(12) United States Patent
Nakaya et al.

(10) Patent No.: US 12,460,074 B2
(45) Date of Patent: Nov. 4, 2025

(54) GAS BARRIER RESIN COMPOSITION, METHOD FOR PRODUCING GAS BARRIER RESIN COMPOSITION, AND MOLDED PRODUCT

(71) Applicant: KURARAY CO., LTD., Okayama (JP)

(72) Inventors: Masakazu Nakaya, Kurashiki (JP); Mizuko Oshita, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 501 days.

(21) Appl. No.: 18/012,792

(22) PCT Filed: Jun. 29, 2021

(86) PCT No.: PCT/JP2021/024488
§ 371 (c)(1),
(2) Date: Dec. 23, 2022

(87) PCT Pub. No.: WO2022/004701
PCT Pub. Date: Jan. 6, 2022

(65) Prior Publication Data
US 2023/0250269 A1 Aug. 10, 2023

(30) Foreign Application Priority Data

Jun. 30, 2020 (JP) .................. 2020-113323
Jun. 30, 2020 (JP) .................. 2020-113325
(Continued)

(51) Int. Cl.
*C08L 23/26* (2025.01)
*B65D 65/40* (2006.01)
(Continued)

(52) U.S. Cl.
CPC .............. *C08L 23/26* (2013.01); *B65D 65/40* (2013.01); *C08F 210/02* (2013.01);
(Continued)

(58) Field of Classification Search
CPC ...... C08L 23/26; C08L 31/04; C08L 2201/08; C08L 2201/14; C08L 2203/10;
(Continued)

(56) References Cited

U.S. PATENT DOCUMENTS 7,811,646 B2 10/2010 Ikeda et al.
8,329,818 B2 12/2012 Ikeda et al.
(Continued)

FOREIGN PATENT DOCUMENTS

EP 3168242 A1 5/2017
JP 2003-231715 A 8/2003
(Continued)

OTHER PUBLICATIONS

Extended European Search Report issued in the corresponding Application No. 21834483.6, dated Jun. 13, 2024.
(Continued)

*Primary Examiner* — James C Yager
(74) *Attorney, Agent, or Firm* — Morgan, Lewis & Bockius LLP

(57) ABSTRACT

Provided are: a gas barrier resin composition having sufficient long-run workability and superior gas barrier properties which compare favorably to those of fossil fuel-derived resins, while containing a biomass-derived raw material; a multilayer structure in which the gas barrier resin is used; and a method for producing such a gas barrier resin composition. The gas barrier resin composition contains at least one type of saponified ethylene-vinyl ester copolymer, wherein of ethylene and a vinyl ester, which are raw materials of the at least one type of saponified ethylene-vinyl ester copolymer, a part is derived from biomass, and a remainder is derived from a fossil fuel.

40 Claims, 7 Drawing Sheets

(30) Foreign Application Priority Data

| Jul. 31, 2020 | (JP) | 2020-129999 |
|---|---|---|
| Jul. 31, 2020 | (JP) | 2020-130000 |
| Jul. 31, 2020 | (JP) | 2020-130004 |
| Jul. 31, 2020 | (JP) | 2020-130007 |
| Jul. 31, 2020 | (JP) | 2020-130011 |
| Jul. 31, 2020 | (JP) | 2020-130012 |
| Jul. 31, 2020 | (JP) | 2020-130017 |
| Dec. 11, 2020 | (JP) | 2020-205872 |

(51) Int. Cl.
  C08F 210/02 (2006.01)
  C08F 218/08 (2006.01)
  C08J 3/00 (2006.01)
  C08J 3/20 (2006.01)
  C08J 5/18 (2006.01)
  C08J 7/048 (2020.01)
  C08J 7/06 (2006.01)
  C08L 31/04 (2006.01)
  A01G 13/32 (2025.01)
  F16L 9/12 (2006.01)

(52) U.S. Cl.
  CPC ............ *C08F 218/08* (2013.01); *C08J 3/005* (2013.01); *C08J 3/203* (2013.01); *C08J 5/18* (2013.01); *C08J 7/048* (2020.01); *C08J 7/06* (2013.01); *C08L 31/04* (2013.01); *A01G 13/32* (2025.01); C08F 2810/00 (2013.01); C08J 2323/26 (2013.01); C08J 2331/04 (2013.01); C08L 2201/08 (2013.01); C08L 2201/14 (2013.01); C08L 2203/10 (2013.01); C08L 2203/162 (2013.01); C08L 2203/18 (2013.01); C08L 2205/025 (2013.01); C08L 2205/035 (2013.01); C08L 2207/04 (2013.01); *F16L 9/12* (2013.01)

(58) Field of Classification Search
  CPC ........... C08L 2203/162; C08L 2203/18; C08L 2205/025; C08L 2205/035; C08L 2207/04; C08L 2203/16; C08L 29/04; C08L 77/00; B65D 65/40; C08F 210/02; C08F 218/08; C08F 2810/00; C08F 8/12; C08F 216/06; C08J 3/203; C08J 5/18; C08J 7/048; C08J 7/06; C08J 2323/26; C08J 2331/04; A01G 13/32; A01G 24/30; A01G 27/06; F16L 9/12; C07C 67/05; C08K 3/36; C08K 5/13; C08K 5/372; C08K 2003/2224; C08K 2003/387; C08K 5/098; C08K 2003/324; C08K 3/08; C08K 5/09; C08K 3/32; C08K 3/38; C08K 13/02; B29C 51/082; B32B 27/08; B32B 27/36; B32B 2037/246; B32B 2307/31

See application file for complete search history.

(56) References Cited

U.S. PATENT DOCUMENTS

| 10,064,345 B2 | 9/2018 | Nishimura et al. |
|---|---|---|
| 10,159,202 B2 | 12/2018 | Nishimura et al. |
| 11,267,941 B2 | 3/2022 | Nakajima et al. |
| 2004/0096683 A1 | 5/2004 | Keda et al. |
| 2005/0147778 A1 | 7/2005 | Tai et al. |
| 2010/0280178 A1 | 11/2010 | Keda et al. |
| 2012/0245382 A1 | 9/2012 | Huber et al. |
| 2013/0312325 A1 | 11/2013 | Nishimura et al. |
| 2016/0021833 A1 | 1/2016 | Nishimura et al. |
| 2019/0315933 A1 | 10/2019 | Nakajima et al. |
| 2021/0269209 A1 | 9/2021 | Suzuki |

FOREIGN PATENT DOCUMENTS

| JP | 2007-137506 A | 6/2007 |
|---|---|---|
| JP | 2007-191713 A | 8/2007 |
| JP | 2014-200968 A | 10/2014 |
| JP | 2018-104647 A | 7/2018 |
| JP | 2019-182947 A | 10/2019 |
| WO | 2012/108374 A1 | 8/2012 |
| WO | 2014/065380 A1 | 5/2014 |
| WO | 2018/163835 A1 | 9/2018 |
| WO | 2019/202405 A1 | 10/2019 |
| WO | 2020/071513 A1 | 4/2020 |

OTHER PUBLICATIONS

Abas Mohsenzadeh et al., "Bioethylene Production from Ethanol: A Review and Techno-economical Evaluation", ChemBioEng Rev, 2017, 4(2): 75-91.

International Search Report issued in corresponding International Patent Application No. No. PCT/JP2021/024488 dated Sep. 14, 2021.

International Preliminary Report on Patentability and Written Opinion issued in corresponding International Patent Application No. No. PCT/JP2021/024488 dated Jan. 12, 2023.

Shoji Saitoh, "Multipurpose use of sugars, Information on sugars," The Agriculture & Livestock Industries Corporation (ALIC), Mar. 6, 2010, 1-9, https://sugar.alic.go.jp/japan/example_03/example0808a.htm.

Schmid et al., "Technofunctional Properties of Films Made from Ethylene Vinyl Acetate/Whey Protein Isolate Compounds," Packaging Technology and Science, 27 (7): 521-533 (2013).

GAS BARRIER RESIN COMPOSITION, METHOD FOR PRODUCING GAS BARRIER RESIN COMPOSITION, AND MOLDED PRODUCT

TECHNICAL FIELD

The present invention relates to a gas barrier resin composition, a method for producing a gas barrier resin composition, a molded product in which the gas barrier resin composition is used, and the like.

DISCUSSION OF THE BACKGROUND

Gas barrier materials containing a resin which is superior in terms of performance of blocking a gas such as oxygen (gas barrier properties) have been widely used for various intended usages such as containers, films, sheets, pipes, and the like. Examples of known resins which are superior in gas barrier properties include polyamides, polyesters, polyvinylidene chlorides, acrylonitrile copolymers, polyvinylidene fluorides, polychlorotrifluoroethylene, saponified ethylene-vinyl ester copolymers, and the like. For example, Patent Document 1 discloses an invention directed to a multilayer plastic container having at least one type of gas barrier resin layer selected from a polyamide, a polyester, a polyvinyl alcohol, an ethylene-vinyl alcohol copolymer, a fluorine-containing resin, and a silicone resin.

On the other hand, with the aim of a recycling-oriented society, there has been growing demand for bioplastics containing a raw material derived from carbon neutral biomass. However, it is known that in some cases, biomass-derived synthetic resins are inferior to fossil fuel-derived synthetic resins in performance. For example, Patent Document 2 teaches that conventional biomass-derived film materials such as polyolefins were insufficient in terms of quality such as adhesiveness, processability, and durability; in order to improve such points, Patent Document 2 discloses an invention directed to a resin film including a biomass-derived resin layer of a specific composition, containing a biomass-derived resin. Furthermore, Patent Document 3 teaches that in some cases, a film in which a petroleum-derived resin is replaced with a biomass-derived resin has decreased impact resistance and the like; in order to improve such points, Patent Document 3 discloses an invention directed to a laminated film having an intermediate layer containing biomass-derived biomass polyethylene, fossil fuel-derived polyethylene, and a propylene-based block polymer resin.

PRIOR ART DOCUMENTS

Patent Documents

Patent Document 1: Japanese Unexamined Patent Application, Publication No. 2007-137506
Patent Document 2: PCT International Publication No. 2014/065380
Patent Document 3: PCT International Publication No. 2018/163835

SUMMARY OF THE INVENTION

Problems to be Solved by the Invention

In the intended usages of gas barrier materials, commercialization of a gas barrier resin synthesized using a biomass-derived raw material is expected. However, since, as described above, there are cases in which biomass-derived synthetic resins are inferior to fossil fuel-derived synthetic resins in performance, in the case of replacing the conventional fossil fuel-derived gas barrier resin with a biomass-derived gas barrier resin, there is concern that the gas barrier properties, being of utmost importance, may decrease. Thus, there is a desire for development of a biomass-derived resin having superior gas barrier properties that compare favorably to those of fossil fuel-derived resins.

Furthermore, gas barrier resins may be molded by melt molding into various shapes such as containers, sheets, and the like. Thus, it is also important to have long-run workability (a characteristic of long term operability) such as defects and the like being unlikely to occur even if melt molding is performed over a long time period.

The present invention was made in view of the foregoing circumstances, and it is an object of the present invention to provide: a gas barrier resin composition having sufficient long-run workability and superior gas barrier properties which compare favorably to those of fossil fuel-derived resins, while containing a biomass-derived raw material; a molded product and the like in which the gas barrier resin composition is used; and a method for producing such a gas barrier resin composition.

Means for Solving the Problems

The present inventors have found that among saponified ethylene-vinyl ester copolymers, being a type of gas barrier resins, a copolymer synthesized using a biomass-derived raw material as a monomer has superior gas barrier properties that compare favorably to the conventional resin having the same structure, synthesized using a fossil fuel-derived raw material as a monomer. On the other hand, the present inventors have also noted that in contrast to the gas barrier properties, the saponified ethylene-vinyl ester copolymer synthesized using the biomass-derived raw material as the monomer tends to be inferior as compared with the resin synthesized using the fossil fuel-derived raw material as the monomer, in terms of the long-run workability. In light of such matters, the present inventors have found that a saponified ethylene-vinyl ester copolymer which contains the biomass-derived raw material and the fossil fuel-derived raw material in combination is capable of demonstrating superior gas barrier properties equivalent to those of the resin which contains only the fossil fuel-derived raw material and also has sufficient long-run workability, while decreasing the environmental load, and have consequently completed the present invention.

More specifically, according to the present invention, the object of the invention is accomplished by providing any one of the following:

(1) A gas barrier resin composition containing at least one type of saponified ethylene-vinyl ester copolymer, wherein of ethylene and a vinyl ester, which are raw materials of the at least one type of saponified ethylene-vinyl ester copolymer, a part is derived from biomass, and a remainder is derived from a fossil fuel;

(2) The gas barrier resin composition according to (1), wherein the at least one type of saponified ethylene-vinyl ester copolymer includes: a saponified ethylene-vinyl ester copolymer (A) in which of ethylene and a vinyl ester, which are raw materials thereof, at least a part is derived from biomass; and a saponified ethylene-vinyl ester copolymer (B) which is derived from a fossil fuel.

(3) The gas barrier resin composition according to (2), wherein a mass ratio (A/B) of the saponified ethylene-vinyl ester copolymer (A) to the saponified ethylene-vinyl ester copolymer (B) is 1/99 or more and 99/1 or less.

(4) The gas barrier resin composition according to (1), wherein the at least one type of saponified ethylene-vinyl ester copolymer includes an ethylene-vinyl alcohol copolymer (A') in which of ethylene and a vinyl ester, which are raw materials thereof, a part is derived from biomass, and a remainder is derived from a fossil fuel.

(5) The gas barrier resin composition according to any one of (1) to (4), wherein a biobased content of the at least one type of saponified ethylene-vinyl ester copolymer is 1% or more and 99% or less.

(6) The gas barrier resin composition according to any one of (1) to (5), having a biobased content of 1% or more and 99% or less.

(7) The gas barrier resin composition according to any one of (1) to (6), containing a sulfur compound at a concentration of more than 0 ppm and 100 ppm or less in terms of sulfur atoms.

(8) The gas barrier resin composition according to (7), wherein the sulfur compound is dimethylsulfide or dimethylsulfoxide.

(9) The gas barrier resin composition according to any one of (1) to (8), wherein of the raw materials, at least a part of the ethylene is derived from biomass.

(10) The gas barrier resin composition according to any one of (1) to (9), wherein of the raw materials, at least a part of the vinyl ester is derived from biomass.

(11) The gas barrier resin composition according to any one of (1) to (10), wherein the at least one type of saponified ethylene-vinyl ester copolymer has a modifying group represented by the following general formula (I):

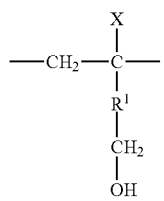

(I)

wherein, in the general formula (1), X represents a hydrogen atom, a methyl group, or a group represented by $R^2$—OH; and $R^1$ and $R^2$ each independently represent a single bond, an alkylene group having 1 to 9 carbon atoms, or an alkyleneoxy group having 1 to 9 carbon atoms, wherein the alkylene group and the alkyleneoxy group may comprise a hydroxyl group, an alkoxy group, or a halogen atom.

(12) The gas barrier resin composition according to any one of (1) to (11), comprising carboxylic acid at a concentration of 30 ppm or more and 1,000 ppm or less in terms of carboxylic acid radical equivalent.

(13) The gas barrier resin composition according to any one of (1) to (12), containing a metal ion at a concentration of 1 ppm or more and 1,000 ppm or less.

(14) The gas barrier resin composition according to any one of (1) to (13), containing a phosphate compound at a concentration of 1 ppm or more and 200 ppm or less in terms of phosphorus atoms.

(15) The gas barrier resin composition according to any one of (1) to (14), containing a boron compound at a concentration of 5 ppm or more and 5,000 ppm or less in terms of boron atoms.

(16) The gas barrier resin composition according to any one of (1) to (15), wherein the at least one type of saponified ethylene-vinyl ester copolymer includes: a saponified ethylene-vinyl ester copolymer (X); and a saponified ethylene-vinyl ester copolymer (Y) having a melting point which is lower than a melting point of the saponified ethylene-vinyl ester copolymer (X).

(17) The gas barrier resin composition according to any one of (1) to (16), further containing an inorganic particle (C), wherein a content of the inorganic particle (C) is 50 ppm or more and 5,000 ppm or less.

(18) The gas barrier resin composition according to any one of (1) to (17), further containing an antioxidant (D), wherein a content of the antioxidant (D) is 0.01% by mass or more and 5% by mass or less.

(19) The gas barrier resin composition according to any one of (1) to (18), further containing: a polyamide (E); and at least one type of a metal atom (F) selected from the group consisting of atoms of magnesium, calcium, and zinc, wherein a mass ratio of the polyamide (E) to the at least one type of saponified ethylene-vinyl ester copolymer is 5/95 or more and 40/60 or less, and a content of the metal atom (F) is 1 ppm or more and 500 ppm or less.

(20) The gas barrier resin composition according to any one of (1) to (19), further containing a thermoplastic elastomer (G), wherein a mass ratio of the thermoplastic elastomer (G) to the at least one type of saponified ethylene-vinyl ester copolymer is 5/95 or more and 35/65 or less.

(21) A method for producing a gas barrier resin composition, wherein the method includes a step of dry-blending pellets of a saponified ethylene-vinyl ester copolymer (A) with pellets of a saponified ethylene-vinyl ester copolymer (B) and carrying out melt kneading, of ethylene and a vinyl ester, which are raw materials of the saponified ethylene-vinyl ester copolymer (A), at least a part is derived from biomass, and the saponified ethylene-vinyl ester copolymer (B) is derived from a fossil fuel.

(22) A method for producing the gas barrier resin composition according to (19), comprising a step of mixing: pellets of the at least one type of saponified ethylene-vinyl ester copolymer; pellets of the polyamide (E); and a compound comprising at least one type of the metal atom (F) selected from the group consisting of atoms of magnesium, calcium, and zinc, and carrying out melt kneading.

(23) A method for producing a gas barrier resin composition, wherein the method includes a step of dry-blending pellets of a saponified ethylene-vinyl ester copolymer (A), pellets of a saponified ethylene-vinyl ester copolymer (B), and pellets of a thermoplastic elastomer (G), and carrying out melt kneading, of ethylene and a vinyl ester, which are raw materials of the saponified ethylene-vinyl ester copolymer (A), at least a part is derived from biomass, and the saponified ethylene-vinyl ester copolymer (B) is derived from a fossil fuel.

(24) A molded product including a gas barrier layer formed from the gas barrier resin composition according to any one of (1) to (20).

(25) A film or sheet including the molded product according to (24).

(26) An industrial film or industrial sheet including the molded product according to (24).

(27) A thermoformed container including the molded product according to (24).

(28) A blow-molded container including the molded product according to (24).

(29) A fuel container including the blow-molded container according to (28).

(30) A bottle-shaped container including the blow-molded container according to (28).

(31) A tube including the molded product according to (24).

(32) A pipe including the molded product according to (24).

(33) A paper container including the molded product according to (24).

(34) A monolayer film formed from the gas barrier resin composition according to any one of (1) to (20).

(35) A multilayer film including at least one layer formed from the gas barrier resin composition according to any one of (1) to (20).

(36) A vapor deposition film including: the monolayer film according to (34), or the multilayer film according to (35) including, as an outermost layer, at least one of the layer formed from the gas barrier resin composition; and at least one inorganic vapor deposition layer, being provided on an exposed surface of the monolayer film or the layer formed from the gas barrier resin composition of the multilayer film.

(37) A multilayer structure including: the vapor deposition film according to (36); and an other layer provided on the inorganic vapor deposition layer of the vapor deposition film.

(38) A heat-sealing film including: the monolayer film according to (34); the multilayer film according to (35); the vapor deposition film according to (36); or the multilayer structure according to (37).

(39) A packaging material including at least one layer constituted from the gas barrier resin composition according to any one of (1) to (20).

(40) A plant cultivation medium including a molded product formed from a resin composition, wherein the resin composition is the gas barrier resin composition according to any one of (1) to (20).

Effects of the Invention

The present invention can provide: a gas barrier resin composition having sufficient long-run workability and superior gas barrier properties which compare favorably to those of fossil fuel-derived resins, while containing a biomass-derived raw material; a molded product and the like in which the gas barrier resin composition is used; and a method for producing such a gas barrier resin composition.

DESCRIPTION OF EMBODIMENTS

Gas Barrier Resin Composition

Figure 1:
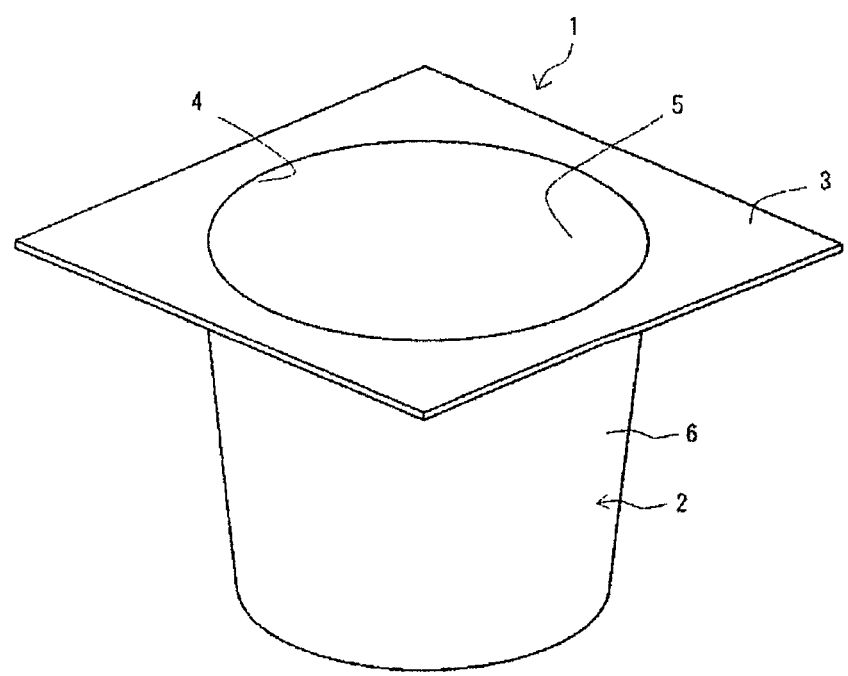
FIG. 1 is a schematic perspective view illustrating a cup-shaped container which is one embodiment of the present invention.

The gas barrier resin composition of the present invention includes at least one type of saponified ethylene-vinyl ester copolymer (ethylene-vinyl alcohol copolymer; hereinafter, may be also referred to as "EVOH"), wherein of ethylene and a vinyl ester, which are raw materials (raw material monomers) of the at least one type of EVOH, a part is derived from biomass, and a remainder of the ethylene and vinyl ester, being the raw materials (raw material monomers), is derived from a fossil fuel. Due to the partial use of the raw material derived from biomass, the environmental load is low. Furthermore, in the gas barrier resin composition, the EVOH is selected and used as the gas barrier resin, and even in a case in which the EVOH is synthesized using the biomass-derived raw material, excellent gas barrier properties equivalent to those of an EVOH having the same structure, synthesized from only a fossil fuel-based raw material, can be exhibited. It is to be noted that the "EVOH having the same structure" means an EVOH in which a degree of polymerization, a content ratio of each structural unit, presence or absence of modification, a degree of saponification, and the like are the same. Furthermore, in the gas barrier resin composition, due to also using the fossil fuel-derived raw material for the EVOH, the long-run workability is sufficient. It is to be noted that although not necessarily clarified, the reason that the present invention exhibits such effects is presumed to be, for example, that in the case of using the biomass-derived raw material to synthesize the EVOH, trace amounts of unavoidable impurities which do not affect the gas barrier properties, but affect the long-run workability are generated and/or mixed in.

The long-run workability as referred to herein can be evaluated by a method described in EXAMPLES, and can be comprehensively evaluated in accordance with a degree of flaws, streaks, and coloring when carrying out continuous film formation of the gas barrier resin composition. However, since, for example, there are cases in which coloring may not be particularly problematic depending upon the intended usage, etc., if there are few defects and streaks when carrying out continuous film formation for a predetermined time period (for example, 10 hours), the long-run workability is evaluated to be sufficient.

That the ethylene and vinyl ester contained as the raw materials contain both the biomass-derived raw material and the fossil fuel-derived raw material can be confirmed by measuring a biobased content. The biobased content means an index representing a proportion of the biomass-derived raw material, and as referred to herein, means a percentage content of biobased carbon determined by measuring a concentration of radioactive carbon ($^{14}C$) by means of an accelerator mass spectrometer (AMS). Specifically, the biobased content can be measured in accordance with a method disclosed in ASTM D6866-18. That is to say, typically, in a case in which the biobased content of an EVOH is more than 0% and less than 100%, it can be deemed that the ethylene and vinyl ester used as the raw materials contain both biomass-derived raw material and fossil fuel-derived raw material.

"Biomass" as referred to means a resource which is an organic substance derived from an animal or a plant, and refers to substances other than "fossil fuel" (fossil resources). The biomass may be a resource that is an organic substance derived from a plant.

The gas barrier resin composition of the present invention enables tracking a company's product by using the concentration of radioactive carbon ($^{14}C$). While conducting activities, a living organism incorporates and contains a certain amount of radioactive carbon ($^{14}C$) in the atmosphere, but when the activity stops, the incorporation of new 14C ceases, and a ratio of $^{14}C$ to total carbon decreases. Furthermore, it is known that when a plant fixes carbon, a phenomenon referred to as isotope fractionation occurs, where the ratio of $^{14}C$ to total carbon varies for each seed of the plant. It is known that the ratio of $^{14}C$ to total carbon also varies in accordance with locality and age, whereby raw materials having varying ratios of $^{14}C$ to total carbon can be obtained in accordance with the biomass used as the raw material. Since almost no $^{14}C$ remains in fossil fuel-derived raw materials, for example, by altering a ratio of the biomass-derived raw material and the fossil fuel-derived raw material, an EVOH having a certain ratio of $^{14}C$ to total carbon can be obtained, and by investigating this ratio of $^{14}C$ to total carbon, tracking of the company-produced EVOH (gas barrier resin composition) is enabled.

EVOHs are used for a wide variety of intended usages, and it is a supplier's duty to supply high-quality products to the market. Furthermore, there is a demand for a method to distinguish a company's product from another company's products for branding. For example, an EVOH used in a gas barrier layer of a commercial available packaging container is molded into a packaging container by thermoforming, and the saponified ethylene-vinyl ester copolymer sometimes forms an unmelted gel in a solvent due to thermal history undergone during the thermoforming. Thus, there are many cases in which even if the packaging container is recovered, the EVOH used is extracted with the solvent, and an effort is made to measure a molecular weight thereof, it is difficult to accurately measure the molecular weight. Consequently, whether the EVOH is the company's cannot be discriminated by merely analyzing a molded product.

EVOHs go through many distribution channels to be used in films, sheets, containers, and the like, as packaging materials for food products, medical drugs, industrial chemicals, pesticides, and the like. Furthermore, making use of the barrier properties, heat retention, pollution resistance, and the like thereof, EVOHs are also used for purposes such as fuel tanks for vehicles such as automobiles, tube materials for tires, agricultural films, geomembranes, cushion materials for shoes, and the like. In a case in which these materials in which EVOHs are used are then disposed of, it is difficult to discriminate at which plant, and on which production line the resins and used packaging containers were produced. Furthermore, it is also difficult to perform tracking for the company's products during or after use, such as quality investigations, impact on the environment after disposal, degradability in the ground, and the like.

As one method for tracking the company's product, for example, a method involving adding a tracer substance to the EVOH could be conceived of. However, there may be a case in which the addition of the tracer could increase cost or decrease performance of the EVOH. Against this background, it can be deemed that enabling using the concentration of radioactive carbon ($^{14}C$) to trace the company's products is an extremely useful effect.

The gas barrier resin composition of the present invention is a resin composition that has a function of inhibiting gas transmission. Under a condition involving 20° C. and 65% RH, the upper limit of an oxygen transmission rate of the gas barrier resin composition of the present invention, measured in accordance with a method disclosed in JIS K 7126-2 (isobaric method; 2006) is preferably 100 mL 20 μm/m$^2$·day atm, more preferably 50 mL 20 μm/m$^2$ day atm, and still more preferably 10 mL 20 μm/m$^2$ day atm, 1 mL 20 μm/m$^2$·day atm, or 0.5 mL 20 μm/m$^2$·day atm.

EVOH

A mode of the at least one type of EVOH contained in the gas barrier resin composition of the present invention may be exemplified by the forms of (I) and (II) below.

(I) a form containing: an EVOH (A) in which of ethylene and a vinyl ester, which are raw materials thereof, at least a part is derived from biomass; and an EVOH (B) being derived from a fossil fuel; and (II) a form containing an EVOH (A') in which of ethylene and a vinyl ester, which are raw materials thereof, a part is derived from biomass, and a remainder is derived from a fossil fuel.

The at least one type of EVOH may be an EVOH in which of an ethylene unit, a vinyl alcohol unit, and a vinyl ester unit, a part is derived from biomass, and a remainder is derived from a fossil fuel. That is, the EVOH (A) may be an EVOH in which of the ethylene unit, the vinyl alcohol unit, and the vinyl ester unit, at least a part is derived from biomass. The EVOH (B) may be an EVOH in which all of the ethylene unit, the vinyl alcohol unit, and the vinyl ester unit are derived from a fossil fuel. The EVOH (A') may be an EVOH in which of the ethylene unit, the vinyl alcohol unit, and the vinyl ester unit, a part is derived from biomass, and a remainder is derived from a fossil fuel.

EVOH (A)

The EVOH (A) is an EVOH in which of ethylene and a vinyl ester, which are raw material monomers thereof, at least a part is derived from biomass. Due to the EVOH (A) containing the biomass-derived raw material, the biobased content of the gas barrier resin composition of the present invention is increased, thereby enabling decreasing the environmental load.

The EVOH (A) is obtained by saponifying the copolymer of ethylene and the vinyl ester, at least a part of which is derived from biomass. Production and saponification of the ethylene-vinyl ester copolymer serving as a precursor of the EVOH (A) may be performed by well-known procedures similar to those of production and saponification of the conventional fossil fuel-derived ethylene-vinyl ester copolymer. As the vinyl ester, for example, a carboxylic acid vinyl ester such as vinyl acetate, vinyl formate, vinyl propionate, vinyl valerate, vinyl caprate, vinyl laurate, vinyl stearate, vinyl pivalate, or vinyl versatate may be used, and vinyl acetate is preferred.

The biomass-derived ethylene may be produced by a well-known procedure such as purifying bioethanol from a biomass raw material and allowing a dehydration reaction. A waste material, an unused material, a resource crop, or the like may be used as the biomass raw material, and examples of raw materials that may be used include a cellulosic crop (e.g., pulp, kenaf, wheat straw, rice straw, waste paper, and a paper manufacturing residue), timber, charcoal, compost, natural rubber, raw cotton, sugarcane, tofu refuse, a fat or oil (e.g., rapeseed oil, cottonseed oil, soybean oil, coconut oil, or castor oil), a carbohydrate crop (e.g., corn, potato, wheat, rice, rice husk, rice bran, waste rice, cassava, and sago palm), bagasse, buckwheat, essential oils (e.g., pine root oil, orange oil, and *eucalyptus* oil), pulp black liquor, vegetable oil scum, and the like.

A procedure for producing the bioethanol is not particularly limited, and for example, a procedure of pretreating the biomass raw material as needed (e.g., a pressurized hot water treatment, an acid treatment, an alkali treatment, or a saccharification treatment using a saccharification enzyme), producing yeast-fermented bioethanol, and then purifying the bioethanol by means of a distilling step and a dehydrating step may be employed. At the time of the bioethanol production, in the case of performing the saccharification treatment, sequential saccharification and fermentation may be employed, involving performing the saccharification and the fermentation stepwise, or parallel saccharification and fermentation may be employed, involving performing the saccharification and the fermentation concurrently; however, in light of production efficiency, the bioethanol is preferably produced by the parallel saccharification and fermentation.

A commercially available biomass-derived ethylene may be used, and for example, a sugarcane-derived bioethylene, manufactured by Braskem S.A., or the like may be used.

A vinyl ester produced using biomass-derived ethylene may be exemplified as the biomass-derived vinyl ester. A procedure for producing the biomass-derived vinyl ester may be exemplified by a procedure of using a palladium catalyst to permit a reaction between ethylene, acetic acid, and an oxygen molecule, being a typical industrial process, and the like. Furthermore, the biomass-derived vinyl ester may be a vinyl ester produced by using biomass-derived carboxylic acid. In a case in which a degree of saponification of the EVOH (A) is not 100 mol %, a biomass-derived acyl group will remain.

The lower limit of an ethylene unit content in the EVOH (A) is preferably 20 mol %, more preferably 23 mol %, and still more preferably 25 mol %. When the ethylene unit content in the EVOH (A) is 20 mol % or more, the long-run workability tends to improve. The upper limit of the ethylene unit content in the EVOH (A) is preferably 60 mol %, more preferably 55 mol %, and still more preferably 50 mol %. When the ethylene unit content in the EVOH (A) is 60 mol % or less, the gas barrier properties tend to be more favorable. The ethylene unit content in the EVOH can be determined by a nuclear magnetic resonance (NMR) procedure.

The lower limit of the degree of saponification of the EVOH (A) is preferably 90 mol %, more preferably 95 mol %, and still more preferably 99 mol %. When the degree of saponification of the EVOH (A) is 90 mol % or greater, the gas barrier properties and the long-run workability of the gas barrier resin composition of the present invention tend to be more favorable. Furthermore, the upper limit of the degree of saponification of the EVOH (A) may be 100 mol %, or may be 99.97 mol % or 99.94 mol %. The degree of saponification of the EVOH can be calculated by performing a $^1$H-NMR measurement to measure a peak area of hydrogen atoms contained in a vinyl ester structure, and a peak area of hydrogen atoms contained in a vinyl alcohol structure.

With regard to the ethylene and the vinyl ester contained as the raw materials of the EVOH (A), at least a part thereof is derived from biomass, and it is preferred that at least a part of the vinyl ester is derived from biomass, and all of the vinyl ester may be derived from biomass. Furthermore, it is also preferred that at least a part of the ethylene, which is one of the raw materials of the EVOH (A), is derived from biomass, and all of the ethylene may be derived from biomass. Moreover, it may be preferred that at least a part of the vinyl ester and at least a part of the ethylene, which are the raw materials of the EVOH (A), are derived from biomass, and all of the vinyl ester and the ethylene may be derived from biomass.

The lower limit of a proportion of the biomass-derived vinyl alcohol unit in total vinyl alcohol units (saponified vinyl alcohol units) constituting the EVOH (A) is preferably 1 mol %, more preferably 5 mol %, still more preferably 10 mol %, yet more preferably 25 mol % or 45 mol %, or may be 70 mol %, 90 mol %, or 99 mol %, and all of the vinyl alcohol units constituting the EVOH (A) may be derived from biomass. The upper limit of a proportion of the fossil fuel-derived vinyl alcohol unit in total vinyl alcohol units constituting the EVOH (A) is preferably 99 mol %, more preferably 95 mol %, still more preferably 90 mol %, yet more preferably 75 mol % or 55 mol %, or may be 30 mol %, 10 mol %, or 1 mol %, and it is acceptable for the fossil fuel-derived vinyl alcohol unit to not be contained in total vinyl alcohol units constituting the EVOH (A). When the proportion of the biomass-derived vinyl alcohol unit in the total vinyl alcohol units constituting the EVOH (A) becomes higher, the biobased content in the gas barrier resin composition of the present invention increases, whereby there is a tendency to enable decreasing the environmental load. On the other hand, in light of providing the gas barrier resin composition to be superior in terms of a balance of the biobased content and the long-run workability, the proportion of the biomass-derived vinyl alcohol unit is preferably 5 mol % or greater and 95 mol % or less, more preferably 15 mol % or greater and 85 mol % or less, still more preferably 25 mol % or greater and 75 mol % or less, and particularly preferably 35 mol % or greater and 65 mol % or less.

The lower limit of a proportion of the biomass-derived ethylene unit in the total ethylene units constituting the EVOH (A) is preferably 1 mol %, more preferably 5 mol %, still more preferably 10 mol %, yet more preferably 25 mol % or 45 mol %, or may be 70 mol %, 90 mol %, or 99 mol %, and all of the ethylene units constituting the EVOH (A) may be derived from biomass. The upper limit of a proportion of the fossil fuel-derived ethylene unit in the total ethylene units constituting the EVOH (A) is preferably 99 mol %, more preferably 95 mol %, still more preferably 90 mol %, yet more preferably 75 mol % or 55 mol %, or may be 30 mol %, 10 mol %, or 1 mol %, and it is acceptable for the fossil fuel-derived ethylene unit to not be contained in the total ethylene units constituting the EVOH (A). When the proportion of the biomass-derived ethylene unit in the total ethylene units constituting the EVOH (A) becomes higher, the biobased content in the gas barrier resin composition of the present invention increases, whereby there is a tendency to enable decreasing the environmental load. On the other hand, in light of providing the gas barrier resin composition to be superior in terms of a balance of the biobased content and the long-run workability, the proportion of the biomass-derived ethylene unit is preferably 5 mol % or greater and 95 mol % or less, more preferably 15 mol % or greater and 85 mol % or less, still more preferably 25 mol % or greater and 75 mol % or less, and particularly preferably 35 mol % or greater and 65 mol % or less.

In light of decreasing the environmental load of the gas barrier resin composition of the present invention, the lower limit of the biobased content of the EVOH (A) is preferably 1%, more preferably 5%, still more preferably 20%, and particularly preferably 40%. Further, the lower limit of the biobased content of the EVOH (A) may be 60%, or may be 80% or 95%. Furthermore, the upper limit of the biobased content of the EVOH (A) may be 100%, and in light of the long-run workability being favorable, is preferably 99%, more preferably 95%, or may be still more preferably 85%, 75%, or 65%.

The EVOH (A) may have, within a range not leading to impairment of the object of the present invention, a unit derived from an other monomer aside from ethylene, vinyl ester, and a saponification product thereof. In the case in which the EVOH (A) has the unit derived from the other monomer, the upper limit of a content of the unit derived from the other monomer with respect to total structural units of the EVOH (A) is preferably 30 mol %, more preferably 20 mol %, still more preferably 10 mol %, yet more preferably 5 mol %, or may be still yet more preferably 1 mol %. Furthermore, in the case in which the EVOH (A) has the unit derived from the other monomer, the lower limit of the content thereof may be 0.05 mol % or more, or may be 0.10 mol %. Examples of the other monomer include: alkenes such as propylene, butylene, pentene, and hexene; alkenes having an ester group such as 3-acyloxy-1-propene, 3-acyloxy-1-butene, 4-acyloxy-1-butene, 3,4-diacyloxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-acyloxy-1-pentene, 5-acyloxy-1-pentene, 4,5-diacyloxy-1-pentene, 4-acyloxy-1-hexene, 5-acyloxy-1-hexene, 6-acyloxy-1-hexene, 5,6-diacyloxy-1-hexene, and 1,3-diacetoxy-2-methylenepropane, and saponification products thereof; unsaturated acids such as acrylic acid, methacrylic acid, crotonic acid, and itaconic acid, and anhydrides, salts, and mono- or dialkyl esters thereof; nitriles such as acrylonitrile and methacrylonitrile; amides such as acrylamide and methacrylamide; olefin sulfonic acids such as vinylsulfonic acid, acrylsulfonic acid, and methacrylsulfonic acid, and salts thereof; vinylsilane compounds such as vinyltrimethoxysilane, vinyltriethoxysilane, vinyltri(β-methoxy-ethoxy)silane, and γ-methacryloxypropylmethoxysilane; alkyl vinyl ethers; vinyl ketone; N-vinylpyrrolidone; vinyl chloride; vinylidene chloride; and the like.

The EVOH (A) may be subjected to post-modification with a process such as urethanization, acetalization, cyanoethylation, oxyalkylenation, or the like.

In the case in which the EVOH (A) has a modifying group, the EVOH (A) preferably has a structural unit (modifying group) represented by the following formula (I).

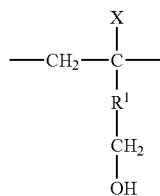

(I)

In the formula (I), X represents a hydrogen atom, a methyl group, or a group represented by $R^2$—OH; and $R^1$ and $R^2$ each independently represent a single bond, an alkylene group having 1 to 9 carbon atoms, or an alkyleneoxy group having 1 to 9 carbon atoms, wherein the alkylene group and the alkyleneoxy group may comprise a hydroxy group, an alkoxy group, or a halogen atom.

X represents preferably a hydrogen atom or the group represented by $R^2$—OH, and more preferably the group represented by $R^2$—OH.

The alkylene group and the alkyleneoxy group which may be used as $R^1$ or $R^2$ may contain a hydroxy group, an alkoxy group, or a halogen atom. $R^1$ and $R^2$ each represent preferably an alkylene group or an alkyleneoxy group each having 1 to 5 carbon atoms, and more preferably an alkylene group or an alkyleneoxy group each having 1 to 3 carbon atoms.

Specific examples of the structural unit (modifying group) represented by the formula (I) include structural units (modifying groups) represented by the following formula (II), formula (III), and formula (IV), and of these, the structural unit (modifying group) represented by the formula (II) is preferred.

(II)

In the formula (II), $R^3$ and $R^4$ each independently represent a hydrogen atom or an alkyl group having 1 to 8 carbon atoms, wherein the alkyl group may contain a hydroxy group, an alkoxy group, or a halogen atom.

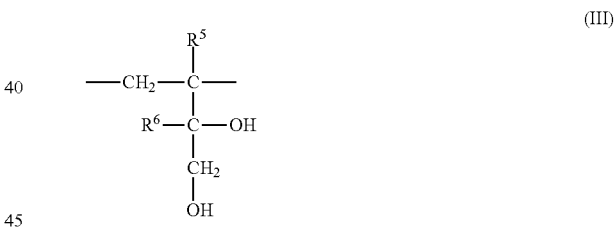

(III)

In the formula (III), $R^5$ is defined as X is in the formula (I); and $R^6$ represents a hydrogen atom or an alkyl group having 1 to 8 carbon atoms, wherein the alkyl group may contain a hydroxy group, an alkoxy group, or a halogen atom.

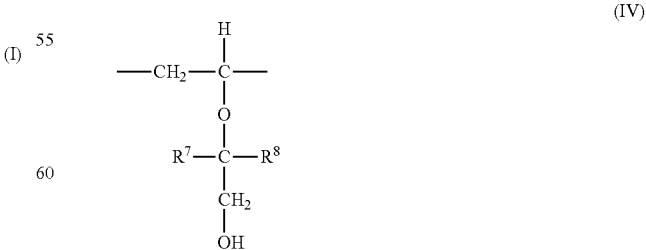

(IV)

In the formula (IV), $R^7$ and $R^8$ each independently represent a hydrogen atom, an alkyl group having 1 to 8 carbon atoms, a cycloalkyl group having 3 to 8 carbon atoms, or a hydroxy group, wherein a part or all of hydrogen atoms contained in the alkyl group and the cycloalkyl group may be substituted with a hydroxy group, an alkoxy group, or a halogen atom.

In the present invention, it is preferred that in the formula (I), $R^1$ represents a single bond, and X represents a hydroxymethyl group ($R^3$ and $R^4$ in the formula (II) each represent a hydrogen atom). When the EVOH (A) having this structural unit (modifying group) is contained, there is a tendency to be able to enhance secondary processability such as stretchability and thermoformability, without significantly deteriorating the gas barrier properties. In the case in which the EVOH (A) has the structural unit (modifying group), the lower limit of a content thereof is preferably 0.1 mol %, more preferably 0.4 mol %, and still more preferably 1.0 mol %. On the other hand, in light of the gas barrier properties being favorable, the upper limit of the content of the structural unit (modifying group) is preferably 20 mol %, more preferably 10 mol %, still more preferably 8 mol %, and particularly preferably 5 mol %.

In the present invention, it is also preferred that in the formula (I), $R^1$ represents a hydroxymethylene group, and X represents a hydrogen atom ($R^5$ and $R^6$ in the formula (III) each represent a hydrogen atom). When the EVOH (A) having this structural unit (modifying group) is contained, there is a tendency to be able to enhance secondary processability such as stretchability and thermoformability, without significantly deteriorating the gas barrier properties. In the case in which the EVOH (A) has the structural unit (modifying group), the lower limit of a content thereof is preferably 0.1 mol %, more preferably 0.4 mol %, and still more preferably 1.0 mol %. On the other hand, in light of the gas barrier properties being favorable, the upper limit of the content of the structural unit (modifying group) is preferably 20 mol %, more preferably 10 mol %, still more preferably 8 mol %, and particularly preferably 5 mol %.

In the present invention, it is also preferred that in the formula (I), $R^1$ represents a methymethyleneoxy group, and X represents a hydrogen atom. When the EVOH (A) having this structural unit (modifying group) is contained, there is a tendency to be able to enhance secondary processability such as stretchability and thermoformability, without significantly deteriorating the gas barrier properties. Furthermore, in the methylmethyleneoxy group, an oxygen atom bonds to a carbon atom on the main chain. More specifically, it is preferred that in the formula (IV), one of $R^7$ and $R^8$ represents a methyl group, and the other one of $R^7$ and $R^8$ represents a hydrogen atom. In the case in which the EVOH (A) has the structural unit (modifying group), the lower limit of a content thereof is preferably 0.1 mol %, more preferably 0.5 mol %, still more preferably 1.0 mol %, and particularly preferably 2.0 mol %. On the other hand, in light of the gas barrier properties being favorable, the upper limit of the content of the structural unit (modifying group) is preferably 20 mol %, more preferably 15 mol %, and still more preferably 10 mol %.

The EVOH (A) may be used alone, or two or more types thereof may be used in combination.

The lower limit of a melt flow rate (MFR) of the EVOH (A) at 190° C. under a load of 2,160 g, measured in accordance with JIS K7210: 1999, is preferably 0.1 g/10 min, more preferably 0.5 g/10 min, and still more preferably 1.0 g/10 min. On the other hand, the upper limit of the MFR of the EVOH (A) is preferably 30 g/10 min, more preferably 20 g/10 min, and still more preferably 15 g/10 min. When the MFR of the EVOH (A) at 190° C. under a load of 2,160 g falls within the above range, melt formability improves, and consequently, the long-run workability tends to improve.

The lower limit of a melting point of the EVOH (A) is preferably 135° C., more preferably 150° C., and still more preferably 155° C. When the melting point of the EVOH (A) is 135° C. or higher, there is a tendency for superiority in terms of the gas barrier properties. Furthermore, the upper limit of the melting point of the EVOH (A) is preferably 200° C., more preferably 190° C., and still more preferably 185° C. When the melting point of the EVOH (A) is 200° C. or lower, the melt moldability tends to be favorable, and consequently, the long-run workability tends to improve.

EVOH (B)

The EVOH (B) is a fossil fuel-derived EVOH. As referred to herein, "fossil fuel-derived EVOH" means an EVOH synthesized using a fossil fuel-derived raw material. More specifically, the EVOH (B) is an EVOH in which all of the ethylene, the vinyl ester, and the other monomer, which is contained as necessary, are derived from a fossil fuel. In other words, the EVOH (B) is an EVOH synthesized without using a biomass-derived raw material. When the gas barrier resin composition of the present invention contains the EVOH (B), sufficient long-run workability can be exhibited.

Except for the raw materials being derived from fossil fuel, i.e., except for the biobased content being 0%, a specific and suitable mode of the EVOH (B) is similar to that of the EVOH (A). More specifically, a specific and suitable ethylene unit content, degree of saponification, type and content of the other monomer, MFR, melting point, and the like are the same as those of EVOH (A).

The EVOH (B) may be used alone, or two or more types thereof may be used in combination.

In the mode of (I) above, in which the EVOH (A) and the EVOH (B) are used in combination, the lower limit of a mass ratio (A/B) of the EVOH (A) to the EVOH (B) is preferably 1/99, more preferably 5/95, still more preferably 15/85, and particularly preferably 40/60. When the mass ratio (A/B) is 1/99 or more, the biobased content of the gas barrier resin composition of the present invention can be increased, thereby enabling decreasing the environmental load. In light of further decreasing the environmental load, the lower limit of the mass ratio (A/B) may be preferably 60/40, or may be preferably 75/25. Furthermore, the upper limit of the mass ratio (A/B) is preferably 99/1, more preferably 95/5, may be still more preferably 85/15, or may be yet more preferably 60/40 or 40/60. When the mass ratio (A/B) is 99/1 or less, the long-run workability can be improved.

The ethylene unit content, the degree of saponification, the MFR, the melting point, and the like of the EVOH (A) and the EVOH (B) may each be the same or different. In light of, e.g., improving types of performance such as the long-run workability, it is preferred that the ethylene unit content, the degree of saponification, the MFR, and the melting point of the EVOH (A) and the EVOH (B) are each the same, or are approximate in value. A difference between the ethylene unit contents in the EVOH (A) and the EVOH (B) is preferably 6 mol % or less, more preferably 3 mol % or less, and still more preferably 0 mol %. Furthermore, a difference between the degrees of saponification of the EVOH (A) and the EVOH (B) is preferably 2 mol % or less, more preferably 1 mol % or less, and still more preferably 0 mol %. Moreover, a difference between the MFRs of the EVOH (A) and the EVOH (B) is preferably 2 g/10 min or less, more preferably 1 g/10 min or less, and still more preferably 0 g/10 min. In addition, the difference between the melting points of the EVOH (A) and the EVOH (B) is preferably 7° C. or lower, more preferably 3° C. or lower, and still more preferably 0° C.

EVOH (A')

The EVOH (A') is an EVOH in which of ethylene and the vinyl ester, which are raw material monomers thereof, a part is derived from biomass, and the remainder of ethylene and the vinyl ester is derived from a fossil fuel. Due to the raw material of the EVOH (A') containing the biomass-derived raw material, the biobased content in the gas barrier resin composition of the present invention is increased, whereby there is a tendency to enable decreasing the environmental load. Furthermore, due to the raw material of the EVOH (A') containing the fossil fuel-derived raw material, the long-run workability of the gas barrier resin composition of the present invention can be favorable.

The EVOH (A') is obtained by saponifying the copolymer of ethylene and a vinyl ester, a part of which is derived from biomass and the remainder of which is derived from a fossil fuel. Production and saponification of an ethylene-vinyl ester copolymer serving as the precursor of the EVOH (A') can be performed by a conventionally well-known method, except for the biomass-derived raw material being used as a part of the raw material.

Examples of a biomass-derived ethylene and a biomass-derived vinyl ester which can be used in synthesizing the EVOH (A') are similar to those described above, which can be used in synthesizing the EVOH (A).

Specific and suitable conditions for an ethylene unit content and a degree of saponification of the EVOH (A') are similar to those of the EVOH (A), described above.

In the ethylene and the vinyl ester which are used as the raw materials of the EVOH (A'), it is preferred that at least a part of the ethylene is derived from biomass, and all of the ethylene may be derived from biomass. Furthermore, it is also preferred that at least a part of the vinyl ester, which is one of the raw materials of the EVOH (A'), is derived from biomass, and all of the vinyl ester may be derived from biomass.

The lower limit of a proportion of the biomass-derived vinyl alcohol unit in total vinyl alcohol units (saponified vinyl alcohol units) constituting the EVOH (A') is preferably 1 mol %, more preferably 5 mol %, still more preferably 10 mol %, still more preferably 25 mol % or 45 mol %, or may be 70 mol %, 90 mol %, or 99 mol %, and all of the vinyl alcohol units constituting the EVOH (A) may be derived from biomass. The upper limit of a proportion of the fossil fuel-derived vinyl alcohol unit in total vinyl alcohol units constituting the EVOH (A') is preferably 99 mol %, more preferably 95 mol %, still more preferably 90 mol %, still more preferably 75 mol % or 55 mol %, or may be 30 mol %, 10 mol %, or 1 mol %, and it is acceptable for the fossil fuel-derived vinyl alcohol unit to not be contained in the total vinyl alcohol units constituting the EVOH (A'). When the proportion of the biomass-derived vinyl alcohol unit in the total vinyl alcohol units constituting the EVOH (A') becomes higher, the biobased content in the gas barrier resin composition of the present invention increases, whereby there is a tendency to enable decreasing the environmental load. On the other hand, in light of providing the gas barrier resin composition to be superior in terms of a balance of the biobased content and the long-run workability, the proportion of the biomass-derived vinyl alcohol unit is preferably 5 mol % or greater and 95 mol % or less, more preferably 15 mol % or greater and 85 mol % or less, still more preferably 25 mol % or greater and 75 mol % or less, and particularly preferably 35 mol % or greater and 65 mol % or less.

The lower limit of a proportion of the biomass-derived ethylene unit in total ethylene units constituting the EVOH (A') is preferably 1 mol %, more preferably 5 mol %, still more preferably 10 mol %, still more preferably 25 mol % or 45 mol %, or may be 70 mol %, 90 mol %, or 99 mol %, and all of the ethylene units constituting the EVOH (A') may be derived from biomass. The upper limit of a proportion of the fossil fuel-derived ethylene unit in total ethylene units constituting the EVOH (A') is preferably 99 mol %, more preferably 95 mol %, still more preferably 90 mol %, yet more preferably 75 mol % or 55 mol %, or may be 30 mol %, 10 mol %, or 1 mol %, and it is acceptable for the fossil fuel-derived ethylene unit to not be contained in total vinyl alcohol units constituting the EVOH (A'). When the proportion of the biomass-derived ethylene unit in the total ethylene units constituting the EVOH (A') becomes higher, the biobased content in the gas barrier resin composition of the present invention increases, whereby there is a tendency to enable decreasing the environmental load. On the other hand, in light of providing the gas barrier resin composition to be superior in terms of a balance of the biobased content and the long-run workability, the proportion of the biomass-derived ethylene unit is preferably 5 mol % or greater and 95 mol % or less, more preferably 15 mol % or greater and 85 mol % or less, still more preferably 25 mol % or greater and 75 mol % or less, and particularly preferably 35 mol % or greater and 65 mol % or less.

In light of decreasing the environmental load of the gas barrier resin composition of the present invention, the lower limit of the biobased content of the EVOH (A') is preferably 1%, more preferably 5%, still more preferably 20%, and particularly preferably 40%. Furthermore, in, for example, an intended usage in which superior long-run workability is not required, the lower limit of the biobased content of the EVOH (A') may be 60%, or may be 80%. On the other hand, in light of the long-run workability being favorable, the upper limit of the biobased content of the EVOH (A') is preferably 99%, more preferably 95%, or may be still more preferably 85%, 75%, or 65%.

The EVOH (A') may contain, within a range not leading to impairment of the object of the present invention, a unit derived from a monomer other than ethylene, a vinyl ester, and a saponification product thereof, and the EVOH (A') may be post-modified. Copolymer components and specific examples of the post-modification are the same as those of EVOH (A), described above.

The EVOH (A') may be used alone, or two or more types thereof may be used in combination.

Suitable modes of: a melt flow rate (MFR) of the EVOH (A') at 190° C. under a load of 2,160 g, measured in accordance with JIS K7210: 1999, and a melting point of the EVOH (A') are the same as those of the EVOH (A), described above.

EVOH (X) and EVOH (Y)

The at least one type of EVOH preferably includes an EVOH (X), and an EVOH (Y) having a melting point which is lower than a melting point of the EVOH (X). In other words, the at least one type of EVOH can preferably be categorized into at least the two parts of the EVOH (X) and the EVOH (Y). In the case in which the gas barrier resin composition of the present invention contains the two types of EVOHs (the EVOH (X) and the EVOH (Y)) having the different melting points, there is a tendency to enable maintaining favorable gas barrier properties and favorable moldability. Such a gas barrier resin composition is particularly suitable as a material for, e.g., a multilayer sheet, a packaging material obtained by molding the multilayer sheet by a heat-stretching molding process, a container obtained by molding the multilayer sheet by a vacuum/pressure molding process, and the like.

The EVOH (X) consists of one, or two of more of the EVOH (A), the EVOH (B), and the EVOH (A'). Similarly, the EVOH (Y) consists of one, or two of more of the EVOH (A), the EVOH (B), and the EVOH (A'). The same applies to EVOH (Z), described later.

A relationship between the EVOH (X) and the EVOH (Y), and the EVOH (A), the EVOH (B), and the EVOH (A') may be exemplified as in the following:
- a mode in which one of the EVOH (X) and the EVOH (Y) is the EVOH (A), and the other is the EVOH (B);
- a mode in which at least one of the EVOH (X) and the EVOH (Y) includes the EVOH (A) or the EVOH (A), and the EVOH (B);
- a mode in which the EVOH (X) and the EVOH (Y) are the EVOH (A'); and the like.

EVOH (X)

The EVOH (X) is the EVOH having the melting point which is higher than the melting point of the EVOH (Y), and is typically the EVOH having the highest melting point of the EVOHs contained in the gas barrier resin composition of the present invention. When to the gas barrier resin composition contains the EVOH (X), there is a tendency for the gas barrier resin composition to be superior in the gas barrier properties. The lower limit of the melting point of the EVOH (X) is preferably 150° C., more preferably 155° C., and still more preferably 160° C. The upper limit of the melting point of the EVOH (X) is preferably 200° C. When the melting point of the EVOH (X) falls within the above range, the gas barrier properties of the gas barrier resin composition tend to be favorable.

In light of the moldability and the long-run workability being favorable, the lower limit of an ethylene unit content in the EVOH (X) is preferably 20 mol %, more preferably 22 mol %, and still more preferably 24 mol %. Furthermore, in light of increasing the melting point and in light of the gas barrier properties being favorable, the upper limit of the ethylene unit content in the EVOH (X) is preferably 50 mol %, more preferably 48 mol %, and still more preferably 46 mol %.

The lower limit of the degree of saponification of the EVOH (X) is preferably 90 mol %, more preferably 95 mol %, and still more preferably 99 mol %. When the degree of saponification of the EVOH (X) is 90 mol % or greater, the gas barrier properties and the long-run workability of the gas barrier resin composition of the present invention tend to be more favorable. Furthermore, the upper limit of the degree of saponification of the EVOH (X) may be 100 mol %, or may be 99.97 mol % or 99.94 mol %.

The EVOH (X) may have, within a range not leading to impairment of the object of the present invention, an other monomer unit aside from the ethylene, the vinyl ester, and the saponification product thereof, but in light of maintaining the gas barrier properties of the gas barrier resin composition of the present invention at a high level, it is preferred that the EVOH (X) does not have the other monomer unit. A monomer that gives the other monomer unit may be exemplified by monomers exemplified in the description of EVOH (A), and the like. In the case in which the EVOH (X) has the other monomer unit, a content thereof with respect to total structural units of the EVOH (X) is preferably 5 mol % or less, more preferably 3 mol % or less, and still more preferably 1 mol % or less.

The lower limit of a melt flow rate (MFR) of the EVOH (X) at 190° C. under a load of 2,160 g, measured in accordance with JIS K7210: 1999, is preferably 0.1 g/10 min, more preferably 0.5 g/10 min, and still more preferably 1.0 g/10 min. On the other hand, the upper limit of the MFR of the EVOH (X) is preferably 30 g/10 min, more preferably 20 g/10 min, and still more preferably 15 g/10 min. When the MFR of the EVOH (X) at 190° C. under a load of 2,160 g falls within the above range, the melt moldability tends to improve, and consequently, the long-run workability tends to improve.

EVOH (Y)

The EVOH (Y) is the EVOH having the melting point which is lower than the melting point of the EVOH (X). When the gas barrier resin composition of the present invention contains the EVOH (Y), there is a tendency for the gas barrier resin composition to be superior in the moldability. The lower limit of the melting point of the EVOH (Y) is preferably 100° C., more preferably 105° C., and still more preferably 110° C. The upper limit of the melting point of the EVOH (Y) is preferably 180° C. When the melting point of the EVOH (Y) falls within the above range, the gas barrier properties of the gas barrier resin composition tend to be favorable.

In light of lowering the melting point and in light of the moldability and the long-run workability being favorable, the lower limit of the ethylene unit content in the EVOH (Y) is preferably 30 mol %, more preferably 32 mol %, and still more preferably 34 mol %. Furthermore, in light of the gas barrier properties being favorable, the upper limit of the ethylene unit content in the EVOH (Y) is preferably 60 mol %, more preferably 58 mol %, and still more preferably 56 mol %.

The lower limit of the degree of saponification of the EVOH (Y) is preferably 90 mol %, more preferably 95 mol %, and still more preferably 99 mol %. When the degree of saponification of the EVOH (Y) is 90 mol % or greater, the gas barrier properties and the long-run workability of the gas barrier resin composition of the present invention tend to be more favorable. Furthermore, the upper limit of the degree of saponification of the EVOH (Y) may be 100 mol %, or may be 99.97 mol % or 99.94 mol %. Furthermore, in light of improving the moldability, the lower limit of the degree of saponification of the EVOH (Y) may be 70 mol % or may be 80 mol %, and in light of improving the moldability, the upper limit of the degree of saponification of the EVOH (Y) may be 98 mol %.

Similarly to the EVOH (X), described above, the EVOH (Y) may have, within a range not leading to impairment of the object of the present invention, an other monomer unit aside from the ethylene, the vinyl ester, and the saponification product thereof. In light of lowering the melting point of the EVOH (Y) and improving the moldability of the gas barrier resin composition of the present invention, it may be preferred that the EVOH (Y) has the other monomer unit (structural unit). In the case in which the EVOH (Y) has the other monomer unit (structural unit), the lower limit of a content of the other monomer unit with respect to total structural units of the EVOH (Y) is preferably 0.1 mol %, and more preferably 0.3 mol %. Furthermore, the upper limit of the content is preferably 15 mol %, and more preferably 10 mol %.

The EVOH (Y) may be subjected to post-modification by a process such as urethanization, acetalization, cyanoethylation, oxyalkylenation, or the like.

In the case in which the EVOH (Y) has a modifying group, the EVOH (Y) preferably has a structural unit (modifying group) represented by the above formula (I). It is to be noted that an EVOH other than the EVOH (Y) may have the structural unit represented by the above formula (I).

In the case in which the EVOH (Y) has the structural unit (modifying group) represented by the above formula (I), it is preferred that in the formula (I), $R^1$ represents a single bond, and X represents a hydroxymethyl group (wherein $R^3$ and $R^4$ in the formula (II) represent a hydrogen atom). When the EVOH (Y) having this structural unit (modifying group) is contained, there is a tendency to be able to enhance moldability such as stretchability and thermoformability, without significantly deteriorating the gas barrier properties. In the case in which the EVOH (Y) has the structural unit (modifying group), the lower limit of a content thereof is preferably 0.1 mol %, more preferably 0.4 mol %, and still more preferably 1.0 mol %. On the other hand, in light of the gas barrier properties being favorable, the upper limit of the content of the structural unit (modifying group) is preferably 20 mol %, more preferably 10 mol %, still more preferably 8 mol %, and particularly preferably 5 mol %.

In the case in which the EVOH (Y) has the structural unit (modifying group) represented by the above formula (I), it is also preferred that in the formula (I), $R^1$ represents a hydroxymethylene group, and X represents a hydrogen atom ($R^5$ and $R^6$ in the formula (III) each represent a hydrogen atom). When the EVOH (Y) having this structural unit (modifying group) is contained, there is a tendency to be able to enhance moldability such as stretchability and thermoformability, without significantly deteriorating the gas barrier properties. In the case in which the EVOH (Y) has the structural unit (modifying group), the lower limit of a content thereof is preferably 0.1 mol %, more preferably 0.4 mol %, and still more preferably 1.0 mol %. On the other hand, in light of the gas barrier properties being favorable, the upper limit of the content of the structural unit (modifying group) is preferably 20 mol %, more preferably 10 mol %, still more preferably 8 mol %, and particularly preferably 5 mol %.

In the case in which the EVOH (Y) has the structural unit (modifying group) represented by the above formula (I), it is also preferred that in the formula (I), $R^1$ represents a methymethyleneoxy group, and X represents a hydrogen atom. When the EVOH (Y) having this structural unit (modifying group) is contained, there is a tendency to be able to enhance moldability such as stretchability and thermoformability, without significantly deteriorating the gas barrier properties. Furthermore, in the methylmethyleneoxy group, an oxygen atom bonds to a carbon atom on the main chain. More specifically, it is preferred that in the formula (IV), one of $R^7$ and $R^8$ represents a methyl group, and the other one of $R^7$ and $R^8$ represents a hydrogen atom. In the case in which the EVOH (Y) has the structural unit (modifying group), the lower limit of a content thereof is preferably 0.1 mol %, more preferably 0.5 mol %, still more preferably 1.0 mol %, and particularly preferably 2.0 mol %. On the other hand, in light of the gas barrier properties being favorable, the upper limit of the content of the structural unit (modifying group) is preferably 20 mol %, more preferably 15 mol %, and still more preferably 10 mol %.

A suitable range of an MFR of the EVOH (Y) at 190° C. under a load of 2,160 g, measured in accordance with JIS K7210: 1999, is the same as that of the EVOH (X), described above.

Relationship Between EVOH (X) and EVOH (Y)

A difference (Y-X) between the ethylene unit contents in the EVOH (Y) and the EVOH (X) is preferably 5 mol % or more, more preferably 7 mol % or more, and still more preferably 10 mol % or more. Furthermore, the difference (Y-X) between the ethylene unit contents may be 25 mol % or less. When the difference (Y-X) between the ethylene unit contents falls within the above range, there is a tendency for the moldability to be favorable while exhibiting favorable gas barrier properties.

A difference (X-Y) between the melting points of the EVOH (X) and the EVOH (Y) is preferably 15° C. or higher, and more preferably 18° C. or higher. The difference (X-Y) between the melting points may be 100° C. or lower, or may be 50° C. or lower. When the difference (X-Y) between the melting points falls within the above range, there is a tendency for the moldability to be favorable while exhibiting favorable gas barrier properties.

A mass ratio (X/Y) of the EVOH (X) to the EVOH (Y) is preferably 60/40 or more, and more preferably 65/35 or more. Furthermore, the mass ratio (X/Y) is preferably 95/5 or less, and more preferably 90/10 or less. When the mass ratio (X/Y) falls within the above range, there is a tendency for the moldability to be favorable while exhibiting favorable gas barrier properties.

The lower limit of a total content of the EVOH (X) and the EVOH (Y) with respect to EVOHs as a whole contained in the gas barrier resin composition of the present invention is preferably 60% by mass, or may be more preferably 70% by mass, 80% by mass, 90% by mass, 95% by mass, or 99% by mass. Furthermore, the upper limit of the total content of the EVOH (X) and the EVOH (Y) with respect to the EVOHs as a whole contained in the gas barrier resin composition of the present invention may be 100% by mass.

EVOH (Z)

In the gas barrier resin composition of the present invention, the EVOHs may further include an EVOH (Z) having a melting point which is lower than the melting point of the EVOH (Y). In other words, the at least one type of EVOH may be categorizable into at least the three parts of the EVOH (X), the EVOH (Y), and the EVOH (Z). When the gas barrier resin composition contains the EVOH (Z), there is a tendency to exhibit superior moldability. A suitable mode of the EVOH (Z) is similar to that of the EVOH (Y), except that the melting point is lower than the melting point of the EVOH (Y).

A content of the EVOH (Z) with respect to the EVOHs as a whole contained in the gas barrier resin composition of the present invention may be, for example, 1% by mass or more and 40% by mass or less. The lower limit of a total content of the EVOH (X), the EVOH (Y), and the EVOH (Z) with respect to the EVOHs as a whole contained in the gas barrier resin composition is preferably 90% by mass, more preferably 95% by mass, and still more preferably 99% by mass. Furthermore, the upper limit of the total content of the EVOH (X), the EVOH (Y), and the EVOH (Z) with respect to the EVOHs as a whole contained in the gas barrier resin composition may be 100% by mass.

The lower limit of a proportion accounted for by the at least one type of EVOH in total resins constituting the gas barrier resin composition of the present invention may be, for example, 65% by mass, 70% by mass, or 75% by mass, and is preferably 80% by mass, more preferably 85% by mass, or may be still more preferably 90% by mass, 95% by mass, 98% by mass, or 99% by mass. The resins constituting the gas barrier resin composition may be substantially only the at least one type of EVOH, or may be only the at least one type of EVOH. The upper limit of the proportion accounted for by the at least one type of EVOH in the total resins constituting the gas barrier resin composition may be 100% by mass, or may be 95% by mass.

Furthermore, the lower limit of a proportion accounted for by the at least one type of EVOH in the gas barrier resin composition of the present invention may be, for example, 65% by mass, 70% by mass, or 75% by mass, and is preferably 80% by mass, more preferably 85% by mass, or may be still more preferably 90% by mass, 95% by mass, 98% by mass, or 99% by mass. The gas barrier resin composition may be constituted from substantially only the at least one type of EVOH. The upper limit of the proportion accounted for by the at least one type of EVOH in the gas barrier resin composition may be 100% by mass, or may be 95% by mass.

In light of decreasing the environmental load of the gas barrier resin composition of the present invention, the lower limit of a biobased content of the at least one type of EVOH as a whole contained in the gas barrier resin composition is preferably 1%, more preferably 5%, still more preferably 20%, and particularly preferably 40%. Furthermore, in, for example, an intended usage in which superior long-run workability is not required, the lower limit of the biobased content of the EVOHs as a whole may be 60%, or may be 80%. On the other hand, in light of the long-run workability being favorable, the upper limit of the biobased content of the EVOHs as a whole is preferably 99%, more preferably 95%, and may be still more preferably 85%, 75%, 65%, 55%, 45%, 35%, or 25%.

Specific and suitable ranges of an ethylene unit content, a degree of saponification, an MFR, and a melting point of the at least one type of EVOH as a whole contained in the gas barrier resin composition of the present invention are the same as the ranges of those of the EVOH (A), described above.

Inorganic Particle (C)

The gas barrier resin composition of the present invention preferably further contains an inorganic particle (C). When the gas barrier resin composition contains the inorganic particle (C), breakage resistance of a film and/or the like containing a layer formed from the gas barrier resin composition tends to be favorable. Furthermore, when the inorganic particle (C) is contained, at a time of forming a vapor deposition layer on a surface of the film containing the layer formed from the gas barrier resin composition, there may be a case of inhibiting vapor deposition defects and enabling improving adhesion strength to the vapor deposition layer. Furthermore, when the inorganic particle (C) is contained, an arithmetic average roughness (Ra) of the layer or the surface of the film formed may be more suitable, thereby improving blocking resistance and slipping properties. As referred to herein, the "inorganic particle" means a particle in which an inorganic substance is the principal component. The "principal component" as referred to herein means the component having the highest content, and for example, is a component having a content of 50% by mass or more, preferably a component having a content of more than 50% by mass, and more preferably a component having a content of 90% by mass or more. The same applies to the term "principal component" hereinafter.

The inorganic substance constituting the inorganic particle (C) is preferably an inorganic substance containing at least one type of element selected from the group consisting of silicon, aluminum, magnesium, zirconium, cerium, tungsten, and molybdenum. Of these, in light of availability, the inorganic substance is more preferably an inorganic substance containing at least one type of element selected from the group consisting of silicon, aluminum, and magnesium. Examples of the inorganic substance include oxides, nitrides, oxynitrides, and the like of the exemplified elements, and an oxide is preferred.

The lower limit of an average particle diameter of the inorganic particles (C) is preferably 0.5 μm, more preferably 1.5 μm, and still more preferably 2.5 μm. The upper limit of the average particle diameter of the inorganic particles (C) is preferably 10 μm, more preferably 8 μm, and still more preferably 5 μm. When the average particle diameter of the inorganic particles (C) falls within the above range, there is a tendency for the arithmetic average roughness (Ra) of the layer or the surface of the film formed from the gas barrier resin composition to be suitable, and for the blocking resistance and slipping properties to improve. As a result, the gas barrier resin composition tends to enable improving the breakage resistance, the vapor deposition defect-inhibiting property, and the adhesion strength to the vapor deposition layer.

The lower limit of a content of the inorganic particle (C) is preferably 50 ppm, more preferably 100 ppm, and still more preferably 150 ppm. The upper limit of the content of the inorganic particle (C) is preferably 5,000 ppm, more preferably 4,000 ppm, still more preferably 3,000 ppm, or may be yet more preferably 2,000 ppm or 1,000 ppm. When the content of the inorganic particle (C) falls within the above range, the arithmetic average roughness (Ra) of the layer or the surface of the film formed from the gas barrier resin composition can be suitable, and the blocking resistance and slipping properties can improve. As a result, the gas barrier resin composition can be superior in the breakage resistance and the vapor deposition defect-inhibiting property, and furthermore, the adhesion strength to the vapor deposition layer of the layer to be obtained can be improved. One, or two or more types of the inorganic particle (C) may be contained. Furthermore, one particle may be formed from one, or two or more types of the inorganic substance.

The lower limit of a proportion accounted for by the at least one type of EVOH and the inorganic particle (C) in the gas barrier resin composition of the present invention is preferably 80% by mass, more preferably 90% by mass, still more preferably 95% by mass, particularly preferably 98% by mass, and may be 99% by mass, or the gas barrier resin composition may be substantially constituted from only the at least one type of EVOH and the inorganic particle (C).

In the case of containing the inorganic particle (C), the gas barrier resin composition of the present invention tends to be superior in the breakage resistance, the blocking resistance, the vapor deposition defect-inhibiting property, and the adhesiveness to the vapor deposition layer. Thus, particularly suitable modes for such a gas barrier resin composition include usage in various films such as a monolayer film, a multilayer film, and a vapor deposition film; and in a multilayer structure including a vapor deposition film.

Antioxidant (D)

The gas barrier resin composition of the present invention preferably further contains the antioxidant (D). When the gas barrier resin composition contains the antioxidant (D), oxidative degradation resistance can improve. Thus, when the gas barrier resin composition contains the antioxidant (D), in a molded product such as a pipe formed from the gas barrier resin composition, a decrease in mechanical strength is less likely to occur, even during use over a long period, and there is a tendency to enable preventing the occurrence of cracks due to degradation over time.

The antioxidant (D) is a compound having an oxidation-preventing function. A melting point of the antioxidant (D)

is not necessarily limited, but is preferably 170° C. or lower. When the melting point of the antioxidant (D) is 170° C. or lower, in producing the gas barrier resin composition by melt mixing, melting in an extruder can be easier. Thus, the antioxidant (D) is localized in the gas barrier resin composition, whereby a highly concentrated part becoming colored can be inhibited. Furthermore, the melting point of the antioxidant (D) is preferably 50° C. or higher, and may be more preferably 100° C. or higher. When the melting point of the antioxidant (D) is 50° C. or higher, the antioxidant bleeding out to a surface of the molded product (the pipe, etc.) obtained and the appearance deteriorating can be inhibited.

A molecular weight of the antioxidant (D) is preferably 300 or more. In the case in which the molecular weight of the antioxidant (D) is 300 or more, when the molded product has been obtained from the gas barrier resin composition of the present invention, the antioxidant bleeding out to the surface and deteriorating the appearance can be inhibited, and furthermore, the thermal stability of the resin composition can be improved. The molecular weight is more preferably 400 or more, and particularly preferably 500 or more. On the other hand, the upper limit of the molecular weight of the antioxidant (D) is not particularly limited, and in light of dispersibility, is preferably 8,000 or less, more preferably 6,000 or less, still more preferably 4,000 or less, and particularly preferably 2,000 or less.

A compound having a hindered phenol group is suitably used as the antioxidant (D). While on one hand the compound having a hindered phenol group is itself superior in thermal stability, this compound also has the ability to capture the oxygen radical that is the cause of oxidative degradation, and when blended into the gas barrier resin composition as the antioxidant (D), a superior effect of preventing the oxidative degradation can be provided.

As the compound having a hindered phenol group, a typically commercially available product can be used, and examples thereof include the products exemplified below.
(1) "IRGANOX 1010," manufactured by BASF: pentaerythritol tetrakis[3-(3,5-di-tert-butyl-4-hydroxyphenyl)propionate] with a melting point in the range of 110 to 125° C. and a molecular weight of 1,178
(2) "IRGANOX 1076," manufactured by BASF: octadecyl-3-(3,5-di-tert-butyl-4-hydroxyphenyl)-propionate with a melting point in a range of 50 to 55° C. and a molecular weight of 531
(3) "IRGANOX 1098," manufactured by BASF: N, N'-(hexane-1,6-diyl)bis[3-(3,5-di-tert-butyl-4-hydroxyphenyl)propionamide] with a melting point in a range of 156 to 161° C. and a molecular weight of 637
(4) "IRGANOX 245," manufactured by BASF: triethylene glycol-bis[3-(3-tert-butyl-5-methyl-4-hydroxyphenyl)propionate] with a melting point in a range of 76 to 79° C. and a molecular weight of 587
(5) "IRGANOX 259," manufactured by BASF: 1,6-hexanediol-bis[3-(3,5-di-tert-butyl-4-hydroxyphenyl) propionate] with a melting point in a range of 104 to 108° C. and a molecular weight of 639
(6) "Sumilizer MDP-s," manufactured by Sumitomo Chemical Co., Ltd.: 2,2'-methylene-bis(4-methyl-6-tert-butylphenol) with a melting point of about 128° C. and a molecular weight of 341
(7) "Sumilizer GM," manufactured by Sumitomo Chemical Co., Ltd.: 2-tert-butyl-6-(3-tert-butyl-2-hydroxy-5-methylbenzyl)-4-methylphenyl acrylate with a melting point of about 128° C. and a molecular weight of 395
(8) "Sumilizer GA-80," manufactured by Sumitomo Chemical Co., Ltd.: 3,9-bis[2-{3-(3-tert-butyl-4-hydroxy-5-methylphenyl)propionyloxy}-1,1-dimethylethyl]-2,4, 8,10-tetraoxaspiro[5,5]undecane with a melting point of about 110° C. and a molecular weight of 741

A compound having a hindered amine group may also be suitably used as the antioxidant (D). When the compound having a hindered amine group is blended with the gas barrier resin composition as the antioxidant (D), the compound does not only prevent thermal degradation of the EVOH, but also achieves the effect of capturing an aldehyde generated as a result of thermal decomposition of the EVOH, and can inhibit generation of a void or an air bubble during molding by reducing generation of decomposition gases. Furthermore, when the gas barrier resin composition of the present invention is used as a food packaging container, spoiling of the taste of the content due to an odor caused by an aldehyde is addressed by the capturing of the aldehyde.

A piperidine derivative is preferably used as the compound having a hindered amine group, and in particular, a 2,2,6,6-tetraalkylpiperidine derivative having a substituent group at 4-position is preferred. Examples of the substituent at the fourth position include a carboxyl group, an alkoxy group, and an alkylamino group.

Furthermore, an alkyl group may be substituted at an N-position of the hindered amine group, but the use of the compound having a hindered amine group with a hydrogen atom being bonded is preferred due to being superior in a thermal stability effect.

As the compound having a hindered phenol group, a typically commercially available product can be used, and examples thereof include the products exemplified below.
(9) "TINUVIN 770," manufactured by BASF: bis(2,2,6, 6-tetramethyl-4-piperidyl) sebacate with a melting point in a range of 81 to 85° C. and a molecular weight of 481
(10) "TINUVIN 765," manufactured by BASF: bis(1,2, 2,6,6-pentamethyl-4-piperidyl) sebacate, which is a liquid compound with a molecular weight of 509, and 1,2,2,6,6-pentamethyl-4-piperidyl sebacate (mixture)
(11) "TINUVIN 622LD," manufactured by BASF: polycondensate of dimethyl succinate and 1-(2-hydroxyethyl)-4-hydroxy-2,2,6,6-tetramethylpiperidine with a melting point in a range of 55 to 70° C. and a molecular weight of 3,100 to 4,000
(12) "CHIMASSORB 119FL," manufactured by BASF: condensate of N,N'-bis(3-aminopropyl)ethylenediamine and 2,4-bis[N-butyl-N-(1,2,2,6,6-pentamethyl-4-piperidyl)amino]-6-chloro-1,3,5-triazine with a melting point in a range of 130 to 140° C. and a molecular weight of 2,000 or more
(13) "CHIMASSORB 944LD," manufactured by BASF: poly[[6-(1,1,3,3-tetramethylbutyl)amino-1,3,5-triazin-2,4-diyl](2,2,6,6-tetramethyl-4-piperid yl)imino]hexamethylene(2,2,6,6-tetramethyl-4-piperidyl)imino]] with a melting point in a range of 100 to 135° C. and a molecular weight of 2,000 to 3,100
(14) "TINUVIN 144," manufactured by BASF: bis(1,2, 2,6,6-pentamethyl-4-piperidyl)[[3,5-bis(1,1-dimethylethyl)-4-hydroxyphenyl]methyl]butyl malonate with a melting point in a range of 146 to 150° C. and a molecular weight of 685
(15) "UVINUL 4050H," manufactured by BASF: N, N'-1,6-hexanediylbis{N-(2,2,6,6-tetramethyl-4-piperidinyl)formamide} with a melting point of 157° C. and a molecular weight of 450

(16) "UVINUL 5050H," manufactured by BASF: compound having the following structure with a melting point in a range of 104 to 112° C. and a molecular weight of about 3,500

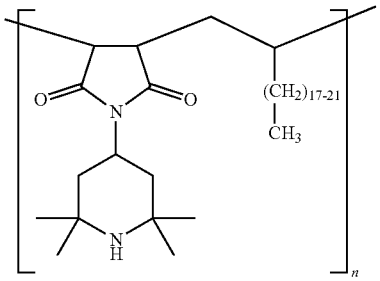

These compounds having a hindered phenol group or a hindered amine group may be used either alone, or by combining two or more types.

The lower limit of a content of the antioxidant (D) in the gas barrier resin composition of the present invention is preferably 0.01% by mass, more preferably 0.1% by mass, and still more preferably 0.3% by mass. The upper limit of the content of the antioxidant (D) is preferably 5% by mass, more preferably 3% by mass, and still more preferably 1% by mass. When the content of the antioxidant (D) falls within the above range, the antioxidant (D) is favorably dispersed, wherein, in the case of obtaining a molded product from the gas barrier resin composition of the present invention, there is a tendency to be superior in appearance, and a tendency to enable exhibiting favorable oxidative degradation resistance, heat resistance, and the like.

The lower limit of a proportion accounted for by the at least one type of EVOH and the antioxidant (D) in the gas barrier resin composition of the present invention is preferably 80% by mass, more preferably 90% by mass, still more preferably 95% by mass, particularly preferably 98% by mass, and may be 99% by mass, or the gas barrier resin composition may be substantially constituted from only the at least one type of EVOH and the antioxidant (D).

In the case in which the gas barrier resin composition of the present invention contains the antioxidant (D), the gas barrier resin composition or the molded product in which the gas barrier resin composition is contained (the multilayer structure, the pipe, etc.) has a low environmental load and exhibits favorable gas barrier properties, and cracks are unlikely to be generated by oxidative degradation, even after use for a long period. Thus, these are suitable for daily use products, packaging materials, machine components, components for durable goods, industrial components, industrial materials, and the like, each of which is to be used indoors and/or outdoors. Examples of intended uses in which the characteristics of the molded product and the like are particularly effectively exhibited include packaging materials for foods/drinks, packing materials for containers, films, agricultural films, geomembranes, infusion bag materials for medical treatments, high-pressure tank materials, gasoline tank materials, fuel containers, tube materials for tires, cushioning materials for shoes, inner bag materials for bag-in-boxes, tank materials for preserving organic liquids, pipes (pipe materials for transporting organic liquids (pipes for fuel transportation. etc.), warm water pipe materials for heating (warm water pipe materials for floor heating, etc.), heat insulating multilayer pipes, and the like), resin wallpapers, plant mediums, and the like. In particular, use as films, pipes, agricultural films, plant mediums, and geomembranes, which are each to be used outdoors and which tend to deteriorate due to heat and/or light, is suitable.

Polyamide (E)

The gas barrier resin composition of the present invention preferably further contains the polyamide (PA) (E). When the gas barrier resin composition contains the PA (E), retort resistance can be favorable.

The PA (E) is a resin that includes an amide linkage. The PA (E) is obtained by: ring-opening polymerization of a lactam having a 3 or more-membered ring; polycondensation of polymerizable ω-amino acids; polycondensation of a dibasic acid and a diamine; and the like. Examples of the PA (E) include polycaproamide (nylon 6), poly-o-aminoheptanoic acid (nylon 7), poly-ω-aminononanoic acid (nylon 9), polyundecanamide (nylon 11), polylauryllactam (nylon 12), polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/o-aminononanoic acid copolymers (nylon 6/9), caprolactam/hexamethylenediammonium adipate copolymers (nylon 6/66), lauryllactam/hexamethylenediammonium adipate copolymers (nylon 12/66), hexamethylenediammonium adipate/hexamethylenediammonium sebacate copolymers (nylon 66/610), ethylene diammonium adipate/hexamethylenediammonium adipate copolymers (nylon 26/66), caprolactam/hexamethylenediammonium adipate/hexamethylenediammonium sebacate copolymers (nylon 6/66/610), polyhexamethylene isophthalamide (nylon 6I), polyhexamethylene terephthalamide (nylon 6T), hexamethyleneisophthalamide/terephthalamide copolymers (nylon 6I/6T), and the like.

The PA (E) may be produced using only a fossil fuel-derived raw material, or may be produced using a biomass-derived raw material. For example, Arkema S.A. produces and sells polyundecaneamide (nylon 11) ("Rilsan PA11") having castor oil as a raw material as the polyamide (E) containing only the biomass-derived raw material, and polyhexamethylenesebacamide (nylon 610) ("Rilsan S") as the polyamide (C) produced using the biomass-derived raw material and the fossil fuel-derived raw material.

Furthermore, as a diamine, an aliphatic diamine into which a substituent such as 2,2,4-trimethylhexamethylenediamine or 2,4,4-trimethylhexamethylenediamine has been introduced; an aromatic amine such as methylbenzylamine or m-xylylenediamine, or the like may be used, and these may be used for modification of the polyamide. Furthermore, as the dicarboxylic acid, an aliphatic carboxylic acid into which a substituent such as 2,2,4-trimethyladipic acid or 2,4,4-trimethyladipic acid has been introduced; an alicyclic dicarboxylic acid such as 1,4-cyclohexanedicarboxylic acid; an aromatic dicarboxylic acid such as phthalic acid, a xylylenedicarboxylic acid, an alkyl-substituted terephthalic acid, an alkyl-substituted isophthalic acid, or a naphthalenedicarboxylic acid, or the like may be used, and these may be used for modification of the polyamide.

Of these, polycaproamide (nylon 6) is preferred. Alternatively, a caprolactam/lauryllactam copolymer (nylon 6/12) is also preferred. In this case, the ratio of nylon 6 units to nylon 12 units contained is not particularly limited, and the lower limit of the content of the nylon 12 units is preferably 5% by mass. On the other hand, the upper limit of the content of the nylon 12 units is preferably 60% by mass, and more preferably 50% by mass.

The lower limit of a mass ratio (PA (E)/EVOH) of the PA (E) to the at least one type of saponified ethylene-vinyl ester copolymer in the gas barrier resin composition of the present invention is preferably 5/95, more preferably 8/92, and still more preferably 13/87. Furthermore, the upper limit of the mass ratio (PA (E)/EVOH) is preferably 40/60, more preferably 35/65, still more preferably 30/70, and yet more preferably 25/75. When the mass ratio (PA (E)/EVOH) is 5/95 or more, retort resistance can be sufficient, and appearance after the molded product or the like formed from the gas barrier resin composition is heat treated by hot water, water vapor, or the like can improve. Furthermore, when the mass ratio (PA (E)/EVOH) is 40/60 or less, the gas barrier properties can improve, and the long-run workability can be more sufficient.

In light of improving the retort resistance, the lower limit of a content of the PA (E) in the gas barrier resin composition of the present invention is preferably 5% by mass, and more preferably 7% by mass. Furthermore, in light of improving the gas barrier properties and the long-run workability, the upper limit of the content of the PA (E) is preferably 40% by mass, more preferably 30% by mass, still more preferably 25% by mass, and particularly preferably 15% by mass.

The lower limit of a proportion accounted for by the at least one type of EVOH and the PA (E) in total resins constituting the gas barrier resin composition of the present invention is preferably 80% by mass, more preferably 90% by mass, still more preferably 95% by mass, particularly preferably 98% by mass, and may be 99% by mass. The resins constituting the gas barrier resin composition may be substantially only the at least one type of EVOH and the PA (E), and may be only the at least one type of EVOH and the PA (E).

In the case in which the gas barrier resin composition of the present invention contains the PA (E), the retorting resistance can be favorable, enabling exhibiting retort resistance equivalent to that of an EVOH having the same structure, synthesized from only a fossil fuel-based raw material. Thus, the gas barrier resin composition of the present invention or the multilayer structure having at least one layer constituted from the gas barrier resin composition, each of these containing the PA (E), can be suitably used as a packaging material, and particularly a packaging material for retorting.

Metal Atom (F)

The gas barrier resin composition of the present invention preferably contains at least one type of the metal atom (F) selected from the group consisting of atoms of magnesium, calcium, and zinc. When the gas barrier resin composition contains the metal atom (F), long-run workability during melt molding can be favorable. In particular, resin compositions having a PA added to EVOH tend to have decreased long-run workability, but when the gas barrier resin composition of the present invention contains the metal atom (F) together with the PA (E), sufficient long-run workability can be exhibited.

The lower limit of a content of the metal atom (F) in the gas barrier resin composition of the present invention is preferably 1 ppm, more preferably 10 ppm, and still more preferably 50 ppm. Furthermore, the upper limit of the content of the metal atom (F) is preferably 500 ppm, more preferably 350 ppm, still more preferably 300 ppm, and yet more preferably 250 ppm. When the content of the metal atom (F) falls within the above range, defects, streaks, and coloring tend to be improved in a well-balanced manner. In light of the long-run workability at the time of melt molding being more favorable, the metal atom (F) is more preferably magnesium.

The metal atom (F) may be present as a metal atom simple substance or a constituent atom in a compound, or may be present in the state of a free metal ion. The metal atom (F) may be contained as: a salt of an organic acid such as an aliphatic carboxylic acid, an aromatic carboxylic acid, an aliphatic dicarboxylic acid, an aromatic dicarboxylic acid, a tricarboxylic acid, a tetracarboxylic acid, a hydroxycarboxylic acid, a ketodicarboxylic acid, and an amino acid; a salt of an inorganic acid such as nitric acid, sulfurous acid, carbonic acid, and phosphoric acid; a hydroxide; and/or the like. Of these, the metal atom (F) is preferably contained as an aliphatic carboxylic acid metal salt or a hydroxide, and in light of miscibility with the EVOH, is more preferably contained as an aliphatic carboxylic acid metal salt having 6 or fewer carbon atoms or a hydroxide. Examples of the aliphatic carboxylic acid include: saturated aliphatic carboxylic acids such as formic acid, acetic acid, propionic acid, and capronic acid; and unsaturated aliphatic carboxylic acids such as acrylic acid and methacrylic acid. Of these, in light of, e.g., miscibility with the EVOH and the like, a salt of a saturated aliphatic carboxylic acid having 1 to 3 carbon atoms or a hydroxide is preferred, and an acetic acid salt or a hydroxide is more preferred.

In the gas barrier resin composition of the present invention, the metal atom (F) may form an organic or inorganic acid and a salt, as described above, or may form a salt as a counter cation of an alkoxide of the at least one type of EVOH.

In the gas barrier resin composition of the present invention, the metal atom (F) is preferably uniformly dispersed throughout the entirety of the resin composition. Furthermore, the metal atom (F) may be used alone of one type, or in a combination of two or more types.

The lower limit of a proportion accounted for by the at least one type of EVOH, the PA (E), and the metal atom (F) in the gas barrier resin composition of the present invention is preferably 80% by mass, more preferably 90% by mass, still more preferably 95% by mass, particularly preferably 98% by mass, and may be 99% by mass. The gas barrier resin composition may be substantially only the at least one type of EVOH, the PA (E), and the metal atom (F), and may be only the at least one type of EVOH, the PA (E), and the metal atom (F).

Thermoplastic Elastomer (G)

The gas barrier resin composition of the present invention preferably further contains the thermoplastic elastomer (G). When the gas barrier resin composition contains the thermoplastic elastomer (G), flex resistance tends to be favorable. It is to be noted that raw materials of the thermoplastic elastomer (G) may be derived from biomass, or may be derived from a fossil fuel.

The thermoplastic elastomer (G) is not particularly limited, and a thermoplastic polyester elastomer, a thermoplastic polystyrene elastomer, a thermoplastic polyolefin elastomer, and the like can be used. These may be used as one type, or two or more types may be combined. Of these, in light of improving the flex resistance, the thermoplastic elastomer (G) is preferably at least one selected from the group consisting of a thermoplastic polystyrene elastomer and a thermoplastic polyolefin elastomer.

The thermoplastic polyester elastomer (hereinafter, may be also referred to as "TPEE") may be exemplified by multi-block copolymer that includes in the molecule, a polyester as a hard segment, and a polyether or a polyester having a low glass transition temperature (Tg) as a soft segment. The TPEE can be separated into the following types depending on differences in the molecular structure, and of these, a polyester-polyether type TPEE and a polyester-polyester type TPEE are preferred.

(1) Polyester-Polyether Type TPEE

Generally, this is a thermoplastic elastomer in which an aromatic crystalline polyester is used as a hard segment, and a polyether is used as a soft segment.

(2) Polyester-Polyester Type TPEE

This is a thermoplastic elastomer in which an aromatic crystalline polyester is used as a hard segment, and an aliphatic polyester is used as a soft segment.

(3) Crystalline TPEE

This is a thermoplastic elastomer in which a rigid liquid crystal molecule is used as a hard segment, and an aliphatic polyester is used as a soft segment.

Examples of the polyester segment include polyester segments containing a dicarboxylic acid component such as: aromatic dicarboxylic acids such as terephthalic acid, isophthalic acid, and naphthalenedicarboxylic acid; alicyclic dicarboxylic acids such as 1,4-cyclohexanedicarboxylic acid; and aliphatic dicarboxylic acids such as succinic acid and adipic acid, and a diol component such as: aliphatic diols such as ethylene glycol, 1,2-propylene glycol, and 1,4-butanediol; and alicyclic diols such as cyclohexane-1,4-dimethanol. Examples of the polyether segment include aliphatic polyether segments such as polyethylene glycol, polypropylene glycol, and polybutylene glycol.

The thermoplastic polystyrene elastomer is not particularly limited, and typically contains a styrene-monomer polymer block (Hb) as the hard segment and a conjugated diene-compound polymer block or a hydrogenated block thereof (Sb) as the soft segment. The thermoplastic styrene elastomer may have a structure of a diblock structure represented by Hb-Sb, a triblock structure represented by Hb-Sb-Hb or Sb-Hb-Sb, a tetrablock structure represented by Hb-Sb-Hb-Sb, or a polyblock structure in which Hb and Sb in a total of 5 or more are linearly bonded.

The styrene monomer used for the styrene-monomer polymer block (Hb) is not particularly limited, and examples thereof may include styrene, derivatives thereof, and the like. Specific examples include vinyl group-containing aromatic compounds such as: styrenes such as styrene, α-methylstyrene, 2-methylstyrene, 4-methylstyrene, 4-propylstyrene, 4-t-butylstyrene, 4-cyclohexylstyrene, 4-dodecylstyrene, 2-ethyl-4-benzylstyrene, 4-(phenylbutyl) styrene, 2,4,6-trimethylstyrene, monofluorostyrene, difluorostyrene, monochlorostyrene, dichlorostyrene, methoxystyrene, and t-butoxystyrene; vinylnaphthalenes such as 1-vinylnaphthalene and 2-vinylnaphthalene; and the like, vinyl group-containing aromatic compounds such as indene and acenaphthylene, and the like. Of these, styrene is preferred. The styrene monomer may be only one type, or may be two or more types.

The conjugated diene compound used for the conjugated diene-compound polymer block or a hydrogenated block thereof (Sb) is also not particularly limited, and examples thereof may include butadiene, isoprene, 2,3-dimethylbutadiene, pentadiene, hexadiene, and the like. Of these, butadiene is preferred. The conjugated diene compound may be only one type or may be two or more types. Moreover, another comonomer, for example, ethylene, propylene, butylene, or styrene may be copolymerized. Furthermore, the conjugated diene-compound polymer block may be a hydrogenation product that is partially or completely hydrogenated.

Specific examples of the thermoplastic polystyrene elastomer include styrene-isoprene diblock copolymers (SI), styrene-butadiene diblock copolymers (SB), styrene-isoprene-styrene triblock copolymers (SIS), styrene-butadiene/isoprene-styrene triblock copolymers (SB/IS), and styrene-butadiene-styrene triblock copolymers (SBS), and hydrogenation products thereof. Of these, the thermoplastic polystyrene elastomer is preferably at least one selected from the group consisting of a hydrogenation product of styrene-isoprene diblock copolymers (SEP), a hydrogenation product of styrene-butadiene diblock copolymers (SEB), a hydrogenation product of styrene-isoprene-styrene triblock copolymers (SEPS), a hydrogenation product of styrene-butadiene/isoprene-styrene triblock copolymers (SEEPS), and a hydrogenation product of styrene-butadiene-styrene triblock copolymers (SEBS).

The thermoplastic polyolefin elastomer includes thermoplastic elastomers, for example, containing a polyolefin block, such as polypropylene or polyethylene, as the hard segment and a rubber block, such as an ethylene-propylene-diene copolymer, as the soft segment. It is to be noted that such thermoplastic elastomers include a blend type and an implant type, and in light of miscibility with the EVOH and cost, the implant type is preferred.

The thermoplastic elastomer (G) preferably includes at least one selected from the group consisting of an unmodified thermoplastic elastomer (g1), a modified thermoplastic elastomer (g2), and a polystyrene-based thermoplastic elastomer (g3) containing a halogen atom, and more preferably includes the modified thermoplastic elastomer (g2). When the modified thermoplastic elastomer (g2) is included, for example, a reaction between the at least one type of EVOH and the modified thermoplastic elastomer (g2) is promoted at the time of melt kneading, whereby obtaining the gas barrier resin composition having a favorable phase separation structure tends to be enabled, even without adopting special extrusion conditions. The thermoplastic elastomer (G) may include both the unmodified thermoplastic elastomer (g1) and the modified thermoplastic elastomer (g2), may be constituted from only the modified thermoplastic elastomer (g2), or may be constituted from only the polystyrene-based thermoplastic elastomer (g3) containing a halogen atom. The resins exemplified above as thermoplastic elastomers may be directly used as the unmodified thermoplastic elastomer (g1).

In the case in which the gas barrier resin composition of the present invention contains the unmodified thermoplastic elastomer (g1), the lower limit of a proportion accounted for by the unmodified thermoplastic elastomer (g1) in the thermoplastic elastomer (G) is preferably 30% by mass, more preferably 40% by mass, and may be still more preferably 85% by mass. The upper limit of the proportion accounted for by the unmodified thermoplastic elastomer (g1) in the thermoplastic elastomer (G) may be 100% by mass, or may be 60% by mass. Since the unmodified thermoplastic elastomer (g1) does not have a site which is capable of reacting with the at least one type of EVOH, as the proportion accounted for by the unmodified thermoplastic elastomer (g1) in the thermoplastic elastomer (G) becomes higher, for example, there is a tendency to enable inhibiting generation of a gel or the like, and consequently, the long-run workability tends to improve.

The modified thermoplastic elastomer (g2) is preferably an acid-modified thermoplastic elastomer. The modified thermoplastic elastomer (g2) may be obtained, for example, by modifying the unmodified thermoplastic elastomer (g1) with an unsaturated carboxylic acid or a derivative thereof. Examples of the unsaturated carboxylic acid or the derivative thereof include maleic acid, fumaric acid, itaconic acid, maleic anhydride, itaconic anhydride, maleic acid monomethyl ester, maleic acid monoethyl ester, maleic acid diethyl ester, fumaric acid monomethyl ester, and the like. Of these, being modified by maleic anhydride is preferred. When such a modified thermoplastic elastomer (g2) is used, miscibility of the at least one type of EVOH and the thermoplastic elastomer (G) tends to improve, whereby the gas barrier properties, the flex resistance, and the like tend to further improve.

As the modified thermoplastic elastomer (g2), a modified polyester thermoplastic elastomer, a modified polystyrene thermoplastic elastomer, a modified polyolefin thermoplastic elastomer, and the like can be used. These may be used as one type, or two or more types may be combined. The modified thermoplastic elastomer (g2) is preferably a maleic anhydride-modified polyester thermoplastic elastomer, a maleic anhydride-modified polystyrene thermoplastic elastomer, or a maleic anhydride-modified polyolefin thermoplastic elastomer. Of these, in light of improving the flex resistance, the modified thermoplastic elastomer (g2) is preferably at least one selected from the group consisting of a maleic anhydride-modified polystyrene thermoplastic elastomer and a maleic anhydride-modified polyolefin thermoplastic elastomer.

In the case in which the modified thermoplastic elastomer (g2) is the acid-modified thermoplastic elastomer, in light of improving the flex resistance and the long-run workability, an acid number of the acid-modified thermoplastic elastomer is preferably 1 mg KOH/g or more and 50 mg KOH/g or less. Furthermore, in light of improving the flex resistance and the long-run workability, the acid number of the acid-modified thermoplastic elastomer (G) is preferably 0.5 mg KOH/g or more and 25 mg KOH/g or less.

The lower limit of a proportion accounted for by the modified thermoplastic elastomer (g2) in the thermoplastic elastomer (G) is preferably 5% by mass, more preferably 20% by mass, and may be still more preferably 40% by mass, and the thermoplastic elastomer (G) may be constituted from only the modified thermoplastic elastomer (g2). The upper limit of the proportion accounted for by the modified thermoplastic elastomer (g2) in the thermoplastic elastomer (G) may be 100% by mass, and may be 60% by mass. Since the modified thermoplastic elastomer (g2) enhances the miscibility of the at least one type of EVOH and the thermoplastic elastomer (G), as the proportion accounted for by the modified thermoplastic elastomer (g2) in the thermoplastic elastomer (G) becomes higher, there is a tendency for the miscibility to improve, and consequently, the flex resistance tends to further improve.

In the case in which the thermoplastic elastomer (G) includes the unmodified thermoplastic elastomer (g1) and the modified thermoplastic elastomer (g2), a mass ratio (g1/g2) of the unmodified thermoplastic elastomer (g1) to the modified thermoplastic elastomer (g2) is preferably more than 0/100, more preferably 20/80 or more, still more preferably 40/60 or more, and may be particularly preferably 80/20 or more. Furthermore, the mass ratio (g1/g2) is preferably 95/5 or less. When the mass ratio (g1/g2) falls within the above range, the acid number of the thermoplastic elastomer (G) can be easily adjusted, whereby the gas barrier resin composition of the present invention tends to facilitate producing a composition which is superior in flex resistance and long-run stability.

The lower limit of a proportion accounted for by the unmodified thermoplastic elastomer (g1) and the modified thermoplastic elastomer (g2) in the thermoplastic elastomer (G) may be 70% by mass, may be 80% by mass, or may be 90% by mass, and the thermoplastic elastomer (G) may be substantially constituted from only the unmodified thermoplastic elastomer (g1) and the modified thermoplastic elastomer (g2), or may be constituted from only the unmodified thermoplastic elastomer (g1) and the modified thermoplastic elastomer (g2).

The thermoplastic elastomer (G) also preferably includes the polystyrene-based thermoplastic elastomer (g3) containing a halogen atom. The halogen atom may be a halogen atom derived from a polymerization catalyst used when producing the polystyrene-based thermoplastic elastomer, and in that case, the halogen atom is contained at an end of the polystyrene-based thermoplastic elastomer. Due to the halogen atom being contained at the end of the polystyrene-based thermoplastic elastomer, the halogen atom reacts with the EVOH, whereby dispersibility of the polystyrene-based thermoplastic elastomer in the EVOH phase tends to improve. Examples of the halogen atom contained in the polystyrene-based thermoplastic elastomer include chlorine, bromine, fluorine, iodine, and the like, and of these, chlorine is preferred. A content of the halogen atom in the polystyrene-based thermoplastic elastomer is typically 0.005 to 3.000% by mass. The halogen atom in the polystyrene-based thermoplastic elastomer can be analyzed using an ion chromatograph. The polystyrene-based thermoplastic elastomer (g3) containing a halogen atom is not particularly limited as long as it contains the halogen atom, and for example, a compound obtained by containing the halogen atom in the compounds exemplified as the polystyrene-based elastomer, described above, can be used. Of these, the polystyrene-based thermoplastic elastomer (g3) is more preferably a styrene-isobutylene-styrene block copolymer, and examples thereof include product name "SIBSTAR 062T," manufactured by Kaneka Corporation, and the like. The lower limit of a proportion accounted for by the polystyrene-based thermoplastic elastomer (g3) containing a halogen atom in the thermoplastic elastomer (G) is preferably 20% by mass, more preferably 50% by mass, and still more preferably 90% by mass, and the thermoplastic elastomer (G) may be substantially constituted from only the polystyrene-based thermoplastic elastomer (g3) containing a halogen atom, or may be constituted from only the polystyrene-based thermoplastic elastomer (g3) containing a halogen atom.

The lower limit of a mass ratio (G/EVOH) of the thermoplastic elastomer (G) to the at least one type of EVOH in the gas barrier resin composition of the present invention is preferably 5/95, more preferably 8/92, may be still more preferably 12/88, and may be yet more preferably 15/85 or 25/75. When the mass ratio (G/EVOH) is greater than or equal to the lower limit, the flex resistance and the like can be improved. On the other hand, the upper limit of the mass ratio (G/EVOH) is preferably 35/65, may be more preferably 30/70, may be still more preferably 25/75, and may be yet more preferably 15/85. When the mass ratio (G/EVOH) is less than or equal to the upper limit, the gas barrier properties tend to be further improved.

Phase Separation Structure

In the case in which the gas barrier resin composition of the present invention contains the thermoplastic elastomer (G), particles of the thermoplastic elastomer (G) are preferably dispersed in a matrix of the at least one type of EVOH. That is, the gas barrier resin composition of the present invention preferably has a sea-island structure in which the sea phase is mainly constituted from the at least one type of EVOH, and the island phases are mainly constituted from the thermoplastic elastomer (G). When the sea structure is thus mainly constituted from the at least one type of EVOH, the flexibility can be improved while maintaining the gas barrier properties.

In the case in which the resin composition of the present invention has the sea-island structure in which the sea phrase is mainly constituted from the at least one type of EVOH and the island phrases are mainly constituted from the thermoplastic elastomer (G), in light of improving the transparency, an average particle diameter of the island phases constituted from the thermoplastic elastomer (G) is preferably 4.5 µm or less, more preferably 3.5 µm or less, still more preferably 3.0 µm or less, particularly preferably 2.5 µm or less, and most preferably 2.0 µm or less. The average particle diameter of the thermoplastic elastomer (G) may be 0.1 m or more. The average particle diameter of the island phases constituted from the thermoplastic elastomer (G) falling within the above range is preferred due to the flex resistance being improved while maintaining the gas barrier properties and the transparency and, furthermore, delamination properties of a delaminatable container, described later, being improved. The average particle diameter of the thermoplastic elastomer (G) can be adjusted by adjusting kneading intensity, and adjusting a component ratio of the at least one type of EVOH and the thermoplastic elastomer (G).

In the gas barrier resin composition of the present invention, a refractive index difference between the at least one type of EVOH and the thermoplastic elastomer (G) is preferably 0.05 or less, more preferably 0.04 or less, and still more preferably 0.03 or less. The refractive index difference may be 0.005 or more. The refractive index difference falling within the above range is preferred due to the transparency of the gas barrier resin composition of the present invention tending to be more favorable.

The thermoplastic elastomer (G) may be used alone of one type, or in a combination of two or more types.

The lower limit of a proportion accounted for by the at least one type of EVOH and the thermoplastic elastomer (G) in the gas barrier resin composition of the present invention is preferably 80% by mass, more preferably 90% by mass, still more preferably 95% by mass, particularly preferably 98% by mass, and may be 99% by mass. The resins constituting the gas barrier resin composition may be constituted from substantially only the at least one type of EVOH and the thermoplastic elastomer (G), or may be constituted from only the at least one type of EVOH and the thermoplastic elastomer (G).

In the case in which the gas barrier resin composition of the present invention contains the thermoplastic elastomer (G), superior flex resistance can be exhibited. Thus, the gas barrier resin composition or the multilayer structure having at least one layer constituted from the gas barrier resin composition, each of these containing the thermoplastic elastomer (G), can be suitably used as a packaging material, a vertical form fill seal pouch, an inner container for a bag-in-box, a delaminatable container, a tube, a pipe, a blow-molded container, and the like.

Halogen Scavenger

In the case in which the gas barrier resin composition of the present invention contains the polystyrene-based thermoplastic elastomer (g3) containing a halogen atom, in light of improving the long-run workability, the gas barrier resin composition of the present invention preferably contains a halogen scavenger. The halogen scavenger is acceptable as long as it has a halogen-scavenging ability, and may be exemplified by: a layered inorganic compound having an exchangeable ion; alkaline earth metal compounds such as magnesium oxide, calcium hydroxide, magnesium hydroxide, and calcium carbonate; zinc oxide; lithium carbonate; and the like. Of these, the halogen scavenger is preferably a layered inorganic compound having an exchangeable ion. Due to an ion which are present between layers of the layered inorganic compound being exchanged with a halogen ion, the halogen ion is incorporated into the layered inorganic compound. Exemplary layered inorganic compounds include: clay minerals; layered polycilicates; layered silicates; layered double hydroxides; layered phosphoric acid salts; layered transition metal oxysalts such as titanium niobate, hexaniobate, and molybdate; layered manganese oxide; layered cobalt oxide; and the like, and among these, the clay minerals are preferred.

Examples of the clay mineral include: hydrotalcite, zeolite, mica, vermiculite, montmorillonite, beidellite, saponite, hectorite, and stevensite. The clay mineral may be synthetic clay or natural clay. Of these, as the clay mineral, hydrotalcite and zeolite are preferred, and the former is more preferred. Examples of the hydrotalcite include hydrotalcite represented by the following general formula (i), and examples of the zeolite include zeolite represented by the following general formula (ii).

$$Mg_{1-a}Al_a(OH)_2(CO_3)_{a/2} \cdot xH_2O \quad (i)$$

$$Na_2O \cdot Al_2O_3 \cdot 2SiO_2 \cdot yH_2O \quad (ii)$$

In the formulae (i) and (ii), x is an integer of 0 to 5, a is a number which satisfies $0<a\leq0.5$, and y is an integer of 0 to 6.

In the case in which the gas barrier resin composition of the present invention contains the halogen scavenger, in light of inhibiting rapid crosslinking (gelation) and improving the long-run workability, the lower limit of a content of the halogen scavenger is preferably 0.01% by mass, and more preferably 0.025% by mass. On the other hand, in light of inhibiting generation of aggregates derived from the halogen scavenger, the upper limit of the content of the halogen scavenger is preferably 1% by mass, and more preferably 0.8% by mass.

A mass ratio (halogen scavenger/halogen atom) of the content of the halogen scavenger to a content of the halogen atom contained in the polystyrene-based thermoplastic elastomer (g3) having a halogen atom in the gas barrier resin composition of the present invention is preferably 0.10 or more, more preferably 0.15 or more, still more preferably 0.20 or more, and particularly preferably 0.25 or more. Furthermore, the mass ratio (halogen scavenger/halogen atom) is preferably 1.010 or less, more preferably 0.702 or less, still more preferably 0.501 or less, and particularly preferably 0.40 or less. When the mass ratio (halogen scavenger/halogen atom) falls within the above range, progression of the crosslinking and aggregation of the halogen scavenger during production over a long period can be further inhibited, whereby cost reduction is enabled due to inhibiting excessive use of the halogen scavenger.

In light of tracking the company's product, the gas barrier resin composition of the present invention further preferably contains a sulfur compound at a concentration of more than 0 ppm and 100 ppm in terms of sulfur atoms. Furthermore, the present inventors have found that the sulfur compound being contained at the concentration of 100 ppm or less in terms of sulfur atoms has substantially no effect on the performance of the gas barrier resin composition, whereby the sulfur compound is suitable as a tracer substance. The upper limit of the concentration of the sulfur compound is further preferably 50 ppm, still more preferably 5 ppm, yet more preferably 3 ppm, and particularly preferably 0.3 ppm. The lower limit of the concentration of the sulfur compound may be 0.0001 ppm, 0.001 ppm, 0.01 ppm, 0.05 ppm, or 0.1 ppm. In the case of using the biomass-derived raw material, an EVOH containing an organic sulfur compound contained in the biomass raw material may be obtained. On the other hand, in the case of the fossil fuel-derived EVOH, due to desulfurization during naphtha cracking, the sulfur compound becomes scarcer than that in the biomass-derived EVOH. Thus, in the case of using such a biomass-derived EVOH, tracking of the biomass-derived EVOH is further facilitated by comparing the concentration of the sulfur compound. In particular, when the gas barrier resin composition of the present invention contains an organic sulfur compound, and particularly dimethylsulfide or dimethylsulfoxide, as the sulfur compound, the tracking is further facilitated. Furthermore, in light of, e.g., tracking the company's product, at the time of producing the EVOH, it may be preferable to not conduct excessive purification such that the concentration of the sulfur compound falls to equal to or less than a detection limit with respect to the biomass-derived ethylene and the biomass-derived vinyl ester, which are the raw materials, and the EVOH to be obtained.

Other Components

The gas barrier resin composition of the present invention preferably further contains a carboxylic acid. When the gas barrier resin composition contains the carboxylic acid, melt moldability and coloring resistance at a high temperature can be further improved. In particular, in light of cases in which pH buffering capacity of the gas barrier resin composition improves and coloring resistance to acid substances and basic substances can be improved, a pKa of the carboxylic acid preferably falls within a range of 3.5 to 5.5.

In the case in which the gas barrier resin composition of the present invention contains the carboxylic acid, the lower limit of a concentration of the carboxylic acid in terms of carboxylic acid radical equivalent is preferably 30 ppm, and more preferably 100 ppm. On the other hand, the upper limit of the concentration of the carboxylic acid is preferably 1,000 ppm, and more preferably 600 ppm. When the concentration of the carboxylic acid is 30 ppm or more, coloring resistance at a high temperature tends to be favorable. On the other hand, when the concentration of the carboxylic acid is 1,000 ppm or less, the melt moldability tends to be favorable. The concentration of the carboxylic acid can be determined by titrating an extraction liquid obtained by extracting 10 g of the resin composition with 50 ml of pure water at 95° C. for 8 hours. In this case, a content of carboxylic acid present in the extraction liquid is not considered as the concentration of the carboxylic acid in the resin composition. Furthermore, the carboxylic acid may be present as a carboxylate ion.

The carboxylic acid may be exemplified by a monovalent carboxylic acid and a polyvalent carboxylic acid, and these may consist of one type or a plurality of types. In the case of containing both the monovalent carboxylic acid and the polyvalent carboxylic acid as the carboxylic acid, enhancing the melt moldability and the coloring resistance at a high temperature of the gas barrier resin composition of the present invention may be enabled. Furthermore, the polyvalent carboxylic acid may have 3 or more carboxy groups. In this case, further improving the coloring resistance of the gas barrier resin composition of the present invention may be enabled.

The monovalent carboxylic acid as referred to herein means a compound having one carboxy group inside the molecule. A pKa of the monovalent carboxy group preferably falls within the range of 3.5 to 5.5. Examples of such a monovalent carboxylic acid include formic acid (pKa of 3.77), acetic acid (pKa of 4.76), propionic acid (pKa of 4.85), butyric acid (pKa of 4.82), caproic acid (pKa of 4.88), capric acid (pKa of 4.90), lactic acid (pKa of 3.86), acrylic acid (pKa of 4.25), methacrylic acid (pKa of 4.65), benzoic acid (pKa of 4.20), and 2-naphthoic acid (pKa of 4.17). As long as the pKa falls within the range of 3.5 to 5.5, these carboxylic acids may have a substituent such as a hydroxy group, an amino group, or a halogen atom. Of these, in light of being superior in safety and being easy to handle, acetic acid is preferred.

The polyvalent carboxylic acid as referred to herein means a compound having two or more carboxy groups inside the molecule. In this case, the pKa of at least one carboxy group preferably falls within the range of 3.5 to 5.5. Examples of such a polyvalent carboxy group include oxalic acid (pKa2 of 4.27), succinic acid (pKa1 of 4.20), fumaric acid (pKa2 of 4.44), malic acid (pKa2 of 5.13), glutaric acid (pKa1 of 4.30, pKa2 of 5.40), adipic acid (pKa1 of 4.43, pKa2 of 5.41), pimelic acid (pKa 1 of 4.71), phthalic acid (pKa2 of 5.41), isophthalic acid (pKa2 of 4.46), terephthalic acid (pKa1 of 3.51, pKa2 of 4.82), citric acid (pKa2 of 4.75), tartaric acid (pKa2 of 4.40), glutamic acid (pKa 2 of 4.07), and aspartic acid (pKa of 3.90).

The gas barrier resin composition of the present invention preferably further contains a phosphate compound. In the case in which the gas barrier resin composition contains the phosphate compound, the lower limit of a concentration of the phosphate compound in terms of phosphate radical equivalent is preferably 1 ppm, and more preferably 3 ppm. On the other hand, the upper limit of the concentration in terms of phosphate radical equivalent is preferably 200 ppm, and more preferably 100 ppm. When the phosphate compound is contained falling within the above range, improving the thermal stability of the gas barrier resin composition may be enabled. In particular, the generation of gelatinous aggregates and coloring when conducting melt molding over a long period of time may be inhibited. As the phosphate compound, for example, various acids, such as phosphoric acid and phosphorous acid, salts thereof, and the like may be used. The phosphoric acid salt may be included in any form such as, for example, a phosphate salt, a monohydrogen phosphate salt, or a dihydrogen phosphate salt. Examples of cation species of the phosphoric acid salt include alkali metals and alkaline earth metals. Specific examples of the phosphate compound include phosphate compounds in the forms of sodium dihydrogen phosphate, potassium dihydrogen phosphate, disodium hydrogen phosphate, and dipotassium hydrogen phosphate.

The gas barrier resin composition of the present invention preferably further contains a boron compound. In the case in which the gas barrier resin composition of the present invention contains the boron compound, the lower limit of a concentration of the boron compound in terms of boron atoms is preferably 5 ppm, and more preferably 100 ppm. On the other hand, the upper limit of the concentration in terms of boron atoms is preferably 5,000 ppm, and more preferably 1,000 ppm. When the boron compound is contained falling within the above range, improving the thermal stability during melt molding of the gas barrier resin composition, and inhibiting the generation of gelatinous aggregates may be enabled. Furthermore, improving mechanical properties of the molded product to be obtained may be enabled. It is presumed that these effects are due to chelate interaction occurring between the EVOH and the boron compound. The boron compound is exemplified by boric acids, boric acid esters, boric acid salts, and boron hydride. Specifically, examples of the boric acids include orthoboric acid ($H_3BO_3$), metaboric acid, and tetraboric acid; examples of the boric acid esters include trimethyl borate and triethyl borate; and examples of the boric acid salts include alkali metal salts and alkaline earth metal salts of the above boric acids, and borax.

The gas barrier resin composition of the present invention preferably further contains a metal ion. When the gas barrier resin composition contains the metal ion, interlayer adhesiveness is superior in the case of forming a multilayer molded product, that is, the multilayer structure. The reason for the interlayer adhesiveness improving is not necessarily clarified, but it is believed that, in a case of containing, in a layer being adjacent to the layer formed from the gas barrier resin composition, a molecule having a functional group capable of reacting with a hydroxy group of the EVOH, a bond-forming reaction of both is accelerated by the metal ion. Furthermore, when a content ratio of the metal ion and the carboxylic acid, described above, is controlled, the melt moldability and the coloring resistance of the gas barrier resin composition can be improved.

In the case of the gas barrier resin composition of the present invention containing the metal ion, the lower limit of a concentration thereof is preferably 1 ppm, more preferably 100 ppm, and still more preferably 150 ppm. On the other hand, the upper limit of the concentration of the metal ion is preferably 1,000 ppm, more preferably 400 ppm, and still more preferably 350 ppm. When the concentration of the metal ion is 1 ppm or more, the interlayer adhesiveness of the multilayer structure to be obtained tends to be favorable. On the other hand, when the concentration of the metal ion is 1,000 ppm or lower, the coloring resistance tends to be favorable.

The metal ion may be exemplified by a monovalent metal ion, a divalent metal ion, and another transition metal ion, and these may consist of one type, or a plurality of types. Of these, the monovalent metal ion and the divalent metal ion are preferred.

As the monovalent metal ion, an alkali metal ion is preferred, and examples thereof include ions of lithium, sodium, potassium, rubidium, and cesium; in light of industrial availability, an ion of sodium or potassium is preferred. Furthermore, examples of an alkali metal salt which gives the alkali metal ion include aliphatic carboxylic acid salts, aromatic carboxylic acid salts, carbonates, hydrochloric acid salts, nitric acid salts, sulfuric acid salts, phosphoric acid salts, and metal complexes. Of these, in light of availability, the aliphatic carboxylic acid salts and the phosphoric acid salts are preferred, and specifically, sodium acetate, potassium acetate, sodium phosphate, and potassium phosphate are preferred.

It may be preferable for the divalent metal ion to be contained as the metal ion. When the metal ion contains the divalent metal ion, for example, heat deterioration of the EVOH at a time of recovering and reusing trim may be inhibited, and generation of gels and aggregates of the molded product to be obtained may be inhibited. Examples of the divalent metal ion include ions of beryllium, magnesium, calcium, strontium, barium, and zinc, and in light of industrial availability, an ion of magnesium, calcium, or zinc is preferred. It is to be noted that in a case in which the metal atom (F), described above, is present as an ion, such an ion is included in this divalent metal ion. Furthermore, examples of a divalent metal salt which gives the divalent metal ion include carboxylic acid salts, carbonates, hydrochloric acid salts, nitric acid salts, sulfuric acid salts, phosphoric acid salts, and metal complexes, and the carboxylic acid salts are preferred. A carboxylic acid which constitutes the carboxylic acid salt is preferably a carboxylic acid having 1 to 30 carbon atoms, and specific examples thereof include acetic acid, stearic acid, lauric acid, montanic acid, behenic acid, octylic acid, sebacic acid, ricinoleic acid, myristic acid, palmitic acid, and the like, and of these, acetic acid and stearic acid are preferred.

The gas barrier resin composition of the present invention may contain, within a range not leading to impairment of the effects of the present invention, other component(s) such as: an antiblocking agent, a processing aid, an other resin aside from the various resins described above, a stabilizer, an ultraviolet ray-absorbing agent, a plasticizer, an antistatic agent, a lubricant, a colorant, a filler, a surfactant, a desiccant, an oxygen-absorbing agent, a crosslinking agent, a reinforcing agent such as various types of fibers, and the like.

Examples of the antiblocking agent include oxides, nitrides, and oxynitrides of an element selected from elements such as silicon, aluminum, magnesium, zirconium, cerium, tungsten, molybdenum, and the like, and of these, in light of availability, silicon oxide is desirable. When the gas barrier resin composition of the present invention contains the antiblocking agent, blocking resistance can be enhanced.

Examples of the processing aid include fluorine-based processing aids such as Kynar (registered trademark), manufactured by Arkema S.A., Dynamar (registered trademark), manufactured by 3M, and the like. When the gas barrier resin composition of the present invention contains the processing aid, gum depositing on a die lip tends to be prevented.

The other resin is exemplified by various polyolefins (polyethylene, polypropylene, poly 1-butene, poly 4-methyl-1-pentene, an ethylene-propylene copolymer, a copolymer of ethylene and an α-olefin having 4 or more carbon atoms, a copolymer of polyolefin and maleic anhydride, an ethylene-vinyl ester copolymer, an ethylene-acrylic acid ester copolymer, a modified polyolefin obtained by graft-modifying these with an unsaturated carboxylic acid or a derivative thereof, etc.), various polyesters (polyethylene terephthalate, polybutylene terephthalate, polyethylene naphthalate, etc.), polyvinyl chloride, polyvinylidene chloride, polystyrene, polyacrylonitrile, polyurethane, polycarbonate, polyacetal, polyacrylate, and a modified polyvinyl alcohol resin.

The stabilizer for improving the melt stability and the like is exemplified by hydrotalcite compounds, hindered phenol and hindered amine thermal stabilizers, metal salts of higher aliphatic carboxylic acids (for example, calcium stearate, magnesium stearate, etc.), and the like. In the case in which the gas barrier resin composition of the present invention contains the stabilizer, a content thereof is preferably 0.001 to 1% by mass.

Examples of the ultraviolet ray-absorbing agent include ethylene-2-cyano-3', 3'-diphenyl acrylate, 2-(2'-hydroxy-5'-methylphenyl)benzotriazole, 2-(2'-hydroxy-3'-t-butyl-5'-methylphenyl)5-chlorobenzotriazole, 2-hydroxy-4-methoxybenzophenone, 2,2'-dihydroxy-4-methoxybenzophenone, and the like.

Examples of the plasticizer include dimethyl phthalate, diethyl phthalate, dioctyl phthalate, waxes, liquid paraffin, phosphoric acid esters, and the like.

Examples of the antistatic agent include pentaerythritol monostearate, sorbitan monopalmitate, sulfated polyolefins, polyethylene oxide, Carbowax, and the like.

Examples of the lubricant include ethylenebis stearamide, butyl stearate, and the like.

Examples of the colorant include carbon black, phthalocyanine, quinacridone, indoline, azo pigments, bengara, and the like.

Examples of the filler include glass fiber, asbestos, balastonite, calcium silicate, and the like.

Examples of the desiccant include phosphoric acid salts (not including the above-described phosphoric acid salts), sodium borate, sodium sulfate and the like, sodium chloride, sodium nitrate, sugar, silica gel, bentonite, molecular sieves, highly water-absorbent resins, and the like.

In light of preventing generation of voids during mold processing, a moisture content of the gas barrier resin composition of the present invention is, with respect to 100 parts by mass in total of the at least one type of EVOH, preferably 3.0 parts by mass or less, more preferably 1.0 parts by mass or less, still more preferably 0.5 parts by mass or less, and particularly preferably 0.3 parts by mass or less.

The gas barrier resin composition of the present invention may contain biomass-derived impurities owing to the EVOH (A) or the EVOH (A'). There is a possibility of various impurities being contained, but there is a tendency for many cases of abundantly containing at least metals such as iron and nickel.

Biobased Content of Gas Barrier Resin Composition

In light of decreasing the environmental load, the lower limit of a biobased content of the gas barrier resin composition of the present invention is preferably 1%, more preferably 5%, still more preferably 20%, and particularly preferably 40%. Furthermore, in, for example, an intended usage in which superior long-run workability is not required, the lower limit of the biobased content of the gas barrier resin composition may be 60%, and may be 80%. On the other hand, in light of the long-run workability being favorable, the upper limit of the biobased content of the gas barrier resin composition is preferably 99%, more preferably 95%, and may be still more preferably 85%, 75%, 65%, 55%, 45%, 35%, or 25%. It is to be noted that the biobased content of this gas barrier resin composition means a value measured while also considering, e.g., other resins contained in optional components aside from the EVOH.

Method for Producing Gas Barrier Resin Composition

The method for producing the gas barrier resin composition of the present invention is not particularly limited. For example, in the case of the gas barrier resin composition containing the EVOH (A) and the EVOH (B), the following may be exemplified:

(1) a method involving mixing (dry-blending) pellets of the EVOH (A), pellets of the EVOH (B), and as needed, the other component(s) described above, and melt kneading the pellets thus mixed;

(2) a method involving immersing pellets of the EVOH (A) and/or pellets of the EVOH (B) in a solution containing, as needed, the other component(s) described above and the like, subsequently dry-blending the pellets of the EVOH (A) and the pellets of the EVOH (B), and then melt kneading these;

(3) a method involving dry-blending pellets of the EVOH (A) and pellets of the EVOH (B), and then, while melt kneading these, adding at a middle portion of an extruder, an aqueous solution containing, as needed, the other component(s) described above; and (4) a method involving blending, in a melted state, a melted resin of the EVOH (A) and a melted resin of the EVOH (B) (as needed, the other component(s) may be added beforehand to the EVOH (A) and/or the EVOH (B), or added in the extruder).

According to the production methods of (1) to (4), by adjusting a mixing proportion of the EVOH (A) and the EVOH (B) in accordance with the intended usage, the performance, and the like, a gas barrier resin composition superior in gas barrier properties can be produced while also considering a balance of the environmental load-reducing effect and the long-run workability. Of these, (1) a step of dry-blending the pellets of the EVOH (A) and the pellets of the EVOH (B) and then melt kneading is preferably included. For the mixing of the pellets with each other and/or the mixing of the pellets with the other component(s), for example, a ribbon blender, a high-speed mixer cokneader, a mixing roll, an extruder, an intensive mixer, or the like may be used.

Furthermore, in the case in which the gas barrier resin composition contains the EVOH (A'), the production may be carried out by: synthesizing the EVOH (A') by a well-known procedure; and as needed, mixing, by a well-known procedure, the other component(s) with the EVOH (A') thus obtained.

In the case of the gas barrier resin composition containing the EVOH (A), the EVOH (B), and the inorganic particle (C) and/or the like (the inorganic particle (C), the antioxidant (D), the PA (E), the metal atom (F), the thermoplastic elastomer (G), etc.), the following may be exemplified as a method for producing such a gas barrier resin composition:

(1') a method involving mixing (dry-blending) pellets of the EVOH (A), pellets of the EVOH (B), and the inorganic particle (C) and/or the like, and as needed, the other component(s) described above, and melt kneading the pellets thus mixed;

(2') a method involving immersing pellets of the EVOH (A) and/or pellets of the EVOH (B) in a solution containing, as needed, the other component(s) described above and the like, subsequently dry-blending the pellets of the EVOH (A), the pellets of the EVOH (B), and the inorganic particle (C) and/or the like, and then melt kneading these;

(3') a method involving dry-blending pellets of the EVOH (A), pellets of the EVOH (B), and the inorganic particle (C) and/or the like, and then, while melt kneading these, adding at a middle portion of the extruder, an aqueous solution containing, as needed, the other component(s) described above;

(4') a method involving adding the inorganic particle (C) and/or the like to the EVOH (A) and/or the EVOH (B) beforehand, and then blending, in a melted state, a melted resin of the EVOH (A) and a melted resin of the EVOH (B) (as needed, the other component(s) may be added beforehand to the EVOH (A) and/or the EVOH (B), or added in the extruder); and (5') a method involving, in a step of synthesizing the EVOH (A) and/or the EVOH (B), adding the inorganic particle (C) and/or the like either alone or in a dispersion containing an appropriate solvent, and then mixing.

According to the production methods of (1') to (5'), by adjusting a mixing proportion of each component in accordance with the intended usage, the performance, and the like, a gas barrier resin composition superior in gas barrier properties can be produced while also considering a balance of the environmental load-reducing effect and the long-run workability. Of these, (1) a step of dry-blending the pellets of the EVOH (A), the pellets of the EVOH (B), and the inorganic particle (C) and/or the like, and then melt kneading is preferably included. For example, the method for producing a gas barrier resin composition including a step of dry-blending pellets of the EVOH (A), pellets of the EVOH (B), and pellets of the thermoplastic elastomer (G), and then melt kneading is a suitable mode of the present invention. For the mixing of the pellets with each other and/or the mixing of the pellets with the other component(s), for example, a ribbon blender, a high-speed mixer cokneader, a mixing roll, an extruder, an intensive mixer, or the like may be used.

Furthermore, in the case of the gas barrier resin composition containing the EVOH (A') and the inorganic particle (C) and/or the like, the production can be carried out by: synthesizing the EVOH (A') by a well-known procedure; mixing, by a well-known procedure, the inorganic particle (C) and/or the like with the EVOH (A') thus obtained; and, as needed, mixing in the other component(s) by a well-known procedure.

In the case in which the gas barrier resin composition of the present invention further contains the PA (E) and the metal atom (F), as the method for producing such a gas barrier resin composition, a method involving mixing pellets of the at least one type of EVOH with pellets of the PA (E) and a compound including at least one type of the metal atom (F) selected from the group consisting of atoms of magnesium, calcium, and zinc, and carrying out melt kneading is preferred. A form of the compound containing the metal atom (F) at the time of the mixing in the production method may be solid, or may be an aqueous solution. Furthermore, the mixing of the pellets of the EVOH with the pellets of the PA (E) and the compound containing the metal atom (F) may be carried out in one step, or may be carried out in two or more steps. In the case of carrying out the mixing in one step, for example, the mixing may be carried out by, for example, dry-blending each component in solid form. Furthermore, in the case of carrying out the mixing in two steps, the mixing may be carried out by, for example, dry-blending the pellets of the EVOH with the pellets of the PA (E), and then, at the time of melt kneading these, adding an aqueous solution containing the metal atom (F) at a middle portion of the extruder.

Molded Product

The molded product containing the gas barrier resin composition of the present invention is a suitable embodiment of the present invention. The gas barrier resin composition can be contained in a molded product having a monolayer structure, or can be contained in a molded product having a multilayer structure of 2 or more types together with various other base materials and/or the like, that is, a multilayer structure. A procedure for molding the molded product of the present invention may be exemplified by extrusion molding, thermoforming, profile molding, hollow molding, rotational molding, and injection molding. The molded product in which the gas barrier resin composition of the present invention is used can be applied to a wide range of intended uses such as films, sheets, containers (bags, cups, tubes, trays, bottles, paper cartons, etc.), fuel containers, tanks, pipes, hoses, fibers, packaging materials for foods/drinks, packaging materials for containers, infusion bag materials for medical treatments, tube materials for tires, cushioning materials for shoes, inner bag materials for bag-in-boxes, tank materials for preserving organic liquids, pipe materials for transporting organic liquids, warm water pipe materials for heating (warm water pipe materials for floor heating, etc.), packaging materials for cosmetics, packaging materials for dental care, packaging materials for medical drugs, sub parts for packaging materials (caps, stopcock parts for bag-in-boxes, etc.), pesticide bottles, agricultural films (films for greenhouses, films for fumigating soil), bags for storing grains, geomembranes, outer bags of vacuum thermal insulating boards, wallpapers or dressing boards, gas tanks for hydrogen, oxygen, or the like, and the like. Various other intended usages, described later, also fall under the intended usages of the molded product.

As specific procedures for molding the molded product, for example, films, sheets, pipes, and hoses can be molded by extrusion molding; container shapes can be molded by injection molding; and hollow containers such as bottles, tanks, and the like can be molded by hollow molding or rotational molding. Examples of the hollow molding include: extrusion hollow molding, involving molding a parison by means of extrusion molding, and then performing blowing on this to carry out molding; and injection hollow molding, involving molding a preform by means of injection molding, and then performing blowing on this to carry out molding. In producing a flexible packaging material or a container, a procedure of molding a packaging material such as a multilayer film by means of extrusion molding; and a procedure of thermoforming a multilayer sheet molded by extrusion molding to obtain a container-shaped packaging material may be suitably employed.

Multilayer Structure A

The molded product of the present invention may include a gas barrier layer (hereinafter, may be abbreviated to "layer (1)") formed from the gas barrier resin composition of the present invention. The molded product may be a monolayer structure, but is preferably a multilayer structure further including other layer(s). In other words, the multilayer structure A of the present invention includes at least one layer constituted from the gas barrier resin composition of the present invention. It is to be noted that a multilayer film, a multilayer sheet, a multilayer pipe, a multilayer structure B, and the like, described later, also fall under forms of the multilayer structure A. The lower limit of the number of layers of the multilayer structure A is preferably 2, and more preferably 3. Furthermore, the upper limit of the number of layers of the multilayer structure A may be, for example, 1,000, may be 100, or may be 20 or 10.

The layer(s) other than the layer (1) which may be included in the multilayer structure A of the present invention are exemplified by a thermoplastic resin layer (hereinafter, may be abbreviated to "layer (2)") containing, as a principal component, a thermoplastic resin other than the gas barrier resin composition of the present invention; an adhesion layer (hereinafter, may be abbreviated to "layer (3)") containing, as a principal component, an adhesive resin, an anchor-coating agent, or an adhesive; a recovery layer (hereinafter, may be abbreviated to "layer (4)"); an inorganic vapor deposition layer (hereinafter, may be abbreviated to "layer (5)"); a paper base material layer (hereinafter, may be abbreviated to "layer (6)"); and the like.

A suitable mode of the multilayer structure A of the present invention varies based on the intended usage, and fundamentally, including the layer (1) and the layer (2) is preferred, and including the layer (1), the layer (2), and the layer (3) is further preferred. In the case of the multilayer structure A being a container, a packaging material, a tube, a pipe, or the like, from an inner side to an outer side, the following layer configurations may be adopted as specific configurations: an order of layer (2), layer (3), layer (1), layer (3), layer (4), layer (2) (hereinafter, represented by (inside) 2/3/1/3/4/2 (outside)); (inside) 2/3/1/3/2 (outside); (inside) 2/4/3/1/3/4/2 (outside); (inside) 4/3/1/3/4 (outside); (inside) 1/3/2 (outside); (inside) 2/4/3/1/3/2 (outside); (inside) 2/1/3/2 (outside); (inside) 2/1/5/2 (outside); (inside) 2/5/1/2 (outside); (inside) 2/5/1/5/2 (outside); (inside) 2/3/1/5/3/2 (outside); (inside) 2/3/5/1/3/2 (outside); (inside) 2/3/1/3/2/6 (outside); (inside) 3/1/3/6 (outside); and the like. It is to be noted that depending on a type of the layer (2), the layer (3) may be omitted, a configuration which includes the layer (4) in place of the layer (2) may be adopted, and in the case of an arrangement in which a plurality of each of the layers (1) to (6) is used, the resin constituting each layer may be the same or different.

With regard to an average thickness, in total, of the multilayer structure A or the molded product of the present invention, a suitable mode varies based on the intended usage, and the average thickness is preferably 5 μm to 15 mm, and more preferably 10 μm to 10 mm.

Layer (1)

The lower limit of a proportion of an average thickness of the layer (1) with respect to the average thickness of the multilayer structure (A) of the present invention is not particularly limited, and is preferably 1%, and may be more preferably 2%. The proportion of the average thickness of the layer (1) is preferably 20%, and more preferably 15%. When the proportion of the average thickness of the layer (1) falls within the above range, favorable gas barrier properties and long-run workability tend to be exhibited, and producibility tends to be favorable.

Layer (2)

The layer (2) is the thermoplastic resin layer containing, as the principal component, the thermoplastic resin other than the EVOH. A proportion of the thermoplastic resin other than the EVOH in the layer (2) is preferably 70% by mass or more, more preferably 80% by mass or more, still more preferably 90% by mass or more, particularly preferably 95% by mass or more, and may be 99% by mass or more, and the resin constituting the layer (2) may be substantially constituted from only the thermoplastic resin other than the EVOH.

Examples of the thermoplastic resin being the principal component of the layer (2) include various polyolefins (polyethylene, polypropylene, poly 1-butene, poly 4-methyl-1-pentene, ethylene-propylene copolymers, copolymers of ethylene and α-olefin having 4 or more carbon atoms, copolymers of a polyolefin and maleic anhydride, ethylene-vinyl ester copolymers, ethylene-acrylic acid ester copolymers, modified polyolefins obtained by graft modifying these with unsaturated carboxylic acid or a derivative thereof, etc.), various polyamides (nylon 6, nylon 6-6, nylon 6/66 copolymers, nylon 11, nylon 12, polymetaxylylene adipamide, etc.), various polyesters (polyethylene terephthalate, polybutylene terephthalate, polyethylene naphthalate, etc.), polyvinyl chloride, polyvinylidene chloride, polystyrene, polyacrylonitrile, polyurethane, polycarbonate, polyacetal, polyacrylate, and modified polyvinyl alcohol resins. The thermoplastic resin layer may be unstretched, or may be monoaxially or biaxially stretched or rolled. Of these, the polyolefins are preferred in light of moisture resistance, mechanical properties, economic efficiency, and heat sealing properties, and the polyamides and the polyesters are preferred in light of mechanical properties and heat resistance.

The lower limit of an MFR of the thermoplastic resin at 190° C. under a load of 2,160 g is preferably 0.01 g/10 min, and more preferably 0.02 g/10 min. On the other hand, the upper limit of the MFR is preferably 0.5 g/10 min, more preferably 0.1 g/10 min, and still more preferably 0.05 g/10 min.

As the thermoplastic resin, one selected from typically commercially available products may be appropriately selected and used. Furthermore, within a range not leading to impairment of the effects of the present invention, the layer (2) may contain other optional component(s) similar to those of the gas barrier resin composition of the present invention, which constitutes the layer (1).

The lower limit of an average thickness per layer of the layer (2) is preferably 5 μm, and more preferably 20 μm. The upper limit of the average thickness per layer of the layer (2) is preferably 3,000 μm, and more preferably 1,000 μm. When the average thickness per layer of the layer (2) falls within the above range, the strength, moldability, appearance, and the like tend to improve.

The lower limit of a proportion of the average thickness of the layer (2) with respect to the average thickness of the multilayer structure (A) of the present invention is not particularly limited, and is preferably 10%, more preferably 30%, and may be still more preferably 50%, 70%, or 80%. The upper limit of the proportion of the average thickness of the layer (2) is not particularly limited, and is preferably 95%, and more preferably 90%.

Layer (3)

The layer (3) may be provided between the layer (1) and the layer (2), and is the layer containing, as the principal component, the adhesive resin, the anchor-coating agent, or the adhesive. The layer (3) can function as an adhesion layer between the layer (1) and another layer, such as the layer (2). The adhesive resin is a resin having adhesiveness, and may be preferably a thermoplastic resin having adhesiveness. Each of the anchor-coating agent and the adhesive may be a resin, may be a non-resin such as a low-molecular weight compound, or may be constituted from a plurality of components. Examples of the adhesive resin include a carboxylic acid-modified polyolefin, and the like. It is to be noted that the carboxylic acid-modified polyolefin as referred to herein means an olefin polymer having a carboxy group or an anhydride group thereof, obtained by subjecting the olefin polymer to chemical bonding with an ethylenic unsaturated carboxylic acid or an anhydride thereof by an addition reaction, a graft reaction, or the like.

The lower limit of an MFR of the adhesive resin at 190° C. under a load of 2,160 g is preferably 0.1 g/10 min, more preferably 0.2 g/10 min, and still more preferably 0.3 g/10 min. On the other hand, the upper limit of the MFR is preferably 15 g/10 min, more preferably 10 g/10 min, and still more preferably 5 g/10 min. It is to be noted that a commercially available product which is industrially manufactured may be used as such an adhesive resin, and examples thereof include "ADMER NF642E," "ADMER AT2235E," and "ADMER NF408E," each manufactured by Mitsui Chemicals, Inc., and the like.

It is to be noted that aside from the adhesive resin, the anchor-coating agent, and the adhesive, the layer (3) may contain, within a range not leading to impairment of the effects of the present invention, other optional component(s) similar to those of the layer (1).

In the case of containing the anchor-coating agent and the adhesive, the layer (3) can be formed by applying these to an upper face of a layer adjacent to the layer (3), and drying as needed. The adhesiveness may be enhanced by, before applying these, carrying out a surface treatment such as a corona discharge treatment on an applying face. The adhesive is not particularly limited, and for example, a two-component reactive polyurethane adhesive obtained by mixing a polyisocyanate component with a polyol component and allowing a reaction is preferably employed. Furthermore, the adhesiveness of the anchor-coating agent and the adhesive may be further improved by adding a small amount of a well-known silane coupling agent or the like. Suitable examples of the silane coupling agent may be exemplified by a silane coupling agent having a reactive group such as an isocyanate group, an epoxy group, an amino group, an ureide group, a mercapto group, or the like.

The lower limit of an average thickness per layer of the layer (3) is preferably 1 μm, and more preferably 3 μm. The upper limit of the average thickness per layer of the layer (3) is preferably 300 μm, and more preferably 150 μm. When the average thickness per layer of the layer (3) falls within the above range, favorable adhesiveness tends to be exhibited at low cost.

Layer (4)

The layer (4) is a layer which contains, for example, an EVOH, a thermoplastic resin, and an adhesive resin. Furthermore, the layer (4) is preferably a layer formed using a recovered material of the layer (1), the layer (2), and the layer (3) in the production step of the multilayer structure A of the present invention. Examples of the recovered material include burrs generated in the production step of the multilayer structure A, products which have failed an inspection, and the like.

The layer (4) may be used as a substitute for the layer (2) described above. However, in general, the layer (4) is preferably used laminated with the layer (2), since the layer (4) typically has less mechanical strength than does the layer (2). Taking into consideration that when the multilayer structure A the present invention is a container and is subjected to an external impact, concentration of stress occurs in the container, and in the stress concentration area, a compression stress in response to the impact is generated on an inner layer side of the container, which may lead to breakage, the layer (4), which is inferior in strength, is preferably provided so as to be situated on an outer layer side with respect to the layer (1). Moreover, in a case in which a large amount of the resin needs to be recycled, e.g., in the case of the generation of a large amount of the burrs, the regrind layer as the layer (4) may be provided on both sides of the layer (1).

Layer (5)

The layer (5) is the inorganic vapor deposition layer. The layer (5) is typically a layer which has barrier properties against oxygen and water vapor, and preferably has transparency. The layer (5) can be formed by vapor-depositing an inorganic substance. As the inorganic substance, metals (for example, aluminum) metal oxides (for example, silicon oxide and aluminum oxide), metal nitrides (for example, silicon nitride), metal oxide nitrides (for example, silicon oxynitride), and metal carbide nitrides (for example, silicon carbonitride) may be exemplified. Of these, in light of superior transparency, the layer (5) being formed from aluminum oxide, silicon oxide, magnesium oxide, or silicon nitride is preferred.

A process for forming the layer (5) is not particularly limited, and may be exemplified by physical vapor deposition processes such as vacuum vapor deposition (e.g., resistive heating vapor deposition, electron beam vapor deposition, and a molecular beam epitaxy process), a sputtering process, and an ion plating process; and chemical vapor deposition processes such as a thermal chemical vapor deposition process (e.g., a catalytic chemical vapor deposition process), a photochemical vapor deposition process, a plasma chemical vapor deposition process (e.g., capacitively coupled plasma, inductively coupled plasma, surface wave plasma, electron cyclotron resonance, dual magnetron, and an atomic layer deposition process), and an organometallic vapor deposition process.

A thickness of the layer (5) varies in accordance with type(s) of component(s) constituting the inorganic vapor deposition layer, and is preferably 0.002 to 0.5 μm, more preferably 0.005 to 0.2 μm, and still more preferably 0.01 to 0.1 μm. When the thickness of the layer (5) is 0.002 μm or more, the barrier properties of the layer (5) against oxygen and water vapor tend to be favorable. Furthermore, when the thickness of the layer (5) is 0.5 μm or less, the barrier properties of the layer (5) after bending tend to be maintained.

Furthermore, the inorganic vapor deposition layer contained in the vapor deposition film, described later, is also a suitable form of the layer (5).

Layer (6)

The layer (6) is the paper base material layer. As a paper base material to be used in the layer (6), an arbitrary paper having various formability, flex resistance, rigidity, resilience, strength, and the like may be adopted in accordance with the intended usage of the paper container for application, and for example, various types of paper being a main reinforcing material, such as bleached or unbleached paper having strong sizing characteristics, or pure-white machine-glazed paper, kraft paper, paperboard, processed paper, milk carton base paper, and the like may be employed. The paper base material layer may be a laminated layer in which a plurality of types of these papers are stacked. The paper base material layer falls within a range of a grammage of 80 to 600 g/m$^2$ and preferably a grammage of 100 to 450 g/m$^2$, and a thickness of 110 to 860 μm and preferably 140 to 640 μm. When the paper base material layer is thinner than this, the strength as a container may be insufficient, and when the paper base material layer is thicker than this, the rigidity may become too great, whereby processing may become difficult. It is to be noted that for example, characters, figures, symbols, and other desired designs may be optionally formed on the paper base material layer by means of a typical printing technique.

Method for Producing Multilayer Structure A

Other than using the gas barrier resin composition of the present invention, the multilayer structure A of the present invention can be produced by a conventionally well-known molding procedure such as various types of melt molding, and the like. A procedure for carrying out the melt molding of the gas barrier resin composition may be exemplified by extrusion molding, cast molding, inflation extrusion molding, blow molding, injection molding, injection blow molding, and the like.

Film or Sheet

The film or the sheet of the present invention includes the molded product of the present invention. The film as referred to herein means "a membranous, soft product having an average thickness of less than 250 μm," and the sheet as referred to herein means "a thin, plate-shaped, soft product having an average thickness of 250 μm or more." Discrimination between the film and the sheet in a thermo-shrinkable "film or sheet" and an industrial "film or sheet" is the same. Hereinafter, "the film or the sheet" is also referred to as the "film, etc." The film, etc. of the present invention may be a film, etc. constituted from the molded product of the present invention. In other words, one embodiment of the molded product of the present invention may be the film, etc. The film, etc. of the present invention has a low environmental load, and is favorable in gas barrier properties, appearance, and producibility. The film, etc. of the present invention may be a monolayer film constituted from only the layer (1), or may be a multilayer film. An average thickness of the film, etc. of the present invention is, for example, preferably 1 μm or more and less than 300 μm, and more preferably 5 μm or more and less than 100 μm. The film, etc. of the present invention may be suitably used as various packaging materials, and the like.

An arithmetic average roughness (Ra) of at least one surface of the film, etc. of the present invention, measured in accordance with JIS B0601, is preferably 1.0 μm or less, more preferably 0.8 μm or less, still more preferably 0.6 μm or less, and particularly preferably 0.4 μm or less. The arithmetic average roughness (Ra) of the at least one surface of the film, etc. of the present invention is preferably 0.05 μm or more, more preferably 0.10 μm or more, still more preferably 0.15 μm or more, and particularly preferably 0.20 μm or more. When the arithmetic average roughness (Ra) of the at least one surface of the film, etc. of the present invention falls within the above range, breakage resistance can be superior.

An average length of a contour curve element (RSm) of at least one surface of the film, etc. of the present invention, measured in accordance with JIS B0601, is preferably 1,000 μm or less, more preferably 800 μm or less, still more preferably 600 μm or less, and particularly preferably 400 μm or less. The average length of the contour curve element (RSm) of the at least one surface of the film, etc. of the present invention is preferably 50 μm or more, more preferably 100 μm or more, still more preferably 150 μm or more, and particularly preferably 200 μm or more. When the average length of the contour curve element (RSm) of the at least one surface of the film, etc. of the present invention falls within the above range, the breakage resistance can be superior. It is to be noted that JIS B0601 refers to, for example, JIS B0601: 2001.

The film, etc. of the present invention may be an unstretched film, etc., but there may be a case in which being stretched is preferred. In the case of being stretched, the strength and the like can improve. Furthermore, in the case in which the film, etc. of the present invention is the stretched film, etc., occurrence of stripy unevenness, which may occur in conjunction with the stretching, is unlikely, whereby the appearance, the gas barrier properties, and the like can be favorable.

Method for Producing Film, Etc.

The film, etc. of the present invention may be produced by a well-known procedure. The procedure for forming the film, etc. is not particularly limited; a melting process, a solution process, a calendar process, and the like may be exemplified, and the melting process is preferred. Examples of the melting process include a T-die process (a casting process) and an inflation process, and the casting process is preferred. In particular, producing by a procedure including: a cast-forming step in which the resin composition constituting the film, etc. of the present invention is melt-extruded on a casting roller; and a step of stretching the unstretched film, etc. obtained from the resin composition is preferred. A melting temperature at the time of the melting process varies based on a melting point, etc. of the gas barrier resin composition, and is preferably about 150 to 300° C. Furthermore, in a case in which the film, etc. of the present invention is multilayered, the film, etc. may be produced by a well-known procedure, and a coextrusion process, a dry-laminating process, a sand-laminating process, an extrusion-laminating process, a coextrusion-laminating process, a solution-coating process, and/or the like may be adopted.

The stretching may be monoaxial stretch or biaxial stretching, and biaxial stretching is preferred. The biaxial stretching may be either of successive biaxial stretching and simultaneous biaxial stretching. The lower limit of a draw ratio on area basis is preferably 6 times, and more preferably 8 times. The upper limit of the draw ratio is preferably 15 times, and more preferably 12 times. When the draw ratio falls within the above range, thickness uniformity, gas barrier properties, and mechanical strength of the film can be improved. Furthermore, a stretching temperature can be, for example, 60° C. or higher and 120° C. or lower.

The method for producing the film, etc. of the present invention may include, after the stretching step, a step of heat-treating the stretched film, etc. A heat treatment temperature is typically set to a temperature higher than the stretching temperature, and may be, for example, higher than 120° C. and 200° C. or lower.

The film, etc. of the present invention is suitably used as a material of various packaging containers such as food packaging containers, medical drug packaging containers, industrial chemical packaging containers, pesticide packaging containers, and the like. Furthermore, the thermo-shrinkable film, etc. and the industrial film, etc., described later, fall under embodiments of the film, etc. of the present invention.

Thermo-Shrinkable Film or Sheet

The thermo-shrinkable film or sheet (thermo-shrinkable film or thermo-shrinkable sheet) of the present invention includes the molded product of the present invention. The thermo-shrinkable film, etc. of the present invention may be a thermo-shrinkable film, etc. constituted from the molded product of the present invention. In other words, one embodiment of the molded product of the present invention may be the thermo-shrinkable film, etc. The thermo-shrinkable film, etc. of the present invention has a low environmental load, and is favorable in gas barrier properties, appearance, and producibility. The thermo-shrinkable film, etc. of the present invention is imparted with thermo-shrinkability by being subjecting to a stretching step after forming of the monolayer or multilayer film, etc. In light of exhibiting favorable thermo-shrinkability, the EVOH used in the layer (1) of the thermo-shrinkable film, etc. of the present invention preferably has a modifying group (structure) represented by the above formula (I).

The thermo-shrinkable film, etc. of the present invention is suitably a multilayer film, etc. having the layer (1) and the layer (2). In this case, a configuration in which the layer (1) is provided as one outer layer, and the layer (2) is provided as the other outer layer, or a configuration in which the layer (1) is an intermediate layer and the layer (2) is provided as outer layers on both sides thereof is preferred, and the latter is more suitable. The layer (1) and the layer (2) are preferably adhered via the adhesive resin.

In the multilayer film, etc. before the stretching, a thickness of the layer (1) is suitably 3 to 250 m, and more suitably 10 to 100 m. On the other hand, a thickness of the layer (2) is not particularly limited, and is appropriately selected upon considering performance such as moisture permeability, heat resistance, heat sealing properties, transparency, and the like which are required, as well as the intended usage. A total thickness of the multilayer film, etc. before the stretching is not particularly limited, and is typically 15 to 6,000 μm.

In light of the heat-sealing properties and the thermo-shrinkability being superior, a polyolefin such as an ethylene-vinyl acetate copolymer, an ionomer, or polyethylene is suitably employed as the thermoplastic resin contained in the layer (2) in the thermo-shrinkable film, etc. of the present invention, and in light of mechanical strength such as piercing strength and pinhole resistance being superior, a polyamide is suitably employed.

In the case in which the polyolefin is employed as the thermoplastic resin contained in the layer (2) in the thermo-shrinkable film, etc. of the present invention, examples of suitable configurations include: polyethylene layer/layer (3)/layer (1)/layer (3)/polyethylene layer; polypropylene layer/layer (3)/layer (1); layer (2); polypropylene layer; ionomer layer/layer (3)/layer (1)/layer (3)/ionomer layer; ethylene-vinyl acetate copolymer layer/layer (3)/layer (1)/layer (3)/ethylene-vinyl acetate copolymer layer; and the like.

In the case in which the polyamide is employed as the thermoplastic resin contained in the layer (2) in the thermo-shrinkable film, etc. of the present invention, a configuration in which a polyamide layer and the layer (1) are adjacent is preferably adopted. When such a configuration is adopted, superiority can be obtained in the barrier properties and the piercing resistance strength. Furthermore, transparency after the shrinking is superior compared to a case in which a general purpose barrier resin is used instead of the layer (1). A configuration in which the adhesive resin is not sandwiched between the polyamide and the layer (1) is more preferred.

As the configuration in the case in which the polyamide layer and the layer (1) are thus adjacent, polyamide layer/layer (1)/layer (3)/layer (2); layer (2)/polyamide layer/layer (1)/polyamide layer/layer (2); polyamide layer/layer (1)/polyamide layer/layer (2); polyamide layer/polyamide layer/layer (1)/polyamide layer/layer (2); and the like may be exemplified. Polyamide layer/layer (1)/layer (3)/ethylene-vinyl acetate copolymer layer; polyethylene layer/layer (3)/polyamide layer/layer (1)/polyamide layer/layer (3)/polyethylene layer; polyamide layer/layer (1)/polyamide layer/layer (3)/polyethylene layer; polyamide layer/layer (3)/polyamide layer/layer (1)/polyamide layer/layer (3)/polyethylene layer; and the like may be exemplified as suitable configurations.

The multilayer film, etc. can be obtained by various production procedures, and a coextrusion process, a dry-laminating process, a sand-laminating process, an extrusion-laminating process, a coextrusion-laminating process, a solution-coating process, and/or the like may be adopted. Of these, the coextrusion process is a process in which the gas barrier resin composition and the other resin composition(s) are simultaneously extruded from the extruder and laminated in a melted state, and discharged in a multilayer film shape from a die outlet. In the case of film-forming by the coextrusion process, a process in which the layer (1) and the layer (2) are laminated with the layer (3) sandwiched therebetween is preferred. As the adhesive resin, using a polyolefin having a carboxyl group, a carboxylic anhydride group, or an epoxy group is preferred. Such an adhesive resin is superior in both adhesiveness to the gas barrier resin composition, and adhesiveness to other thermoplastic resin(s) not containing a carboxyl group, a carboxylic anhydride group, or an epoxy group.

The thermo-shrinkable film, etc. of the present invention is produced by stretching the monolayer or multilayer film, etc. obtained. The stretching may be monoaxial stretching, or may be biaxial stretching. The biaxial stretching may be simultaneous biaxial stretching or successive biaxial stretching. Examples of a stretching process include a tenter stretching process, a tubular stretching process, a roll stretching process, and the like. The thermo-shrinkable film, etc. of the present invention is suitably a film which is stretched at a high magnification. Specifically, a thermo-shrinkable film obtained by stretching to 7 times or more in terms of area magnification is particularly suitable. A stretching temperature is typically 50 to 130° C. Before stretching the film, etc., crosslinking may be carried out by, e.g., irradiation with a radioactive ray. In light of further enhancing the shrinkability, the film, etc. is suitably cooled quickly after being stretched.

The thermo-shrinkable film, etc. of the present invention is suitably used as a material of various packaging containers such as food packaging containers, medical drug packaging containers, industrial chemical packaging containers, pesticide packaging containers, and the like.

Packaging Material A

The packaging material A of the present invention includes the film or sheet, or the thermo-shrinkable film or sheet of the present invention. The packaging material A of the present invention may be a packaging material constituted from the film or sheet, or the thermo-shrinkable film or sheet of the present invention. In other words, one embodiment of the molded product of the present invention may be the packaging material. The packaging material A of the present invention has a low environmental load, and is favorable in gas barrier properties, appearance, and producibility.

The packaging material A of the present invention may be a monolayer film, etc., or may be a multilayer film, etc. Furthermore, the multilayer film, etc., may further have a layer formed from a material other than a resin, such as a paper layer, a metal layer, or the like. The packaging material A may be a packaging material retaining the shape of the film or the sheet, or may be a packaging material in which the film or the sheet has been subjected to secondary processing. Examples of the packaging material obtained by carrying out the secondary processing include: (1) a tray cup-shaped container obtained by subjecting the film or the sheet to thermoforming processing such as vacuum molding, pressure molding, vacuum/pressure molding, or the like; (2) a bottle-shaped or cup-shaped container obtained by subjecting the film or the sheet to stretch blow-molding or the like; (3) a bag-shaped container obtained by subjecting the film or the sheet to heat sealing; and the like. It is to be noted that the secondary processing procedure is not limited to the procedures exemplified above, and a well-known secondary processing procedure other than those described above, such as blow-molding or the like, may be appropriately used.

The packaging material A of the present invention is used for packaging, for example, foods; drinks; chemicals such as pesticides and medical drugs; industrial materials such as medical equipment, machine parts, and precision materials; clothes; and the like. In particular, the packaging material A is preferably used in an intended usage for which barrier properties against oxygen are necessary, and in an intended usage in which an interior of the packaging material will be substituted by various types of functional gas. The packaging material A is formed into a variety of shapes according to the intended usage, for example, into a vertical form fill seal pouch, a vacuum wrapping bag, a spout-attached pouch, a laminate tube container, a lid material for a container, and the like.

Vacuum Wrapping Bag

The packaging material A may be a vacuum wrapping bag. One example of the vacuum wrapping bag is a bag-shaped container including the film, etc. of the present invention as a partition wall which divides: an internal part in which content is wrapped; and an external part, wherein the internal part is in a state of reduced pressure. In the vacuum wrapping bag, for example, two sheets of the film, etc. of the present invention are overlapped, and circumferential edge parts of these two sheets of the film, etc. are sealed together. In the vacuum wrapping bag, the partition wall is preferably the multilayer film or the like. The vacuum wrapping bag may be produced using a nozzle-type or chamber-type vacuum wrapping apparatus.

The vacuum wrapping bag is used in an intended usage in which wrapping in a vacuum state is desired, for example, for preserving foods, drinks, etc. Furthermore, the vacuum wrapping bag may also be used as an outer packaging material for a vacuum insulator.

Industrial Film or Sheet

The industrial film or sheet (industrial film or industrial sheet) of the present invention includes the monolayer or multilayer film, etc. of the molded product of the present invention. The industrial film, etc. of the present invention may be an industrial film, etc. constituted from the molded product of the present invention. In other words, one embodiment of the molded product of the present invention may be the industrial film, etc. The industrial film, etc. of the present invention has a low environmental load, and is favorable in gas barrier properties, appearance, and producibility. Specific examples of the industrial film, etc. include an agricultural film and the like, a landfill film and the like, and a construction film and the like.

The industrial film, etc. of the present invention is preferably a multilayer film, etc. As the layer (2) included in the industrial film, etc., with the purpose of preventing a deterioration in the gas barrier properties of the layer (1) due to moisture, a hydrophobic thermoplastic resin is preferably employed. Specific examples thereof include polyolefin resins: polyethylenes such as linear low-density polyethylenes, low-density polyethylenes, ultra-low-density polyethylenes, ultra-low-density linear polyethylenes, medium-density polyethylenes, and high-density polyethylenes, polyethylene resins such as ethylene-α-olefin copolymers, polypropylene resins such as polypropylenes, ethylene-propylene (block and random) copolymers, and propylene-α-olefin (α-olefin having 4 to 20 carbon atoms) copolymers, polybutenes, and polypentenes; grafted polyolefins obtained by graft modification of these polyolefins with an unsaturated carboxylic acid or an ester thereof, and cyclic polyolefin resins; and ionomers, ethylene-vinyl acetate copolymers, ethylene-acrylic acid copolymers, ethylene-acrylic acid ester copolymers, polyester resins, polyamide resins, polyvinyl chloride, polyvinylidene chloride, acrylic resins, polystyrenes, vinyl ester resins, polyester elastomers, polyurethane elastomers, halogenated polyolefins such as chlorinated polyethylenes and chlorinated polypropylenes, and aromatic and aliphatic polyketones. Of these, in light of mechanical strength and molding processability, the polyolefin resins are preferred, and the polyethylenes and the polypropylenes are particularly preferred.

With regard to a melt viscosity of the hydrophobic thermoplastic resin, the lower limit value of an MFR at 210° C. under a load of 2,160 is preferably 1.0 g/10 min and more preferably 2.0 g/10 min, and the upper limit value thereof is preferably 100 g/10 min, and more preferably 60 g/10 min. When the hydrophobic thermoplastic resin having such a melt viscosity is employed, a favorable multilayer film, etc. not having disordered layers can be obtained.

As a layer configuration of the industrial film, etc. of the present invention, the following layer configurations may be exemplified. In the layer configurations, layers being closer to the left side represent layers on an outer side (layers exposed to the external environment).
5 layers: 1/3/2/3/1; 2/3/1/3/2; 2/3/1/3/1
6 layers: 2/3/1/3/2/2
7 layers: 2/3/1/3/1/3/2; 2/2/3/1/3/2/2

With the aim of particularly preventing deterioration of oxygen barrier properties due to moisture, the configurations in which the layer (1) is employed as an intermediate layer and the layer (2) is employed as the outer layers are preferred, and the configurations of 2/3/1/3/2, 2/2/3/1/3/2/2, and the like are further preferred.

As a thickness of the industrial film, etc. of the present invention, a total thickness thereof is typically 5 to 5 mm, preferably 10 to 4.5 mm, more preferably 15 to 4 mm, and particularly preferably 20 to 3.5 mm. Furthermore, a thickness of the layer (2) (a hydrophobic resin composition layer, etc.) in the industrial film, etc. is not particularly limited, and is typically 0.5 to 2.5 mm, preferably 1 to 2 mm, and particularly preferably 1 to 1.5 mm. A thickness of the layer (1) is not particularly limited, and a proportion of the total layer thickness falls within a range of preferably 1 to 20%, more preferably 2 to 18%, and still more preferably 3 to 15%.

Examples of the construction film, etc. may include a wallpaper and the like. The wallpaper as an embodiment of the industrial film, etc. of the present invention has a low environmental load, and is superior in producibility.

Examples of the landfill film, etc. may include a geomembrane, a landfill sheet, and the like. The geomembrane is a sheet used as a seepage control work for waste disposal plants, and the like. Furthermore, the landfill sheet is a sheet which prevents diffusion of harmful substances emitted from industrial waste and the like, and for example, may be used in order to prevent diffusion of radon gas.

In light of enabling usage over a long period outdoors, it is preferable to include an antioxidant, an ultraviolet ray resistance agent (an ultraviolet ray-absorbing agent, a light stabilizer, or a colorant), and/or the like in the gas barrier resin composition of the agricultural film, etc. The agricultural film, etc. is preferably a multilayer film, etc., and as the layer (2), with the aim of preventing deterioration of the gas barrier properties of the layer (1) due to moisture, a hydrophobic thermoplastic resin is preferably contained.

The layer (2) preferably contains the ultraviolet ray resistance agent and/or a sticky component. Examples of the ultraviolet ray resistance agent include an ultraviolet ray-absorbing agent, a light stabilizer, a colorant, and the like.

A blending quantity of the ultraviolet ray resistance agent with respect to the hydrophobic thermoplastic resin is, with respect to the hydrophobic thermoplastic resin, typically 1 to 10% by mass, preferably 2 to 8% by mass, and particularly preferably 3 to 5% by mass. In a case in which the blending quantity falls below the above range, the hydrophobic thermoplastic resin is more likely to be deteriorated by an ultraviolet ray. On the other hand, in a case in which the blending quantity exceeds the above range, the mechanical strength of the hydrophobic thermoplastic resin may decrease.

The sticky component may be exemplified by aliphatic saturated hydrocarbon resins such as polyisobutene, polycyclic saturated hydrocarbon resins, and the like, and a blending quantity of the sticky component with respect to the hydrophobic thermoplastic resin is typically 1 to 30% by mass, preferably 2 to 20% by mass, and particularly 3 to 15% by mass. When the blending quantity is appropriate, at a time of performing wrapping using the agricultural film, etc., the film is more likely to pressure-bond to itself, and the seal is more likely to be maintained. In a case in which the blending quantity falls below the above range, a gap may be generated in the film, etc., and air may penetrate into an interior, whereby long-term storage properties of the content may deteriorate. Furthermore, in a case in which the blending quantity exceeds the above range, blocking of the multilayer film may occur, whereby unrolling from a film roll, etc. may fail.

As a thickness of the agricultural film, etc. of the present invention, a total thickness thereof is typically 5 to 200 μm, preferably 10 to 150 μm, more preferably 15 to 100 μm, and particularly preferably 20 to 50 μm. Furthermore, a thickness of the layer (2) (the hydrophobic resin composition layer, etc.) in the agricultural film, etc. is not particularly limited, and is typically 0.5 to 200 μm, preferably 1 to 100 μm, and particularly preferably 1 to 10 μm. A thickness of the layer (1) is not particularly limited, and it is preferable for a proportion of the total layer thickness to fall within a range of 1 to 20%, preferably 2 to 18%, and more preferably 3 to 15%.

The agricultural film may be used for various films for use in the agricultural field, such as a large silo film, a soil fumigation film, a grain storage bag, a silage film, a film for a vinyl house, a multi-film, and the like.

Large Silo Film

The large silo film is a film for wrapping and preserving grains. By wrapping and storing the grains with the large silo film, the grains can be protected from moisture, mold, insects, and the like. A length of one side of the large silo film is, for example, 1 m or more, and may be 2 m, 3 m, 5 m, or 10 m or more. Furthermore, the large silo film may be processed into a bag shape or the like.

Soil Fumigation Film

The soil fumigation film is a film used for, e.g., preventing transpiration of a soil fumigation agent when performing soil fumigation in a field or the like.

Grain Storage Bag

The soil storage bag is a bag for storing grain to protect the grain from humidity, mold, insects, and the like, and is also referred to as a "hermetic bag" and the like. The grain storage bag is a product in which a film including at least one layer formed from the gas barrier resin composition of the present invention is formed into a bag shape, a saccate shape, or another container shape. In a case in which the grain storage bag is, for example, in a rectangular bag shape, a length of one side thereof is, for example, 0.5 to 2 m.

Silage Film

The silage film is a film used for the production, wrapping, and/or the like of silage. Silage, which is obtained by fermenting pastorage or the like under anaerobic conditions, is used for feed for livestock, and the like. A form of a silo where the silage film is used is not particularly limited, and various forms, such as a bunker silo, an underground (or semi-underground) silo, a bag silo, a tube silo, a stack silo, a wrap silo, and the like, may be exemplified.

For example, in the case of producing the wrap silo, first, pastorage is formed in a desired volume (for example, 0.1 to 50 $m^3$, and preferably 1 to 30 $m^3$). For example, in a case of a cylindrical roll bail silo, a size thereof is, in terms of diameter, typically 0.5 to 3 m and preferably 1 to 2 m, and in terms of height, typically 0.5 to 3 m and preferably 1 to 2 m. Next, the silage film is wrapped around the thus formed pastorage using a conventional wrap-rolling apparatus to seal the pastorage.

Tube

The tube of the present invention includes the molded product of the present invention. The tube may be a tube constituted from the molded product of the present invention. In other words, one embodiment of the molded product of the present invention may be the tube. The tube has a low environmental load, and is favorable in gas barrier properties, appearance, and producibility.

A method for producing the tube of the present invention is not particularly limited, and for example, a procedure of directly molding into a tube shape by melt molding by means of coextrusion molding, coinjection molding, coextrusion coating, or the like; a procedure of molding into a tube shape by heat sealing the film or the sheet of the present invention; a procedure of molding into a tube shape by using an adhesive to laminate the film or the sheet of the present invention; and the like may be exemplified.

Pipe

The pipe of the present invention includes the molded product of the present invention. The pipe of the present invention may be a pipe constituted from the molded product of the present invention. In other words, one embodiment of the molded product of the present invention may be the pipe. The pipe has a low environmental load, and is favorable in gas barrier properties, appearance, and producibility. In light of inhibiting oxidative degradation in use over a long period, the pipe preferably contains the antioxidant (D) in the gas barrier resin composition. In light of inhibiting oxidative degradation in use at a high temperature, the antioxidant is preferably the compound having a hindered amine group and/or the compound having a hindered phenol group. Furthermore, in light of flex resistance, the pipe preferably contains the thermoplastic elastomer (G), and more preferably contains the modified thermoplastic elastomer (g2), in the gas barrier resin composition.

An intended usage of the pipe is not particularly limited, and for example, the pipe can be used as a hot water circulation pipe, a heat insulating multilayer pipe, a fuel pipe, and the like.

The pipe of the present invention may be a monolayer pipe and may be a multilayer pipe, but is preferably a multilayer pipe. As a layer configuration of the multilayer pipe, the layer configuration of the molded product (the multilayer structure A) may be adopted.

Hot Water Circulation Pipe

In the case in which the multilayer pipe is used as a hot water circulation pipe, a 3-layer configuration being layer (1)/layer (3)/layer (2), in which the layer (2) is the outermost layer, is typically adopted. This is because in reality, many pipe manufacturers have adopted this configuration since by adding equipment for coextrusion coating of gas barrier resin compositions and adhesive resins to production lines of monolayer pipes, such as existing crosslinked polyolefins, the production lines can be easily converted to a production line for the multilayer pipe.

Providing, e.g., polyolefin layers on both sides of the layer (1) and using the layer (1) as an intermediate layer is effective for, e.g., damage prevention of the layer (1). However, in the case of using the multilayer pipe as a hot water circulation pipe, e.g., a floor heating pipe, since the multilayer pipe is typically laid under the floor, the risk of damage to the layer (1) by physical impact and the like is comparatively low, whereby in light of gas barrier properties, it is rather desirable to provide the layer (1) as the outermost layer. The gas barrier resin composition exhibits high moisture dependency, whereby the barrier properties tend to degrade under a condition involving high humidity.

Thus, when the layer (1) is provided as the outermost layer, the layer (1) is mainly positioned at a site the furthest away from a surface inside the pipe which comes in contact with water; consequently, this layer configuration is the most useful layer configuration in terms of the barrier performance of the multilayer pipe. On the other hand, typically, in the case of providing the EVOH layer as the outermost layer, due to coming directly in contact with air, the EVOH layer is likely to be affected by oxidative degradation. In such an environment, in the case of using the gas barrier resin composition containing the antioxidant having the compound having the hindered amine group and/or the compound having the hindered phenol group, since the layer (1) is provided as the outermost layer, which is unlikely to experience oxidative degradation even at a high temperature, the effect of providing the multilayer pipe in which the occurrence of cracks due to oxidative degradation is reduced while having favorable barrier properties can be more effectively exhibited.

Heat Insulating Multilayer Pipe

In the case of the multilayer pipe being used as the heat insulating multilayer pipe for, e.g., area cooling/heating, it is preferable to have: a 3-layer configuration (hereinafter, may be abbreviated to laminate 1) being layer (2)/layer (3)/layer (1), in which the layer (1) is provided closer to the inner side than the layer (2); or, in light of preventing damage to the layer (1), a 5-layer configuration (hereinafter, may be abbreviated to laminate 2) of layer (2)/layer (3)/layer (1)/layer (3)/layer (2).

The heat insulating multilayer pipe for, e.g., area heating/cooling typically includes, in addition to the layer (1) (the layer formed from the gas barrier resin composition), a heat insulating foam layer. A configuration of the heat insulating multilayer pipe is not particularly limited, and for example, from the inner side, being provided with an inner pipe, the heat insulating foam layer covering a circumference of the inner pipe, and then the laminate 1 or 2 as the outer layer, in this order, is preferred.

A type (material), shape, and size of the pipe used as the inner pipe is not particularly limited as long as it enables transporting a heating medium such as gas or liquid, and may be appropriately selected in accordance with a type of the heating medium, an intended usage and usage form of the piping material, and the like. Specifically, metals such as steel, stainless steel, aluminum, and the like; polyolefins (polyethylene, crosslinked polyethylene (PEX), polypropylene, poly 1-butene, poly 4-methyl-1-pentene, etc.), and the laminate 1 or 2 may be exemplified, and of these, the crosslinked polyethylene (PEX) is suitably used.

As the heat insulating foam, polyurethane foam, polyethylene foam, polystyrene foam, phenol foam, or polyisocyanurate foam may be used, and in light of improving heat insulating performance, polyurethane foam is suitably used.

Chlorofluorocarbon gases, various alternative chlorofluorocarbons, water, chlorinated hydrocarbons, hydrocarbons, carbon dioxide, and the like may be used as a foaming agent of the heat insulating foam, and in light of foaming effects and impact on the environment, hydrocarbons, and specifically n-pentane and cyclopentane are suitably used.

As a method for producing the heat insulating pipe, for example, a procedure in which the inner pipe which transports the heating medium is inserted inside a pipe-shaped outer layer and the inner pipe is secured with a spacer to create a dual-layer pipe, and various foam feedstocks are injected into a gap part between the inner pipe and the outer layer to allow for foaming and hardening can be exemplified. A material for the spacer is not particularly limited, and in order to reduce damage by the spacer to the inner pipe and the outer layer, polyethylene or polyurethane is preferred.

Fuel Pipe

In the case of using the pipe of the present invention as the fuel pipe, it may be further preferable for the layer constituted from the gas barrier resin composition of the present invention to further contain the thermoplastic elastomer (G). When the thermoplastic elastomer (G) is contained, crack resistance and the like of the pipe can further improve.

In the case of use as the fuel pipe, an innermost layer is formed so as to be electrically conductive. For this purpose, an electrically conductive additive, for example, carbon black or graphite fibers, is mixed into the thermoplastic resin of the innermost layer.

Method for Producing Pipe

Hereinafter, a method for producing the pipe of the present invention, specifically the multilayer pipe, is described. The multilayer pipe may be produced, for example, by performing coextrusion coating on a monolayer pipe of, e.g., crosslinked polyolefin using the gas barrier resin composition and the adhesive resin. At the time of performing the coextrusion coating on the monolayer pipe using the gas barrier resin composition and the adhesive resin, the coating may be performed by simply using a film obtained by melting the gas barrier resin composition and the adhesive resin on the monolayer pipe, but there may be a case in which adhesiveness between the monolayer pipe and the coating layer is insufficient, whereby there is a possibility that the coating layer may peel during use over a long period, resulting in loss of the gas barrier properties. As a measure against this, it is effective to, before coating, subject the surface of the pipe to be coated to a frame treatment and/or a corona discharge treatment.

As another multilayer molding procedure for producing the multilayer pipe, a procedure of carrying out what is generally referred to as coextrusion molding may be exemplified. In this procedure, extruders in a number corresponding to the types of resin layers are used, and simultaneous extrusion molding is performed in a state such that flows of resins melted in the extruders are stacked in layers. Furthermore, a multilayer molding procedure such as dry lamination may also be adopted.

The method for producing the multilayer pipe preferably includes a step of cooling with water at 10 to 70° C. immediately after molding. In other words, after the melt molding, before curing the layer (1), the layer (1) is desirably cooled with water at 10 to 70° C. for curing. When the temperature of the cooling water is too low, in a case of bending the multilayer pipe in the secondary processing step which follows, a crack is likely to occur due to warping of the layer (1) at the bending part. Details of a cause for the crack being likely to occur due to warping are not necessarily clarified, but it is presumed that residual stress in the molded article may have an influence. In light of this, the temperature of the cooling water is more preferably 15° C. or higher, and still more preferably 20° C. or higher. On the other hand, when the temperature of the cooling water is too high, at the time of the secondary processing, a crack is likely to occur due to warping of the layer (1) at the bending part. Details of a cause for this are also not sufficiently clarified, but it is presumed that this results from a level of crystallization of the layer (1) becoming too high. In light of this, the temperature of the cooling water is more preferably 60° C. or lower, and still more preferably 50° C. or lower.

When the multilayer pipe obtained by the above procedure is subjected to the secondary processing, various types of molded products can be obtained. A procedure for the secondary processing is not particularly limited and a well-known secondary processing procedure may be appropriately adopted, and for example, a procedure of carrying out processing involving the multilayer pipe being heated to 80 to 160° C. and then deformed into a desired shape, and then secured for 1 minute to 2 hours in that state may be exemplified.

Thermoformed Container

The thermoformed container of the present invention includes the molded product of the present invention. The thermoformed container may be a thermoformed container constituted from the molded product of the present invention. In other words, one of embodiments of the molded product of the present invention may be the thermoformed container. The thermoformed container has a low environmental load, and is favorable in gas barrier properties, appearance, and producibility. The thermoformed container can be used in intended usages for which oxygen barrier properties are demanded in a variety of fields of, for example, foods, cosmetics, medical/chemical drugs, toiletries, and the like. This thermoformed container is formed to have a retaining portion by, for example, subjecting a monolayer or multilayer film or sheet to thermoforming.

Retaining Portion

The retaining portion is a portion for retaining contents such as foods. The shape of this retaining portion is decided in accordance with the shape of the contents. Specifically, the thermoformed container may be formed to give, for example, a cup-shaped container, a tray-shaped container, a bag-shaped container, a bottle-shaped container, a pouch-shaped container, or the like.

The form of the retaining portion may be expressed by a draw ratio (S) as one indicator. The draw ratio (S) as referred to herein means a value obtained by dividing the depth of the bottom of the container by the diameter of an inscribed circle having the maximum diameter in the opening of the container. Thus, a greater value of the draw ratio (S) indicates a deeper container, whereas a smaller value of the draw ratio (S) indicates a shallower container. For example, in the case of the thermoformed container of this embodiment having a cup shape, the draw ratio (S) thereof would be larger, whereas in the case of the thermoformed container being a tray, the draw ratio (S) thereof would be smaller. It is to be noted that the value of the diameter of the inscribed circle having the maximum diameter corresponds to, for example: a diameter of a circular shape when the opening of the retaining portion is circular; a shortest diameter (minor axis) of an elliptical shape when the opening of the retaining portion is elliptical; and a length of the shorter side of a rectangular shape when the opening of the retaining portion is rectangular.

A suitable value of the draw ratio (S) may vary depending on the thickness of the film or sheet. In the case of the thermoformed container of the present invention being obtained by subjecting a film to thermoforming, the draw ratio (S) is preferably 0.2 or more, more preferably 0.3 or more, and still more preferably 0.4 or more. On the other hand, in the case of the thermoformed container being obtained by subjecting a sheet to molding, the draw ratio (S) is preferably 0.3 or more, more preferably 0.5 or more, and still more preferably 0.8 or more.

In the thermoformed container of the present invention, the lower limit of a thickness ratio (I/O) of the total thickness (I) of the other layer(s) laminated to one face side of the first layer (1) to the total thickness (O) of the other layer(s) laminated to the other face side of the layer (1) is preferably 1/99, and more preferably 30/70. The upper limit of I/O described above is preferably 70/30, and more preferably 55/45. It is to be noted that the thickness of the total layers or a monolayer of the thermoformed container is an average value of thicknesses measured by optical microscopic observation of samples obtained from a plurality of portions of the thermoformed container by cutting away with a microtome.

The lower limit of an overall average thickness of the thermoformed container of the present invention is preferably 300 μm, more preferably 500 μm, and still more preferably 700 μm. Meanwhile, the upper limit of the overall average thickness of the thermoformed container is preferably 10,000 μm, more preferably 8,500 μm, and still more preferably 7,000 μm. It is to be noted that the overall average thickness as referred to herein means the thickness of the total layers in the retaining portion of the thermoformed container. When the overall average thickness is equal to or less than the upper limit, a production cost of the thermoformed container can be restrained. On the other hand, when the overall average thickness is equal to or more than the lower limit, sufficient rigidity is maintained, whereby the thermoformed container is unlikely to be broken.

Method for Producing Multilayer Sheet Used in Thermoformed Container

A method for producing a multilayer sheet which is one of the monolayer or multilayer film, etc., to be used in production of the thermoformed container of the present invention will be described. The multilayer sheet may be formed by using a coextrusion molding apparatus. The multilayer sheet may be formed so as to have a predetermined layered structural configuration by, for example, charging the gas barrier resin compositions for forming respective layers, as well as other resin into separate extruders, respectively, and carrying out coextrusion using these extruders.

The extrusion molding of each layer is carried out by operating an extruder equipped with a single screw at a certain temperature. The temperature of an extruder for forming the layer (1) is adjusted to, for example, 170° C. or higher and 260° C. or lower. In addition, the temperatures of extruders for forming the layers (2) to (4) are adjusted to, for example, 150° C. or higher and 260° C. or lower.

Thermoforming

The thermoformed container of the present invention can be formed by heating the multilayer sheet or the like to be softened, and thereafter carrying out molding so as to fit a die shape. The thermoforming procedure is exemplified by: a procedure involving carrying out the molding so as to fit a die shape by means of vacuum or compressed air, which may be used in combination with a plug as needed (a straight process, a drape process, an air slip process, a snap-back process, a plug-assist process, and the like); a procedure involving press molding; and the like. Various molding conditions such as the molding temperature, the degree of vacuum, the pressure of the compressed air, and the molding speed are appropriately selected in accordance with the shape of the plug and/or the die, as well as properties of a resin as a base material, and the like.

The molding temperature is not particularly limited as long as it is a temperature at which the resin can be sufficiently softened for molding, and a suitable range of the temperature may vary in accordance with the configuration of the multilayer sheet or the like. It is to be noted that the heating temperature is typically lower than the melting point of the resin. The lower limit of the heating temperature of a specific multilayer sheet or the like is typically 50° C., preferably 60° C., and more preferably 70° C. The upper limit of the heating temperature is, for example, 180° C., and may be 160° C.

Layer Configuration of Thermoformed Container

The thermoformed container of the present invention is acceptable as long as at least the layer (1) is included, and may be configured from a single layer or from a plurality of layers. The layer configuration in the case of the thermoformed container including a plurality of layers may be appropriately predetermined in accordance with the intended usage and the like.

The layer configuration in a case in which the thermoformed container of the present invention includes a plurality of layers preferably involves providing the layer (2) as an outermost layer. More specifically, providing in an order of: layer (2)/layer (3)/layer (1)/layer (3)/layer (2) from the inner surface of the retaining portion to the outer surface of the retaining portion (hereinafter, represented as "(2)/(3)/(1)/(3)/(2) from the inner surface to the outer surface") is preferred in light of the impact resistance. Furthermore, in a case where the layer (4), being a regrind layer, is included, examples of the layer configuration include:

- (2)/(3)/(1)/(3)/(4)/(2) from the inner surface to the outer surface;
- (2)/(4)/(3)/(1)/(3)/(4)/(2) from the inner surface to the outer surface;
- (4)/(3)/(1)/(3)/(4) from the inner surface to the outer surface; and the like.

It is to be noted that in these layer configurations, the layer (4) may be provided in place of the layer (2). It is to be noted that in the case of a configuration in which the layer (1) to the layer (4) are each used in a plurality of number, the resin constituting each layer may be the same or different.

Cup-Shaped Container

Figure 2:
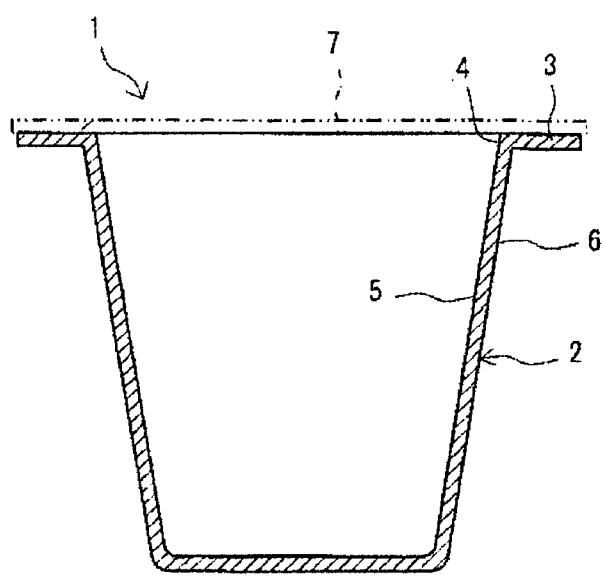
FIG. 2 is a cross sectional view of the cup-shaped container illustrated in FIG. 1.

Next, a cup-shaped container shown in FIGS. 1 and 2 will be specifically described as an example of the thermoformed container of the present invention. However, the cup-shaped container is merely an example of the thermoformed container of the above embodiment, and the following explanation of the cup-shaped container does not limit the scope of the present invention.

The cup-shaped container 1 shown in FIGS. 1 and 2 includes a cup main body 2 as the retaining portion, and a flange portion 3. The cup-shaped container 1 is used such that contents are retained in the cup main body 2 and thereafter a lid 7 as a sealer is attached to the flange portion 3 so as to seal an opening 4 of the cup main body 2. The lid 7 is exemplified by a resin film, a metal foil, a metal-resin composite film, and the like, and among these, a metal-resin composite film in which a metal layer is laminated to a resin film is preferred. Examples of the resin film include polyethylene films, polyethylene terephthalate films, and the like. The metal layer is not particularly limited, and is preferably a metal foil or a metal vapor-deposition layer, and is more preferably an aluminum foil in light of gas barrier properties and producibility.

The cup-shaped container 1 is typically obtained by subjecting the multilayer sheet to thermoforming. It is preferred that the multilayer sheet includes at least the layer (1), and an other layer is preferably laminated to the layer (1). The other layer is exemplified by the layer (2), the layer (3), the layer (4), and the like. Specific examples of the layered configuration of the multilayer sheet are described above.

Method for Producing Cup-Shaped Container

Figure 3:
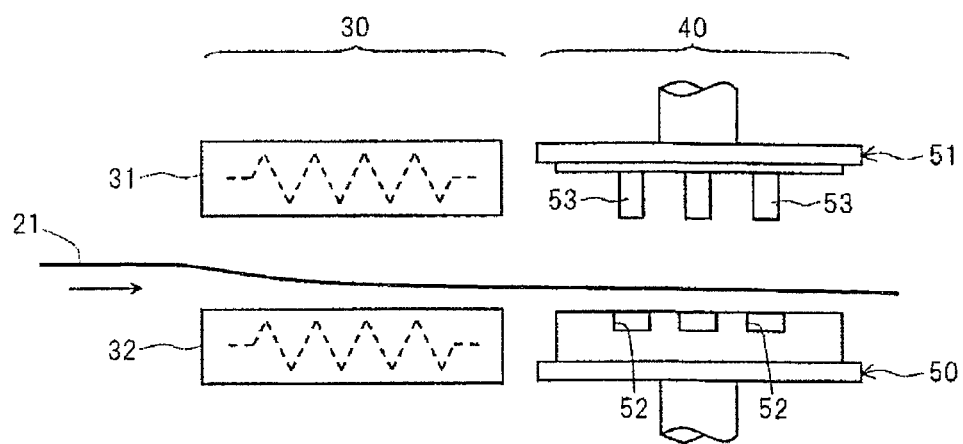
FIG. 3 is a schematic view for demonstrating a method for producing the cup-shaped container illustrated in FIG. 1.

As shown in FIG. 3, the cup-shaped container 1 is produced by heating a continuous multilayer sheet 21 by means of a heating apparatus 30 to permit softening, followed by thermoforming by using a die apparatus 40.

Heating Apparatus

The heating apparatus 30 is provided with a pair of heaters (heater 31 and heater 32), and is configured such that the continuous multilayer sheet 21 can be passed through between the heater 31 and the heater 32. It is to be noted that an apparatus that can conduct heating by hot pressing may be used as the heating apparatus 30.

Die Apparatus

The die apparatus 40 is suitable for thermoforming by a plug-assist process, and includes a lower mold half 50 and an upper mold half 51 that are placed in a chamber (not shown in the Figure). The lower mold half 50 and the upper mold half 51 are configured such that they are each independently vertically movable, and in a state of being spaced apart from one another, the continuous multilayer sheet 21 can be passed between the lower mold half 50 and the upper mold half 51. The lower mold half 50 includes a plurality of recessed parts 52 for shaping the retaining portion of the cup-shaped container 1. The upper mold half 51 includes a plurality of plugs 53 that protrude toward the lower mold half 50. The plurality of plugs 53 are each provided in a position corresponding to each of the plurality of recessed parts 52 of the lower mold half 50. Each plug 53 can be inserted into the corresponding recessed part 52.

Thermoforming

Figure 4:
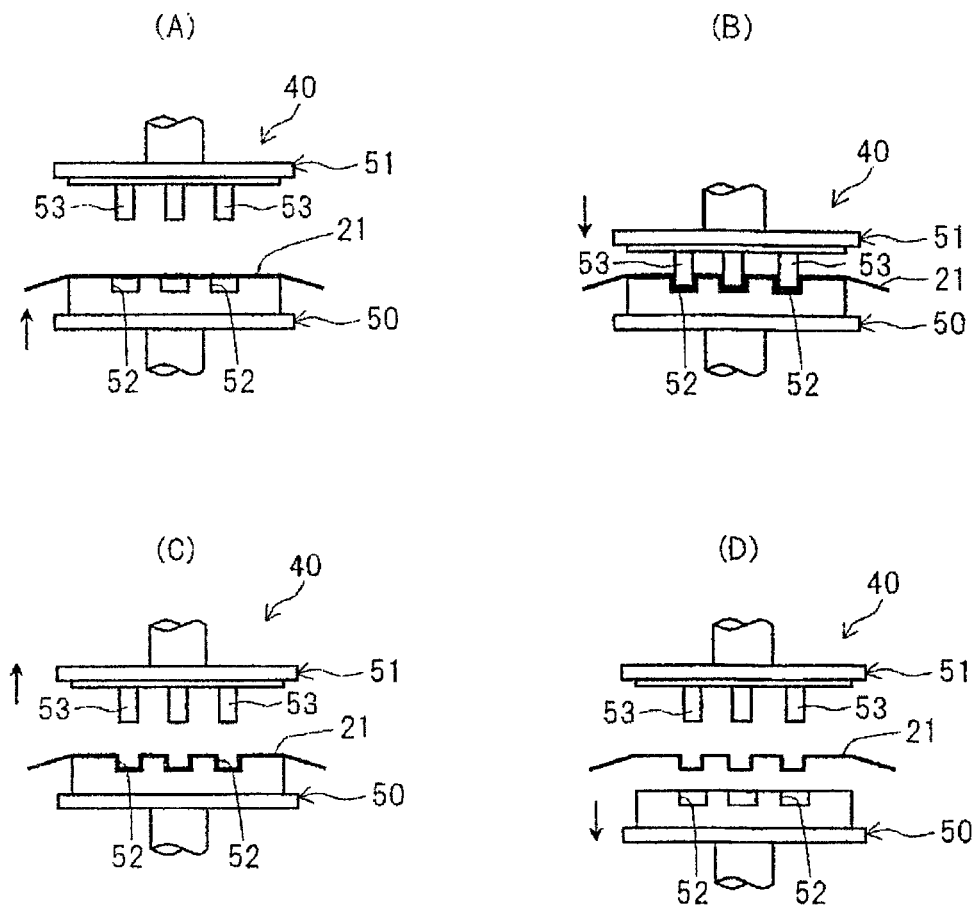
FIGS. 4(A) to 4(D) are schematic views for demonstrating the method for producing the cup-shaped container illustrated in FIG. 1.

First, as shown in FIGS. 3 and 4(A), the lower mold half 50 is moved upward with respect to the continuous multilayer sheet 21 which has been softened using the heating apparatus 30 to bring the softened continuous multilayer sheet 21 into close contact with the lower mold half 50, and the continuous multilayer sheet 21 is slightly lifted up to apply tension to the continuous multilayer sheet 21. Next, as shown in FIG. 4(B), the upper mold half 51 is moved downward, whereby the plugs 53 are inserted into each corresponding recessed part 52.

Subsequently, as shown in FIG. 4(C), the upper mold half 51 is moved upward to separate the plugs 53 from each corresponding recessed part 52, and the inside of the chamber (not shown in the Figure) is evacuated to bring the continuous multilayer sheet 21 into close contact with the inner face of the recessed parts 52. Thereafter, the mold is cooled by blowing air thereto to fix the shape. As shown in FIG. 4(D), the inside of the chamber (not shown in the Figure) is then exposed to ambient air and the lower mold half 50 is moved downward to release the lower mold half 50, whereby a primary molded article is obtained. The primary molded article is cut away to give the cup-shaped container 1 shown in FIGS. 1 and 2.

Other Embodiments of Thermoformed Container

The thermoformed container of the present invention is not limited to the modes described above, and a tray-shaped container is also included in exemplary thermoformed containers of the present invention. The tray-shaped container may be also produced by a method similar to the aforementioned method for producing the cup-shaped container, or the like. The tray-shaped container may be suitably used as a food tray or the like.

Blow-Molded Container

The blow-molded container of the present invention includes the molded product of the present invention. The blow-molded container may be a blow-molded container constituted from the molded product of the present invention. In other words, one of embodiments of the molded product of the present invention may be the blow-molded container. The blow-molded container has a low environmental load, and is favorable in gas barrier properties, appearance, and producibility. The blow-molded container can be used for various types of containers for which gas barrier properties, oil resistance, and the like are demanded.

The blow-molded container which may be adopted has a layer configuration involving, for example, from the internal surface of the container to the external surface of the container: the order of the layer (2), the layer (3), the layer (1), the layer (3), the layer (4), and the layer (2) (hereinafter, represented as (inside) 2/3/1/3/4/2 (outside)); (inside) 2/3/1/3/2 (outside); (inside) 2/4/3/1/3/4/2 (outside); (inside) 4/3/1/3/4 (outside), or the like. It is to be noted that a configuration in which the layer (4) is provided in place of the layer (2) is also acceptable, and in the case of the configuration in which a plurality of layers (1) to (4) are respectively used, resins constituting respective layers may be the same or different.

The blow-molded container of the present invention is preferably produced by a production method that includes a step of blow molding using the gas barrier resin composition. The blow molding may be carried out by a well-known procedure such as direct blow molding, injection blow molding, sheet blow molding, or free blow molding.

Specifically, the blow molding is carried out by using, for example, pellets of the gas barrier resin composition for forming the layer (1), and as needed each resin for forming each other layer, in a blow molding machine at a temperature of 100° C. to 400° C., and then cooling wherein an internal temperature of the die is 10° C. to 30° C. for 10 sec to 30 min. Accordingly, a hollow container blow molded can be formed. A heating temperature during the blow molding may be 150° C. or higher, or may be 180° C. or higher or 200° C. or higher. Also, the heating temperature may be a melting point of the gas barrier resin composition or higher. Meanwhile, the upper limit of the heating temperature may be 350° C., or may be 300° C. or 250° C. The blow-molded container of the present invention can be used in a variety of intended usages such as fuel containers as well as various types of bottles, and the like.

Fuel Container

The blow-molded container of the present invention can be used as a fuel container. The fuel container of the present invention may be provided with a filter, a fuel gauge, a baffle plate and the like. Due to being provided with the blow-molded container of the present invention, the fuel container of the present invention is accompanied by lower environmental load, and is favorable in barrier properties, appearance and producibility; therefore, it can be suitably used as a fuel container. The "fuel container" as referred to herein means a fuel container mounted in an automobile, a motorcycle, a watercraft, an aircraft, an electric power generator, an industrial or agricultural instrument or the like, or a portable fuel container for supplying the fuel to such a fuel container, as well as a container for retaining the fuel. Further, typical examples of the fuel include gasoline, in particular, oxygen-containing gasoline prepared by blending gasoline with methanol, ethanol, MTBE or the like, and further, heavy oil, light mineral oil, kerosene and the like are also included. The fuel container of the present invention is particularly suitably used as a fuel container for oxygen-containing gasoline, among these.

Bottle-Shaped Container

The blow-molded container of the present invention can be used as a bottle-shaped container. The bottle-shaped container of the present invention may further include a constituent structure other than the blow-molded container of the present invention, such as a cover film and a cap. A molding procedure of the bottle-shaped container of the present invention is exemplified by direct blow molding and injection blow molding. Since the blow-molded container of the present invention having been molded to have a bottle shape has a low environmental load, and is favorable in gas barrier properties, appearance, and producibility, it can be suitably used as a bottle-shaped container for foods, cosmetics, and the like.

Paper Container

The paper container of the present invention includes the molded product of the present invention. The paper container may be a paper container constituted from the molded product of the present invention. In other words, one of embodiments of the molded product of the present invention may be the paper container. The paper container consists of a molded product which includes a paper substrate, and is produced by processing to form a shape such as a carton or a cup. Such a paper container is capable of preserving various types of beverages and the like for a long time period.

With respect to the molded product which includes a paper substrate, film formation at a high speed is possible by, for example, a T die process in which forming is executed by extrusion coating.

Monolayer Film

The monolayer film of the present invention is a film formed from the gas barrier resin composition of the present invention. More specifically, the monolayer film is a film consisting of only a layer formed from the gas barrier resin composition of the present invention. The monolayer film has a low environmental load, and is favorable in gas barrier properties. Moreover, in a case in which the monolayer film is formed from the gas barrier resin composition of the present invention containing the inorganic particle (C), breakage resistance and the like may be favorable. An average thickness of the monolayer film is, for example, preferably 1 μm or more and less than 300 μm, and more preferably 5 μm or more and less than 100 μm. The monolayer film can be suitably used as various types of packaging materials and the like.

Suitable ranges of an arithmetic average roughness (Ra) and an average length (RSm) of a contour curve element of at least one surface of the monolayer film of the present invention, as measured in accordance with JIS B 0601, are similar to the ranges of the film, etc. of the present invention described above.

The monolayer film of the present invention may be an unstretched film or a stretched film, and may be preferably stretched. Being stretched tends to result in improvements of gas barrier properties, strength, and the like. Furthermore, in the case in which the monolayer film of the present invention is a stretched film, producibility may be favorable due to being less prone to breakage. On the other hand, in the case of being unstretched, a thermally fusible property tends to be favorable. Therefore, in a case of use as a heat-sealing film as described later, being unstretched is preferred.

The monolayer film of the present invention can be produced by a procedure similar to the procedure for producing the film, etc. of the present invention. The monolayer film may be suitably used as a material for various types of packaging containers such as food packaging containers, medical drug packaging containers, industrial chemical packaging containers, and pesticide packaging containers.

Multilayer Film

The multilayer film of the present invention is a multilayer film including at least one layer formed from the gas barrier resin composition of the present invention. The lower limit of the number of layer(s) of the multilayer film may be two, and is preferably three. The upper limit of the number of layer(s) of the multilayer film may be, for example, 1,000, or may be 100, or may be 20 or 10. The multilayer film is obtained typically by laminating other layer(s) with a layer constituted from the gas barrier resin composition of the present invention. Provided that: a layer formed from a resin other than the gas barrier resin composition of the present invention is defined as an x layer; a layer of the gas barrier resin composition of the present invention is defined as a y layer; an adhesive resin layer is defined as a z layer; and "/" is defined as an adhesion layer or direct lamination, the layer configuration of the multilayer film is exemplified by x/y, x/y/x, x/z/y, x/z/y/z/x, x/y/x/y/x, x/z/y/z/x/z/y/z/x, and the like. In a case in which a plurality of x layers, y layers, and z layers are provided, their types may be the same or different. In addition, a layer of a recovered resin including scraps such as a trim generated in molding may be provided additionally, or the recovered resin may be included in a layer formed from an other resin. With respect to a thickness configuration of each layer of the multilayer film, a thickness ratio of the y layer to an entire layer thickness is typically 2 to 20%, in light of formability, cost, and the like. It is to be noted that the adhesion layer is a layer formed from the adhesive resin or another adhesive.

A resin to be used for the x layer is preferably a thermoplastic resin, in light of processability and the like. Examples of the thermoplastic resin include those exemplified in the description of the multilayer structure A, and the like. Examples of the adhesive resin for use in the z layer include those exemplified in the description of the multilayer structure A, and the like. The multilayer film may be further laminated with an other layer.

A procedure for obtaining the multilayer film is exemplified by coextrusion molding, coextrusion hollow molding, coinjection molding, extrusion lamination, coextrusion lamination, dry lamination, solution coating, and the like. It is to be noted that the multilayer film obtained by such a procedure may be further subjected to secondary processing molding by a procedure such as deep draw vacuum pressure molding, blow molding, or press molding, after heating again, to give a molded product structure as intended. In addition, the multilayer film may be monoaxially or biaxially stretched by a procedure such as a roll stretching process, a pantograph stretching process, or an inflation stretching process, after heating again at a temperature within a range of a melting point of the EVOH or lower, whereby a stretched multilayer film can be obtained.

Examples of the molded product in which the monolayer film or multilayer film of the present invention is used include containers (bags, cups, tubes, trays, bottles, etc.), fuel containers, pipes, fibers, packaging materials for foods or beverages, packaging materials for containers, infusion bag materials for medical treatments, tube materials for tires, cushioning materials for shoes, inner bag materials for bag-in-boxes, tank materials for preserving organic liquids, pipe materials for transporting organic liquids, warm water pipe materials for heating (warm water pipe materials for floor heating, etc.), packaging materials for cosmetics, packaging materials for dental care, packaging materials for medical drugs, sub parts for packing materials (caps, stopcock parts for bag-in-boxes, etc.), pesticide bottles, agricultural films (films for greenhouses, films for fumigating soil), bags for storing grains, geomembranes, outer bags of vacuum thermal insulating boards, wallpaper or decorative laminate boards, gas tanks for hydrogen, oxygen, or the like, and the like.

Vapor Deposition Film

The vapor deposition film of the present invention includes the monolayer film or multilayer film of the present invention, and an inorganic vapor deposition layer. Specifically, the vapor deposition film of the present invention includes: the monolayer film of the present invention, or the multilayer film of the present invention including, as an outermost layer, at least one of the layer formed from the gas barrier resin composition; and at least one inorganic vapor deposition layer, being provided on an exposed surface of the monolayer film or the layer formed from the gas barrier resin composition of the multilayer film. In the vapor deposition film, the inorganic vapor deposition layer is directly provided on a layer formed from the gas barrier resin layer of the present invention.

The inorganic vapor deposition layer is a layer consisting of an inorganic substance such as a metal or an inorganic oxide, and having gas barrier properties against oxygen and/or water vapor. The gas barrier resin composition of the present invention has higher affinity to a metal and/or an inorganic oxide than common thermoplastic resins, thereby enabling forming the inorganic vapor deposition layer so as to be compact and free from defect. In addition, due to the gas barrier resin composition having the gas barrier properties, deterioration of gas barrier properties can be inhibited even when defects of inorganic vapor deposition layer are generated by bending or the like. Moreover, in a case in which the gas barrier resin composition contains the inorganic particle (C), a vapor deposition film can be produced which is unlikely to be accompanied by vapor deposition flaws, and is superior in adhesion strength to the inorganic vapor deposition layer. Therefore, the vapor deposition film of the present invention having a structure in which the inorganic vapor deposition layer is provided directly on at least one face of the layer formed from the gas barrier resin composition is unlikely to be accompanied by vapor deposition flaws, and is superior in adhesion strength to the inorganic vapor deposition layer.

The inorganic vapor deposition layer is preferably any one of a metal vapor deposition layer containing aluminum as a principal component, and an inorganic oxide-vapor deposition layer containing alumina or silica as a principal component. In a case in which light shielding properties are to be imparted, the metal vapor deposition layer is preferred; however, the inorganic oxide-vapor deposition layer is preferred in light of visibility of contents and/or oven suitability as a packaging material, as well as capabilities of inhibiting generation of gel and/or aggregates in melt molding of ground matter.

The metal vapor deposition layer is, in general, a layer containing aluminum as a principal component. The content of aluminum atoms in the metal vapor deposition layer is preferably 50 mol % or more, more preferably 70 mol % or more, still more preferably 90 mol % or more, and particularly preferably 95 mol % or more. The average thickness of the metal vapor deposition layer is preferably 120 nm or less, more preferably 100 nm or less, and still more preferably 90 nm or less. In addition, the average thickness of the metal vapor deposition layer is preferably 25 nm or more, more preferably 35 nm or more, and still more preferably 45 nm or more. It is to be noted that the average thickness of the metal vapor deposition layer is an averaged value of thicknesses of cross sections of the metal vapor deposition layer measured at ten arbitrary points by an electron microscope.

The inorganic oxide-vapor deposition layer is exemplified by vapor deposition films of: inorganic oxides such as, e.g., oxides of silicon, aluminum, magnesium, calcium, potassium, tin, sodium, boron, titanium, lead, zirconium, yttrium, or the like; and preferably alumina or silica. The average thickness of the inorganic oxide-vapor deposition layer is preferably 60 nm or less, more preferably 50 nm or less, and still more preferably 40 nm or less. Also, the average thickness of the inorganic oxide-vapor deposition layer is preferably 10 nm or more, more preferably 15 nm or more, and still more preferably 20 nm or more. It is to be noted that the average thickness of the inorganic oxide-vapor deposition layer is an averaged value of thicknesses of cross sections of the inorganic oxide-vapor deposition layer measured at ten arbitrary points by an electron microscope.

The inorganic vapor deposition layer may be vapor-deposited by a well-known physical vapor deposition process or a chemical vapor deposition process. Specifically, procedures exemplified in the description of the multilayer structure A may be employed.

The inorganic vapor deposition layer is capable of achieving superior gas barrier properties, with defects in vapor deposition being unlikely to be caused, when vapor deposition is conducted on a layer having higher dimensional accuracy. In light of the dimensional accuracy, the layer which is formed from the gas barrier resin composition and on which the inorganic vapor deposition layer is to be provided is preferably stretched, and more preferably stretched and thereafter subjected to a heat treatment.

The lower limit of the number of layer(s) of the vapor deposition film of the present invention is 2. In other words, the vapor deposition film is one mode of the multilayer film of the present invention. Furthermore, similarly to the multilayer film, the upper limit of the number of layer(s) of the vapor deposition film may be, for example, 1,000, may be 100, or may be 20, 10, 5, or 4.

Provided that: a layer formed from a resin other than the gas barrier resin composition of the present invention is defined as an x layer; a layer formed from the gas barrier resin composition of the present invention is defined as a y layer; an adhesive resin layer is defined as a z layer; and the inorganic vapor deposition layer is defined as a v layer, the layer configuration of the vapor deposition film of the present invention may be exemplified by y/v, v/y/v, x/y/v, x/z/y/v, v/y/z/x/z/y/v, and the like.

Multilayer Structure B

The vapor deposition film of the present invention has the inorganic vapor deposition layer as an outermost layer adjacent to the layer formed from the gas barrier resin composition of the present invention. On the other hand, use as a multilayer structure in which an other layer is further provided on the inorganic vapor deposition layer of the vapor deposition film is also possible. In other words, the multilayer structure B of the present invention includes the vapor deposition film of the present invention, and an other layer (thermoplastic resin layer, etc.) provided on the inorganic vapor deposition layer in the vapor deposition film. The other layer is not particularly limited, and examples thereof include layers of various types of thermoplastic resins exemplified in the description of the multilayer structure A, and the like. The multilayer structure B may be a multilayer film having the inorganic vapor deposition layer. The multilayer structure B falls under one mode of the multilayer structure A of the present invention described above.

The lower limit of the number of layer(s) of the multilayer structure B of the present invention is, for example, 3. Furthermore, the upper limit of the number of layer(s) of the multilayer structure B may be, for example, 1,000, may be 100, or may be 20, 10, 5, or 4.

Provided that: a layer formed from a resin other than the gas barrier resin composition of the present invention is defined as an x layer; a layer of the gas barrier resin composition of the present invention is defined as a y layer; an adhesive resin layer is defined as a z layer; and the inorganic vapor deposition layer is defined as a v layer, the layer configuration of the multilayer structure B of the present invention is exemplified by x/v/y, x/v/y/v, x/y/v/x, x/v/y/v/x, x/z/v/y, x/z/y/v/z/x, x/z/v/y/v/z/x, and the like.

The vapor deposition film and the multilayer structure B of the embodiments of the present invention are suitably used as packaging materials for which particular superiority in barrier properties are required. Specific examples include containers (bags, tubes, lid materials, etc.), packaging materials for foods or beverages, infusion bag materials for medical treatments, tube materials for tires, inner bag materials for bag-in-boxes, packaging materials for cosmetics, packaging materials for dental care, packaging materials for medical drugs, agricultural films (films for greenhouses, films for fumigating soil), bags for storing grains, geomembranes, outer bags of vacuum thermal insulating boards, and the like.

Heat-Sealing Film

The monolayer film, the multilayer film, the vapor deposition film, or the multilayer structure B of the present invention is preferably a heat-sealing film. More specifically, the heat-sealing film of the present invention includes the monolayer film, the multilayer film, the vapor deposition film, or the multilayer structure B of the present invention. Specific examples of the layer configuration in the case in which the heat-sealing film of the present invention is the multilayer include those identical to the layer configuration of the multilayer structure B. In the heat-sealing film, a top layer serves as a thermal adhesion layer. The thermal adhesion layer may be either a layer consisting of the monolayer film of the present invention (a layer formed from the gas barrier resin composition), or a layer formed from an other thermoplastic resin or the like.

In the heat-sealing film of the present invention, it is preferred that at least one layer of the monolayer film of the present invention is provided as a top layer. In the heat-sealing film of such a mode, the monolayer film of the present invention layer can be as the thermal adhesion layer. The monolayer film of the present invention can effectively inhibit adsorption of a scent component and the like, as described above. Therefore, a packaging material in which the monolayer film of the present invention is the thermal adhesion layer, and a heat-sealing film provided with the monolayer film as the top layer is used can efficiently maintain scent components of the contents.

In order for the monolayer film of the present invention to exhibit favorable thermal adhesiveness, the lower limit of an average ethylene unit content of EVOH constituting the gas barrier resin composition is preferably 25 mol %, more preferably 30 mol %, and still more preferably 40 mol %. The upper limit of the ethylene unit content is preferably 60 mol %, and more preferably 55 mol %.

In the case in which the monolayer film of the present invention is provided as a thermal adhesion layer (top layer) in the heat-sealing film of the present invention, superior nonadsorptivity against scent components and the like are achieved as described above, whereby the monolayer film can be suitably used for wrapping bags.

In regard to the heat-sealing film of the present invention, it is preferred that a heat seal strength obtained by: facing thermal adhesion layers (top layers) toward each other; and compression bonding the same using a hot plate type heat sealer under a condition involving a temperature of 185° C. and a pressure of 0.1 Mpa for 1 sec is 10 N/15 mm or more. It is to be noted that the thermal adhesion layers to be faced toward each other may be the same or different. The heat-sealing film can have superior heat seal strength by the heat sealing, and thus can be suitably used as a heat-sealing film for a wrapping bag having superior scent retention properties. It is to be noted that the heat seal strength is a value measured in accordance with JIS-Z 1707.

Wrapping Bag

The heat-sealing film of the present invention can provide a container and a package (bag, cup, tube, tray, bottle, etc.) by heat sealing the thermal adhesion layers each other, such that the thermal adhesion layers are each on an inner side. As described above, the heat-sealing film can be heat sealed to give high strength, and in the case in which the monolayer film of the present invention is provided as the thermal adhesion layer, the thermal adhesion layer is superior in nonadsorptivity of scent components; therefore, the wrapping bag and the like obtained therefrom can exhibit superior scent retention properties.

A heat sealing procedure is not particularly limited, and a well-known procedure may be used, which is exemplified by procedures of heat sealing with a hot plate type heat sealer, an impulse sealer, an ultrasonic sealer, a frictional heat sealer, a dielectric heat sealer, or the like. A temperature in conducting the heat sealing is not particularly limited, and is preferably a melting point of the thermal adhesion layer or higher, and (melting point+30° C.) or lower of the thermal adhesion layer, in light of the heat seal strength and prevention of unfavorable appearance. A pressure in conducting the heat sealing is not particularly limited, and is preferably 0.01 MPa or more and 1.0 MPa or less, in light of the heat seal strength and prevention of unfavorable appearance. A time period of conducting the heat sealing is not particularly limited, and is preferably 0.05 sec or more and 5 sec or less, in light of the heat seal strength and producibility.

A moisture content of the thermal adhesion layer of the heat-sealing film in conducting the heat sealing of the heat-sealing film of the present invention to form the wrapping bag or the like is preferably 0.1% by mass or more and 4% by mass or less, and still more preferably 0.2% by mass or more and 3% by mass or less. When the moisture content of the thermal adhesion layer in the heat sealing falls within the above range, appearance of a sealed portion can be maintained, and/or reduction in seal strength can be prohibited. When the moisture content is equal to or less than the upper limit, foaming resulting from vaporization of the moisture in the thermal adhesion layer during the heat sealing is unlikely to occur, and as a result, the appearance of the heat-sealed portion may improve, and/or heat sealing properties may improve. In addition, when the moisture content is greater than or equal to the lower limit, nonadsorptivity immediately after molding of the wrapping bag or the like tends to improve. For example, in a case in which contents are charged immediately after molding, flavor components derived from the contents become unlikely to be adsorbed to the thermal adhesion layer.

The contents (matter to be wrapped) in the wrapping bag are exemplified by foods, beverages, medical drugs, cosmetics, flavorings, and toiletry products, containing scent components, respectively, and the like, and may be, in particular, at least one selected from the group consisting of confectioneries, tea leaves, coffee, spices, and tobacco. Since the wrapping bag can be a mode having superiority in scent retention properties as described above, it is suitable as the wrapping bag for foods and the like which needs to have scent retention properties, in particular.

Packaging Material B

The packaging material B of the present invention includes a multilayer structure (for example, the multilayer structure A) of the present invention. The packaging material B may be a packaging material consisting of the multilayer structure of the present invention. The packaging material B has a low environmental load, and is favorable in gas barrier properties, appearance, and producibility.

The packaging material B of the present invention may also have a layer formed from a material other than a resin, such as a paper layer, a metal layer, and/or the like. The packaging material B may be a multilayer structure per se, or may be a multilayer structure which has been subjected to secondary processing. Examples of the packaging material obtained by carrying out the secondary processing include: (1) a tray cup-shaped container obtained by subjecting the multilayer structure to thermoforming processing such as vacuum molding, pressure molding, vacuum/pressure molding, or the like; (2) a bottle-shaped or cup-shaped container obtained by subjecting the multilayer structure to stretch blow-molding or the like; (3) a bag-shaped container obtained by subjecting the multilayer structure to heat sealing; and the like. It is to be noted that the secondary processing procedure is not limited to the procedures exemplified above, and a well-known secondary processing procedure other than those described above, such as blow-molding or the like, may be appropriately used.

The packaging material B of the present invention is used for packaging, for example, foods; beverages; chemicals such as pesticides and medical drugs; industrial materials such as medical equipment, machine parts, and precision materials; clothes; and the like. In particular, the packaging material B is preferably used in an intended usage for which barrier properties against oxygen are necessary, and in an intended usage in which an interior of the packaging material will be substituted by various types of functional gas. The packaging material B is formed into a variety of shapes according to the intended usage, for example, into a vertical form fill seal pouch, a vacuum wrapping bag, a spout-attached pouch, a laminate tube container, a lid material for a container, and the like.

Particularly, in a case in which the packaging material B is formed by using a multilayer structure having a layer formed from a gas barrier resin composition containing PA (E), the packaging material B may be preferably used as a packaging material for boiling sterilization or for retort sterilization, due to being superior in retort resistance. Moreover, in a case in which the packaging material B is formed by using a multilayer structure having a layer formed from the gas barrier resin composition containing the thermoplastic elastomer (G), the packaging material B is useful as a flexible packaging material, due to being superior in flex resistance. The flexible packaging material is exemplified by a vertical form fill seal pouch.

Vertical Form Fill Seal Pouch

The vertical form fill seal pouch of the present invention is a vertical form fill seal pouch including the multilayer structure of the present invention (for example, multilayer structure A). The vertical form fill seal pouch is often used for wrapping a food or beverage being a liquid, viscous matter, powder, solid bulk, or a combination of the same, for example. The vertical form fill seal pouch is superior in flex resistance, and thus gas barrier properties thereof are maintained upon application to physical stress by deformation, impact, etc.

Figure 5:
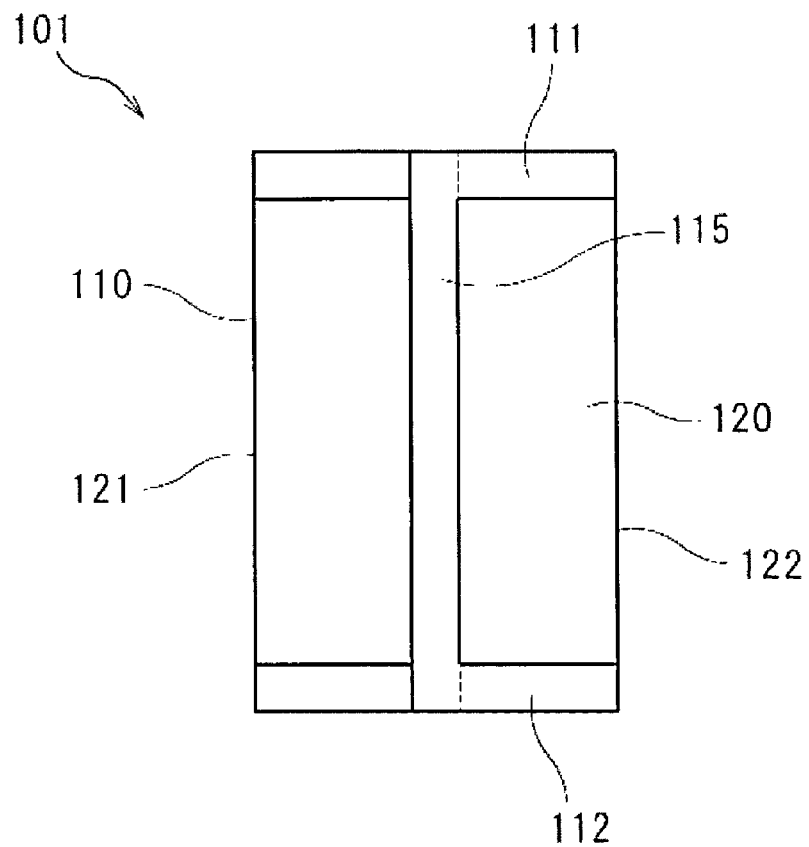
FIG. 5 is a rear view illustrating a vertical form fill seal pouch according to one embodiment of the present invention.

One mode of the vertical form fill seal pouch is shown in FIG. 5. In the vertical form fill seal pouch 101 shown in FIG. 5, the film material 110 is sealed at three sides: the upper edge 111, the lower edge 112, and the body portion 115 of the sealing pouch 101. In the sealing pouch 101 shown in the figure, the body portion 115 is situated on a central portion of a rear face to extend from the upper edge 111 to the lower edge 112 such that the rear face 120 is comparted into two portions. In the upper edge 111, the lower edge 112 and the body portion 115, the film material 110 is sealed in a state of its inner faces being in contact with each other. In other words, the form of sealing in the body portion 115 is lap sealing, as generally referred to. Although not shown in FIG. 5, the front face (a face having a shape identical to the shape of the rear face on an opposite side of the rear face) of the sealing pouch 101 is, unlike the rear face 120, not comparted by a sealed portion, and is typically used as a face for display the contents and/or items. It is to be noted that the body portion 115 to be sealed may be situated on any of the side edge 121 or 122, and in this case, the rear face is not also comparted by the sealed portion. The sealing pouch 101 shown in the figure is a bag produced by feeding, into a vertically-manufacturing bag filler, one piece of the film material 110 having a width corresponding to a total of twice the width of the rear face 120 (total of widths of the front face and the rear face) and a width needed for sealing at the body portion 115. All the upper edge 111, the lower edge 112, and the body portion 115 are formed as a sealing portion in a straight line shape, without any branch in all. As described above, the vertical form fill seal pouch is, in one mode thereof, manufactured into a bag by sealing one piece of a film material at three sites, i.e., the upper edge corresponding to upper hems of the front face and the rear face; the lower edge corresponding to the lower hem; and of the body portion extending vertically from the upper edge to the lower edge, between the ends of these. The film material 110 includes the multilayer structure of the present invention.

Inner Container for Bag-In-Box

The inner container for a bag-in-box of the present invention includes the multilayer structure of the present invention (for example, the multilayer structure A). Examples of the inner container for a bag-in-box include a container having: a liquid inlet molded from an other resin composition; and a container main body formed from the multilayer structure. Such an inner container for a bag-in-box may be produced by, for example, heat sealing a film or a sheet of the multilayer structure of the present invention, and further heat sealing the liquid inlet. The heat sealing procedure may be appropriately selected from among general heat sealing conditions.

The bag-in-box has a flexible plastic inner container (an inner container for a bag-in-box) provided with a liquid inlet, stored inside a corrugated cardboard box. In general, the inner container for a bag-in-box is bent repeatedly during transport and the like. When forming the inner container for a bag-in-box, processing such as an increase in a thickness in the bending area or around a sealing plug may be applied. The inner container for a bag-in-box of the present invention can exhibit superior durability, due to the multilayer structure of the present invention being included.

Delaminatable Container

The delaminatable container of the present invention (delamination container) includes the multilayer structure of the present invention (for example, the multilayer structure A). The multilayer structure included in the delaminatable container further has a layer containing, as a principal component, a polyolefin having no polar functional group, the layer being directly laminated on one face of a layer constituted from the gas barrier resin composition of the present invention. In other words, the delaminatable container has a layer structure in which a layer containing the polyolefin as a principal component is directly laminated on one face of the layer constituted from the gas barrier resin composition. Such a configuration results in favorable delamination properties between the layer constituted from the gas barrier resin composition of the present invention, and the layer containing, as a principal component, a polyolefin having no polar functional group, the container can be suitably used as a delaminatable container. A proportion of the polyolefin having no polar functional group in the layer containing, as a principal component, a polyolefin having no polar functional group is preferably 70% by mass or more, more preferably 90% by mass or more, and still more preferably 95% by mass or more, and it is preferred that the layer is constituted substantially from only the polyolefin having no polar functional group.

The layer containing the polyolefin as a principal component may be a layer constituted substantially from only the polyolefin having no polar functional group. The "polyolefin having no polar functional group" as referred to herein means a homopolymer or a copolymer, of an olefin, having no polar functional group. As the homopolymer or copolymer of an olefin, a homopolymer or a copolymer of an olefin is suitably used such as, for example, linear low density polyethylene (LLDPE), low density polyethylene (LDPE), very low density polyethylene (VLDPE), medium density polyethylene (MDPE), high density polyethylene (HDPE), an ethylene-propylene (block or random) copolymer, polypropylene (PP), a copolymer of propylene and α-olefin having 4 to 20 carbon atoms, polybutene, polypentene, polymethylpentene, and the like. Of these, at least one selected from the group consisting of low density polyethylene (LDPE), polypropylene (PP), high density polyethylene (HDPE), and an ethylene-propylene (block or random) copolymer is more suitably used.

In a suitable mode of the multilayer structure in the delaminatable container of the present invention, another surface of the layer constituted from the gas barrier resin composition of the present invention is adhered to a layer containing a thermoplastic resin as a principal component via an adhesion layer. A proportion of the thermoplastic resin in the layer containing a thermoplastic resin as a principal component is preferably 70% by mass or more, more preferably 90% by mass or more, and still more preferably 95% by mass or more, and it is preferred that the layer is constituted substantially from only the thermoplastic resin. Such a configuration enables improving flexibility and strength of the multilayer structure of the present invention, and in turn, of the delaminatable container. The thermoplastic resin constituting the layer containing a thermoplastic resin as a principal component is preferably a polyolefin, and the polyolefin may be the same as the polyolefin having no polar functional group, or may be a modified polyolefin modified with an unsaturated carboxylic acid or a derivative thereof, or the like. Examples of the unsaturated carboxylic acid or a derivative thereof may include maleic acid, fumaric acid, itaconic acid, maleic anhydride, itaconic anhydride, monomethyl maleate, monoethyl maleate, diethyl maleate, monomethyl fumarate, and the like. These may be used as one type, or two or more types may be used in a combination.

Examples of the adhesive resin constituting the adhesion layer include those exemplified for the adhesion layer in the multilayer structure A of the present invention.

Provided that the layer constituted from the gas barrier resin composition of the present invention is represented by "y", an other layer containing a thermoplastic resin as a principal component is represented by "x", a layer containing an adhesive resin as a principal component (adhesion layer) is represented by "z", and a layer containing, as a principal component, a polyolefin having no polar functional group is represented by "x", examples of a layer configuration of the delaminatable container of the present invention (multilayer structure) include structures of:

χ/y;
χ/y/z/x;
χ/y/z/x/z/y;
χ/y/z/x/z/x;
χ/y/z/x/z/y/z/x;
χ/y/z/x/z/x/z/x;

and the like.

A method for producing the delaminatable container of the present invention is exemplified by a coextrusion blow molding process and the like.

The thickness of the layer constituted from the gas barrier resin composition of the present invention which constitutes the delaminatable container of the present invention is preferably 0.5 µm or more, more preferably 1 µm or more, and still more preferably 5 µm or more. When the thickness of the layer constituted from the gas barrier resin composition is 0.5 µm or more, the gas barrier properties tend to be favorable. Furthermore, the thickness of the layer constituted from the gas barrier resin composition is preferably 1,000 µm or less, more preferably 500 µm or less, and still more preferably 100 µm or less. When the thickness of the layer constituted from the gas barrier resin composition is 1,000 µm or less, flexibility may be increased, and delamination properties tend to be more favorable.

The thickness of the layer containing, as a principal component, a polyolefin having no polar functional group constituting the delaminatable container of the present invention is preferably 25 µm or more, more preferably 30 µm or more, and still more preferably 50 µm or more. When the thickness of the layer containing the polyolefin as a principal component is 25 µm or more, the strength can be enhanced. Furthermore, the thickness of the layer containing the polyolefin as a principal component is preferably 5,000 µm or less, more preferably 2,000 µm or less, and still more preferably 1,000 µm or less. When the thickness of the layer containing the polyolefin as a principal component is 5,000 µm or less, flexibility may be increased, and the delamination properties may be more favorable.

A total thickness of the multilayer structure constituting the delaminatable container of the present invention is preferably 150 µm or more, and more preferably 200 µm or more. When the total thickness of the multilayer structure is 150 µm or more, breakage may be unlikely to occur due to the strength becoming sufficient. Moreover, a total thickness of the multilayer structure is preferably 10,000 µm or less, more preferably 8,000 µm or less, and still more preferably 6,000 µm or less. When the total thickness of the multilayer structure is 10,000 µm or less, flexibility may be increased.

In the delaminatable container of the present invention, a delaminatable area between the layer constituted from the gas barrier resin composition and the layer containing, as a principal component, a polyolefin having no polar functional group is preferably 80 $cm^2$ or more, more preferably 150 $cm^2$ or more, still more preferably 200 $cm^2$ or more, and particularly preferably 220 $cm^2$ or more. When the delaminatable area is 80 $cm^2$ or more, delamination may be further sufficient. Moreover, the delaminatable area is preferably 300 $cm^2$ or less, more preferably 280 $cm^2$ or less, and still more preferably 260 $cm^2$ or less. When the delaminatable area is 300 $cm^2$ or less, excessive augmenting of delamination properties may be inhibited, and producibility may be enhanced. The delamination area in this context can be obtained by: cutting the multilayer structure to give 300 mm (width)×350 mm (length); producing a delamination port between the layer constituted from the gas barrier resin composition and the layer containing, as a principal component, a polyolefin having no polar functional group at the central portion; inserting a tube 50 mm into the delamination port; blowing air at a pressure of 0.2 MPa therethrough; and converting the mass of the thus delaminated portion to an area.

The delaminatable container of the present invention has a standard peel strength between the layer constituted from the gas barrier resin composition and the layer containing, as a principal component, a polyolefin having no polar functional group of preferably 1 g/30 mm or more, more preferably 3 g/30 mm or more, and still more preferably 5 g/30 mm. When the standard peel strength is 1 g/30 mm or more, excessive enhancing of delamination properties may be inhibited, and producibility may be enhanced. Furthermore, the standard peel strength is preferably 12 g/30 mm or less, more preferably 11 g/30 mm or less, still more preferably 9.5 g/30 mm or less, and particularly preferably 9.0 g/30 mm or less. When the standard peel strength is 12 g/30 mm or less, sufficient delamination properties may be exhibited.

The delaminatable container of the present invention is, as described above, favorable in the delamination properties between the layer constituted from the gas barrier resin composition and the layer containing, as a principal component, a polyolefin having no polar functional group, and is also favorable in flex resistance and the like, particularly in a case in which the gas barrier resin composition contains the thermoplastic elastomer (G). The delaminatable container of the present invention can be suitably used as a delaminatable container for foods which is capable of preventing deterioration of scent, color, and the like of the contents. It is to be noted that in light of inhibiting delamination of the top mouth portion, the top mouth portion of the delaminatable container of the present invention preferably has a greater thickness compared with other portions. For example, the thickness of the top mouth portion is preferably 0.4 mm or more, and more preferably 0.5 mm or more. The upper limit of the thickness of the top mouth portion may be, for example, 3 mm, or may be 2 mm or 1 mm.

Multilayer Sheet

The multilayer sheet of the present invention includes a barrier layer constituted from the gas barrier resin composition of the present invention, and a thermoplastic resin layer laminated directly or via an other layer on at least one face side of this barrier layer. Specific modes, intended usages, etc., of the multilayer sheet may be similar to specific modes, intended usages, etc., of the multilayer film of the present invention described above. The multilayer sheet can be suitably used as a material for forming various types of molded products.

As a procedure for further molding to give a molded product by using the multilayer sheet of the present invention, for example, a heat-stretching process, a vacuum molding process, a pressure molding process, a vacuum/pressure molding process, a blow molding process, and the like are exemplified. Such molding may be carried out typically within a temperature range of a melting point of EVOH or lower. Of these, a heat-stretching process and a vacuum/pressure molding process are preferred. The heat-stretching process is a procedure of molding by heating a multilayer sheet, and stretching in one direction or in multiple directions. The vacuum/pressure molding process is a procedure of heating a multilayer sheet, and molding with combined use of vacuum and compressed air.

Packaging Material C

A packaging material C molded by subjecting the multilayer sheet of the present invention to a heat-stretching process can be produced conveniently and certainly, and is superior in appearance characteristics, gas barrier properties, and the like. The packaging material C may be in a sheet form, or may be processed by molding into another shape. The packaging material C can be used for various types of intended usages similarly to conventionally well-known packaging materials.

In the case of the heat-stretching process, the thermoplastic resin to be use in the thermoplastic resin layer is preferably a stretchable resin within a heat stretching temperature range represented by the following inequality (1):

$$X-110 \leq Y \leq X-10 \tag{1}.$$

In the above inequality (1), X represents a melting point (° C.) of EVOH; and Y represents a heat stretching temperature (° C.). When produced from the multilayer sheet of the above embodiment by using the heat stretching process, the packaging material C can have more superior appearance characteristics through the use of the aforementioned resin as the thermoplastic resin, and defects such as cracks can be more inhibited.

Container

A container molded by subjecting the multilayer sheet of the present invention to a vacuum/pressure molding process can be produced conveniently and certainly, and is superior in appearance characteristics, gas barrier properties, and the like. The container can be used for various types of intended usages similarly to conventionally well-known containers.

In the vacuum/pressure molding process, for example, the multilayer sheet is softened by heating, and thereafter subjecting to molding so as to fit a die shape. The molding procedure is exemplified by: a procedure involving carrying out the molding so as to fit a die shape by means of vacuum or compressed air, which may be further used in combination with a plug as needed (a straight process, a drape process, an air slip process, a snap-back process, a plug-assist process, and the like); a procedure involving press molding; and the like. Various molding conditions such as the molding temperature, the degree of vacuum, the pressure of the compressed air, and/or the molding speed are appropriately selected in accordance with the shape of the plug and/or the die, or properties of a film and/or a sheet as a base material, and the like.

The molding temperature is not particularly limited, and may be a temperature at which the resin is softened to a sufficient extent for molding. For example, in the case of thermoforming the multilayer sheet, it is desired that the temperature of heating is not: high to an extent that fusion of the multilayer sheet by heating occurs or the roughness of a metal face of a heater plate is transferred to the multilayer sheet; or low to an extent that shaping cannot be sufficiently attained. Specifically, the temperature of the multilayer sheet may be 50° C. to 180° C., and suitably 60° C. to 160° C.

Plant Cultivation Medium

The plant cultivation medium of the present invention is a plant cultivation medium including a molded product formed from a resin composition, and the resin composition is the gas barrier resin composition of the present invention.

Also for the plant cultivation medium, commercialization of a medium synthesized using a biomass-derived raw material is expected. However, there are cases in which biomass-derived synthetic resins are inferior to fossil fuel-derived synthetic resins in performance; thus, in the case of replacing the conventional fossil fuel-derived plant cultivation medium with a biomass-derived plant cultivation medium, there is concern that the plant growing capacity, being of utmost importance, may decrease. Thus, there is a desire for development of a biomass-derived resin having superior plant growing capacity that compares favorably to that of fossil fuel-derived resins. Moreover, in general, a plant cultivation medium made of a resin is frequently molded into a chip shape by melt molding. Therefore, in order to efficiently produce a plant cultivation medium made of a resin, long-run workability (a characteristic of long time period operability) of a resinous material is important, such as a chip-shaped plant cultivation medium being stably and efficiently available even if melt molding is performed over a long time period. In a case in which the resinous material with insufficient long-run workability is employed, melt molding performed over a long time period is accompanied by a likelihood of generation of deposits on an extruder die. Furthermore, in the case in which the resinous material with insufficient long-run workability is employed, when melted resinous material is extruded into a strand shape, the strand (strand-shaped resinous material) becomes easily broken, thereby leading to inferior producibility. It is to be noted that hereinafter, the event that strand breaks may be also referred to as "strand breakage."

In view of the problems of conventional plant cultivation medium, the plant cultivation medium of the present invention is formed from a resin composition having sufficient long-run workability that compares favorably to that derived from fossil fuel even though a biomass-derived raw material is used, and has high plant growing capacity. Specifically, due to the partial use of the raw material derived from biomass, the environmental load by the resin composition (gas barrier resin composition) for use in the plant cultivation medium is low. Furthermore, in the resin composition, the EVOH is selected and used as a resin having superior plant growing capacity, and the plant cultivation medium including a molded product in which EVOH is used is, even in a case in which the EVOH is synthesized using the biomass-derived raw material, capable of exhibiting high plant growing capacity equivalent to a case of an EVOH having the same structure, synthesized from only a fossil fuel-based raw material.

The long-run workability as referred to herein, of the resin composition used for the plant cultivation medium, can be evaluated by a method described in EXAMPLES, and can be comprehensively evaluated in accordance with degrees of die deposits and frequency of strand breakage, when the resin composition is subjected to continuous molding. Furthermore, the plant growing capacity as referred to herein means having the capability to grow a plant and can be evaluated by, for example, number of enlarged roots in growing a daikon radish, as in an evaluation of a medium described in EXAMPLES of the present invention, and the like.

Molded product, method of use, etc.

The molded product included in the plant cultivation medium of the present invention is not particularly limited in the mode thereof, as long as it is formed from the resin composition (gas barrier resin composition). The molded product is typically a melt molded product of the resin composition. The molded product may be chips (pellets) constituted from the resin composition, a nonwoven fabric constituted from the resin composition, or the like. In light of efficiency of plant growing, the molded product is preferably chips constituted from the resin composition (resin composition chips). In this case, for example, a large number of chips are spread in a container or the like, thereby enabling use as a plant cultivation medium.

The chip (resin composition chip) may have, for example, a shape such as an approximately spherical or approximately discoid shape obtained by hot cutting, etc., of a melt of the resin composition, or an approximately cylindrical shape obtained by cutting, etc., of a strand of the resin composition, or may have a flaky or irregular shape. The chip is preferably columnar, flattened, or flaky.

Also, the size of the molded product such as the chip is not particularly limited and, for example, a maximum length falls preferably within the range of 1 to 50 mm, and more preferably within the range of 1 to 20 mm. Note that the maximum length can be measured using a vernier caliper.

The molded product has a water absorbing rate of preferably 5% by mass or more, and more preferably 10% by mass or more, which is defined by the following formula (2), wherein W1 represents a mass after immersing the product in water at 23° C. for 24 hours, and W0 represents a mass after drying (drying at 105° C. for 24 hours) the molded product after the immersion. When the water absorbing rate falls within the above range, the plant cultivation medium can have superior water absorbing properties. It is to be noted that the upper limit of the water absorbing rate is not particularly limited, and in light of strength of the molded product, the water absorbing rate being 300% by mass or less is preferred.

$$\text{Water absorbing rate (\% by mass)}=100\times(W1-W0)/W0 \qquad (2)$$

Although the plant cultivation medium of the present invention may be constituted from only the molded product constituted from the resin composition, the plant cultivation medium may contain other member(s), etc., such as rock wool, sand, soil, ceramic balls, coconut shell, bark, peat moss, bog moss, an other resin medium, and the like, together with the molded product constituted from the resin composition. A percentage content of the molded product in the plant cultivation medium is preferably 50% by mass or more, more preferably 80% by mass or more, and still more preferably 95% by mass or more.

A mode of use of the plant cultivation medium of the present invention is not particularly limited, and use as a medium for nutrient solution cultivation in which a culture liquid is used is preferred. In the case in which the plant cultivation medium is used as the medium for solution cultivation, the method of use may be exemplified by a method in which the plant cultivation medium is placed in a container such as a pot, and after a culture liquid is added thereto, seeds may be sown or seedlings may be transplanted, and the like. Also, an alternative method may be exemplified by a method in which a cultivation bed in which the plant cultivation medium is laid may be prepared, and seedlings having been grown may be transplanted thereto, whereby various types of crops are cultivated, and the like.

The type of the plant grown using the plant cultivation medium of the present invention is not particularly limited, and examples of the plant may include vegetables, fruits, grains, and the like, including flowering plants and root vegetables. In particular, the plant cultivation medium of the present invention is preferably used for cultivating vegetables such as Japanese radish, sweet potatoes, burdock roots, carrots, cucumbers, tomatoes, eggplants, green peppers, and the like. In particular, the plant cultivation medium of the present invention is also advantageous in a capability of being suitably used for cultivating root vegetables that have been difficult to cultivate with rock wool.

Plant Cultivation Apparatus

The present invention also provides a plant cultivation apparatus including the plant cultivation medium of the present invention described above. The plant cultivation apparatus of the present invention is not particularly limited as long as it includes the plant cultivation medium of the present invention described above, and a structure that, other than including the plant cultivation medium, is that of an appropriate, conventionally known apparatus for plant cultivation may be included.

Figure 6:
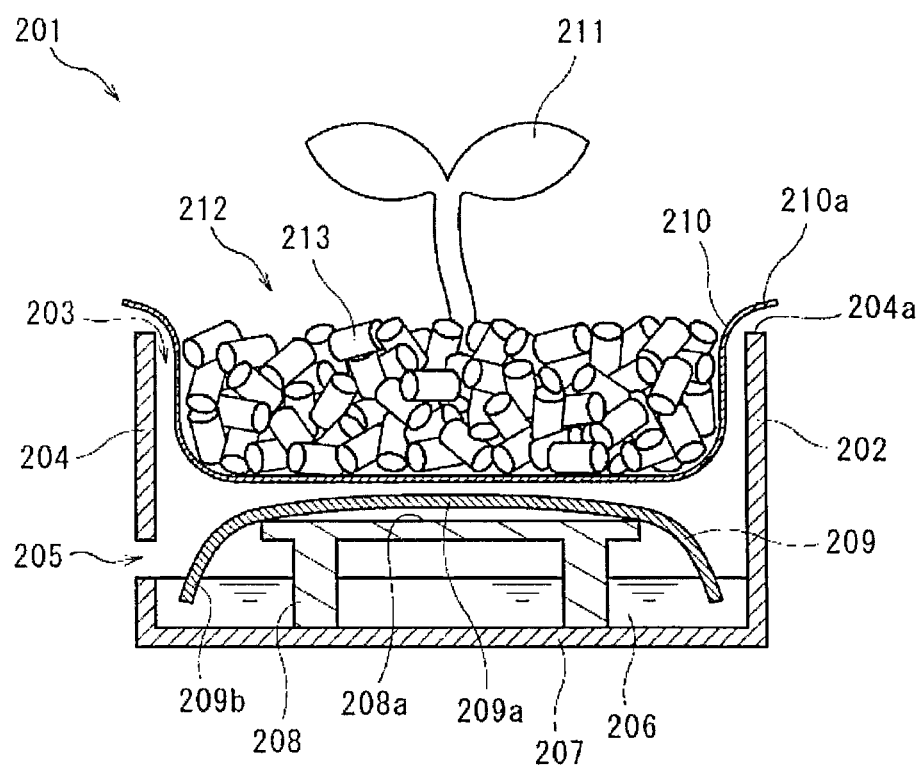
FIG. 6 is a schematic view illustrating a plant cultivation apparatus according to one embodiment of the present invention.

FIG. 6 is a diagram schematically illustrating a plant cultivation apparatus 201 in one preferred embodiment of the invention. The exemplary plant cultivation apparatus 201 shown in FIG. 6 is a box-like article having an opening 203 in an upper portion thereof. The plant cultivation apparatus 201 includes a planter 202 having an outlet 205 at an appropriate height of a side wall 204. Water 206 containing nutrients (nutrient solution) is contained in the planter 202 up to a height (depth) such that it does not overflow from the outlet 205. A shelf 208 is provided on a bottom wall 207 of the planter 202 such that a placement face of shelf 208a is placed above the surface of water 206. A water-absorbing sheet 209 is provided over the shelf 208 to substantially cover the bottom wall 207 of the planter 202 when seen from above. The water-absorbing sheet 209 is a sheet-like material formed of, for example, a material such as a cellulose fiber, a nylon fiber, a vinylon fiber, a polyester fiber, a polyolefin fiber, a rayon fiber, an aramid fiber, a glass fiber, or the like. The water-absorbing sheet 209 is placed such that a central portion of water-absorbing sheet 209a is positioned on the placement face 208a of shelf 208, and edges of water-absorbing sheet 209b are soaked in water 206 within the planter 202, and the water-absorbing sheet 209 is configured such that water 206 absorbed through ends 209b is delivered to the central portion 209a.

In the example shown in FIG. 6, a root-proof water-permeable sheet 210 is placed on the water-absorbing sheet 209 such that edges 210a thereof are hooked over upper ends 204a of the side walls 204 of the planter 202. The root-proof water-permeable sheet 210 is preferably provided for cultivating root vegetables in the plant cultivation apparatus 201, and may not necessarily be provided when a plant 211 to be grown is not a root vegetable. When the root-proof water-permeable sheet 210 is provided, water 206 in the planter 202 is delivered to the root-proof water-permeable sheet 210 via the water-absorbing sheet 209.

The root-proof water-permeable sheet 210 is a fabric, nonwoven fabric, or a mat-like material formed of a fibrous material, or is a sheet or the like formed of a resin such as any of various polyolefins (polyethylene, polypropylene, an ethylene-propylene copolymer, an ethylene-vinyl alcohol copolymer, an ethylene-vinyl ester copolymer, an ethylene-acrylate copolymer, and modified polyolefins obtained by modifying any of the above with an unsaturated carboxylic acid, or by graft-modifying any of the above with a derivative thereof, or by modifying any of the above with maleic anhydride), any of various nylons (nylon-6, nylon-66, nylon-6/66 copolymer, etc.), polyvinyl chloride, polyvinylidene chloride, polyester, polystyrene, polyacrylonitrile, polyurethane, polyacetal, modified polyvinyl alcohol, and the like. The root-proof water-permeable sheet 210 is a sheet that is hydrophilic, water-permeable, and flexible, and does not allow passage of roots. In the case in which the above-described sheet constituted from the resin is used as the root-proof water-permeable sheet 210, it preferably has a countless number of micropores in a uniform distribution, and in this case, the micropores preferably have a maximum size of 20 μm or less. When the maximum size of the micropores is 20 μm or less, the roots of the plant become unlikely to penetrate through the root-proof water-permeable sheet 210, to enter the water-absorbing sheet 209, and to be tangled, whereby excessive absorption of water by the roots is inhibited and thus plant growth becomes more favorable. Furthermore, when the maximum size of the micropores is, for example, 5 μm or more, percolation of water from the water-absorbing sheet may be more likely to occur, leading to more favorable plant growth. By virtue of fine meshes, the root-proof water-permeable sheet 210 has the property of being unlikely to pass water therethrough, and readily holding water therein.

In the example shown in FIG. 6, a plant cultivation medium 212 of the present invention described above is placed on the root-proof water-permeable sheet 210, and the plant 211 is grown in the plant cultivation medium 212. FIG. 6 shows an example in which a plural number of cylindrical pellets (resin composition chips) 213 formed from the resin composition are used as the plant cultivation medium 212 of the present invention.

Plant Cultivation Method

The present invention also provides a method for plant cultivation in which the plant cultivation medium of the present invention described above is used. In other words, the plant cultivation method of the present invention is a plant cultivation method including a step of cultivation using the plant cultivation medium of the present invention. When the plant cultivation medium of the present invention described above is used as a medium for hydroponics in the plant cultivation method of the present invention, in an exemplary method, the plant cultivation medium of the present invention may be placed in a container such as a pot, a nutrient solution may be added thereto, and then seeds may be sown or seedlings may be transplanted. In an alternative exemplary method, a cultivation bed in which the plant cultivation medium of the present invention is laid may be prepared, and grown seedlings may be transplanted thereto, thereby cultivating various types of crops.

EXAMPLES

Hereinafter, the present invention will be further specifically described by way of Examples, but the present invention is not limited by these Examples.

Evaluation Method (1) Ethylene Unit Content and Degree of Saponification of EVOH EVOH pellets obtained by synthesis, and gas barrier resin composition pellets obtained in Examples and Comparative Examples were dissolved in dimethyl sulfoxide (DMSO)-$d^6$ containing tetramethylsilane as an internal standard substance, and tetrafluoroacetic acid (TFA) as an additive, and measurement was conducted by using $^1$H-NMR ("JMTC-400/54/SS", manufactured by JEOL, Ltd.) of 500 MHz at 80° C., whereby an ethylene unit content and a degree of saponification were determined.

Each peak in spectrum for the measurement is assigned as in the following.

0.6 to 1.9 ppm: methylene proton of an ethylene unit (4H); methylene proton of a vinyl alcohol unit (2H); methylene proton of a vinyl acetate unit (2H)

1.9 to 2.0 ppm: methyl proton of a vinyl acetate unit (3H)

3.1 to 4.2 ppm: methine proton of a vinyl alcohol unit (1H)

(2) Melting Point of EVOH

With respect to EVOH pellets obtained by synthesis, the melting point was determined by using a differential scanning calorimeter "Q 2000", manufactured by TA Instruments, Inc., based on a peak temperature measured through temperature elevation from 30° C. to 250° C. at a rate of 10° C./min.

(3) Quantitative Determination of Carboxylic Acid

Into a stoppered 200 mL Erlenmeyer flask were charged 20 g of EVOH pellets obtained by synthesis, or 20 g of the gas barrier resin composition pellets obtained in the Examples and the Comparative Examples, and 100 mL of ion exchanged water. A cooling capacitor was attached to the flask, and stirring extraction was conducted at 95° C. for 6 hours. The extract thus obtained was subjected to neutralization titration performed with N/50 NaOH by using phenolphthalein as an indicator, whereby the carboxylic acid content in terms of carboxylate radical equivalent was quantitatively determined. It is to be noted that in a mode in which a phosphorus compound is contained, the amount of carboxylic acid was calculated, taking into account the phosphorus compound content determined by an evaluation method described later.

(4) Quantitative Determination of Metal Ion, Phosphate Compound and Boron Compound Into a Teflon (registered trademark) pressure container were charged 0.5 g of EVOH pellets obtained by synthesis or 0.5 g of the gas barrier resin composition pellets obtained in the Examples and the Comparative Examples, and 5 mL of conc. nitric acid was added thereto. Decomposition was then permitted at room temperature for 30 min. Thirty minutes later, a lid was attached and decomposition was allowed by heating with a wet decomposition system ("MWS-2", available from Actac Project Services Corporation) at 150° C. for 10 min and then at 180° C. for 5 min, followed by cooling to room temperature. This treatment liquid was transferred to a 50 mL volumetric flask (made of TPX) and diluted to fill up with pure water. This solution was subjected to an element analysis with an ICP emission spectrometer ("OPTIMA 4300 DV", available from PerkinElmer, Inc.) to determine: the amount of the metal ion in terms of the metal atom equivalent; the amount of the phosphorus compound in terms of the phosphorus atom equivalent; and the amount of the boron compound in terms of the boron atom equivalent, each contained in the EVOH pellets or in the gas barrier resin composition pellets.

(5) Biobased Content

With respect to EVOH pellets obtained by synthesis, and the gas barrier resin composition pellets obtained in the Examples and the Comparative Examples, in accordance with a method disclosed in ASTM D 6866-18, a concentration of radioactive carbon ($^{14}$C) was measured with an accelerator mass spectrometer (AMS), and the biobased content was calculated on the basis of a principle of radioactive carbon dating.

(6) Long-Run Workability Evaluation a (6-1) Film Formation Flaw Evaluation of Monolayer Film By using a single screw extruder ("D 2020", available from Toyo Seiki Seisaku-sho, Ltd.; D (mm)=20, L/D=20, compression ratio=3.0, screw: full flight), a monolayer film having an average thickness of 20 μm was produced from each of the gas barrier resin composition pellets obtained in Examples and in Comparative Examples. Each condition in this procedure is as shown below.

Condition of Single Screw Extruder
    extrusion temperature: 210° C.
    screw rotation speed: 40 rpm
    die width: 30 cm
    temperature of drawing roll: 80° C.
    roll drawing speed: 3.1 m/min The monolayer film was produced by a continuous operation under the condition described above, and with respect to the films produced after 10 hours and after 50 hours from the start of the operation, the number of flaws per film length of 17 cm was counted. The counting of the number of flaws was carried out using a film flaw inspection apparatus ("AI-10" available from Frontier System Inc.). It is to be noted that the detection camera of the film flaw inspection apparatus was installed such that the lens thereof was positioned at a distance of 195 mm from the film surface. The flaws in formed film were evaluated to be: "favorable (A)" in a case in which the number of flaw was fewer than 50; "somewhat favorable (B)" in a case in which the number of flaw was 50 or greater and fewer than 200; and "unfavorable (C)" in a case in which the number of flaw was 200 or greater.

(6-2) Appearance Characteristics Evaluation of Monolayer Film

With respect to the films produced after 10 hours and after 50 hours from the start of the operation, appearance characteristics (streak) were evaluated by visual inspection according to the following evaluation criteria. In addition, a film 100 m in length was wound up around a paper tube to produce a roll, and the appearance characteristics (coloring) owing to yellowing of the roll end were evaluated by visual inspection according to the following evaluation criteria.

Evaluation Criteria of Streak
    favorable (A): no streak being found;
    somewhat favorable (B): any streak(s) being found;
    unfavorable (C): a large number of streaks being found Evaluation Criteria of Coloring of Roll End
    favorable (A): colorless;
    somewhat favorable (B): yellowed;
    unfavorable (C): significantly yellowed (7) Oxygen Transmission Rate A A monolayer film having a thickness of 20 μm was formed under the following conditions, by using the gas barrier resin composition pellets obtained in the Examples and the Comparative Examples, and was conditioned under conditions of 20° C./65% RH. Thereafter, an oxygen transmission rate was measured by using an oxygen transmission rate measurement device ("OX-Tran 2/20," available from Modern Controls. Inc.), under a condition of 20° C./65% RH. It is to be noted that this measurement was performed in accordance with JIS K 7126-2 (equal-pressure method; 2006).

Production of Monolayer Film

By using a single screw extruder ("D 2020", available from Toyo Seiki Seisaku-sho, Ltd.; D (mm)=20, L/D=20, compression ratio=3.0, screw: full flight), a monolayer film having an average thickness of 20 μm was produced from each of the gas barrier resin composition pellets obtained in Examples and in Comparative Examples. The extrusion conditions are as shown below.
    extrusion temperature: 210° C.
    die width: 30 cm
    temperature of drawing roll: 80° C.
    screw rotation speed: 40 rpm
    roll drawing speed: 3.1 m/min (8) Evaluation of Thermoformed Container (Moldability)

By using the gas barrier resin composition pellets obtained in the Examples and the Comparative Examples, polypropylene ("Novatec (registered trademark) PP EA 7AD", manufactured by Japan Polypropylene Corporation.), and an adhesive resin ("Admer (registered trademark) QF 551", manufactured by Mitsui Chemicals, Inc. Co. Ltd.), a multilayer sheet (polypropylene/adhesive resin/gas barrier resin composition/adhesive resin/polypropylene, thickness (μm): 368/16/32/16/368) was produced with a coextrusion apparatus for five layers each selected from three types, under the following condition.

Extruder Conditions
    extrusion temperature of each resin: feeding zone/compression zone/metering zone/die=150° C./150° C./210° C./210° C.
    extruder of the polypropylene resin: 32φ single screw extruder, model GT-32-A (manufactured by Research Laboratory of Plastics Technology Co., Ltd.)
    extruder of the adhesive resin: 25φ single screw extruder, model P 25-18-AC (manufactured by Osaka Seiki Kosaku K.K.)
    extruder of the EVOH resin composition: 20φ, laboratory extruder, ME model CO-EXT (manufactured by Toyo Seiki Seisaku-sho, Ltd.)
    T die: width=300 mm for five layers each selected from three types (manufactured by Research Laboratory of Plastics Technology Co., Ltd.)
    temperature of cooling rolls: 80° C.
    drawing speed: 1 m/min Multilayer sheets produced after 30 min, after 10 hours, and after 50 hours from the start of the operation were collected, and each multilayer sheet thus obtained was subjected to thermoforming using a thermoforming machine (a vacuum-pressure deep drawing molding machine "model FX-0431-3", manufactured by Asano Laboratories Co. Ltd.) into a shape of a round cup (die shape: upper part: 75 mmφ; lower part: 60 mmφ; depth: 75 mm; and draw ratio S=1.0) at a sheet temperature of 160° C. with compressed air (atmospheric pressure: 5 kgf/cm$^2$) to give a thermoformed container. The molding conditions are as shown below.
    temperature of heater: 400° C.
    plug: 45φ×65 mm
    die temperature: 40° C.

The appearance of the thermoformed container thus obtained having a cup shape was evaluated by visual inspection according to the following evaluation criteria.

Evaluation Criteria of Appearance
    favorable (A): unevenness and locally uneven wall thickness not being found;
    somewhat favorable (B): slight unevenness and locally uneven wall thickness being found;
    unfavorable" (C): remarkable unevenness and locally uneven wall thickness being found (9) Evaluation of Biaxially Stretched Film (9-1) Film Breakage Resistance Evaluation With respect to biaxially stretched films obtained in the Examples and the Comparative Examples, film rolls of from the second to the 101st were applied to a slitter, and wound while imparting a tension of 100 N/m to the film rolls. The number of times of breakage was then measured and employed for evaluation of film breakage resistance. Decision criteria are as in the following.

Decision Criteria
    A: 0 to once/100 rolls;
    B: 2 to 4 times/100 rolls;
    C: 5 to 7 times/100 rolls;

D: 8 to 10 times/100 rolls;
E: 11 times or more/100 rolls (9-2) Oxygen Transmission Rate With respect to biaxially stretched films obtained in the Examples and the Comparative Examples, the second biaxially stretched film was conditioned under a condition of 20° C./65% RH. Thereafter, an oxygen transmission rate was measured by using an oxygen transmission rate measurement device ("OX-Tran 2/20," available from Modern Controls. Inc.), under a condition of 20° C./65% RH. It is to be noted that this measurement was performed in accordance with JIS K 7126-2 (equal-pressure method; 2006).

(10) Evaluation of Vapor Deposition Film (10-1) Measurement of Average Thickness of Inorganic Vapor Deposition Layer Vapor deposition films obtained in the Examples and the Comparative Examples were cut with a microtome to expose cross sections. This cross section was observed with a scanning electron microscope (SEM: "ZEISS ULTRA 55" available from SII Nano Technology, Inc.), and the thickness of the inorganic vapor deposition layer was measured at ten points by using a backscattered electron detector to determine the average thickness.

(10-2) Inhibitory Property of Vapor Deposition Flaws

The vapor deposition films obtained in the Examples and the Comparative Examples were evaluated on inhibitory property of vapor deposition flaws, by measuring the number of vapor deposition flaws. The vapor deposition film roll was applied to a slitter, and was unwound while illuminating with fluorescent light at 100 W from beneath the film. The number of vapor deposition flaw was counted by visual inspection, with respect to regions at ten different sites each with a width of 0.5 m and a length of 2 m. The average value of the number was defined as the number of vapor deposition flaws per $m^2$. The vapor deposition flaw was evaluated according to the following criteria.

Decision Criteria
A: 0 to 20 flaws/$m^2$;
B: 21 to 40 flaws/$m^2$;
C: 41 to 60 flaws/$m^2$;
D: 61 to 80 flaws/$m^2$;
E: 81 to 100 flaws/$m^2$;
F: 101 or more flaws/m 2

(10-3) Measurement of Adhesion Strength Between Inorganic Vapor Deposition Layer and Biaxially Stretched Film Adhesion strength between the inorganic vapor deposition layer and the biaxially stretched film of the vapor deposition film obtained was measured by a method below. On a surface of the inorganic vapor deposition layer side of the vapor deposition film obtained, an adhesive for dry lamination (an ethyl acetate solution having a solid content concentration of 23% by mass, prepared by mixing TAKELAC A-385/A-50, manufactured by Mitsui Chemicals, Inc., in a mass ratio of 6/1) was coated by using a bar coater, and after hot-air drying at 50° C. for 5 min, lamination with a PET film (E5000, manufactured by Toyobo Co., Ltd.) was carried out with nip rolls which had been heated to 80° C. In this step, half of the film was provided with a part not being laminated, by sandwiching an aluminum foil therebetween. Then, a laminated film was obtained after aging at 40° C. for 72 hours. The laminated film thus obtained was cut away into a short strip of 100 mm×15 mm. Then, a T-peel test was carried out five times by a tensile tester at a tensile rate of 10 mm/min. An average value of the resulting measurement values was herein defined as an adhesion strength. The adhesion strength was assessed as follows. It is to be noted that when a delamination interface was identified by visual inspection, in the vapor deposition film having a peel strength of less than 500 g/15 mm, delamination occurred at the interface of the inorganic vapor deposition layer and the biaxially stretched film layer.

Decision Criteria
A: 500 g/15 mm or more;
B: 450 or more and less than 500 g/15 mm;
C: 400 or more and less than 450 g/15 mm;
D: 350 or more and less than 400 g/15 mm;
E: less than 350 g/15 mm

(11) Oxidative Degradation Resistance

With respect to the monolayer film obtained in (7) above, time dependent alteration of tensile elongation at break was evaluated by measuring a plurality of samples with different heat treatment time periods, under the following evaluation condition. A time period when the tensile elongation at break becomes ¼ of the sample which had not been subjected to the heat treatment was determined and employed as a marker of oxidative degradation resistance.

Evaluation Conditions:

After undergoing a treatment in a hot-air dryer set at 140° C. for a predetermined time period, the sample was taken out. Then, immersion in water at 20° C. for 5 days was followed by wiping off water on the surface. After leaving to stand in a room at 20° C.-65% RH for two weeks, tensile strength was measured under the conditions below.

Measurement Conditions
sample width: 15 mm chuck interval: 30 mm
tensile speed: 50 mm/min
measurement atmosphere: 20° C.-65% RH In the above evaluation, because the deterioration in the gas barrier properties of the EVOH layer (layer formed from the gas barrier resin composition) resulting from occurrence of cracking due to oxidative degeneration becomes remarkable when the elongation at break becomes ¼ or less, the time period until when the elongation at break becomes ¼ can be assumed as one of the markers of lifespan based on the oxidative degeneration of EVOH under high temperatures. The time period until when the elongation at break becomes ¼ shows an Arrhenius type temperature dependence, and if the time period (lifespan) until when the elongation at break becomes ¼ at 80° C. is intended to be 100 years or more, the time period until when the elongation at break becomes ¼ at 140° C. needs to be set as 210 hours or more.

(12) Evaluation of Multilayer Pipe

High density polyethylene ("Novatec (registered trademark) HD HE 421" manufactured by Japan Polyethylene Corporation, density: 0.956 g/cc, MFR: 0.14 g/10 min) was fed into a first extruder, each of the gas barrier resin composition pellets obtained in the Examples and the Comparative Examples was fed into a second extruder, and "Admer (registered trademark) NF 408E", manufactured by Mitsui Chemicals, Inc. Co. Ltd., as an adhesive resin was fed into a third extruder. By using a circular die for three layers each selected from three types, extrusion molding into a multilayer pipe having an external diameter of 20 mm was performed, followed by immediately thereafter, cooling to solidify through a cooling water bath which had been adjusted to 40° C. A layer configuration of the multilayer pipe included the resin composition layer as the outermost layer, with the gas barrier resin composition layer/the adhesive resin layer/the high density polyethylene layer=100 μm/100 μm/2,000 μm. Each of the pipes produced after 10 hours and after 50 hours from the start of the operation was cut in a circumferential direction of the pipe, and thickness/thinness of the gas barrier resin composition layer in the circumferential direction was confirmed from the cross section. In a case in which variation of thickness/thinness was found, the presence of streak(s) was assessed, and evaluated according to the following evaluation criteria.

Evaluation Criteria of Streak
favorable (A): no streak being found;
somewhat favorable (B): slight streak(s) being found;
unfavorable (C): remarkable streaks being found

(13) Long-Run Workability Evaluation B (13-1) Film formation flaw evaluation of monolayer film By using a single screw extruder ("D 2020", available from Toyo Seiki Seisaku-sho, Ltd.; D (mm)=20, L/D=20, compression ratio=3.0, screw: full flight), a monolayer film having an average thickness of 20 μm was produced from each of the gas barrier resin composition pellets obtained in Examples and in Comparative Examples. Each condition in this procedure is as shown below.

Conditions of Single Screw Extruder
extrusion temperature: 230° C.
screw rotation speed: 40 rpm
die width: 30 cm
temperature of drawing roll: 80° C.
roll drawing speed: 3.1 m/min The monolayer film was produced by a continuous operation under the condition described above, and with respect to the films produced after 1 hour and after 5 hours from the start of the operation, the number of flaws per film length of 17 cm was counted. The counting of the number of flaws was carried out using a film flaw inspection apparatus ("AI-10" available from Frontier System Inc.). It is to be noted that the detection camera of the film flaw inspection apparatus was installed such that the lens thereof was positioned at a distance of 195 mm from the film surface. The flaws in formed film were evaluated to be: "favorable (A)" in a case in which the number of flaw was fewer than 50; "somewhat favorable (B)" in a case in which the number of flaw was 50 or greater and fewer than 200; and "unfavorable (C)" in a case in which the number of flaw was 200 or greater.

(13-2) Film Appearance Characteristics Evaluation of Monolayer

With respect to the films produced after 1 hour and after 5 hours from the start of the operation, appearance characteristics (streak) were evaluated by visual inspection according to the following evaluation criteria. In addition, the film of 100 m in length was wound up around a paper tube to produce a roll, and the appearance characteristics (coloring) owing to yellowing of the roll end were evaluated by visual inspection according to the following evaluation criteria.

Evaluation Criteria of Streak
favorable (A): no streak being found;
somewhat favorable (B): any streak(s) being found;
unfavorable (C): a large number of streaks being found Evaluation Criteria of Coloring of Roll End
favorable (A): colorless;
somewhat favorable (B): yellowed;
unfavorable (C): significantly yellowed

(14) Oxygen Permeation Rate B

A monolayer film having a thickness of 20 μm was formed under the following conditions by using the gas barrier resin composition pellets obtained in the Examples and the Comparative Examples was conditioned under a condition of 20° C./65% RH. Thereafter, an oxygen transmission rate was measured by using an oxygen transmission rate measurement device ("OX-Tran 2/20," available from Modern Controls. Inc.), under a condition of 20° C./65% RH. It is to be noted that this measurement was performed in accordance with JIS K 7126-2 (equal-pressure method; 2006).

Production of Monolayer Film

By using a single screw extruder ("D 2020", available from Toyo Seiki Seisaku-sho, Ltd.; D (mm)=20, L/D=20, compression ratio=3.0, screw: full flight), a monolayer film having an average thickness of 20 μm was produced from each of the gas barrier resin composition pellets obtained in Examples and in Comparative Examples. The extrusion condition is as shown below.

extrusion temperature: 230° C.
die width: 30 cm
temperature of drawing roll: 80° C.
screw rotation speed: 40 rpm
roll drawing speed: 3.1 m/min

(15) Retort Resistance Evaluation Test

The monolayer film having a thickness of 20 μm obtained in the evaluation method (14) above, a biaxially stretched nylon 6 film ("Emblem (registered trademark) ON", manufactured by Unitika Limited, average thickness: 15 μm), and an unstretched polypropylene film ("Tohcello CP", manufactured by Mitsui Chemicals Tohcello Inc., average thickness: 60 μm) were each cut away to give a size of A4. An adhesive for dry lamination (containing: "TAKELAC (registered trademark) A-385", manufactured by Mitsui Chemicals, Inc. as a base material; "Takenate (registered trademark) A-50", manufactured by Mitsui Chemicals, Inc. as a hardening agent; and ethyl acetate as a dilution liquid) was applied to give 4.0 g/m, on both two faces of the monolayer film. Dry lamination was carried out such that the outer layer was a nylon 6 film, and the inner layer was the unstretched polypropylene film. Thus resulting laminated film was dried at 80° C. for 3 min to allow the dilution liquid to be evaporated away. Thereafter, aging was carried out at 40° C. for 3 days to give a transparent multilayer sheet constituted from 3 layers.

By using the multilayer sheet thus obtained, a four-sided seal pouch was produced such that an inside dimension became 12×12 cm. Water was charged as a content. This pouch was subjected to a retorting process by using a retorting apparatus (high-temperature and high-pressure cooking sterilization tester, "RCS-40 RTGN", manufactured by Hisaka Works, Ltd.) at 120° C. for 20 min. After the completion of the retorting process, water on the surface was wiped off and the pouch was left to stand still in a high-temperature and high-humidity room at 20° C. and 65% RH for 1 day, and then evaluation of the retort resistance was made according to the following criteria.

Evaluation Criteria of Retort Resistance
A (favorable): transparency having been maintained;
B (unfavorable): patchy blooming being found

(16) Long-Run Workability Evaluation C (16-1) Film Formation Flaw Evaluation of Monolayer Film By using a single screw extruder ("D 2020", available from Toyo Seiki Seisaku-sho, Ltd.; D (mm)=20, L/D=20, compression ratio=3.0, screw: full flight), a monolayer film having an average thickness of 20 μm was produced from each of the gas barrier resin composition pellets obtained in Examples and in Comparative Examples. Each condition in this procedure is as shown below.

Condition of Single Screw Extruder
extrusion temperature: 210° C.
screw rotation speed: 40 rpm
die width: 30 cm
temperature of drawing roll: 80° C.
roll drawing speed: 3.1 m/min The monolayer film was produced by a continuous operation under the condition described above, and with respect to the films produced after 1 hour and after 5 hours from the start of the operation, the number of flaws per film length of 17 cm was counted. The counting of the number of flaws was carried out using a film flaw inspection apparatus ("AI-10" available from Frontier System Inc.). It is to be noted that the detection camera of the film flaw inspection apparatus was installed such that the lens thereof was positioned at a distance of 195 mm from the film surface. The flaws in formed film were evaluated to be: "favorable (A)" in a case in which the number of flaws was fewer than 50; "somewhat favorable (B)" in a case in which the number of flaws was 50 or greater and less than 200; and "unfavorable (C)" in a case in which the number of flaws was 200 or greater.

(16-2) Appearance Characteristics Evaluation of Monolayer Film

With respect to the films produced after 1 hour and after 5 hours from the start of the operation, appearance characteristics (streak) were evaluated by visual inspection according to the following evaluation criteria. In addition, a film 100 m in length was wound up around a paper tube to produce a roll, and the appearance characteristics (coloring) owing to yellowing of the roll end were evaluated by visual inspection according to the following evaluation criteria.

Evaluation Criteria of Streak
favorable (A): no streak being found;
somewhat favorable (B): any streak(s) being found;
unfavorable (C): a large number of streaks being found Evaluation Criteria of Coloring of Roll End
favorable (A): colorless;
somewhat favorable (B): yellowed;
unfavorable (C): significantly yellowed

(17) Flex Resistance Evaluation

With respect to the 20 μm monolayer film obtained in (7) above, flexion was repeated 100 times in an environment at 5° C., using "BE1006," a thermostat-attached Gelvo-type flex tester manufactured by Tester Sangyo Co., Ltd., in accordance with ASTM-F392-74. The monolayer film after the flexion was placed on a filter paper, and an ink was applied on the film. Thereafter, the number of spot(s) of the ink passed through onto the filter paper was counted, and the number of ink spot(s) was defined as the number of pinhole (s) of the film after the flexion. The measurement was performed on each three samples, and their average value was determined to evaluate according to the following evaluation criteria. A smaller number of the pinhole(s) after the flexion indicates superior flex resistance.

Evaluation Criteria of Flex Resistance
favorable (A): average value of the pinhole(s) being fewer than 5;
somewhat favorable (B): average value of the pinholes being fewer than 15;
unfavorable (C): average value of the pinholes being 15 or more

(18) Evaluation of Multilayer Film (18-1) Long-Run Workability Evaluation

By using the gas barrier resin composition pellets obtained in the Examples and the Comparative Examples, a multilayer film (polyethylene layer/adhesive resin layer/gas barrier resin composition layer/adhesive resin layer/polyethylene layer, thickness (μm): 60/10/10/10/60) was produced with a coextrusion apparatus for five layers each selected from three types, under the following condition. As polyethylene, "Novatec (trademark) UF 943" manufactured by Japan Polyethylene Corporation was employed, and as the adhesive resin, "Admer (trademark) NF 528" manufactured by Mitsui Chemicals, Inc. was employed.

Extruder Condition
extrusion temperature of each resin: feeding zone/compression zone/metering zone/die=170° C./170° C./210° C./210° C.
extruder of polyethylene: 32φ single screw extruder, model GT-32-A (manufactured by Research Laboratory of Plastics Technology Co., Ltd.)
extruder of the adhesive resin: 25φ single screw extruder, model P 25-18-AC (manufactured by Osaka Seiki Kosaku K.K.)
extruder of the gas barrier resin composition: 20φ single screw, laboratory extruder, ME model CO-EXT (manufactured by Toyo Seiki Seisaku-sho, Ltd.)
T die: width=300 mm for five layers each selected from three types (manufactured by Research Laboratory of Plastics Technology Co., Ltd.)
temperature of cooling rolls: 50° C.
drawing speed: 4 m/min With respect to the multilayer films produced after 10 hours and after 50 hours from the start of the operation, the presence or absence of the streak(s) was evaluated by visual inspection according to the following evaluation criteria. In addition, the multilayer film of 100 m in length was wound up around a paper tube to produce a roll, and the presence or absence of yellowing of the roll end was evaluated by visual inspection according to the following evaluation criteria.

Evaluation Criteria of Streak
A (favorable): no streak being found;
B (somewhat favorable): streak(s) being found;
C (unfavorable): a large number of streaks being found Evaluation Criteria of Coloring of Roll End
A (favorable): colorless;
B (somewhat favorable): yellowed;
C (unfavorable): significantly yellowed (18-2) Measurement of Oxygen Transmission Rate The multilayer film produced after 30 min from the start of the operation in (18-1) above was conditioned under a condition of 20° C., 65% RH. Thereafter, an oxygen transmission rate was measured by using an oxygen transmission rate measurement device ("OX-Tran 2/20," available from Mocon Modern Controls. Inc.), under a condition of 20° C., 65% RH in accordance with JIS K 7126-2 (equal-pressure method; 2006).

(19) Thermo-Shrinkability Evaluation of Thermo-Shrinkable Film

By using the gas barrier resin composition pellets obtained in the Examples and the Comparative Examples, an ethylene-vinyl acetate copolymer (EVA) ("EVAFLEX (trademark) EV 340", manufactured by Du Pont-Mitsui Polychemicals Company Ltd.), and an adhesive resin ("Admer (trademark) VF 500", manufactured by Mitsui Chemicals, Inc.), a multilayer film (layer configuration: EVA layer/adhesive resin layer/gas barrier resin composition layer/adhesive resin layer/EVA layer, thickness (μm): 300/50/50/50/300) was produced with a coextrusion apparatus for five layers each selected from three types, under the following conditions.

Extruder Conditions
extrusion temperature of each resin: feeding zone/compression zone/metering zone/die=170° C./170° C./210° C./210° C.
extruder of EVA: 32φ single screw extruder, model GT-32-A (manufactured by Research Laboratory of Plastics Technology Co., Ltd.)

extruder of the adhesive resin: 25φ single screw extruder, model P 25-18-AC (manufactured by Osaka Seiki Kosaku K.K.)

extruder of the EVOH resin composition: 20φ single screw, laboratory extruder, ME model CO-EXT (manufactured by Toyo Seiki Seisaku-sho, Ltd.)

T die: width=300 mm for five layers each selected from three types (manufactured by Research Laboratory of Plastics Technology Co., Ltd.)

temperature of cooling rolls: 50° C.

drawing speed: 1 m/min

The multilayer film produced after 30 min from the start of the operation was preheated at 80° C. for 30 sec in a pantograph type biaxially stretching apparatus manufactured by Toyo Seiki Seisaku-sho, Ltd., and thereafter simultaneously biaxially stretched with a draw ratio of 3×3 times to give a thermo-shrinkable film. The thermo-shrinkable film thus obtained was cut into 10 cm×10 cm, and immersed in hot water at 90° C. for 10 sec to permit shrinkage. Then the film after the shrinkage was visually inspected and evaluated according to the following criteria.

Evaluation Criteria of Appearance after Shrinkage
 A: uniformly shrank, without occurrence of coloring or blooming;
 B: occurrence of coloring or blooming being found;
 C: obtaining the thermo-shrinkable film failed due to breakage of the multilayer film when simultaneously biaxially stretched

(20) Evaluation of Multilayer Thermoformed Container

By using the gas barrier resin composition pellets obtained in the Examples and the Comparative Examples, polypropylene (manufactured by Japan Polypropylene Corporation., "Novatec (trademark)PP EA 7AD"), and adhesive resin (manufactured by Mitsui Chemicals, Inc., "Admer (trademark)QF 551"), a multilayer film (polypropylene/adhesive resin/gas barrier resin composition/adhesive resin/polypropylene, thickness (μm): 368/16/32/16/368) was produced with a coextrusion apparatus for five layers each selected from three types, under the following condition.

Extruder Condition
 extrusion temperature of each resin: feeding zone/compression zone/metering zone/die=150° C./150° C./210° C./210° C.
 extruder of the polypropylene resin: 32φ single screw extruder, model GT-32-A (manufactured by Research Laboratory of Plastics Technology Co., Ltd.)
 extruder of the adhesive resin: 25φ single screw extruder, model P 25-18-AC (manufactured by Osaka Seiki Kosaku K.K.)
 extruder of the EVOH resin composition: 20φ, laboratory extruder, ME model CO-EXT (manufactured by Toyo Seiki Seisaku-sho, Ltd.)
 T die: width=300 mm for five layers each selected from three types (manufactured by Research Laboratory of Plastics Technology Co., Ltd.)
 temperature of cooling rolls: 80° C.
 drawing speed: 1 m/min Multilayer sheets produced after 10 hours and after 50 hours from the start of the operation were collected, and each multilayer sheet thus obtained was subjected to thermoforming using a thermoforming machine (a vacuum-pressure deep drawing molding machine "model FX-0431-3", manufactured by Asano Laboratories Co. Ltd.,) into a shape of a round cup (die shape: upper part: 75 mmφ; lower part: 60 mmφ; depth: 38 mm; and draw ratio S=0.5) at a sheet temperature of 160° C. with compressed air (atmospheric pressure: 5 kgf/cm$^2$) to give a thermoformed container. The molding conditions are as shown below.
 temperature of heater: 400° C.
 plug: 45φx 33 mm
 die temperature: 40° C.

The appearance of the thermoformed container thus obtained and having a cup shape was confirmed by visual inspection and evaluated according to the following criteria.

Evaluation Criteria of Appearance
 A (favorable): unevenness and locally uneven wall thickness not being found;
 B (somewhat favorable): slight unevenness and locally uneven wall thickness being found;
 C (unfavorable): remarkable unevenness and locally uneven wall thickness being found

(21) Streak Evaluation of Blow-Molded Container

By using the EVOH resin composition pellets obtained in the Examples and the Comparative Examples, high density polyethylene ("HI-ZEX (trademark) 8200B" manufactured by Prime Polymer Co., Ltd.), and an adhesive resin ("ADMER (trademark) GT-6A", available from Mitsui Chemicals, Inc.), a blow-molded container was produced at 210° C., with a blow molding machine TB-ST-6P manufactured by Suzuki Seiko Co., Ltd., from a parison of 6 layers selected from 3 types, i.e., (inner side) high density polyethylene layer/adhesive resin layer/gas barrier resin composition layer/adhesive resin layer/high density polyethylene layer/high density polyethylene layer (external side). It is to be noted that in the production of the blow-molded container, by cooling at an internal temperature of the die of 15° C. for 20 sec, a 3 L tank having the average thickness of the entire layer of 1,000 μm was molded, involving (high density polyethylene layer/adhesive resin layer/gas barrier resin composition layer/adhesive resin layer/high density polyethylene layer/high density polyethylene layer, from the inside to the outside, =340 μm/50 μm/40 μm/50 μm/400 μm/120 μm, from the inside to the outside). The blow-molded container had a bottom face average diameter of 100 mm, and an average height of 400 mm. The blow-molded container after 3 hours from the start of the operation was collected, and streak evaluation was performed by visual inspection of the appearance, and microscopic observation of the cross section in the circumferential direction.

Evaluation Criteria of Streak
 A (favorable): no streak being found;
 B (somewhat favorable): streak(s) being found;
 C (unfavorable): a large number of streaks being found

(22) Fuel Permeation Rate

By using the gas barrier resin composition pellets obtained in the Examples and the Comparative Examples, high density polyethylene ("HI-ZEX (trademark) 8200B" manufactured by Prime Polymer Co., Ltd.), and an adhesive resin ("ADMER (trademark) GT-6A", available from Mitsui Chemicals, Inc.), a multilayer film (polyethylene/adhesive resin/gas barrier resin composition/adhesive resin/polyethylene) was produced with the coextrusion apparatus for five layers each selected from three types and the extruder conditions employed in (5) above. In the layer configuration of the multilayer film, the polyethylene resin of the inner and outer layers had a thickness of 90 μm, the adhesive resin each had a thickness of 10 μm, and the intermediate layer gas barrier resin composition had a thickness of 20 μm. With respect to the multilayer film thus obtained, the permeation rate of a model fuel was measured with a flow type gas/vapor permeation analysis system (GTR-30XFKE) available from GTR TEC Corporation. The multilayer film was conditioned at 20° C., 65% RH for one month, and the measurement was performed at 60° C. As the model fuel CE 10 gasoline was employed, and the composition thereof was: toluene/isooctane/ethanol=45/45/10% by mass.

(23) Long-Run Workability Evaluation D

In producing the resin composition pellets in the Examples and the Comparative Examples, melt extrusion with a twin-screw extruder was continuously operated for a long time period to perform evaluation on long term operation stability (long-run workability).

(23-1) Amount of Adhesion of Deposits on Die

The strand die and the pellets obtained were observed by visual inspection every 30 minutes from the start of melt extrusion of the resin composition pellets according to the following evaluation criteria, and depending on the amount of the deposits to the strand die, the die deposits were removed. This procedure was continuously performed for 24 hours to evaluate the long-run workability. It is to be noted that in a case in which the strand was broken before cutting with a pelletizing machine (hereinafter, may be referred to as "strand breakage"), the strand die surface was quickly cleaned up and the operation was restarted.

Decision Criteria of Amount of Adhesion of Deposits on Die
favorable (A): slight die deposits being found, and strand breakage and adhesion of the die deposits to the pellets not being caused as long as the die deposits were removed with time intervals of 1 hour or longer.
somewhat favorable (B): die deposits being found, and strand breakage or die adhesion of the die deposits to the pellets being caused unless the die deposits were removed with a time interval of 30 min.
unfavorable (C): a remarkable amount of die deposits being found, and strand breakage or adhesion of degradation matter to the pellets being caused even if the die deposits were removed with a time interval of 30 min.

(23-2) Frequency of Strand Breakage

Frequency of strand breakage was observed according to the following evaluation criteria.

Decision Criteria of Strand Breakage Frequency
favorable (A): number of strand breakage times being 0 to 2
somewhat favorable (B): number of strand breakage times being 3 to 10
unfavorable (C): number of strand breakage times being 11 times or more

(24) Evaluation of Medium

On Apr. 17, 2019, the plant medium obtained was provided with 15 holes, at an interval of 7 cm (width) and 8 cm (length) in a greenhouse, and seeds of Japanese radish named "Tanshin" were sown directly, with three seeds per hole. Thinning was performed on Apr. 27, 2019. For irrigation, a nutrient solution of a mixed solution of the fertilizers for hydroponics "OAT House No. 1", "OAT House No. 2", and "OAT House No. 5", manufactured by OAT Agrio Co., Ltd. (N: 98.7 ppm, P: 19.4 ppm, K: 125.7 ppm, Ca: 63.0 ppm, Mg: 13.4 ppm, Mn: 0.709 ppm, B: 0.487 ppm, Fe: 2.025 ppm, Cu: 0.018 ppm, Zn: 0.048 ppm, and Mo: 0.019 ppm) was supplied using "Tonbo Watering Can No. 4" (manufactured by Shinkigousei Co., Ltd.), about 3 to 6 times a day, depending on the weather and the status of growth. A harvest research was performed on Jun. 25, 2019. In the harvest research, the number of radishes having 1 g or more of enlarged roots, relative to the 15 holes in which they were grown, was counted, and the evaluation was made as: "A" when the number of enlarged roots was 12 or more; and "B" when the number was fewer than 12.

Preparation of Vinyl Acetate Synthetic Catalyst

HSV-1, a silica sphere carrier manufactured by Shanghai Haiyuan Chemical Industry Technology Co., Ltd. (sphere diameter: 5 mm, specific surface area: 160 $m^2$/g, water absorbing rate: 0.75 g/g) in an amount of 23 g (amount of water absorption: 19.7 g), was impregnated with an aqueous solution, in an equivalent amount to the amount of water absorption of the carrier, containing 1.5 g of a 56% by mass aqueous sodium tetrachloropalladate solution and 1.5 g of a 17% by mass aqueous tetrachloroaurate tetrahydrate solution, followed by immersion in 40 mL of an aqueous solution containing 2.5 g of sodium metasilicate nonahydrate, and the mixture was left to stand for 20 hours. Subsequently, 3.3 mL of a 52% by mass aqueous hydrazinehydrate solution was added thereto and the mixture was left to stand at room temperature for 4 hours, followed by: washing with water until a chloride ion disappeared in the water; and drying at 110° C. for 4 hours. A resultant palladium/gold/carrier composition was immersed in 60 mL of a 1.7% by mass aqueous acetic acid solution, and left to stand overnight. Next, washing with water overnight, and drying at 110° C. for 4 hours were performed. Thereafter, impregnation with an aqueous solution of 2 g of potassium acetate, in an equivalent amount to the amount of water absorption of the carrier, and drying at 110° C. for 4 hours gave a vinyl acetate synthetic catalyst.

Synthesis of Vinyl Acetate

Synthesis Example of VAM1

Three mL of the vinyl acetate synthetic catalyst was diluted with 75 mL of glass beads and packed into a SUS 316L reaction tube (internal diameter: 22 mm, length: 480 mm), through which a gas provided by mixing, at a temperature of 150° C. and a pressure of 0.6 MpaG, ethylene/oxygen/water/acetic acid/nitrogen=47.3/6.1/5.6/26.3/14.7 (mol %) in this proportion was flowed at a flow rate of 20 NL/hour to permit a reaction, whereby vinyl acetate (VAM1) was synthesized. Biomass-derived ethylene (sugarcane-derived bioethylene manufactured by Braskem S.A.) was employed as ethylene, and a gas cylinder (ethylene purity: 96.44%, internal volume: 29.502 L, internal pressure: 1.8234 MPa) packed with this ethylene was used. Further, biomass-derived acetic acid (sugarcane-derived bioacetic acid manufactured by Godavari Biorefineries Ltd.) was employed as acetic acid, and introduced into a reaction system as a vapor, after vaporization at 220° C.

Synthesis of VAM2 to VAM4

Each vinyl acetate of VAM2 to VAM4 was synthesized by a process similar to the process of synthesizing VAM1 except that ethylene and acetic acid as raw materials were changed to be biomass-derive and/or fossil fuel-derived as shown in Table 1.

It is to be noted that as the raw material used for synthesis of vinyl acetate, the following raw materials were used.
biomass-derived ethylene: sugarcane-derived bioethylene, manufactured by Braskem S.A.
fossil fuel-derived ethylene: fossil fuel-derived ethylene, manufactured by AIR LIQUIDE Kogyo Gas Ltd.
biomass-derived acetic acid: sugarcane-derived bioacetic acid, manufactured by Godavari Biorefineries Ltd.
fossil fuel-derived acetic acid: fossil fuel-derived acetic acid, manufactured by FUJIFILM Wako Pure Chemical Corporation

TABLE 1

| | Raw materials of vinyl acetate | | | |
| | ethylene | | acetic acid | |
| vinyl acetate | derived from biomass mass % | derived from fossil fuel mass % | derived from biomass mass % | derived from fossil fuel mass % |
|---|---|---|---|---|
| VAM1 | 100 | 0 | 100 | 0 |
| VAM2 | 100 | 0 | 0 | 100 |
| VAM3 | 50 | 50 | 0 | 100 |
| VAM4 | 0 | 100 | 0 | 100 |

Synthesis of EVOH
Production of EVOH (A1-1) Pellets
Polymerization of Ethylene-Vinyl Acetate Copolymer Into a 250 L pressurized reactor equipped with a jacket, a stirrer, a nitrogen feed port, an ethylene feed port, and an initiator addition port, 105 kg of VAM1 and 32.3 kg of methanol (hereinafter, may be referred to as MeOH) were charged and the temperature in the reactor was elevated to 65° C., and thereafter an interior of the reactor was replaced with nitrogen by bubbling nitrogen for 30 min. Next, ethylene was introduced with pressure elevation such that the reactor pressure (ethylene pressure) became 3.67 MPa. Biomass-derived ethylene (sugarcane-derived bioethylene manufactured by Braskem S.A.) was employed as ethylene. After the temperature in the reactor was adjusted to 65° C., polymerization was started by adding, as an initiator, 16.8 g of 2,2'-azobis(2,4-dimethylvaleronitrile) ("V-65" available from Wako Pure Chemical Industries, Ltd.) in a methanol solution. During the polymerization, the ethylene pressure was maintained at 3.67 MPa, and the polymerization temperature was maintained at 65° C. Three hours later when a rate of polymerization of VAc became 45%, the polymerization was stopped by cooling. The reactor was opened to allow for elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to an ethylene-vinyl acetate copolymer.

Saponification and Washing

Into a 500 L reactor equipped with a jacket, a stirrer, a nitrogen feed port, a reflux condenser, and a solution addition port, 250 kg of a 20% by mass solution of a resulting ethylene-vinyl acetate copolymer in MeOH was charged. While nitrogen was blown into this solution, the temperature was elevated to 60° C., and 4 kg of sodium hydroxide was added in a MeOH solution prepared to have a concentration of 2 N. After completion of the addition of the sodium hydroxide, while an internal temperature of the system was maintained at 60° C., the saponification reaction was allowed to proceed, with stirring of the mixture for 2 hrs. After a lapse of 2 hours, 4 kg of sodium hydroxide was added again in a similar manner, and stirring while heating was continued for 2 hours. Subsequently, 14 kg of acetic acid was added to the mixture, whereby the saponification reaction was stopped, and 50 kg of ion exchanged water was added thereto. With heating and stirring, MeOH and water were distillated out from the reactor to concentrate the reaction liquid. After a lapse of 3 hours, 50 kg of ion exchanged water was further added to permit precipitation of the EVOH. The EVOH powder thus obtained was charged into a 1 g/L aqueous acetic acid solution (bath ratio 20: a ratio of 10 kg of the powder with respect to 200 L of ion exchanged water) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20): washing with stirring for 2 hrs; and carrying out deliquoring. Drying of the powder at 60° C. for 16 hrs gave 25 kg of crude dry matter of the EVOH.

Production of EVOH Water-Containing Pellets 25 kg of the crude dry matter of the EVOH thus obtained was placed into a 100 L mixing vessel equipped with a jacket, a stirrer, and a reflux condenser, followed by further adding thereto 20 kg of water and 20 g of MeOH, and dissolution was allowed by elevating the temperature to 70° C. This solution was extruded into a mixed liquid of water/MeOH=90/10 in a weight ratio, which had been cooled to 5° C., through a glass tube having a diameter of 3 mm to allow for precipitation in a strand shape, and this strand was cut into a pellet shape with a strand cutter to give water-containing pellets of the EVOH. The water-containing pellets of EVOH were charged into an aqueous acetic acid solution having a concentration of 1 g/L (bath ratio 20) and washed with stirring for 2 hrs. The EVOH powder was deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20); washing with stirring for 2 hrs; and carrying out deliquoring, to give the water-containing pellets of the EVOH, with catalyst residues, which had been contained in the saponification reaction, and MeOH used in strand precipitation having been eliminated. As a result of a measurement using Halogen Moisture Analyzer "HR73" available from Mettler Toledo, the moisture content of the water-containing pellets of the EVOH obtained was 110% by mass.

Production of EVOH (A1-1) Pellets

The water-containing pellets of EVOH thus obtained were charged into an aqueous solution (bath ratio 20) containing sodium acetate, acetic acid, phosphoric acid, and boric acid, and were immersed therein while the mixture was periodically stirred for 4 hours. It is to be noted that the concentration of each component was adjusted such that the content of each component in the EVOH (A1-1) pellets obtained became each value shown in Table 2. After the immersion, deliquoring followed by drying at 80° C. for 3 hours in the air, and then at 130° C. for 7.5 hours in the air gave EVOH (A1-1) pellets containing sodium acetate, acetic acid, phosphoric acid, and boric acid.

Production of Each Pellet of EVOH (A1-2) to EVOH (A1-9), EVOH (A1-12), EVOH (A1-13), EVOH (B1-1) to (B1-4), EVOH (B1-6)

EVOH (A1-2) pellets to EVOH (A1-9) pellets, EVOH (A1-13) pellets, and EVOH (B1-1) to EVOH (B1-4) pellets were produced in a similar manner to the EVOH (A1-1) pellets, except that each of types of ethylene and vinyl acetate, and contents of the phosphate compound and the boron compound of the raw materials (raw material monomers) was changed as shown in Table 2. In addition, EVOH (A1-12) pellets and EVOH (B1-6) pellets were produced by changing each of types of ethylene and vinyl acetate, and contents of the phosphate compound and the boron compound of the raw materials (raw material monomers) as shown in Table 2, and changing the amount of ethylene and vinyl acetate used. As the fossil fuel-derived ethylene, ethylene manufactured by AIR LIQUIDE Kogyo Gas Ltd. was employed.

With respect to each of the EVOH (A1-1) pellets to the EVOH (A1-9) pellets, the EVOH (A1-12) pellets, the EVOH (A1-13) pellets, the EVOH (B1-1) to the EVOH (B1-4) pellets, and the EVOH (B1-6) pellets, in accordance with the Evaluation Methods (1), (3) to (5) described above, measurement of the ethylene unit content and the degree of saponification, quantitative determination of carboxylic acid, quantitative determination of the metal ion, the phosphate compound, and the boron compound, and measurement of the biobased content were performed. The results are shown in Table 2.

Production of EVOH (A1-10) Pellets

Into a 250 L pressurized reactor equipped with a jacket, a stirrer, a nitrogen feed port, an ethylene feed port, and an initiator addition port, 100 kg of vinyl acetate prepared by mixing vinyl acetate VAM3 and VAM4 at 50/50, 5.7 kg of methanol (hereinafter, may be referred to as MeOH), and 3 kg of 2-methylene-1,3-propanediol diacetate (hereinafter, referred to as MPDAc) as the other monomer were charged and the temperature in the reactor was elevated to 60° C., and thereafter an interior of the reactor was replaced with nitrogen by bubbling nitrogen for 30 min. Next, ethylene prepared by mixing biomass-derived ethylene and fossil fuel-derived ethylene at 50/50 was introduced such that the reactor pressure (ethylene pressure) became 5.1 MPa. After the temperature in the reactor was adjusted to 60° C., polymerization was started by adding as an initiator, 50 g of 2,2'-azobis(2,4-dimethylvaleronitrile) ("V-65" manufactured by Wako Pure Chemical Industries, Ltd.) in a methanol solution. During the polymerization, the ethylene pressure was maintained at 5.1 MPa, and the polymerization temperature was maintained at 60° C. Additionally, during the polymerization, a 30 wt % MPDAc solution in MeOH was continuously added to the pressurized reactor at an addition rate of 350 mL/15 min. 6.5 hours later when a rate of polymerization of VAc became 41%, the polymerization was stopped by cooling. The reactor was opened to allow for elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to a modified ethylene-vinyl acetate copolymer (herein, may be referred to as modified EVAc) having an MPDAc-derived structural unit introduced by copolymerization. The steps of saponification, washing, production of EVOH water-containing pellets, and production of EVOH pellets that follow were carried out similarly to the EVOH (A1-1) pellets, whereby EVOH (A1-10) pellets having an ethylene unit content of 38 mol %, a modifying group (a structural unit including a modifying group) content of 2.5 mol %, and a degree of saponification of 99 mol % or more were produced. With respect to the EVOH (A1-10) pellets thus obtained, in accordance with the Evaluation Methods (1), (3) to (5) described above, measurement of the ethylene unit content and the degree of saponification, quantitative determination of carboxylic acid, quantitative determination of the metal ion, the phosphate compound, and the boron compound, and measurement of the biobased content were performed. The results are shown in Table 2.

Production of EVOH (B1-5) Pellets

EVOH (B1-5) pellets were produced and evaluated in a similar manner to the EVOH (A1-10) pellets, except that types of ethylene and vinyl acetate of the raw materials (raw material monomers) were changed as shown in Table 2. The results are shown in Table 2.

Production of EVOH (A1-11) Pellets

Into a 1 m$^3$ polymerization tank equipped with a cooling coil were charged 500 kg of vinyl acetate prepared by mixing VAM3 and VAM4 at 50/50, 100 kg of methanol, 500 ppm acetyl peroxide (with respect to the vinyl acetate), 20 ppm citric acid (with respect to the vinyl acetate), and as the other monomer, 14 kg of 3,4-diacetoxy-1-butene, and the system was replaced once with a nitrogen gas, followed by replacement with ethylene prepared by mixing biomass-derived ethylene and fossil fuel-derived ethylene at 50/50, which was press injected until an ethylene pressure became 45 kg/cm$^2$ The temperature was elevated to 67° C. with stirring of the mixture, and polymerization was permitted while 3,4-diacetoxy-1-butene was added thereto at 15 g/min in a total amount of 4.5 kg, and the polymerization was allowed for 6 hours until a rate of polymerization reached 50%. The reactor was opened to allow for elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to a modified ethylene-vinyl acetate copolymer (herein, may be referred to as modified EVAc) having a 3,4-diacetoxy-1-butene-derived structural unit introduced by copolymerization. The steps of saponification, washing, production of EVOH water-containing pellets, and production of EVOH pellets that follow were carried out similarly to the EVOH (A1-1) pellets, whereby EVOH (A1-11) pellets having an ethylene unit content of 38 mol %, a modifying group (a structural unit including a modifying group) content of 2.5 mol %, and a degree of saponification of 99 mol % or more were produced. With respect to the EVOH (A1-11) pellets thus obtained, in accordance with the Evaluation Methods (1), (3) to (5) described above, measurement of the ethylene unit content and the degree of saponification, quantitative determination of carboxylic acid, quantitative determination of the metal ion, the phosphate compound, and the boron compound, and measurement of the biobased content were performed. The results are shown in Table 2.

With respect to the pellets (A1-1) to pellets (A1-13) and pellets (B1-1) to pellets (B1-6), measurement of a sulfur compound was performed according to the method described below. The results (type and content of the sulfur compound, in terms of the sulfur atom equivalent) are shown in Table 2.

Measurement of Sulfur Compound Content

Quantitative determination of the sulfur compound was carried out by using a nitrogen sulfur microanalysis device (model TS-2100H) manufactured by Mitsubishi Chemical Analytech, Co., Ltd., and measurement conditions were as in the following.

temperatures of heaters: Inlet 900° C., Outlet 900° C.
    gas flow rate: Ar, $O_2$ each 300 ml/min
    Analysis System: NSX-2100
    mode of measurement: TS
    parameter: SD-210
    measurement time period (timer): 540 sec (9 min)
    PMT sensitivity: high concentration Identification of the sulfur compound was performed by using gas chromatography (GC) and gas chromatography-mass spectrometry (GC/MS). As a detector of GC, FPD (Flame Photometric Detector) which exhibits high sensitivity to slight amounts of a sulfur compound and a phosphorus compound was used, and the identification was executed by analyzing a mass component observed at a retention time at which a sulfur compound had been detected.

TABLE 2

| | Raw materials | | | | | EVOH pellets | | | EVOH pellets | | | | | |
|---|---|---|---|---|---|---|---|---|---|---|---|---|---|---|
| | ethylene | | vinyl acetate type (mass ratio) | modifying group | | ethylene unit content | degree of saponification | carboxylic acid content | metal ion content | phosphate compound content | boron compound content | biobased content | biobased content | |
| | derived from biomass | derived from fossil fuel | | | | | | | | | | | | type |
| | mass % | mass % | | type | mol % | mol % | mol % | ppm | ppm | ppm | ppm | % | ppm | — |
| EVOH (A1-1) | 100 | 0 | VAM1 | — | — | 32 | >99 | 250 | 200 | 10 | 700 | 100 | 1.0 | dimethylsulfide |
| EVOH (A1-2) | 100 | 0 | VAM2 | — | — | 32 | >99 | 250 | 200 | 10 | 700 | 100 | 0.4 | dimethylsulfide |
| EVOH (A1-3) | 0 | 100 | VAM2 | — | — | 32 | >99 | 250 | 200 | 10 | 700 | 68 | 0.2 | dimethylsulfide |
| EVOH (A1-4) | 50 | 50 | VAM3 | — | — | 32 | >99 | 250 | 200 | 10 | 700 | 50 | 0.4 | dimethylsulfide |
| EVOH (A1-5) | 50 | 50 | VAM3/VAM4 (50/50) | — | — | 32 | >99 | 250 | 200 | 10 | 700 | 33 | 0.3 | dimethylsulfide |
| EVOH (A1-6) | 30 | 70 | VAM4 | — | — | 32 | >99 | 250 | 200 | 10 | 700 | 10 | 0.1 | dimethylsulfide |
| EVOH (A1-7) | 30 | 70 | VAM4 | — | — | 32 | >99 | 250 | 200 | 0 | 0 | 10 | 0.1 | dimethylsulfide |
| EVOH (A1-8) | 30 | 70 | VAM4 | — | — | 32 | >99 | 250 | 200 | 10 | 0 | 10 | 0.1 | dimethylsulfide |
| EVOH (A1-9) | 30 | 70 | VAM4 | — | — | 32 | >99 | 250 | 200 | 0 | 700 | 10 | 0.1 | dimethylsulfide |
| EVOH (A1-10) | 50 | 50 | VAM3/VAM4 (50/50) | A | 2.5 | 38 | >99 | 250 | 200 | 10 | 700 | 32 | 0.2 | dimethylsulfide |
| EVOH (A1-11) | 50 | 50 | VAM3/VAM4 (50/50) | B | 2.5 | 38 | >99 | 250 | | | | | | |
| EVOH (A1-12) | 30 | 70 | VAM4 | — | — | 44 | >99 | 250 | | | | | | |
| EVOH (A1-13) | 100 | 0 | VAM1 | — | — | 32 | >99 | 250 | | | | | | |
| EVOH (B1-1) | 0 | 100 | VAM4 | — | — | 32 | >99 | 250 | | | | | | |
| EVOH (B1-2) | 0 | 100 | VAM4 | — | — | 32 | >99 | 250 | | | | | | |
| EVOH (B1-3) | 0 | 100 | VAM4 | — | — | 32 | >99 | 250 | | | | | | |
| EVOH (B1-4) | 0 | 100 | VAM4 | — | — | 32 | >99 | 250 | | | | | | |
| EVOH (B1-5) | 0 | 100 | VAM4 | A | 2.5 | 38 | >99 | 250 | | | | | | |
| EVOH (B1-6) | 0 | 100 | VAM4 | — | — | 44 | >99 | 250 | | | | | | |

TABLE 2-continued

| | | | | | | |
|---|---|---|---|---|---|---|
| EVOH (A1-11) | 200 | 10 | 700 | 32 | 0.2 | dimethylsulfide |
| EVOH (A1-12) | 200 | 10 | 700 | 13 | 0.1 | dimethylsulfide |
| EVOH (A1-13) | 200 | 10 | 0 | 100 | 0.9 | dimethylsulfide |
| EVOH (B1-1) | 200 | 10 | 700 | 0 | <0.01 | — |
| EVOH (B1-2) | 200 | 0 | 0 | 0 | <0.01 | — |
| EVOH (B1-3) | 200 | 10 | 0 | 0 | <0.01 | — |
| EVOH (B1-4) | 200 | 0 | 700 | 0 | <0.01 | — |
| EVOH (B1-5) | 200 | 10 | 700 | 0 | <0.01 | — |
| EVOH (B1-6) | 200 | 0 | 700 | 0 | <0.01 | — |

A: 2-methylene-1,3-propanediol diacetate
B: 3,4-diacetoxy-1-butene

Example 1-1

After dry blending EVOH (A1-1) pellets and EVOH (B1-1) pellets in a mass ratio (A1-1/B1-1) of 10/90, extrusion was conducted by using a twin-screw extruder ("2D 25W" available from Toyo Seiki Seisaku-sho, Ltd., 25 mmφ, die temperature: 220° C., screw rotation speed: 100 rpm), in a nitrogen atmosphere, followed by pelletization to give gas barrier resin composition pellets of Example 1-1.

With respect to the resultant gas barrier resin composition pellets of Example 1-1, in accordance with the Evaluation Methods (1) and (3) to (7) described above, measurement of the ethylene unit content and the degree of saponification, quantitative determination of carboxylic acid, quantitative determination of the metal ion, the phosphate compound, and the boron compound, and measurement or evaluation of the biobased content, the long-run workability, and the oxygen transmission rate were performed. The results are shown in Table 3.

Examples 1-2 to 1-23, Comparative Examples 1-1 to 1-7

Each of gas barrier resin composition pellets of Examples 1-2 to 1-23 and Comparative Examples 1-1 to 1-7 were produced and evaluated in a similar manner to Example 1-1, except that types and mass ratios (proportions) of the EVOHs used were changed as shown in Table 3. The results are shown in Table 3.

TABLE 3

| | Gas barrier resin composition pellets | | | | | | | |
|---|---|---|---|---|---|---|---|---|
| | EVOH (A) | | EVOH (B) | | ethylene unit content mol % | degree of saponification mol % | carboxylic acid content ppm | metal ion content ppm |
| | type | proportion mass % | Type | proportion mass % | | | | |
| Example 1-1 | EVOH (A1-1) | 10 | EVOH (B1-1) | 90 | 32 | >99 | 220 | 200 |
| Example 1-2 | EVOH (A1-1) | 50 | EVOH (B1-1) | 50 | 32 | >99 | 220 | 200 |
| Example 1-3 | EVOH (A1-1) | 70 | EVOH (B1-1) | 30 | 32 | >99 | 220 | 200 |
| Example 1-4 | EVOH (A1-1) | 80 | EVOH (B1-1) | 20 | 32 | >99 | 220 | 200 |
| Example 1-5 | EVOH (A1-2) | 10 | EVOH (B1-1) | 90 | 32 | >99 | 220 | 200 |
| Example 1-6 | EVOH (A1-2) | 50 | EVOH (B1-1) | 50 | 32 | >99 | 220 | 200 |
| Example 1-7 | EVOH (A1-3) | 10 | EVOH (B1-1) | 90 | 32 | >99 | 220 | 200 |
| Example 1-8 | EVOH (A1-3) | 50 | EVOH (B1-1) | 50 | 32 | >99 | 220 | 200 |
| Example 1-9 | EVOH (A1-4) | 10 | EVOH (B1-1) | 90 | 32 | >99 | 220 | 200 |
| Example 1-10 | EVOH (A1-4) | 50 | EVOH (B1-1) | 50 | 32 | >99 | 220 | 200 |
| Example 1-11 | EVOH (A1-5) | 10 | EVOH (B1-1) | 90 | 32 | >99 | 220 | 200 |
| Example 1-12 | EVOH (A1-5) | 50 | EVOH (B1-1) | 50 | 32 | >99 | 220 | 200 |
| Example 1-13 | EVOH (A1-6) | 90 | EVOH (B1-1) | 10 | 32 | >99 | 220 | 200 |

TABLE 3-continued

| | | | | | | | | |
|---|---|---|---|---|---|---|---|---|
| Example 1-14 | EVOH (A1-3) | 100 | — | — | 32 | >99 | 220 | 200 |
| Example 1-15 | EVOH (A1-4) | 100 | — | — | 32 | >99 | 220 | 200 |
| Example 1-16 | EVOH (A1-5) | 100 | — | — | 32 | >99 | 220 | 200 |
| Example 1-17 | EVOH (A1-6) | 100 | — | — | 32 | >99 | 220 | 200 |
| Example 1-18 | EVOH (A1-7) | 100 | — | — | 32 | >99 | 220 | 200 |
| Example 1-19 | EVOH (A1-8) | 100 | — | — | 32 | >99 | 220 | 200 |
| Example 1-20 | EVOH (A1-9) | 100 | — | — | 32 | >99 | 220 | 200 |
| Example 1-21 | EVOH (A1-10) | 100 | — | — | 38 | >99 | 220 | 200 |
| Example 1-22 | EVOH (A1-11) | 100 | — | — | 38 | >99 | 220 | 200 |
| Example 1-23 | EVOH (A1-12) | 100 | — | — | 44 | >99 | 220 | 200 |
| Comparative Example 1-1 | EVOH (A1-1) | 100 | — | — | 32 | >99 | 220 | 200 |
| Comparative Example 1-2 | — | — | EVOH (B1-1) | 100 | 32 | >99 | 220 | 200 |
| Comparative Example 1-3 | — | — | EVOH (B1-2) | 100 | 32 | >99 | 220 | 200 |
| Comparative Example 1-4 | — | — | EVOH (B1-3) | 100 | 32 | >99 | 220 | 200 |
| Comparative Example 1-5 | — | — | EVOH (B1-4) | 100 | 32 | >99 | 220 | 200 |
| Comparative Example 1-6 | — | — | EVOH (B1-5) | 100 | 38 | >99 | 220 | 200 |
| Comparative Example 1-7 | — | — | EVOH (B1-6) | 100 | 44 | >99 | 220 | 200 |

| | Gas barrier resin composition pellets | | | Evaluation | | | | | | oxygen transmission rate mL/(m² · day · atm) |
|---|---|---|---|---|---|---|---|---|---|---|
| | | | | film formation flaw | | streak | | roll edge coloring | | |
| | phosphate compound content ppm | boron compound content ppm | biobased content % | 10 hours later | 50 hours later | 10 hours later | 50 hours later | 10 hours later | 50 hours later | |
| Example 1-1 | 10 | 700 | 10 | A | A | A | A | A | A | 0.3 |
| Example 1-2 | 10 | 700 | 50 | B | B | B | B | B | B | 0.3 |
| Example 1-3 | 10 | 700 | 70 | B | C | B | C | B | B | 0.3 |
| Example 1-4 | 10 | 700 | 80 | B | C | B | C | C | C | 0.3 |
| Example 1-5 | 10 | 700 | 10 | A | A | A | A | A | A | 0.3 |
| Example 1-6 | 10 | 700 | 50 | B | B | B | B | B | B | 0.3 |
| Example 1-7 | 10 | 700 | 7 | A | A | A | A | A | A | 0.3 |
| Example 1-8 | 10 | 700 | 34 | A | B | A | B | A | B | 0.3 |
| Example 1-9 | 10 | 700 | 5 | A | A | A | A | A | A | 0.3 |
| Example 1-10 | 10 | 700 | 25 | A | B | A | B | A | A | 0.3 |
| Example 1-11 | 10 | 700 | 3 | A | A | A | A | A | A | 0.3 |
| Example 1-12 | 10 | 700 | 17 | A | B | A | A | A | A | 0.3 |
| Example 1-13 | 10 | 700 | 9 | A | A | A | A | A | A | 0.3 |
| Example 1-14 | 10 | 700 | 68 | B | C | B | C | B | B | 0.3 |
| Example 1-15 | 10 | 700 | 50 | B | B | B | B | B | B | 0.3 |
| Example 1-16 | 10 | 700 | 33 | A | B | A | B | A | B | 0.3 |
| Example 1-17 | 10 | 700 | 10 | A | A | A | A | A | A | 0.3 |
| Example 1-18 | 0 | 0 | 10 | A | A | A | A | B | B | 0.3 |
| Example 1-19 | 10 | 0 | 10 | A | A | A | A | A | A | 0.3 |
| Example 1-20 | 0 | 700 | 10 | A | A | A | A | B | B | 0.3 |
| Example 1-21 | 10 | 700 | 32 | A | B | A | B | A | B | 0.5 |
| Example 1-22 | 10 | 700 | 32 | A | B | A | B | A | B | 1.0 |
| Example 1-23 | 10 | 700 | 13 | A | A | A | A | A | A | 1.5 |
| Comparative Example 1-1 | 10 | 700 | 100 | C | C | C | C | C | C | 0.3 |
| Comparative Example 1-2 | 10 | 700 | 0 | A | A | A | A | A | A | 0.3 |
| Comparative Example 1-3 | 0 | 0 | 0 | A | A | A | A | B | B | 0.3 |
| Comparative Example 1-4 | 10 | 0 | 0 | A | A | A | A | A | A | 0.3 |
| Comparative Example 1-5 | 0 | 700 | 0 | A | A | A | A | B | B | 0.3 |

TABLE 3-continued

| | | | | | | | | | | |
|---|---|---|---|---|---|---|---|---|---|---|
| Comparative Example 1-6 | 10 | 700 | 0 | A | A | A | A | A | A | 0.5 |
| Comparative Example 1-7 | 10 | 700 | 0 | A | A | A | A | A | A | 1.5 |

As shown in Table 3, each of the gas barrier resin compositions of Examples 1-1 to 1-20 had superior gas barrier properties that compare favorably to the gas barrier resin composition derived from only a fossil fuel (the gas barrier resin composition of Comparative Example 1-2), even though the biomass-derived raw material was partially used. Furthermore, the gas barrier resin composition of Example 1-21 maintained superior gas barrier properties that compare favorably to the gas barrier resin composition derived from only a fossil fuel (the gas barrier resin composition of Comparative Example 1-6), even though the biomass-derived raw material was partially used. The gas barrier resin composition of Example 1-23 maintained superior gas barrier properties that compare favorably to the gas barrier resin composition derived from only a fossil fuel (the gas barrier resin composition of Comparative Example 1-7), even though the biomass-derived raw material was partially used. In addition, each of the gas barrier resin compositions of Examples 1-1 to 1-23 had sufficient long-run workability, as the evaluation results on the film formation flaw and the streak(s) were A or B, with respect to the film produced after 10 hours from the start of the operation.

Moreover, from the results of the Examples and the Comparative Examples, with respect to the gas barrier resin composition in which the EVOH was used, specific properties were ascertained in which the long-run workability tends to be improved as the biobased content becomes lower, whereas the gas barrier properties did not depend on the biobased content. For example, each of the gas barrier resin compositions of Examples 1-1, 1-2, 1-5 to 1-13, and 1-15 to 1-23 having a biobased content of 65% or less had superior long-run workability, as the evaluation results on the film formation flaw, the streak(s) and the roll edge coloring were A or B, with respect to the films produced after 10 hours and after 50 hours from the start of the operation.

Nonadsorptivity Test

By using the gas barrier resin composition pellets obtained in Example 1-23 and Comparative Example 1-7, each monolayer film having a thickness of 30 μm was formed under the following conditions, and evaluated on nonadsorptive characteristics for nicotine and methyl salicylate.

Production of Monolayer Film

A monolayer film having a thickness of 30 μm was produced from the gas barrier resin composition pellets by using a single screw extruder ("D 2020", available from Toyo Seiki Seisaku-sho, Ltd., D (mm)=20, L/D=20, compression ratio=3.0, screw: full flight). The extrusion conditions are as shown below.

extrusion temperature: 210° C.
die width: 30 cm
temperature of drawing roll: 80° C.
screw rotation speed: 40 rpm
roll drawing speed: 2.1 m/min Production of Evaluation Sample After weighing 40 mg of nicotine or methyl salicylate, each was charged into a weighing bottle having an internal volume of 50 cm$^3$, and a SUS mesh screen which had been processed into U-shape so as not to be in contact with the substance to be adsorbed, was placed thereto. On this mesh plate, each one of film pieces having a width of 1 cm and a length of 4 cm, and having a width of 1 cm and a length of 1 cm, each cut away from the 30 μm monolayer film described above was placed, and left to stand in an environment of 20° C., 50% RH for two weeks. The film piece having a size more suitable for the amount of adsorption was used to measure the amount of adsorption by a method described below.

Measurement of Amount of Adsorption

For measurement of the amount of adsorption, a thermal desorption gas chromatograph-mass spectrometer (TCT-GC/MS, TCT: "CP-4020" manufactured by Chrompak Ltd.; GC/MS: "model 5973", manufactured by Agilent Technologies Japan, Ltd.) was used to determine the amount of adsorption by the following method.

Gas Collection Procedure

The film piece was placed on a glass chamber heated to 80° C. While pure nitrogen was flowed from one side at a flow rate of 100 ml/min, a gas vaporized for 3 min into a Tenax collecting tube attached to another side was collected as a sample.

Gas Desorption Conditions

The Tenax collecting tube was heated to 250° C. to permit desorption.

GC-Introducing Procedure

After subjecting to cold trapping at −130° C., the gas desorbed was heated to 250° C. and introduced into a column to measure the amount of adsorption.

As a result of the test, the amount of adsorption of Example 1-23 was: 301 ng/cm$^2$ for nicotine; and 220 ng/cm$^2$ for methyl salicylate. These values were equivalent to those of Comparative Example 1-7 in which a fossil fuel-derived raw material was used, i.e., 313 ng/cm$^2$ for nicotine; and 208 ng/cm$^2$ for methyl salicylate, revealing that even in the case of using the monolayer film of the present invention, the nonadsorptivity compares favorably with the case of using the fossil fuel-derived raw material.

Thermal Adhesiveness Test

A two component adhesive ("A-520" and "A-50", available from Mitsui Chemicals, Inc.) was applied on one face of a biaxially stretched polyester film ("Lumirror (registered trademark)", available from Toray Industries, Inc.) having an average thickness of 12 μm, and a multilayer film was produced by providing, on the face which had been applied, a monolayer film having a thickness of 30 μm used in the evaluation of the nonadsorptive characteristics. The adhesion layer had an average thickness of 4 μm.

By using the multilayer film thus obtained, a 3-side sealing pouch was produced such that the monolayer films are heat sealed to be overlaid with each other, and heat seal strength was measured. In producing the pouch, a 3-side sealing automatic packaging wrapping machine ("KP-109", manufactured by Komack Co., Ltd.) was used, with a setting of a sealing temperature of 180° C., in which the multilayer film was continuously fed to produce the 3-side sealing pouch having a width of 80 mm and a length of 70 mm, at a bag-manufacturing speed of 100 bags/min. The heat seal strength was measured in an environment of 23° C. and 50%

RH by using a tensile tester ("AGS-H", manufactured by Shimadzu Corporation). As a sample, a film piece was produced by cutting a seal face (seal width: 8 mm) of the pouch in a width direction to have a width of 15 mm, and the sealing strength was measured by fixing two ends with chucks and pulling with a strain rate of 250 m/min.

Hot Tackiness Evaluation

For evaluation of hot tack strength, a hot tack tester (manufactured by Theller Inc.) was used. A film piece having a width of 25 mm and a length of 300 mm was produced from the multilayer film, and the hot tack strength was measured when sealed at a sealing temperature within the range of 100° C. to 160° C., and at a sealing pressure of 2.0 MPa, for a sealing time period of 1 sec.

Figure 7:
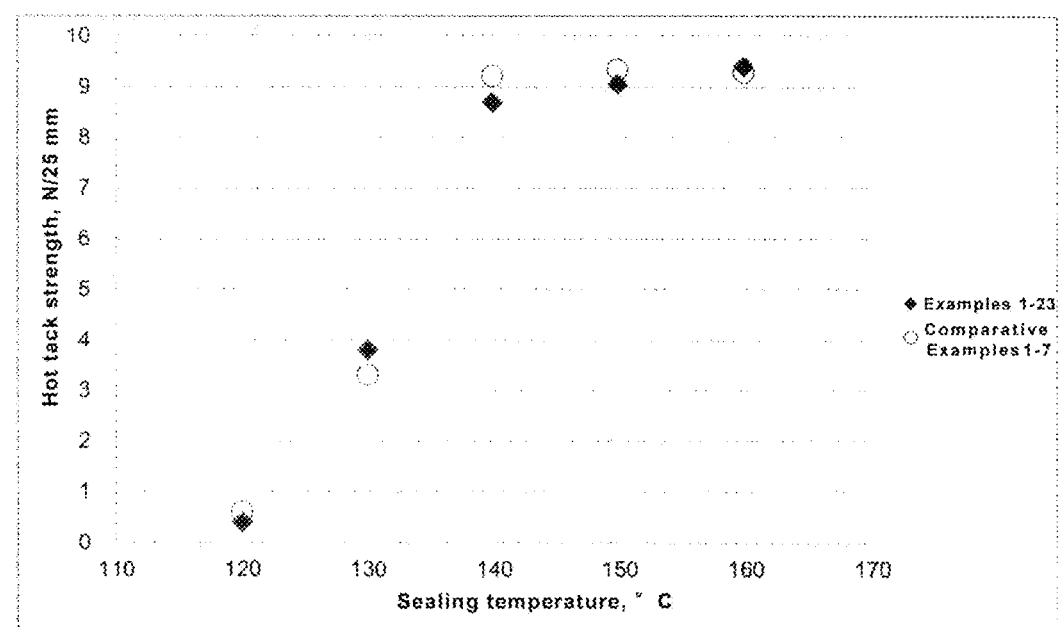
FIG. 7 is a graph indicating results of measuring hot tack strength in EXAMPLES.

As a result of the thermal adhesiveness test, the sealing strength of Example 1-23 was 16.0 N/15 mm. This strength can be concluded to be equivalent strength to the sealing strength being 15.8 N/15 mm, of Comparative Example 1-7 in which a fossil fuel-derived raw material was used. In addition, the results of measuring the hot tack strength are shown in FIG. 7. As is clear also from the results of measuring the hot tack strength, the monolayer film of the present invention was revealed to exhibit thermal adhesiveness which compares favorably with that of the monolayer film in which the fossil fuel-derived raw material was used.

Synthesis of EVOH

Production of Each Pellet of EVOH (A2-1) to EVOH (A2-9), EVOH (A2-11) to EVOH (A2-16), EVOH (B2-1) to (B2-3)

EVOH (A2-1) pellets to EVOH (A2-9) pellets, EVOH (A2-11) to EVOH (A2-16), and EVOH (B2-1) to EVOH (B2-3) pellets were produced in a similar manner to the EVOH (A1-1) pellets, except that each of types of ethylene and vinyl acetate of the raw materials (raw material monomers), and contents of carboxylic acid, the metal ion, the phosphate compound, and the boron compound was changed as shown in Table 4, and that blending quantities of ethylene and vinyl acetate were appropriately changed. As the fossil fuel-derived ethylene, ethylene manufactured by AIR LIQUIDE Kogyo Gas Ltd. was employed.

With respect to each of the EVOH (A2-1) pellets to EVOH (A2-9) pellets, the EVOH (A2-11) to EVOH (A2-16), and EVOH (B2-1) to EVOH (B2-3) pellets, in accordance with the Evaluation Methods (1) to (5) described above, measurement of the ethylene unit content and the degree of saponification, and the melting point, quantitative determination of carboxylic acid, quantitative determination of the metal ion, the phosphate compound, and the boron compound, and measurement of the biobased content were performed. The results are shown in Table 4.

Synthesis of EVOH (A2-10) Pellets

EVOH (A2-10) pellets were produced by using an apparatus disclosed in paragraph [0158] and FIG. 1 of Japanese Unexamined Patent Application, Publication No. 2003-231715, according to the following procedure. In TEM-35BS extruder (37 mmφ, L/D=52.5) manufactured by Toshiba Machine Co., Ltd., used, barrel C 1 was water cooled, the temperature of barrels C 2 to C 3 was set to 200° C., and the temperature of barrels C 4 to C 15 was set to 240° C., and the operation was performed with a screw rotation speed of 400 rpm. After EVOH (A2-9) pellets were fed from the resin feed port of C 1 at a rate of 11 kg/hr and melted, water and oxygen were eliminated from the vent 1, and epoxypropane as a modifying agent 2 was fed at a rate of 2.4 kg/hr (pressure during feeding: 6 MPa) from a liquid pressure inlet of C 9. Thereafter, unreacted epoxypropane was eliminated from the vent 2, and then pelletized to give 5 mol % modified EVOH (A2-10) pellets. With respect to the EVOH (A2-10) pellets thus obtained, in accordance with the Evaluation Method (1) to (5) described above, measurement of the ethylene unit content and the degree of saponification, and the melting point, quantitative determination of carboxylic acid, quantitative determination of the metal ion, the phosphate compound, and the boron compound, and measurement of the biobased content were performed. The results are shown in Table 4.

Synthesis of EVOH (B2-4) Pellets

EVOH (B2-4) pellets were produced similarly to the synthesis of the EVOH (A2-10) pellets, except that the raw material EVOH in the synthesis of the EVOH (A2-10) pellets was changed from the EVOH (A2-9) pellets to the EVOH (B2-3) pellets, and the measurements were performed. The results are shown in Table 4.

TABLE 4

| | Raw materials of EVOH | | | | | EVOH pellets | | | | | | |
|---|---|---|---|---|---|---|---|---|---|---|---|---|
| | ethylene | | vinyl | modifying agent | | ethylene | degree of | | | | phos- | | Evalua- |
| | derived from plant mass % | derived from fossil mass % | acetate VAM type (proportion) | type | modification amount % by mole | unit content mol % | saponification mol % | melting point ° C. | carboxylic acid ppm | metal ion ppm | phate compound ppm | boron compound ppm | tion biobased content % |
| EVOH (A2-1) | 100 | 0 | VAM1 | — | — | 32 | >99 | 183 | 250 | 200 | 10 | 700 | 100 |
| EVOH (A2-2) | 100 | 0 | VAM2 | — | — | 32 | >99 | 183 | 250 | 200 | 10 | 700 | 100 |
| EVOH (A2-3) | 0 | 100 | VAM2 | — | — | 32 | >99 | 183 | 250 | 200 | 10 | 700 | 68 |
| EVOH (A2-4) | 50 | 50 | VAM3 | — | — | 32 | >99 | 183 | 250 | 200 | 10 | 700 | 50 |
| EVOH (A2-5) | 30 | 70 | VAM4 | — | — | 32 | >99 | 183 | 250 | 200 | 10 | 700 | 10 |
| EVOH (A2-6) | 30 | 70 | VAM4 | — | — | 27 | >99 | 190 | 250 | 200 | 10 | 700 | 8 |
| EVOH (A2-7) | 100 | 0 | VAM2 | — | — | 44 | >99 | 165 | 250 | 200 | 10 | 700 | 100 |
| EVOH (A2-8) | 0 | 100 | VAM2 | — | — | 44 | >99 | 165 | 250 | 200 | 10 | 700 | 56 |
| EVOH (A2-9) | 0 | 100 | VAM2 | — | — | 44 | >99 | 165 | 50 | 10 | 20 | 0 | 56 |
| EVOH (A2-10) | 0 | 100 | VAM2 | A | 5 | 44 | >99 | 127 | 30 | 10 | 20 | 0 | 50 |
| EVOH (A2-11) | 30 | 70 | VAM4 | — | — | 32 | >99 | 183 | 250 | 200 | 0 | 0 | 10 |
| EVOH (A2-12) | 30 | 70 | VAM4 | — | — | 32 | >99 | 183 | 250 | 200 | 10 | 0 | 10 |
| EVOH (A2-13) | 30 | 70 | VAM4 | — | — | 32 | >99 | 183 | 250 | 200 | 0 | 700 | 10 |
| EVOH (A2-14) | 30 | 70 | VAM4 | — | — | 44 | >99 | 165 | 250 | 200 | 0 | 0 | 10 |
| EVOH (A2-15) | 30 | 70 | VAM4 | — | — | 44 | >99 | 165 | 250 | 200 | 10 | 0 | 10 |
| EVOH (A2-16) | 30 | 70 | VAM4 | — | — | 44 | >99 | 165 | 250 | 200 | 0 | 700 | 10 |
| EVOH (B2-1) | 0 | 100 | VAM4 | — | — | 32 | >99 | 183 | 250 | 200 | 10 | 700 | 0 |
| EVOH (B2-2) | 0 | 100 | VAM4 | — | — | 44 | >99 | 165 | 250 | 200 | 10 | 700 | 0 |

TABLE 4-continued

| | Raw materials of EVOH | | | | EVOH pellets | | | | | | | |
|---|---|---|---|---|---|---|---|---|---|---|---|---|
| | ethylene | | vinyl | modifying agent | | ethylene | degree of | | | | phos- | Evalua- |
| | derived from plant mass % | derived from fossil mass % | acetate VAM type (proportion) | type | modifi- cation amount % by mole | unit content mol % | saponi- fication mol % | melt- ing point ° C. | car- boxylic acid ppm | metal ion ppm | phate com- pound ppm | boron com- pound ppm | tion biobased content % |
| EVOH (B2-3) | 0 | 100 | VAM4 | — | — | 44 | >99 | 165 | 50 | 10 | 20 | 0 | 0 |
| EVOH (B2-4) | 0 | 100 | VAM4 | A | 5 | 44 | >99 | 127 | 30 | 10 | 20 | 0 | 0 |

A: epoxypropane

Example 2-1

After dry blending: as the EVOH (X), EVOH (A2-1) pellets and EVOH (B2-1) pellets; and as the EVOH (Y), EVOH (B2-2) pellets, used in a mass ratio (A2-1/B2-1/B2-2) of 10/60/30, extrusion was conducted by using a twin-screw extruder ("2D 25W" available from Toyo Seiki Sei-saku-sho, Ltd., 25 mmφ, die temperature: 220° C., screw rotation speed: 100 rpm), in a nitrogen atmosphere, followed by pelletization to give gas barrier resin composition pellets of Example 2-1.

With respect to resultant gas barrier resin composition pellets of Example 2-1, in accordance with the Evaluation Methods (1), (3) to (8) described above, measurement of the degree of saponification, quantitative determination of car- boxylic acid, quantitative determination of the metal ion, the phosphate compound, and the boron compound, measure- ment or evaluation of the biobased content, the long-run workability, the oxygen transmission rate, and the evaluation of the thermoformed container were performed. The results are shown in Tables 5 and 6.

Examples 2-2 to 2-24, Comparative Examples 2-1 to 2-3

Each of gas barrier resin composition pellets of Example 2-2 to 2-24 and Comparative Example 2-1 to 2-3 were produced and evaluated in a similar manner to Example 2-1, except that types and mass ratios (proportions) of the EVOHs used were changed as shown in Table 5. The results are shown in Tables 5 and 6.

TABLE 5

| | EVOH resin composition pellets | | | | | | | | | |
|---|---|---|---|---|---|---|---|---|---|---|
| | EVOH (X) | | | | | EVOH (Y) | | | | |
| | EVOH (A) | | EVOH (B) | | | EVOH (A) | | EVOH (B) | | |
| | Type | propor- tion mass % | Type | propor- tion mass % | melting point ° C. | Type | propor- tion mass % | Type | propor- tion mass % | melting point ° C. |
| Example 2-1 | EVOH (A2-1) | 10 | EVOH (B2-1) | 60 | 183 | — | — | EVOH (B2-2) | 30 | 165 |
| Example 2-2 | EVOH (A2-1) | 50 | EVOH (B2-1) | 20 | 183 | — | — | EVOH (B2-2) | 30 | 165 |
| Example 2-3 | EVOH (A2-1) | 70 | — | — | 183 | — | — | EVOH (B2-2) | 30 | 165 |
| Example 2-4 | EVOH (A2-1) | 80 | — | — | 183 | — | — | EVOH (B2-2) | 20 | 165 |
| Example 2-5 | EVOH (A2-1) EVOH (A2-5) | 20 50 | — | — | 183 | — | — | EVOH (B2-2) | 30 | 165 |
| Example 2-6 | EVOH (A2-2) | 10 | EVOH (B2-1) | 60 | 183 | — | — | EVOH (B2-2) | 30 | 165 |
| Example 2-7 | EVOH (A2-2) | 50 | EVOH (B2-1) | 20 | 183 | — | — | EVOH (B2-2) | 30 | 165 |
| Example 2-8 | EVOH (A2-3) | 10 | EVOH (B2-1) | 60 | 183 | — | — | EVOH (B2-2) | 30 | 165 |
| Example 2-9 | EVOH (A2-3) | 50 | EVOH (B2-1) | 20 | 183 | — | — | EVOH (B2-2) | 30 | 165 |
| Example 2-10 | EVOH (A2-4) | 10 | EVOH (B2-1) | 60 | 183 | — | — | EVOH (B2-2) | 30 | 165 |
| Example 2-11 | EVOH (A2-4) | 50 | EVOH (B2-1) | 20 | 183 | — | — | EVOH (B2-2) | 30 | 165 |
| Example 2-12 | EVOH (A2-5) | 50 | EVOH (B2-1) | 20 | 183 | — | — | EVOH (B2-2) | 30 | 165 |
| Example 2-13 | EVOH (A2-5) | 70 | — | — | 183 | — | — | EVOH (B2-2) | 30 | 165 |
| Example 2-14 | EVOH (A2-6) | 50 | — | — | 190 | — | — | EVOH (B2-1) | 20 | 183 |
| Example 2-15 | EVOH (A2-6) | 70 | — | — | 190 | — | — | EVOH (B2-2) | 30 | 165 |

TABLE 5-continued

| | | | | | | | | | | |
|---|---|---|---|---|---|---|---|---|---|---|
| Example 2-16 | — | — | EVOH (B2-1) | 70 | 183 | EVOH (A2-7) | 30 | — | — | 165 |
| Example 2-17 | — | — | EVOH (B2-1) | 70 | 183 | EVOH (A2-8) | 30 | — | — | 165 |
| Example 2-18 | — | — | EVOH (B2-1) | 70 | 183 | EVOH (A2-10) | 30 | — | — | 127 |
| Example 2-19 | EVOH (A2-5) | 70 | — | — | 183 | EVOH (A2-8) | 30 | — | — | 165 |
| Example 2-20 | EVOH (A2-6) | 70 | — | — | 190 | EVOH (A2-8) | 30 | — | — | 165 |
| Example 2-21 | EVOH (A2-11) | 70 | — | — | 183 | EVOH (A2-14) | 30 | — | — | 165 |
| Example 2-22 | EVOH (A2-12) | 70 | — | — | 183 | EVOH (A2-15) | 30 | — | — | 165 |
| Example 2-23 | EVOH (A2-13) | 70 | — | — | 183 | EVOH (A2-16) | 30 | — | — | 165 |
| Example 2-24 | EVOH (A2-1) | 70 | EVOH (B2-1) | 30 | 183 | — | — | — | — | — |
| Comparative Example 2-1 | EVOH (A2-1) | 70 | — | — | 183 | EVOH (A2-7) | 30 | — | — | 165 |
| Comparative Example 2-2 | — | — | EVOH (B2-1) | 70 | 183 | — | — | EVOH (B2-2) | 30 | 165 |
| Comparative Example 2-3 | — | — | EVOH (B2-1) | 70 | 183 | — | — | EVOH (B2-4) | 30 | 127 |

| | EVOH (Z) | | melting point ° C. | degree of saponification mol % | carboxylic acid ppm | metal ion ppm | phosphate compound ppm | boron compound ppm | biobased content % |
|---|---|---|---|---|---|---|---|---|---|
| | EVOH (B) | | | | | | | | |
| | type | proportion mass % | | | | | | | |
| Example 2-1 | — | — | — | >99 | 220 | 200 | 10 | 700 | 10 |
| Example 2-2 | — | — | — | >99 | 220 | 200 | 10 | 700 | 50 |
| Example 2-3 | — | — | — | >99 | 220 | 200 | 10 | 700 | 70 |
| Example 2-4 | — | — | — | >99 | 220 | 200 | 10 | 700 | 80 |
| Example 2-5 | — | — | — | >99 | 220 | 200 | 10 | 700 | 25 |
| Example 2-6 | — | — | — | >99 | 220 | 200 | 10 | 700 | 10 |
| Example 2-7 | — | — | — | >99 | 220 | 200 | 10 | 700 | 50 |
| Example 2-8 | — | — | — | >99 | 220 | 200 | 10 | 700 | 7 |
| Example 2-9 | — | — | — | >99 | 220 | 200 | 10 | 700 | 34 |
| Example 2-10 | — | — | — | >99 | 220 | 200 | 10 | 700 | 5 |
| Example 2-11 | — | — | — | >99 | 220 | 200 | 10 | 700 | 25 |
| Example 2-12 | — | — | — | >99 | 220 | 200 | 10 | 700 | 5 |
| Example 2-13 | — | — | — | >99 | 220 | 200 | 10 | 700 | 7 |
| Example 2-14 | EVOH (B2-2) | 30 | 165 | >99 | 220 | 200 | 10 | 700 | 4 |
| Example 2-15 | — | — | — | >99 | 220 | 200 | 10 | 700 | 7 |
| Example 2-16 | — | — | — | >99 | 220 | 200 | 10 | 700 | 30 |
| Example 2-17 | — | — | — | >99 | 220 | 200 | 10 | 700 | 17 |
| Example 2-18 | — | — | — | >99 | 160 | 140 | 15 | 490 | 15 |
| Example 2-19 | — | — | — | >99 | 220 | 200 | 10 | 700 | 24 |
| Example 2-20 | — | — | — | >99 | 220 | 200 | 10 | 700 | 21 |
| Example 2-21 | — | — | — | >99 | 220 | 200 | 0 | 0 | 10 |
| Example 2-22 | — | — | — | >99 | 220 | 200 | 10 | 0 | 10 |
| Example 2-23 | — | — | — | >99 | 220 | 200 | 0 | 700 | 10 |
| Example 2-24 | — | — | — | >99 | 220 | 200 | 10 | 700 | 70 |
| Comparative Example 2-1 | — | — | — | >99 | 220 | 200 | 10 | 700 | 100 |
| Comparative Example 2-2 | — | — | — | >99 | 220 | 200 | 10 | 700 | 0 |
| Comparative Example 2-3 | — | — | — | >99 | 160 | 140 | 15 | 490 | 0 |

TABLE 6

| | Monolayer film | | | | | | | Thermoformed container | | |
|---|---|---|---|---|---|---|---|---|---|---|
| | film formation flaw | | Streak | | roll edge coloring | | oxygen transmission rate cc/(m² · day · atm) | appearance after thermoforming | | |
| | after 10 hours | after 50 hours | after 10 hours | after 50 hours | after 10 hours | after 50 hours | | 30 min later | after 10 hours | after 50 hours |
| Example 2-1 | A | A | A | A | A | A | 0.4 | A | A | A |
| Example 2-2 | B | B | B | B | B | B | 0.4 | A | B | B |

TABLE 6-continued

|  | Monolayer film | | | | | | | Thermoformed container | | |
|---|---|---|---|---|---|---|---|---|---|---|
|  | film formation flaw | | Streak | | roll edge coloring | | oxygen transmission rate cc/(m² · day · atm) | appearance after thermoforming | | |
|  | after 10 hours | after 50 hours | after 10 hours | after 50 hours | after 10 hours | after 50 hours |  | 30 min later | after 10 hours | after 50 hours |
| Example 2-3 | B | C | B | C | B | B | 0.4 | A | B | C |
| Example 2-4 | B | C | B | C | C | C | 0.4 | A | B | C |
| Example 2-5 | A | B | A | B | A | A | 0.4 | A | A | B |
| Example 2-6 | A | A | A | A | A | A | 0.4 | A | A | A |
| Example 2-7 | B | B | B | B | B | B | 0.4 | A | B | B |
| Example 2-8 | A | A | A | A | A | A | 0.4 | A | A | A |
| Example 2-9 | A | B | A | B | A | A | 0.4 | A | A | B |
| Example 2-10 | A | A | A | A | A | A | 0.4 | A | A | A |
| Example 2-11 | A | B | A | B | A | A | 0.4 | A | A | B |
| Example 2-12 | A | A | A | A | A | A | 0.4 | A | A | A |
| Example 2-13 | A | A | A | A | A | A | 0.4 | A | A | A |
| Example 2-14 | A | A | A | A | A | A | 0.4 | A | A | A |
| Example 2-15 | A | A | A | A | A | A | 0.4 | A | A | A |
| Example 2-16 | A | B | A | B | A | A | 0.4 | A | A | B |
| Example 2-17 | A | B | A | B | A | A | 0.4 | A | A | B |
| Example 2-18 | A | A | A | A | A | A | 0.5 | A | A | A |
| Example 2-19 | A | B | A | B | A | A | 0.4 | A | A | B |
| Example 2-20 | A | B | A | B | A | A | 0.4 | A | A | B |
| Example 2-21 | A | A | A | A | B | B | 0.4 | A | A | A |
| Example 2-22 | A | A | A | A | A | A | 0.4 | A | A | A |
| Example 2-23 | A | A | A | A | B | B | 0.4 | A | A | A |
| Example 2-24 | B | C | B | C | B | B | 0.3 | C | C | C |
| Comparative Example 2-1 | C | C | C | C | C | C | 0.4 | A | C | C |
| Comparative Example 2-2 | A | A | A | A | A | A | 0.4 | A | A | A |
| Comparative Example 2-3 | A | A | A | A | A | A | 0.5 | A | A | A |

As shown in Tables 5 and 6, each of the gas barrier resin compositions of Examples 2-1 to 2-24 had superior gas barrier properties that compare favorably to the gas barrier resin composition derived from only a fossil fuel (the gas barrier resin compositions of Comparative Example 2-2 and 2-3), even though the biomass-derived raw material was partially used. Furthermore, each of the gas barrier resin compositions of Examples 2-1 to 2-24 had sufficient long-run workability, as the evaluation results on the film formation flaw and the streak(s) were A or B, with respect to the monolayer film produced after 10 hours from the start of the operation. In addition, the thermoformed container in which each gas barrier resin composition of Example 2-1 to 2-23 was used exhibited the appearance after thermoforming of A or B, even when the multilayer sheet after 10 hours from the start of the operation was used, indicating sufficient moldability being involved.

Moreover, from the results of the Examples and the Comparative Examples, with respect to the gas barrier resin composition in which the EVOH was used, specific properties were ascertained in which the long-run workability and moldability tend to be improved as the biobased content becomes lower, whereas the gas barrier properties did not depend on the biobased content. For example, each of the gas barrier resin compositions of Examples 2-1, 2-2, 2-5 to 2-23 having a biobased content of 65% or less had superior long-run workability and moldability, as the evaluation results on the film formation flaw, the streak(s), the roll edge coloring, and the appearance after thermoforming were A or B, with respect to the films produced after 10 hours and after 50 hours from the start of the operation.

Additionally, from the results of Example 2-24, it was also confirmed that in a case in which EVOHs having different melting points are not included in the gas barrier resin composition in which EVOH is used, favorable thermoformability is not expressed even if sufficient long-run workability is involved.

Example 2-25

Measurement of the sulfur compound content, and identification thereof of the gas barrier resin composition pellets obtained in the Example 2-6 were performed by a similar procedure to that employed for the determination with respect to the EVOH (A) and EVOH (B) pellets. As a result, the content of the sulfur compound was 0.3 ppm in terms of sulfur atom equivalent, and the sulfur compound was dimethyl sulfide. With respect to the Example 2-6, the thermoformed container obtained in the Evaluation Method "(8) Evaluation of thermoformed container" described above, after 30 min from the start of the operation was used to evaluate traceability. Specifically, the EVOH layer of the thermoformed container obtained was taken out as a sample for traceability. The biobased content of the resultant EVOH layer measured in accordance with the Evaluation Method (5) described above was 10%, which was identical to the value obtained from the gas barrier resin composition pellets of Example 2-6, whereby traceability of the sample was ascertained. In addition, when measurement of the sulfur compound content, and identification of the EVOH layer obtained were performed, the sulfur compound in terms of the sulfur atom equivalent was 0.3 ppm, and the sulfur compound was dimethyl sulfide, the value being identical to that obtained from the gas barrier resin composition pellets of Example 2-6, whereby traceability of the sample was ascertained.

Synthesis of EVOH
Production of Each Pellet of EVOH (A3-1) to EVOH (A3-9) and EVOH (B3-1)

EVOH (A3-2) pellets to EVOH (A3-9) pellets and EVOH (B3-1) pellets were produced in a similar manner to the EVOH (A1-1) pellets, except that each of types of ethylene and vinyl acetate, and contents of the phosphate compound and the boron compound of the raw materials (raw material monomers) was changed as shown in Table 7. As the fossil fuel-derived ethylene, ethylene manufactured by AIR LIQUIDE Kogyo Gas Ltd. was employed.

With respect to each of the EVOH (A3-1) pellets to EVOH (A3-9) pellets and EVOH (B3-1) pellets, in accordance with the Evaluation Methods (1), (3) to (5) described above, measurement of the ethylene unit content and the degree of saponification, quantitative determination of carboxylic acid, quantitative determination of the metal ion, the phosphate compound, and the boron compound, and measurement of the biobased content were performed. The results are shown in Table 7.

TABLE 7

| | Raw materials | | | EVOH pellets | | | | | | |
|---|---|---|---|---|---|---|---|---|---|---|
| | ethylene | | | ethylene | | | | | | |
| | derived from plant mass % | derived from fossil fuel mass % | vinyl acetate type (mass ratio) | unit content mol % | degree of saponification mol % | carboxylic acid content Ppm | metal ion content ppm | phosphate compound content ppm | boron compound content ppm | biobased content % |
| EVOH (A3-1) | 100 | 0 | VAM1 | 32 | >99 | 250 | 200 | 10 | 700 | 100 |
| EVOH (A3-2) | 100 | 0 | VAM2 | 32 | >99 | 250 | 200 | 10 | 700 | 100 |
| EVOH (A3-3) | 0 | 100 | VAM2 | 32 | >99 | 250 | 200 | 10 | 700 | 68 |
| EVOH (A3-4) | 50 | 50 | VAM3 | 32 | >99 | 250 | 200 | 10 | 700 | 50 |
| EVOH (A3-5) | 50 | 50 | VAM3/VAM4 (50/50) | 32 | >99 | 250 | 200 | 10 | 700 | 33 |
| EVOH (A3-6) | 30 | 70 | VAM4 | 32 | >99 | 250 | 200 | 10 | 700 | 10 |
| EVOH (A3-7) | 30 | 70 | VAM4 | 32 | >99 | 250 | 200 | 0 | 0 | 10 |
| EVOH (A3-8) | 30 | 70 | VAM4 | 32 | >99 | 250 | 200 | 10 | 0 | 10 |
| EVOH (A3-9) | 30 | 70 | VAM4 | 32 | >99 | 250 | 200 | 0 | 700 | 10 |
| EVOH (B3-1) | 0 | 100 | VAM4 | 32 | >99 | 250 | 200 | 10 | 700 | 0 |

Example 3-1

After dry blending EVOH (A3-1) pellets and EVOH (B3-1) pellets in a mass ratio of (A3-1/B3-1)10/90, and as inorganic particles, synthetic silica ("Sylysia 310P" available from Fuji Silysia Chemical Ltd.; average particle diameter as measured by a laser procedure: 2.7 μm) such that the content became 300 ppm, using a tumbler, extrusion was conducted by using a twin-screw extruder ("2D 25W" available from Toyo Seiki Seisaku-sho, Ltd., 25 mmφ, die temperature: 220° C., screw rotation speed: 100 rpm), in a nitrogen atmosphere, followed by pelletization to give gas barrier resin composition pellets of Example 3-1.

With respect to resultant gas barrier resin composition pellets of Example 3-1, in accordance with the Evaluation Methods (1), (3) to (5) described above, measurement of the ethylene unit content and the degree of saponification, quantitative determination of carboxylic acid, quantitative determination of the metal ion, the phosphate compound, and measurement of the boron compound and the biobased content were performed. The results are shown in Table 8.

The gas barrier resin composition pellets obtained were melted at 210° C., and simultaneously with extrusion onto casting rollers from the die, the air was blown at a velocity of 30 m/sec by using an air knife to give an unstretched film (monolayer) having a thickness of 170 μm. This EVOH unstretched film was brought into contact with hot water at 80° C. for 10 sec, and stretched in a 90° C. atmosphere with a Tenter-type simultaneous biaxial stretching machine by 3.2 times in a machine direction and by 3.0 times in a crosswise direction. Furthermore, a heat treatment was carried out in the tenter at a preset temperature of 170° C. for sec, and the film end was cut away to give a biaxially stretched film roll as described below.

film thickness: 12 μm
film width: 50 cm
film volume length: 4,000 m

After a lapse of 10 hours from the start of the biaxially stretched film formation, 102 biaxially stretched films were continuously collected. With respect to the biaxially stretched film thus obtained, the evaluation of the biaxially stretched film was performed in accordance with the Evaluation Method (9) described above. The results are shown in Table 9.

Of the biaxially stretched film rolls obtained, by using the first and the 102nd biaxially stretched films, vapor deposition of aluminum was conducted on one side of the film at a film travelling speed of 200 m/min with a "batchwise vapor deposition system EWA-105" available from ULVAC, Inc., followed by winding up, to give vapor deposition film rolls. With respect to the thus obtained vapor deposition films, evaluation of the vapor deposition film was performed in accordance with the Evaluation Method (10) described above. The results are shown in Table 9.

Examples 3-2 to 3-21, Comparative Examples 3-1 to 3-2

Each of gas barrier resin composition pellets, and biaxially stretched films and vapor deposition films of Examples 3-2 to 3-21 and Comparative Examples 3-1 to 3-2 were produced and evaluated in a similar manner to Example 3-1, except that each of types and mass ratios (proportions) of the EVOHs used and contents of inorganic particles was changed as shown in Table 8. The results are shown in Tables 8 and 9. It is to be noted that with respect to Example 3-21, the evaluation of the vapor deposition film was not performed.

TABLE 8

| | Gas barrier resin composition pellets | | | | | | | | | | |
|---|---|---|---|---|---|---|---|---|---|---|---|
| | EVOH (A) | | EVOH (B) | | inorganic particle content ppm | ethylene unit content mol % | degree of saponification mol % | carboxylic acid content ppm | metal ion content ppm | phosphate compound content ppm | boron compound content ppm | bio-based content % |
| | type | proportion mass % | type | proportion mass % | | | | | | | | |
| Example 3-1 | EVOH (A3-1) | 10 | EVOH (B3-1) | 90 | 300 | 32 | >99 | 220 | 200 | 10 | 700 | 10 |
| Example 3-2 | EVOH (A3-1) | 50 | EVOH (B3-1) | 50 | 300 | 32 | >99 | 220 | 200 | 10 | 700 | 50 |
| Example 3-3 | EVOH (A3-1) | 70 | EVOH (B3-1) | 30 | 300 | 32 | >99 | 220 | 200 | 10 | 700 | 70 |
| Example 3-4 | EVOH (A3-1) | 80 | EVOH (B3-1) | 20 | 300 | 32 | >99 | 220 | 200 | 10 | 700 | 80 |
| Example 3-5 | EVOH (A3-2) | 10 | EVOH (B3-1) | 90 | 300 | 32 | >99 | 220 | 200 | 10 | 700 | 10 |
| Example 3-6 | EVOH (A3-2) | 50 | EVOH (B3-1) | 50 | 300 | 32 | >99 | 220 | 200 | 10 | 700 | 50 |
| Example 3-7 | EVOH (A3-3) | 10 | EVOH (B3-1) | 90 | 300 | 32 | >99 | 220 | 200 | 10 | 700 | 7 |
| Example 3-8 | EVOH (A3-3) | 50 | EVOH (B3-1) | 50 | 300 | 32 | >99 | 220 | 200 | 10 | 700 | 34 |
| Example 3-9 | EVOH (A3-4) | 10 | EVOH (B3-1) | 90 | 300 | 32 | >99 | 220 | 200 | 10 | 700 | 5 |
| Example 3-10 | EVOH (A3-4) | 50 | EVOH (B3-1) | 50 | 300 | 32 | >99 | 220 | 200 | 10 | 700 | 25 |
| Example 3-11 | EVOH (A3-5) | 10 | EVOH (B3-1) | 90 | 300 | 32 | >99 | 220 | 200 | 10 | 700 | 3 |
| Example 3-12 | EVOH (A3-5) | 50 | EVOH (B3-1) | 50 | 300 | 32 | >99 | 220 | 200 | 10 | 700 | 17 |
| Example 3-13 | EVOH (A3-6) | 90 | EVOH (B3-1) | 10 | 300 | 32 | >99 | 220 | 200 | 10 | 700 | 9 |
| Example 3-14 | EVOH (A3-3) | 100 | — | — | 300 | 32 | >99 | 220 | 200 | 10 | 700 | 68 |
| Example 3-15 | EVOH (A3-4) | 100 | — | — | 300 | 32 | >99 | 220 | 200 | 10 | 700 | 50 |
| Example 3-16 | EVOH (A3-5) | 100 | — | — | 300 | 32 | >99 | 220 | 200 | 10 | 700 | 33 |
| Example 3-17 | EVOH (A3-6) | 100 | — | — | 300 | 32 | >99 | 220 | 200 | 10 | 700 | 10 |
| Example 3-18 | EVOH (A3-7) | 100 | — | — | 300 | 32 | >99 | 220 | 200 | 0 | 0 | 10 |
| Example 3-19 | EVOH (A3-8) | 100 | — | — | 300 | 32 | >99 | 220 | 200 | 10 | 0 | 10 |
| Example 3-20 | EVOH (A3-9) | 100 | — | — | 300 | 32 | >99 | 220 | 200 | 0 | 700 | 10 |
| Example 3-21 | EVOH (A3-1) | 10 | EVOH (B3-1) | 90 | 0 | 32 | >99 | 220 | 200 | 10 | 700 | 10 |
| Comparative Example 3-1 | EVOH (A3-1) | 100 | — | — | 300 | 32 | >99 | 220 | 200 | 10 | 700 | 100 |
| Comparative Example 3-2 | — | — | EVOH (B3-1) | 100 | 300 | 32 | >99 | 220 | 200 | 10 | 700 | 0 |

TABLE 9

| | Biaxially stretched film evaluation | | Vapor deposition film evaluation | | | | | |
|---|---|---|---|---|---|---|---|---|
| | | | average thickness of inorganic vapor deposition layer | | inhibitory property of vapor deposition flaw | | adhesion strength | |
| | film breakage resistance | oxygen transmission rate | 1st | 102nd | 1st | 102nd | 1st | 102nd |
| | evaluation — | mL/(m² · day · atm) | Nm | nm | — | — | — | — |
| Example 3-1 | A | 0.4 | 50 | 50 | A | A | A | A |
| Example 3-2 | B | 0.4 | 50 | 50 | B | C | A | B |
| Example 3-3 | C | 0.4 | 50 | 50 | D | E | B | C |
| Example 3-4 | C | 0.4 | 50 | 50 | D | E | C | C |
| Example 3-5 | A | 0.4 | 50 | 50 | A | A | A | A |
| Example 3-6 | B | 0.4 | 50 | 50 | B | C | A | B |
| Example 3-7 | A | 0.4 | 50 | 50 | A | A | A | A |
| Example 3-8 | A | 0.4 | 50 | 50 | B | B | A | A |
| Example 3-9 | A | 0.4 | 50 | 50 | A | A | A | A |
| Example 3-10 | A | 0.4 | 50 | 50 | A | B | A | A |
| Example 3-11 | A | 0.4 | 50 | 50 | A | A | A | A |
| Example 3-12 | A | 0.4 | 50 | 50 | A | B | A | A |
| Example 3-13 | A | 0.4 | 50 | 50 | A | A | A | A |
| Example 3-14 | C | 0.4 | 50 | 50 | D | E | B | C |
| Example 3-15 | B | 0.4 | 50 | 50 | B | C | A | B |
| Example 3-16 | A | 0.4 | 50 | 50 | B | B | A | A |
| Example 3-17 | A | 0.4 | 50 | 50 | A | A | A | A |
| Example 3-18 | A | 0.4 | 50 | 50 | A | A | A | A |
| Example 3-19 | A | 0.4 | 50 | 50 | A | A | A | A |
| Example 3-20 | A | 0.4 | 50 | 50 | A | A | A | A |
| Example 3-21 | E | 0.4 | — | — | — | — | — | — |
| Comparative Example 3-1 | D | 0.4 | 50 | 50 | F | F | C | D |
| Comparative Example 3-2 | A | 0.4 | 50 | 50 | A | A | A | A |

As shown in Tables 8 and 9, each of the gas barrier resin compositions of Examples 3-1 to 3-21 had, even though the biomass-derived raw material was partially used, superior gas barrier properties that compare favorably to a gas barrier resin composition derived from only a fossil fuel (the gas barrier resin composition of Comparative Example 3-2). In addition, each of the gas barrier resin compositions of Examples 3-1 to 3-20 had sufficient long-run workability, as: the film breakage resistance with respect to the biaxially stretched film produced after a lapse of 10 hours from the start of the operation; and the average thickness of the inorganic vapor deposition layer, the inhibitory property of vapor deposition flaw, and the adhesion strength of the vapor deposition film produced by using the biaxially stretched film produced after 10 hours from the start of the operation exhibited favorable results as compared with one of only the biomass-derived raw material (the gas barrier resin composition of Comparative Example 3-1).

Moreover, from the results of the Examples and the Comparative Examples, with respect to the gas barrier resin composition in which the EVOH was used, specific properties were ascertained in which the long-run workability tends to be improved as the biobased content becomes lower, whereas the gas barrier properties did not depend on the biobased content. For example, each of the gas barrier resin compositions of Examples 3-1, 3-2, 3-5 to 3-13, 3-15 to 3-20 having a biobased content of 65% or less had superior long-run workability, as the evaluation results on the film breakage resistance with respect to the biaxially stretched film produced after a lapse of 10 hours from the start of the operation, and on the inhibitory property of vapor deposition flaw and the adhesion strength of the vapor deposition film produced by using the first biaxially stretched film produced after 10 hours from the start of the operation were A or B.

Additionally, from the results of Example 3-21, it was confirmed that in the case in which inorganic particles were not included in the gas barrier resin composition in which the EVOH was used, the film breakage resistance was insufficient.

Synthesis of EVOH
Production of EVOH (A4-1) Pellets
Polymerization of Ethylene-Vinyl Acetate Copolymer Into a 250 L pressurized reactor equipped with a jacket, a stirrer, a nitrogen feed port, an ethylene feed port, and an initiator addition port, 105 kg of VAM1 and 10.1 kg of methanol (hereinafter, may be referred to as MeOH) were charged and the temperature in the reactor was elevated to 65° C., and thereafter an interior of the reactor was replaced with nitrogen by bubbling nitrogen for 30 min. Next, ethylene was introduced with pressure elevation such that the reactor pressure (ethylene pressure) became 4.13 MPa. Biomass-derived ethylene (sugarcane-derived bioethylene manufactured by Braskem S.A.) was employed as ethylene. After the temperature in the reactor was adjusted to 65° C., polymerization was started by adding, as an initiator, 13.2 g of 2,2'-azobis(2,4-dimethylvaleronitrile) ("V-65" available from Wako Pure Chemical Industries, Ltd.) in a methanol solution. During the polymerization, the ethylene pressure was maintained at 4.13 MPa, and the polymerization temperature was maintained at 65° C. Four hours later when a rate of polymerization of VAc became 50%, the polymerization was stopped by cooling. The reactor was opened to allow for elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to an ethylene-vinyl acetate copolymer.

Saponification and Washing

Into a 500 L reactor equipped with a jacket, a stirrer, a nitrogen feed port, a reflux condenser, and a solution addition port, 250 kg of a 20% by mass solution of a resulting ethylene-vinyl acetate copolymer in MeOH was charged. While nitrogen was blown into this solution, the temperature was elevated to 60° C., and 4 kg of sodium hydroxide was added in a MeOH solution prepared to have a concentration of 2 N. After completion of the addition of the sodium hydroxide, while an internal temperature of the system was maintained at 60° C., the saponification reaction was allowed to proceed, with stirring of the mixture for 2 hrs. After a lapse of 2 hours, 4 kg of sodium hydroxide was added again in a similar manner, and stirring while heating was continued for 2 hours. Subsequently, 14 kg of acetic acid was added to the mixture, whereby the saponification reaction was stopped, and 50 kg of ion exchanged water was added thereto. With heating and stirring, MeOH and water were distilled out from the reactor to concentrate the reaction liquid. After a lapse of 3 hours, 50 kg of ion exchanged water was further added to permit precipitation of the EVOH. Thus precipitated EVOH was collected by decantation, and was ground by a mixer. The EVOH powder thus obtained was charged into a 1 g/L aqueous acetic acid solution (bath ratio 20: a ratio of 10 kg of the powder with respect to 200 L of ion exchanged water) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20): washing with stirring for 2 hrs; and carrying out deliquoring. Drying of the powder at 60° C. for 16 hrs gave 25 kg of crude dry matter of the EVOH.

Production of EVOH Water-Containing Pellets 25 kg of the crude dry matter of the EVOH thus obtained was placed into a 100 L mixing vessel equipped with a jacket, a stirrer, and a reflux condenser, followed by further adding thereto 20 kg of water and 20 g of MeOH, and dissolution was allowed by elevating the temperature to 70° C. This solution was extruded into a mixed liquid of water/MeOH=90/10 in a weight ratio, which had been cooled to 5° C., through a glass tube having a diameter of 3 mm to allow for precipitation in a strand shape, and this strand was cut into a pellet shape with a strand cutter to give water-containing pellets of the EVOH. The water-containing pellets of EVOH were charged into an aqueous acetic acid solution having a concentration of 1 g/L (bath ratio 20) and washed with stirring for 2 hrs. The EVOH powder was deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20): washing with stirring for 2 hrs; and carrying out deliquoring, to give the water-containing pellets of the EVOH, with catalyst residues, which had been contained in the saponification reaction, and MeOH used in strand precipitation having been eliminated. As a result of a measurement using Halogen Moisture Analyzer "HR73" available from Mettler Toledo, the moisture content of the water-containing pellets of the EVOH obtained was 110% by mass.

Production of EVOH (A1-1) Pellets

The water-containing pellets of EVOH thus obtained were charged into an aqueous solution (bath ratio 20) containing sodium acetate, acetic acid, and phosphoric acid, and were immersed therein while periodically stirring the mixture for 4 hrs. It is to be noted that the concentration of each component was adjusted such that the content of each component in the EVOH (A4-1) pellets obtained became each value shown in Table 10. After the immersion, deliquoring followed by drying at 80° C. for 3 hours in the air, and then at 130° C. for 7.5 hours in the air gave EVOH (A4-1) pellets containing sodium acetate, acetic acid, and phosphoric acid.

Production of Each Pellet of EVOH (A4-2) to EVOH (A4-9), EVOH (B4-1) to EVOH (B4-4)

EVOH (A4-2) pellets to EVOH (A4-9) pellets and EVOH (B4-1) to EVOH (B4-4) pellets were produced in a similar manner to the EVOH (A4-1) pellets, except that each of types of ethylene and vinyl acetate, and contents of the phosphate compound and the boron compound of the raw materials (raw material monomers) was as shown in Table 10. As the fossil fuel-derived ethylene, ethylene manufactured by AIR LIQUIDE Kogyo Gas Ltd. was employed.

With respect to each of the EVOH (A4-1) pellets to the EVOH (A4-9) pellets and the EVOH (B4-1) to the EVOH (B4-4) pellets, in accordance with the Evaluation Methods (1), (3) to (5) described above, measurement of the ethylene unit content and the degree of saponification, quantitative determination of carboxylic acid, quantitative determination of the metal ion, the phosphate compound, and the boron compound, and measurement of the biobased content were performed. The results are shown in Table 10.

TABLE 10

|  | Raw materials | | | EVOH pellets | | | | | | |
|---|---|---|---|---|---|---|---|---|---|---|
|  | ethylene | | | | | | | | | |
|  | derived from plant mass % | derived from fossil fuel mass % | vinyl acetate type (mass ratio) | ethyl unit content mol % | degree of saponification mol % | carboxylic acid content ppm | metal ion content ppm | phosphate compound content ppm | boron compound content ppm | biobased content % |
| EVOH (A4-1) | 100 | 0 | VAM1 | 32 | >99 | 250 | 200 | 10 | 0 | 100 |
| EVOH (A4-2) | 100 | 0 | VAM2 | 32 | >99 | 250 | 200 | 10 | 0 | 100 |
| EVOH (A4-3) | 0 | 100 | VAM2 | 32 | >99 | 250 | 200 | 10 | 0 | 68 |
| EVOH (A4-4) | 50 | 50 | VAM3 | 32 | >99 | 250 | 200 | 10 | 0 | 50 |

TABLE 10-continued

| | Raw materials | | | EVOH pellets | | | | | | |
|---|---|---|---|---|---|---|---|---|---|---|
| | ethylene | | | | | | | | | |
| | derived from plant mass % | derived from fossil fuel mass % | vinyl acetate type (mass ratio) | ethyl unit content mol % | degree of saponification mol % | carboxylic acid content ppm | metal ion content ppm | phosphate compound content ppm | boron compound content ppm | biobased content % |
| EVOH (A4-5) | 50 | 50 | VAM3/VAM4 (50/50) | 32 | >99 | 250 | 200 | 10 | 0 | 33 |
| EVOH (A4-6) | 30 | 70 | VAM4 | 32 | >99 | 250 | 200 | 10 | 0 | 10 |
| EVOH (A4-7) | 30 | 70 | VAM4 | 32 | >99 | 250 | 200 | 0 | 0 | 10 |
| EVOH (A4-8) | 30 | 70 | VAM4 | 32 | >99 | 250 | 200 | 10 | 700 | 10 |
| EVOH (A4-9) | 30 | 70 | VAM4 | 32 | >99 | 250 | 200 | 0 | 700 | 10 |
| EVOH (B4-1) | 0 | 100 | VAM4 | 32 | >99 | 250 | 200 | 10 | 0 | 0 |
| EVOH (B4-2) | 0 | 100 | VAM4 | 32 | >99 | 250 | 200 | 0 | 0 | 0 |
| EVOH (B4-3) | 0 | 100 | VAM4 | 32 | >99 | 250 | 200 | 10 | 700 | 0 |
| EVOH (B4-4) | 0 | 100 | VAM4 | 32 | >99 | 250 | 200 | 0 | 700 | 0 |

Example 4-1

After dry blending 10 parts by mass of the EVOH (A4-1) pellets and 90 parts by mass of the EVOH (B4-1) pellets, and as an antioxidant (D), 0.5 parts by mass of N,N'-(hexane-1,6-diyl)bis[3-(3,5-di-tert-butyl-4-hydroxyphenyl)propionamide] ("Irganox 1098", manufactured by Basf Japan Ltd., molecular weight: 637), extrusion was conducted by using a twin-screw extruder ("2D 25W" available from Toyo Seiki Seisaku-sho, Ltd., 25 mmφ, die temperature: 220° C., screw rotation speed: 100 rpm), in a nitrogen atmosphere, followed by pelletization to give gas barrier resin composition pellets of Example 4-1.

With respect to resultant gas barrier resin composition pellets of Example 4-1, in accordance with the Evaluation Methods (1), (3) to (7), (11), (12) described above, measurement of the ethylene unit content and the degree of saponification, quantitative determination of carboxylic acid, quantitative determination of the metal ion, the phosphate compound, and the boron compound, measurement or evaluation of the biobased content, the long-run workability, the oxygen transmission rate, the oxidative degradation resistance of the monolayer film, and the multilayer pipe were performed. The results are shown in Tables 11 and 12.

Examples 4-2 to 4-21, Comparative Examples 4-1 to 4-5

Each of gas barrier resin composition pellets of Examples 4-2 to 4-21 and Comparative Examples 4-1 to 4-5 was produced and evaluated in a similar manner to Example 4-1, except that each of types and mass ratios (proportions) of the EVOHs employed, and the contents of the antioxidants (D) was changed as shown in Table 11. The results are shown in Tables 11 and 12.

TABLE 11

| | Gas barrier resin composition pellets | | | | | | | | | | | | |
|---|---|---|---|---|---|---|---|---|---|---|---|---|---|
| | EVOH (A) | | EVOH (B) | | antioxidant (D) | | ethylene unit content mol % | degree of saponification mol % | carboxylic acid content ppm | metal ion content ppm | phosphate compound content ppm | boron compound content ppm | biobased content % |
| | type | proportion parts by mass | type | proportion parts by mass | type | blending quantity parts by mass | | | | | | | |
| Example 4-1 | EVOH (A4-1) | 10 | EVOH (B4-1) | 90 | Irganox 1098 | 0.5 | 32 | >99 | 220 | 200 | 10 | 0 | 10 |
| Example 4-2 | EVOH (A4-1) | 50 | EVOH (B4-1) | 50 | Irganox 1098 | 0.5 | 32 | >99 | 220 | 200 | 10 | 0 | 50 |
| Example 4-3 | EVOH (A4-1) | 70 | EVOH (B4-1) | 30 | Irganox 1098 | 0.5 | 32 | >99 | 220 | 200 | 10 | 0 | 70 |
| Example 4-4 | EVOH (A4-1) | 80 | EVOH (B4-1) | 20 | Irganox 1098 | 0.5 | 32 | >99 | 220 | 200 | 10 | 0 | 80 |
| Example 4-5 | EVOH (A4-2) | 10 | EVOH (B4-1) | 90 | Irganox 1098 | 0.5 | 32 | >99 | 220 | 200 | 10 | 0 | 10 |
| Example 4-6 | EVOH (A4-2) | 50 | EVOH (B4-1) | 50 | Irganox 1098 | 0.5 | 32 | >99 | 220 | 200 | 10 | 0 | 50 |
| Example 4-7 | EVOH (A4-3) | 10 | EVOH (B4-1) | 90 | Irganox 1098 | 0.5 | 32 | >99 | 220 | 200 | 10 | 0 | 7 |

TABLE 11-continued

| | Gas barrier resin composition pellets | | | | | | | | | | | |
|---|---|---|---|---|---|---|---|---|---|---|---|---|
| | EVOH (A) | | EVOH (B) | | antioxidant (D) | | ethylene unit content mol % | degree of saponification mol % | carboxylic acid content ppm | metal ion content ppm | phosphate compound content ppm | boron compound content ppm | bio-based content % |
| | type | proportion parts by mass | type | proportion parts by mass | type | blending quantity parts by mass | | | | | | | |
| Example 4-8 | EVOH (A4-3) | 50 | EVOH (B4-1) | 50 | Irganox 1098 | 0.5 | 32 | >99 | 220 | 200 | 10 | 0 | 34 |
| Example 4-9 | EVOH (A4-4) | 10 | EVOH (B4-1) | 90 | Irganox 1098 | 0.5 | 32 | >99 | 220 | 200 | 10 | 0 | 5 |
| Example 4-10 | EVOH (A4-4) | 50 | EVOH (B4-1) | 50 | Irganox 1098 | 0.5 | 32 | >99 | 220 | 200 | 10 | 0 | 25 |
| Example 4-11 | EVOH (A4-5) | 10 | EVOH (B4-1) | 90 | Irganox 1098 | 0.5 | 32 | >99 | 220 | 200 | 10 | 0 | 3 |
| Example 4-12 | EVOH (A4-5) | 50 | EVOH (B4-1) | 50 | Irganox 1098 | 0.5 | 32 | >99 | 220 | 200 | 10 | 0 | 17 |
| Example 4-13 | EVOH (A4-6) | 90 | EVOH (B4-1) | 10 | Irganox 1098 | 0.5 | 32 | >99 | 220 | 200 | 10 | 0 | 9 |
| Example 4-14 | EVOH (A4-3) | 100 | — | — | Irganox 1098 | 0.5 | 32 | >99 | 220 | 200 | 10 | 0 | 68 |
| Example 4-15 | EVOH (A4-4) | 100 | — | — | Irganox 1098 | 0.5 | 32 | >99 | 220 | 200 | 10 | 0 | 50 |
| Example 4-16 | EVOH (A4-5) | 100 | — | — | Irganox 1098 | 0.5 | 32 | >99 | 220 | 200 | 10 | 0 | 33 |
| Example 4-17 | EVOH (A4-6) | 100 | — | — | Irganox 1098 | 0.5 | 32 | >99 | 220 | 200 | 10 | 0 | 10 |
| Example 4-18 | EVOH (A4-7) | 100 | — | — | Irganox 1098 | 0.5 | 32 | >99 | 220 | 200 | 0 | 0 | 10 |
| Example 4-19 | EVOH (A4-8) | 100 | — | — | Irganox 1098 | 0.5 | 32 | >99 | 220 | 200 | 10 | 700 | 10 |
| Example 4-20 | EVOH (A4-9) | 100 | — | — | Irganox 1098 | 0.5 | 32 | >99 | 220 | 200 | 0 | 700 | 10 |
| Example 4-21 | EVOH (A4-1) | 10 | EVOH (B4-1) | 90 | — | — | 32 | >99 | 220 | 200 | 10 | 0 | 10 |
| Comparative Example 4-1 | EVOH (A4-1) | 100 | — | — | Irganox 1098 | 0.5 | 32 | >99 | 220 | 200 | 10 | 0 | 100 |
| Comparative Example 4-2 | — | — | EVOH (B4-1) | 100 | Irganox 1098 | 0.5 | 32 | >99 | 220 | 200 | 10 | 0 | 0 |
| Comparative Example 4-3 | — | — | EVOH (B4-2) | 100 | Irganox 1098 | 0.5 | 32 | >99 | 220 | 200 | 0 | 0 | 0 |
| Comparative Example 4-4 | — | — | EVOH (B4-3) | 100 | Irganox 1098 | 0.5 | 32 | >99 | 220 | 200 | 10 | 700 | 0 |
| Comparative Example 4-5 | — | — | EVOH (B4-4) | 100 | Irganox 1098 | 0.5 | 32 | >99 | 220 | 200 | 0 | 700 | 0 |

TABLE 12

| | Monolayer film evaluation | | | | | | | | Multilayer pipe evaluation | |
|---|---|---|---|---|---|---|---|---|---|---|
| | film formation flaw | | streak | | roll edge coloring | | oxygen transmission rate mL/(m² · day · atm) | oxidative degradation resistance hr | streak | |
| | after 10 hours | after 50 hours | after 10 hours | after 50 hours | after 10 hours | after 50 hours | | | after 10 hours | after 50 hours |
| Example 4-1 | A | A | A | A | A | A | 0.3 | 280 | A | A |
| Example 4-2 | B | B | B | B | B | B | 0.3 | 270 | B | B |
| Example 4-3 | B | C | B | C | B | B | 0.3 | 270 | B | C |
| Example 4-4 | B | C | B | C | C | C | 0.3 | 260 | B | C |
| Example 4-5 | A | A | A | A | A | A | 0.3 | 280 | A | A |
| Example 4-6 | B | B | B | B | B | B | 0.3 | 270 | B | B |
| Example 4-7 | A | A | A | A | A | A | 0.3 | 280 | A | A |
| Example 4-8 | A | B | A | B | A | B | 0.3 | 280 | A | B |
| Example 4-9 | A | A | A | A | A | A | 0.3 | 280 | A | A |
| Example 4-10 | A | B | A | B | A | A | 0.3 | 280 | A | B |
| Example 4-11 | A | A | A | A | A | A | 0.3 | 280 | A | A |

TABLE 12-continued

| | Monolayer film evaluation | | | | | | | | Multilayer pipe evaluation | |
|---|---|---|---|---|---|---|---|---|---|---|
| | film formation flaw | | streak | | roll edge coloring | | oxygen transmission | oxidative | streak | |
| | after | after | after | after | after | after | rate | degradation | after 10 | after 50 |
| | 10 hours | 50 hours | 10 hours | 50 hours | 10 hours | 50 hours | mL/(m² · day · atm) | resistance hr | hours | hours |
| Example 4-12 | A | B | A | A | A | A | 0.3 | 280 | A | A |
| Example 4-13 | A | A | A | A | A | A | 0.3 | 280 | A | A |
| Example 4-14 | B | C | B | C | B | B | 0.3 | 270 | B | C |
| Example 4-15 | B | B | B | B | B | B | 0.3 | 270 | B | B |
| Example 4-16 | A | B | A | B | A | B | 0.3 | 280 | A | B |
| Example 4-17 | A | A | A | A | A | A | 0.3 | 280 | A | A |
| Example 4-18 | A | A | A | A | B | B | 0.3 | 280 | A | A |
| Example 4-19 | A | A | A | A | A | A | 0.3 | 120 | A | A |
| Example 4-20 | A | A | A | A | B | B | 0.3 | 120 | A | A |
| Example 4-21 | A | A | A | A | A | A | 0.3 | 45 | A | A |
| Comparative Example 4-1 | C | C | C | C | C | C | 0.3 | 260 | C | C |
| Comparative Example 4-2 | A | A | A | A | A | A | 0.3 | 280 | A | A |
| Comparative Example 4-3 | A | A | A | A | B | B | 0.3 | 280 | A | A |
| Comparative Example 4-4 | A | A | A | A | A | A | 0.3 | 120 | A | A |
| Comparative Example 4-5 | A | A | A | A | B | B | 0.3 | 120 | A | A |

As shown in Tables 11 and 12, each of the gas barrier resin compositions of Examples 4-1 to 4-21 had, even though the biomass-derived raw material was partially used, superior gas barrier properties that compare favorably to a gas barrier resin composition derived from only a fossil fuel (the gas barrier resin composition of Comparative Example 4-2, etc.). In addition, each of the gas barrier resin compositions of Examples 4-1 to 4-21 had sufficient long-run workability, as the evaluation results on the film formation flaw and the streak with respect to the film produced after 10 hours from the start of the operation, and the evaluation results on the streak with respect to the multilayer pipe produced after 10 hours from the start of the operation were A or B.

Moreover, from the results of the Examples and the Comparative Examples, with respect to the gas barrier resin composition in which the EVOH was used, specific properties were ascertained in which the long-run workability tends to be improved as the biobased content becomes lower, whereas the gas barrier properties did not depend on the biobased content. For example, each of the gas barrier resin compositions of Examples 4-1, 4-2, 4-5 to 4-13, 4-15 to 4-21 having a biobased content of 65% or less had superior long-run workability, as the evaluation results on the film formation flaw, the streak, and the roll edge coloring with respect to the films produced after 10 hours and after 50 hours from the start of the operation were A or B.

Furthermore, from the results of Example 4-1 and Example 4-21, it was recognized that the antioxidant contained in the gas barrier resin composition contributes to an improvement of oxidative degradation resistance.

Synthesis of EVOH
Production of EVOH (A5-1) Pellets
Polymerization of Ethylene-Vinyl Acetate Copolymer Into a 250 L pressurized reactor equipped with a jacket, a stirrer, a nitrogen feed port, an ethylene feed port, and an initiator addition port, 105 kg of VAM1 and 45.7 kg of methanol (hereinafter, may be referred to as MeOH) were charged and the temperature in the reactor was elevated to 60° C., and thereafter an interior of the reactor was replaced with nitrogen by bubbling nitrogen for 30 min. Next, ethylene was introduced with pressure elevation such that the reactor pressure (ethylene pressure) became 2.87 MPa. Biomass-derived ethylene (sugarcane-derived bioethylene manufactured by Braskem S.A.) was employed as ethylene. After the temperature in the reactor was adjusted to 60° C., polymerization was started by adding, as an initiator, 34.7 g of 2,2'-azobis(2,4-dimethylvaleronitrile) ("V-65" available from Wako Pure Chemical Industries, Ltd.) in a methanol solution. During the polymerization, the ethylene pressure was maintained at 2.87 MPa, and the polymerization temperature was maintained at 60° C. Three hours later when a rate of polymerization of VAc became 45%, the polymerization was stopped by cooling. The reactor was opened to allow for elimination of ethylene, and thereafter the nitrogen gas was bubbled to complete the elimination of ethylene. Subsequently, after unreacted VAc was eliminated under a reduced pressure, a 20% by mass solution in MeOH was prepared by adding MeOH to an ethylene-vinyl acetate copolymer.

Saponification and Washing

Into a 500 L reactor equipped with a jacket, a stirrer, a nitrogen feed port, a reflux condenser, and a solution addition port, 250 kg of a 20% by mass solution of a resulting ethylene-vinyl acetate copolymer in MeOH was charged. While nitrogen was blown into this solution, the temperature was elevated to 60° C., and 4 kg of sodium hydroxide was added in a MeOH solution prepared to have a concentration of 2 N. After completion of the addition of the sodium hydroxide, while an internal temperature of the system was maintained at 60° C., the saponification reaction was allowed to proceed, with stirring of the mixture for 2 hrs. After a lapse of 2 hours, 4 kg of sodium hydroxide was added again in a similar manner, and stirring while heating was continued for 2 hours. Subsequently, 14 kg of acetic acid was added to the mixture, whereby the saponification reaction was stopped, and 50 kg of ion exchanged water was added thereto. With heating and stirring, MeOH and water were distilled out from the reactor to concentrate the reaction liquid. After a lapse of 3 hours, 50 kg of ion exchanged water was further added to permit precipitation of the EVOH. Thus precipitated EVOH was collected by decantation, and was ground by a mixer. The EVOH powder thus obtained was charged into a 1 g/L aqueous acetic acid solution (bath ratio 20: a ratio of 10 kg of the powder with respect to 200 L of ion exchanged water) and washed with stirring for 2 hrs. The EVOH powder was deliquored and further, charged into a 1 g/L aqueous acetic acid solution (bath ratio 20) and washed with stirring for 2 hrs. Purification was conducted by repeating three times, an operation of: charging the EVOH powder into ion exchanged water (bath ratio 20): washing with stirring for 2 hrs; and carrying out deliquoring. Drying of the powder at 60° C. for 16 hrs gave 25 kg of crude dry matter of the EVOH.

Production of EVOH Water-Containing Pellets 25 kg of the crude dry matter of the EVOH thus obtained was placed into a 100 L mixing vessel equipped with a jacket, a stirrer, and a reflux condenser, followed by further adding thereto 20 kg of water and 20 g of MeOH, and dissolution was allowed by elevating the temperature to 70° C. This solution was extruded into a mixed liquid of water/MeOH=90/10 in a weight ratio, which had been cooled to 5° C., through a glass tube having a diameter of 3 mm to allow for precipitation in a strand shape, and this strand was cut into a pellet shape with a strand cutter to give water-containing pellets of the EVOH. The water-containing pellets of EVOH were charged into an aqueous acetic acid solution having a concentration of 1 g/L (bath ratio 20) and washed with stirring for 2 hrs. The EVOH powder was deliquored and further, charged into a 1 g/L aqueous acetic acid solution (bath ratio 20) and washed with stirring for 2 hrs. After deliquoring, the aqueous acetic acid solution was renewed and a similar operation was conducted. After washing with an aqueous acetic acid solution and then deliquoring, purification was conducted by repeating three times, an operation of: charging the water-containing pellets into ion exchanged water (bath ratio 20): washing with stirring for 2 hrs; and carrying out deliquoring, to give the water-containing pellets of the EVOH, with catalyst residues, which had been contained in the saponification reaction, and MeOH used in strand precipitation having been eliminated. As a result of a measurement using Halogen Moisture Analyzer "HR73" available from Mettler Toledo, the moisture content of the water-containing pellets of the EVOH obtained was 110% by mass.

Production of (EVOH (A5-1) Pellets

The water-containing pellets of EVOH thus obtained were charged into an aqueous solution (bath ratio 20) containing sodium acetate, acetic acid, phosphoric acid, and boric acid, and were immersed therein while periodically stirring the mixture for 4 hrs. It is to be noted that the concentration of each component was adjusted such that the content of each component in the EVOH (A5-1) pellets obtained became each value shown in Table 13. After the immersion, deliquoring followed by drying at 80° C. for 3 hours in the air, and then at 130° C. for 7.5 hours in the air gave EVOH (A5-1) pellets containing sodium acetate, acetic acid, phosphoric acid, and boric acid.

Production of Each Pellet of EVOH (A5-2) to EVOH (A5-9), EVOH (B5-1) to EVOH (B5-4)

EVOH (A5-2) pellets to EVOH (A5-9) pellets and EVOH (B5-1) to EVOH (B5-4) pellets were produced in a similar manner to the EVOH (A5-1) pellets, except that each of types of ethylene and vinyl acetate, and contents of the phosphate compound and the boron compound of the raw materials (raw material monomers) was as shown in Table 13. As the fossil fuel-derived ethylene, ethylene manufactured by AIR LIQUIDE Kogyo Gas Ltd. was employed.

With respect to each of the EVOH (A5-1) pellets to the EVOH (A5-9) pellets and the EVOH (B5-1) to the EVOH (B5-4) pellets, in accordance with the Evaluation Methods (1), (3) to (5) described above, measurement of the ethylene unit content and the degree of saponification, quantitative determination of carboxylic acid, quantitative determination of the metal ion, the phosphate compound, and the boron compound, and measurement of the biobased content were performed. The results are shown in Table 13.

TABLE 13

| | Raw materials | | | EVOH pellets | | | | | | |
|---|---|---|---|---|---|---|---|---|---|---|
| | ethylene | | | ethylene | degree | | | phosphate | boron | |
| | derived from plant mass % | derived from fossil fuel mass % | vinyl acetate type (mass ratio) | unit content mol % | of saponification mol % | carboxylic acid content ppm | metal ion content ppm | compound content ppm | compound content ppm | biobased content % |
| EVOH (A5-1) | 100 | 0 | VAM1 | 27 | >99 | 250 | 200 | 10 | 700 | 100 |
| EVOH (A5-2) | 100 | 0 | VAM2 | 27 | >99 | 250 | 200 | 10 | 700 | 100 |
| EVOH (A5-3) | 0 | 100 | VAM2 | 27 | >99 | 250 | 200 | 10 | 700 | 68 |
| EVOH (A5-4) | 50 | 50 | VAM3 | 27 | >99 | 250 | 200 | 10 | 700 | 50 |

TABLE 13-continued

| | Raw materials | | | EVOH pellets | | | | | | |
|---|---|---|---|---|---|---|---|---|---|---|
| | ethylene | | | ethylene | degree | | | phosphate | boron | |
| | derived from plant mass % | derived from fossil fuel mass % | vinyl acetate type (mass ratio) | unit content mol % | of saponification mol % | carboxylic acid content ppm | metal ion content ppm | compound content ppm | compound content ppm | biobased content % |
| EVOH (A5-5) | 50 | 50 | VAM3/VAM4 (50/50) | 27 | >99 | 250 | 200 | 10 | 700 | 33 |
| EVOH (A5-6) | 30 | 70 | VAM4 | 27 | >99 | 250 | 200 | 10 | 700 | 10 |
| EVOH (A5-7) | 30 | 70 | VAM4 | 27 | >99 | 250 | 200 | 0 | 0 | 10 |
| EVOH (A5-8) | 30 | 70 | VAM4 | 27 | >99 | 250 | 200 | 10 | 0 | 10 |
| EVOH (A5-9) | 30 | 70 | VAM4 | 27 | >99 | 250 | 200 | 0 | 700 | 10 |
| EVOH (B5-1) | 0 | 100 | VAM4 | 27 | >99 | 250 | 200 | 10 | 700 | 0 |
| EVOH (B5-2) | 0 | 100 | VAM4 | 27 | >99 | 250 | 200 | 0 | 0 | 0 |
| EVOH (B5-3) | 0 | 100 | VAM4 | 27 | >99 | 250 | 200 | 10 | 0 | 0 |
| EVOH (B5-4) | 0 | 100 | VAM4 | 27 | >99 | 250 | 200 | 0 | 700 | 0 |

Example 5-1

After dry blending by adding 9 parts by mass of the EVOH (A5-1) pellets, 81 parts by mass of the EVOH (B5-1) pellets, 10 parts by mass of polyamide pellets ("Ny 1018A" manufactured by Ube Industries, Ltd. (nylon 6)) (E), and as a compound including a metal atom (F), 100 ppm magnesium acetate in terms of the metal atom equivalent, extrusion was conducted by using a twin-screw extruder ("2D 25W" available from Toyo Seiki Seisaku-sho, Ltd., 25 mmφ, die temperature: 230° C., screw rotation speed: 100 rpm) in a nitrogen atmosphere, followed by pelletization to give gas barrier resin composition pellets of Example 5-1.

With respect to resultant gas barrier resin composition pellets of Example 5-1, in accordance with the Evaluation Methods (1), (3) to (5), (13) to (15) described above, measurement of the ethylene unit content and the degree of saponification, quantitative determination of carboxylic acid, quantitative determination of the metal ion, the phosphate compound, and the boron compound, measurement or evaluation of the biobased content, the long-run workability, the oxygen transmission rate, and the retort resistance were performed. It is to be noted that in regard to the quantitative determination of the metal ion, a metal atom equivalent, i.e., an amount converted to metal atoms, of the metal ion including the amount of the metal atom added as the metal atom (F) was determined. The results are shown in Tables 14 and 15.

Examples 5-2 to 5-27, Comparative Examples 5-1 to 5-8

Each of gas barrier resin composition pellets of Examples 5-2 to 5-27 and Comparative Examples 5-1 to 5-8 was produced and evaluated in a similar manner to Example 5-1, except that each of types and mass ratios (proportions) of the EVOHs employed, mass ratios of polyamides (E), and types and contents in terms of the metal atom equivalent of the compound including the metal atom (F) was changed as shown in Table 14. The results are shown in Tables 14 and 15.

TABLE 14

| | Gas barrier resin composition pellets | | | | | | |
|---|---|---|---|---|---|---|---|
| | EVOH (A) | | EVOH (B) | | polyamide (E) | metal atom (F) | |
| | type | proportion mass % | type | proportion mass % | proportion mass % | type | content ppm |
| Example 5-1 | EVOH (A5-1) | 9 | EVOH (B5-1) | 81 | 10 | Mg acetate | 100 |
| Example 5-2 | EVOH (A5-1) | 45 | EVOH (B5-1) | 45 | 10 | Mg acetate | 100 |
| Example 5-3 | EVOH (A5-1) | 63 | EVOH (B5-1) | 27 | 10 | Mg acetate | 100 |
| Example 5-4 | EVOH (A5-1) | 72 | EVOH (B5-1) | 18 | 10 | Mg acetate | 100 |
| Example 5-5 | EVOH (A5-2) | 9 | EVOH (B5-1) | 81 | 10 | Mg acetate | 100 |
| Example 5-6 | EVOH (A5-2) | 45 | EVOH (B5-1) | 45 | 10 | Mg acetate | 100 |

TABLE 14-continued

| | | | | | | | |
|---|---|---|---|---|---|---|---|
| Example 5-7 | EVOH (A5-3) | 9 | EVOH (B5-1) | 81 | 10 | Mg acetate | 100 |
| Example 5-8 | EVOH (A5-3) | 45 | EVOH (B5-1) | 45 | 10 | Mg acetate | 100 |
| Example 5-9 | EVOH (A5-4) | 9 | EVOH (B5-1) | 81 | 10 | Mg acetate | 100 |
| Example 5-10 | EVOH (A5-4) | 45 | EVOH (B5-1) | 45 | 10 | Mg acetate | 100 |
| Example 5-11 | EVOH (A5-5) | 9 | EVOH (B5-1) | 81 | 10 | Mg acetate | 100 |
| Example 5-12 | EVOH (A5-5) | 45 | EVOH (B5-1) | 45 | 10 | Mg acetate | 100 |
| Example 5-13 | EVOH (A5-6) | 81 | EVOH (B5-1) | 9 | 10 | Mg acetate | 100 |
| Example 5-14 | EVOH (A5-3) | 90 | — | — | 10 | Mg acetate | 100 |
| Example 5-15 | EVOH (A5-4) | 90 | — | — | 10 | Mg acetate | 100 |
| Example 5-16 | EVOH (A5-5) | 90 | — | — | 10 | Mg acetate | 100 |
| Example 5-17 | EVOH (A5-6) | 90 | — | — | 10 | Mg acetate | 100 |
| Example 5-18 | EVOH (A5-6) | 90 | — | — | 10 | Mg acetate | 40 |
| Example 5-19 | EVOH (A5-6) | 90 | — | — | 10 | Mg acetate | 180 |
| Example 5-20 | EVOH (A5-6) | 90 | — | — | 10 | Ca stearate | 100 |
| Example 5-21 | EVOH (A5-6) | 90 | — | — | 10 | Zn stearate | 100 |
| Example 5-22 | EVOH (A5-6) | 85 | — | — | 10 | Mg hydroxide | 100 |
| Example 5-23 | EVOH (A5-6) | 85 | — | — | 15 | Mg hydroxide | 125 |
| Example 5-24 | EVOH (A5-6) | 80 | — | — | 20 | Mg hydroxide | 200 |
| Example 5-25 | EVOH (A5-7) | 90 | — | — | 10 | Mg acetate | 100 |
| Example 5-26 | EVOH (A5-8) | 90 | — | — | 10 | Mg acetate | 100 |
| Example 5-27 | EVOH (A5-9) | 90 | — | — | 10 | Mg acetate | 100 |
| Comparative Example 5-1 | EVOH (A5-1) | 90 | — | — | 10 | Mg acetate | 100 |
| Comparative Example 5-2 | — | — | EVOH (B5-1) | 90 | 10 | Mg acetate | 100 |
| Comparative Example 5-3 | — | — | EVOH (B5-1) | 90 | 10 | — | — |
| Comparative Example 5-4 | — | — | EVOH (B5-1) | 100 | — | Mg acetate | 100 |
| Comparative Example 5-5 | — | — | EVOH (B5-2) | 100 | — | — | — |
| Comparative Example 5-6 | — | — | EVOH (B5-2) | 90 | 10 | Mg acetate | 100 |
| Comparative Example 5-7 | — | — | EVOH (B5-3) | 90 | 10 | Mg acetate | 100 |
| Comparative Example 5-8 | — | — | EVOH (B5-4) | 90 | 10 | Mg acetate | 100 |

| | Gas barrier resin composition pellets | | | | | |
|---|---|---|---|---|---|---|
| | ethylene unit content mol % | degree of saponification mol % | carboxylic acid content ppm | metal ion content ppm | phosphate compound content ppm | boron compound content ppm | biobased content % |
| Example 5-1 | 27 | >99 | 190 | 270 | 9 | 630 | 9 |
| Example 5-2 | 27 | >99 | 190 | 270 | 9 | 630 | 45 |
| Example 5-3 | 27 | >99 | 190 | 270 | 9 | 630 | 63 |
| Example 5-4 | 27 | >99 | 190 | 270 | 9 | 630 | 72 |
| Example 5-5 | 27 | >99 | 190 | 270 | 9 | 630 | 9 |
| Example 5-6 | 27 | >99 | 190 | 270 | 9 | 630 | 45 |
| Example 5-7 | 27 | >99 | 190 | 270 | 9 | 630 | 6 |
| Example 5-8 | 27 | >99 | 190 | 270 | 9 | 630 | 30 |
| Example 5-9 | 27 | >99 | 190 | 270 | 9 | 630 | 4 |
| Example 5-10 | 27 | >99 | 190 | 270 | 9 | 630 | 22 |
| Example 5-11 | 27 | >99 | 190 | 270 | 9 | 630 | 3 |
| Example 5-12 | 27 | >99 | 190 | 270 | 9 | 630 | 15 |
| Example 5-13 | 27 | >99 | 190 | 270 | 9 | 630 | 8 |
| Example 5-14 | 27 | >99 | 190 | 270 | 9 | 630 | 61 |

TABLE 14-continued

| | | | | | | | |
|---|---|---|---|---|---|---|---|
| Example 5-15 | 27 | >99 | 190 | 270 | 9 | 630 | 45 |
| Example 5-16 | 27 | >99 | 190 | 270 | 9 | 630 | 30 |
| Example 5-17 | 27 | >99 | 190 | 270 | 9 | 630 | 9 |
| Example 5-18 | 27 | >99 | 190 | 215 | 9 | 630 | 9 |
| Example 5-19 | 27 | >99 | 190 | 340 | 9 | 630 | 9 |
| Example 5-20 | 27 | >99 | 190 | 270 | 9 | 630 | 9 |
| Example 5-21 | 27 | >99 | 190 | 270 | 9 | 630 | 9 |
| Example 5-22 | 27 | >99 | 190 | 270 | 9 | 630 | 9 |
| Example 5-23 | 27 | >99 | 180 | 275 | 9 | 600 | 8 |
| Example 5-24 | 27 | >99 | 170 | 320 | 8 | 560 | 8 |
| Example 5-25 | 27 | >99 | 190 | 270 | 0 | 0 | 9 |
| Example 5-26 | 27 | >99 | 190 | 270 | 9 | 0 | 9 |
| Example 5-27 | 27 | >99 | 190 | 270 | 0 | 630 | 9 |
| Comparative Example 5-1 | 27 | >99 | 190 | 270 | 9 | 630 | 90 |
| Comparative Example 5-2 | 27 | >99 | 190 | 270 | 9 | 630 | 0 |
| Comparative Example 5-3 | 27 | >99 | 190 | 180 | 9 | 630 | 0 |
| Comparative Example 5-4 | 27 | >99 | 220 | 300 | 10 | 700 | 0 |
| Comparative Example 5-5 | 27 | >99 | 220 | 200 | 10 | 700 | 0 |
| Comparative Example 5-6 | 27 | >99 | 190 | 270 | 0 | 0 | 0 |
| Comparative Example 5-7 | 27 | >99 | 190 | 270 | 9 | 0 | 0 |
| Comparative Example 5-8 | 27 | >99 | 190 | 270 | 0 | 630 | 0 |

TABLE 15

| | Evaluation | | | | | | | |
|---|---|---|---|---|---|---|---|---|
| | film formation flaw | | streak | | roll edge coloring | | retort resistance | oxygen transmission rate mL/(m$^2$ · day · atm) |
| | after 1 hour | after 5 hours | after 1 hour | after 5 hours | after 1 hour | after 5 hours | | |
| Example 5-1 | A | A | A | A | A | B | A | 0.4 |
| Example 5-2 | B | B | B | B | B | C | A | 0.4 |
| Example 5-3 | B | B | B | B | C | C | A | 0.4 |
| Example 5-4 | B | C | B | C | C | C | A | 0.4 |
| Example 5-5 | A | A | A | A | A | B | A | 0.4 |
| Example 5-6 | B | B | B | B | B | C | A | 0.4 |
| Example 5-7 | A | A | A | A | A | B | A | 0.4 |
| Example 5-8 | A | B | A | B | B | B | A | 0.4 |
| Example 5-9 | A | A | A | A | A | B | A | 0.4 |
| Example 5-10 | A | B | A | B | B | B | A | 0.4 |
| Example 5-11 | A | A | A | A | A | B | A | 0.4 |
| Example 5-12 | A | A | A | A | B | B | A | 0.4 |
| Example 5-13 | A | A | A | A | A | B | A | 0.4 |
| Example 5-14 | B | B | B | B | C | C | A | 0.4 |
| Example 5-15 | B | B | B | B | B | C | A | 0.4 |
| Example 5-16 | A | B | A | B | B | B | A | 0.4 |
| Example 5-17 | A | A | A | A | A | B | A | 0.4 |
| Example 5-18 | A | B | A | B | A | A | A | 0.4 |
| Example 5-19 | A | A | A | A | B | B | A | 0.4 |
| Example 5-20 | A | B | A | A | A | B | A | 0.4 |
| Example 5-21 | A | B | A | A | A | B | A | 0.4 |
| Example 5-22 | A | A | A | A | A | B | A | 0.4 |
| Example 5-23 | A | A | A | A | B | C | A | 0.5 |
| Example 5-24 | A | B | A | B | C | C | A | 0.6 |
| Example 5-25 | A | A | A | A | B | B | A | 0.4 |
| Example 5-26 | A | A | A | A | A | B | A | 0.4 |
| Example 5-27 | A | A | A | A | B | B | A | 0.4 |
| Comparative Example 5-1 | C | C | C | C | C | C | A | 0.4 |
| Comparative Example 5-2 | A | A | A | A | A | B | A | 0.4 |
| Comparative Example 5-3 | C | C | C | C | A | B | A | 0.4 |
| Comparative Example 5-4 | A | A | A | A | A | A | B | 0.2 |

TABLE 15-continued

| | Evaluation | | | | | | | |
|---|---|---|---|---|---|---|---|---|
| | film formation flaw | | streak | | roll edge coloring | | | oxygen transmission |
| | after 1 hour | after 5 hours | after 1 hour | after 5 hours | after 1 hour | after 5 hours | retort resistance | rate mL/(m² · day · atm) |
| Comparative Example 5-5 | A | A | A | A | A | A | B | 0.2 |
| Comparative Example 5-6 | A | A | A | A | B | B | A | 0.4 |
| Comparative Example 5-7 | A | A | A | A | A | B | A | 0.4 |
| Comparative Example 5-8 | A | A | A | A | B | B | A | 0.4 |

As shown in Tables 14 and 15, each of the gas barrier resin compositions of Examples 5-1 to 5-27 had, even though the biomass-derived raw material was partially used, superior gas barrier properties that compare favorably to a gas barrier resin composition derived from only a fossil fuel (the gas barrier resin composition of Comparative Example 5-2). In addition, each of the gas barrier resin compositions of Examples 5-1 to 5-27 had sufficient long-run workability, as the evaluation results on the film formation flaw and the streak with respect to the film produced after 1 hour from the start of the operation were A or B.

Moreover, from the results of the Examples and the Comparative Examples, with respect to the gas barrier resin composition in which the EVOH was used, specific properties were ascertained in which the long-run workability tends to be improved as the biobased content becomes lower, whereas the gas barrier properties did not depend on the biobased content. For example, each of the gas barrier resin compositions of Examples 5-1 to 5-3, 5-5 to 5-27 having a biobased content of 65% or less had superior long-run workability, as the evaluation results on the film formation flaw and the streak with respect to the films produced after hour and after 5 hours from the start of the operation were A or B.

In addition, it was suggested that from the results of Comparative Example 5-2 and Comparative Example 5-4, containing the polyamide (E) in the gas barrier resin composition may be required for expression of the retort resistance, and that from the results of Comparative Example 5-2 and Comparative Example 5-3, the long-run workability can be improved due to the metal atom (F).

Synthesis of EVOH

Production of Each Pellet of EVOH (A6-1) to EVOH (A6-9), EVOH (B6-1) to EVOH (B6-4)

EVOH (A6-1) pellets to EVOH (A6-9) pellets and EVOH (B6-1) to EVOH (B6-4) pellets were produced in a similar manner to the EVOH (A5-1) pellets, except that each of types of ethylene and vinyl acetate, and contents of the phosphate compound and the boron compound of the raw materials (raw material monomers) was as shown in Table 16. As the fossil fuel-derived ethylene, ethylene manufactured by AIR LIQUIDE Kogyo Gas Ltd. was employed.

With respect to each of the EVOH (A6-1) pellets to EVOH (A6-9) pellets and the EVOH (B6-1) to the EVOH (B6-4) pellets, in accordance with the Evaluation Methods (1), (2) to (5) described above, measurement of the ethylene unit content and the degree of saponification, quantitative determination of carboxylic acid, quantitative determination of the metal ion, the phosphate compound, and the boron compound, and measurement of the biobased content were performed. The results are shown in Table 16.

TABLE 16

| | Raw materials | | | EVOH pellets | | | | | | |
|---|---|---|---|---|---|---|---|---|---|---|
| | ethylene | | | | | | | | | |
| | derived from plant mass % | derived from fossil fuel mass % | vinyl acetate type (mass ratio) | ethylene unit content mol % | degree of saponification mol % | carboxylic acid content ppm | metal ion content ppm | phosphate compound content ppm | boron compound content ppm | biobased content % |
| EVOH (A6-1) | 100 | 0 | VAM1 | 27 | >99 | 250 | 200 | 10 | 700 | 100 |
| EVOH (A6-2) | 100 | 0 | VAM2 | 27 | >99 | 250 | 200 | 10 | 700 | 100 |
| EVOH (A6-3) | 0 | 100 | VAM2 | 27 | >99 | 250 | 200 | 10 | 700 | 68 |
| EVOH (A6-4) | 50 | 50 | VAM3 | 27 | >99 | 250 | 200 | 10 | 700 | 50 |
| EVOH (A6-5) | 50 | 50 | VAM3/VAM4 (50/50) | 27 | >99 | 250 | 200 | 10 | 700 | 33 |
| EVOH (A6-6) | 30 | 70 | VAM4 | 27 | >99 | 250 | 200 | 10 | 700 | 10 |

TABLE 16-continued

| | Raw materials | | | EVOH pellets | | | | | | |
|---|---|---|---|---|---|---|---|---|---|---|
| | ethylene derived from plant mass % | derived from fossil fuel mass % | vinyl acetate type (mass ratio) | ethylene unit content mol % | degree of saponification mol % | carboxylic acid content ppm | metal ion content ppm | phosphate compound content ppm | boron compound content ppm | biobased content % |
| EVOH (A6-7) | 30 | 70 | VAM4 | 27 | >99 | 250 | 200 | 0 | 0 | 10 |
| EVOH (A6-8) | 30 | 70 | VAM4 | 27 | >99 | 250 | 200 | 10 | 0 | 10 |
| EVOH (A6-9) | 30 | 70 | VAM4 | 27 | >99 | 250 | 200 | 0 | 700 | 10 |
| EVOH (B6-1) | 0 | 100 | VAM4 | 27 | >99 | 250 | 200 | 10 | 700 | 0 |
| EVOH (B6-2) | 0 | 100 | VAM4 | 27 | >99 | 250 | 200 | 0 | 0 | 0 |
| EVOH (B6-3) | 0 | 100 | VAM4 | 27 | >99 | 250 | 200 | 10 | 0 | 0 |
| EVOH (B6-4) | 0 | 100 | VAM4 | 27 | >99 | 250 | 200 | 0 | 700 | 0 |

Thermoplastic Elastomer (G)

Modified thermoplastic elastomers (G) used in the Examples and the Comparative Examples were as in the following.

Unmodified Thermoplastic Elastomer (g 1)
G-3: Tuftec (registered trademark) H 1041 (manufactured by Asahi Kasei Corporation, styrene-derived elastomer resin)
G-7: TAFMER (registered trademark) P 0280 (manufactured by Mitsui Chemicals, Inc., ethylene-propylene copolymer)

Modified Thermoplastic Elastomer (g 2)
G-1: Modic (registered trademark) GQ 131 (manufactured by Mitsubishi Chemical Corporation, unsaturated carboxylic acid-modified polyester elastomer resin)
G-2: Modic (registered trademark) GQ 430 (manufactured by Mitsubishi Chemical Corporation, unsaturated carboxylic acid-modified polyester elastomer resin)
G-4: Tuftec (registered trademark) M 1911 (manufactured by Asahi Kasei Corporation, unsaturated carboxylic acid-modified styrene-derived elastomer resin)
G-5: TAFMER (registered trademark) MH 7020 (manufactured by Mitsui Chemicals, Inc., maleic anhydride-modified ethylene-butene copolymer)
G-6: TAFMER (registered trademark) MP 0610 (manufactured by Mitsui Chemicals, Inc., maleic anhydride-modified ethylene-propylene copolymer)

Halogen Atom-Containing Styrene Thermoplastic Elastomer (g 3)
G-8: SIBSTAR (registered trademark) 062T-FD (manufactured by Kaneka Corporation, SIBS; styrene-isobutylene-styrene triblock copolymer)

Example 6-1

After dry blending 9 parts by mass of the EVOH (A6-1) pellets, 81 parts by mass of the EVOH (B6-1) pellets, and 10 parts by mass of pellets of the thermoplastic elastomer (G-5), extrusion was conducted by using a twin-screw extruder ("2D 25W" available from Toyo Seiki Seisaku-sho, Ltd., 25 mmφ, die temperature: 220° C., screw rotation speed: 100 rpm), in a nitrogen atmosphere, followed by pelletization to give gas barrier resin composition pellets of Example 6-1.

With respect to resultant gas barrier resin composition pellets of Example 1, in accordance with the Evaluation Methods (1), (3) to (5), (7), (16), (17) described above, measurement of the ethylene unit content and the degree of saponification, quantitative determination of carboxylic acid, quantitative determination of the metal ion, the phosphate compound, and the boron compound, measurement or evaluation of the biobased content, the long-run workability, the oxygen transmission rate, and the flex resistance were performed. The results are shown in Table 18.

Examples 6-2 to 6-27, Comparative Examples 6-1 to 6-5

Each of gas barrier resin composition pellets of Examples 6-2 to 6-27 and Comparative Examples 6-1 to 6-5 were produced and evaluated in a similar manner to Example 6-1, except that each of types and contents of the EVOHs used, types and contents of the thermoplastic elastomers (G), and types, trade names and contents of the additives was changed as shown in Table 17. The results are shown in Table 18. It is to be noted that in Example 6-14, Irganox 1098 manufactured by BASF Japan Co. Ltd., being an antioxidant, was used as an additive. Moreover, in Example 6-19, ZHT-4A manufactured by Kyowa Chemical Industry Co., Ltd. being a halogen scavenger, was used as an additive. Upon dry blending of various types of pellets, each of the additives was also dry blended to give the gas barrier resin composition pellets.

TABLE 17

| | Gas barrier resin composition pellets | | | | | | | | | | |
|---|---|---|---|---|---|---|---|---|---|---|---|
| | EVOH (A) | | EVOH (B) | | thermoplastic elastomer (G) | | | | | additive | | |
| | | | | | unmodified | modified | thermoplastic elastomer including | | | | | |
| | type | Content parts by mass | type | content parts by mass | thermoplastic elastomer (g1) | thermoplastic elastomer (g2) | halogen atom (g3) | mass ratio (g1/g2) | content parts by mass | type | trade name | content parts by mass |
| Example 6-1 | EVOH (A6-1) | 9 | EVOH (B6-1) | 81 | — | G-5 | — | — | 10 | — | — | — |
| Example 6-2 | EVOH (A6-1) | 45 | EVOH (B6-1) | 45 | — | G-5 | — | — | 10 | — | — | — |
| Example 6-3 | EVOH (A6-1) | 63 | EVOH (B6-1) | 27 | — | G-5 | — | — | 10 | — | — | — |
| Example 6-4 | EVOH (A6-1) | 72 | EVOH (B6-1) | 18 | — | G-5 | — | — | 10 | — | — | — |
| Example 6-5 | EVOH (A6-2) | 9 | EVOH (B6-1) | 8 | — | G-5 | — | — | 10 | — | — | — |
| Example 6-6 | EVOH (A6-2) | 45 | EVOH (B6-1) | 45 | — | G-5 | — | — | 10 | — | — | — |
| Example 6-7 | EVOH (A6-3) | 9 | EVOH (B6-1) | 81 | — | G-5 | — | — | 10 | — | — | — |
| Example 6-8 | EVOH (A6-3) | 45 | EVOH (B6-1) | 45 | — | G-5 | — | — | 10 | — | — | — |
| Example 6-9 | EVOH (A6-4) | 9 | EVOH (B6-1) | 8 | — | G-5 | — | — | 10 | — | — | — |
| Example 6-10 | EVOH (A6-4) | 45 | EVOH (B6-1) | 45 | — | G-5 | — | — | 10 | — | — | — |
| Example 6-11 | EVOH (A6-5) | 9 | EVOH (B6-1) | 81 | — | G-5 | — | — | 10 | — | — | — |
| Example 6-12 | EVOH (A6-5) | 45 | EVOH (B6-1) | 45 | — | G-5 | — | — | 10 | — | — | — |
| Example 6-13 | EVOH (A6-6) | 81 | EVOH (B6-1) | 9 | — | G-5 | — | — | 10 | — | — | — |
| Example 6-14 | EVOH (A6-6) | 81 | EVOH (B6-1) | 9 | — | G-5 | — | — | 10 | antioxidant | Irganox 1098 | 0.5 |
| Example 6-15 | EVOH (A6-6) | 72 | EVOH (B6-1) | 8 | G-3 | G-4 | — | 10/10 | 20 | — | — | — |
| Example 6-16 | EVOH (A6-6) | 63 | EVOH (B6-1) | 7 | G-7 | G-6 | — | 27/3 | 30 | — | — | — |
| Example 6-17 | EVOH (A6-6) | 72 | EVOH (B6-1) | 8 | — | G-1 | — | — | 20 | — | — | — |
| Example 6-18 | EVOH (A6-6) | 72 | EVOH (B6-1) | 8 | — | G-2 | — | — | 20 | — | — | — |
| Example 6-19 | EVOH (A6-6) | 8 | EVOH (B6-1) | 9 | — | — | G-8 | — | 10 | halogen scavenger | ZHT-4A | 0.1 |
| Example 6-20 | EVOH (A6-3) | 90 | — | — | — | G-5 | — | — | 10 | — | — | — |
| Example 6-21 | EVOH (A6-4) | 90 | — | — | — | G-5 | — | — | 10 | — | — | — |
| Example 6-22 | EVOH (A6-5) | 90 | — | — | — | G-5 | — | — | 10 | — | — | — |
| Example 6-23 | EVOH (A6-6) | 90 | — | — | — | G-5 | — | — | 10 | — | — | — |
| Example 6-24 | EVOH (A6-7) | 90 | — | — | — | G-5 | — | — | 10 | — | — | — |
| Example 6-25 | EVOH (A6-8) | 90 | — | — | — | G-5 | — | — | 10 | — | — | — |
| Example 6-26 | EVOH (A6-9) | 90 | — | — | — | G-5 | — | — | 10 | — | — | — |
| Example 6-27 | EVOH (A6-1) | 10 | EVOH (B6-1) | 90 | — | — | — | — | 0 | — | — | — |
| Comparative Example 6-1 | EVOH (A6-1) | 90 | — | — | — | G-5 | — | — | 10 | — | — | — |
| Comparative Example 6-2 | — | — | EVOH (B6-1) | 90 | — | G-5 | — | — | 10 | — | — | — |
| Comparative Example 6-3 | — | — | EVOH (B6-2) | 90 | — | G-5 | — | — | 10 | — | — | — |
| Comparative Example 6-4 | — | — | EVOH (B6-3) | 90 | — | G-5 | — | — | 10 | — | — | — |
| Comparative Example 6-5 | — | — | EVOH (B6-4) | 90 | — | G-5 | — | — | 10 | — | — | — |

TABLE 18

| | Gas barrier resin composition pellets | | | | | | | Evaluation film formation flaw |
| --- | --- | --- | --- | --- | --- | --- | --- | --- |
| | ethylene unit content mol % | degree of saponification mol % | carboxylic acid content Ppm | metal ion content ppm | phosphate compound content ppm | boron compound content ppm | biobased content % | after 1 hour — |
| Example 6-1 | 27 | >99 | 200 | 180 | 9 | 630 | 9 | A |
| Example 6-2 | 27 | >99 | 200 | 180 | 9 | 630 | 44 | B |
| Example 6-3 | 27 | >99 | 200 | 180 | 9 | 630 | 62 | B |
| Example 6-4 | 27 | >99 | 200 | 180 | 9 | 630 | 70 | B |
| Example 6-5 | 27 | >99 | 200 | 180 | 9 | 630 | 9 | A |
| Example 6-6 | 27 | >99 | 200 | 180 | 9 | 630 | 44 | B |
| Example 6-7 | 27 | >99 | 200 | 180 | 9 | 630 | 6 | A |
| Example 6-8 | 27 | >99 | 200 | 180 | 9 | 630 | 30 | A |
| Example 6-9 | 27 | >99 | 200 | 180 | 9 | 630 | 4 | A |
| Example 6-10 | 27 | >99 | 200 | 180 | 9 | 630 | 22 | A |
| Example 6-11 | 27 | >99 | 200 | 180 | 9 | 630 | 3 | A |
| Example 6-12 | 27 | >99 | 200 | 180 | 9 | 630 | 15 | A |
| Example 6-13 | 27 | >99 | 200 | 180 | 9 | 630 | 8 | A |
| Example 6-14 | 27 | >99 | 200 | 180 | 9 | 630 | 8 | A |
| Example 6-15 | 27 | >99 | 170 | 160 | 8 | 560 | 8 | A |
| Example 6-16 | 27 | >99 | 150 | 140 | 7 | 490 | 6 | A |
| Example 6-17 | 27 | >99 | 170 | 160 | 8 | 560 | 7 | A |
| Example 6-18 | 27 | >99 | 170 | 160 | 8 | 560 | 7 | A |
| Example 6-19 | 27 | >99 | 200 | 180 | 9 | 630 | 8 | A |
| Example 6-20 | 27 | >99 | 200 | 180 | 9 | 630 | 60 | B |
| Example 6-21 | 27 | >99 | 200 | 180 | 9 | 630 | 44 | B |
| Example 6-22 | 27 | >99 | 200 | 180 | 9 | 630 | 29 | A |
| Example 6-23 | 27 | >99 | 200 | 180 | 9 | 630 | 9 | A |
| Example 6-24 | 27 | >99 | 200 | 180 | 0 | 0 | 9 | A |
| Example 6-25 | 27 | >99 | 200 | 180 | 9 | 0 | 9 | A |
| Example 6-26 | 27 | >99 | 200 | 180 | 0 | 630 | 9 | A |
| Example 6-27 | 27 | >99 | 220 | 200 | 10 | 700 | 10 | A |
| Comparative Example 6-1 | 27 | >99 | 200 | 180 | 9 | 630 | 88 | C |
| Comparative Example 6-2 | 27 | >99 | 200 | 180 | 9 | 630 | 0 | A |
| Comparative Example 6-3 | 27 | >99 | 200 | 180 | 0 | 0 | 0 | A |
| Comparative Example 6-4 | 27 | >99 | 200 | 180 | 9 | 0 | 0 | A |
| Comparative Example 6-5 | 27 | >99 | 200 | 180 | 0 | 630 | 0 | A |

| | Evaluation | | | | | | |
| --- | --- | --- | --- | --- | --- | --- | --- |
| | film formation flaw | streak | | roll edge coloring | | oxygen | |
| | after 5 hours — | after 1 hour — | after 5 hours — | after 1 hour — | after 5 hours — | transmission rate mL/(m$^2 \cdot$ day $\cdot$ atm) | flex resistance — |
| Example 6-1 | A | A | A | A | A | 0.2 | B |
| Example 6-2 | B | B | B | B | B | 0.2 | B |
| Example 6-3 | B | B | B | B | B | 0.2 | B |
| Example 6-4 | C | B | C | C | C | 0.2 | B |
| Example 6-5 | A | A | A | A | A | 0.2 | B |
| Example 6-6 | B | B | B | B | B | 0.2 | B |
| Example 6-7 | A | A | A | A | A | 0.2 | B |
| Example 6-8 | B | A | B | A | A | 0.2 | B |
| Example 6-9 | A | A | A | A | A | 0.2 | B |
| Example 6-10 | B | A | B | A | A | 0.2 | B |
| Example 6-11 | A | A | A | A | A | 0.2 | B |
| Example 6-12 | B | A | A | A | A | 0.2 | B |
| Example 6-13 | A | A | A | A | A | 0.2 | B |
| Example 6-14 | A | A | A | A | A | 0.2 | B |
| Example 6-15 | A | A | A | A | A | 0.3 | B |
| Example 6-16 | A | A | A | A | A | 0.3 | A |
| Example 6-17 | A | A | A | A | A | 0.3 | B |
| Example 6-18 | A | A | A | A | A | 0.3 | B |
| Example 6-19 | A | A | A | A | A | 0.2 | B |
| Example 6-20 | B | B | B | B | B | 0.2 | B |
| Example 6-21 | B | B | B | B | B | 0.2 | B |

TABLE 18-continued

| | | | | | | | |
|---|---|---|---|---|---|---|---|
| Example 6-22 | B | A | B | A | A | 0.2 | B |
| Example 6-23 | A | A | A | A | A | 0.2 | B |
| Example 6-24 | A | A | A | B | B | 0.2 | B |
| Example 6-25 | A | A | A | A | A | 0.2 | B |
| Example 6-26 | A | A | A | B | B | 0.2 | B |
| Example 6-27 | A | A | A | A | A | 0.2 | C |
| Comparative Example 6-1 | C | C | C | C | C | 0.2 | B |
| Comparative Example 6-2 | A | A | A | A | A | 0.2 | B |
| Comparative Example 6-3 | A | A | A | B | B | 0.2 | B |
| Comparative Example 6-4 | A | A | A | A | A | 0.2 | B |
| Comparative Example 6-5 | A | A | A | B | B | 0.2 | B |

Example 6-28

Using the gas barrier resin composition pellets obtained in Example 6-13, oxidative degradation resistance was evaluated by the Evaluation Method (11) described above. The oxidative degradation resistant time period was 65 hours.

Example 6-29

Using the gas barrier resin composition pellets obtained in Example 6-14, oxidative degradation resistance was evaluated by the Evaluation Method (11) described above. The oxidative degradation resistant time period was 280 hours.

In addition, using the gas barrier resin composition pellets obtained in Example 6-14, a multilayer pipe was produced according to the following procedure. High density polyethylene ("Novatec (registered trademark) HD HE 421" manufactured by Japan Polyethylene Corporation, density: 0.956 g/cc, MFR: 0.14 g/10 min) was fed into a first extruder, each of the gas barrier resin composition pellets obtained in Example 6-14 was fed into a second extruder, and as an adhesive resin, "Admer (registered trademark) NF 408E", manufactured by Mitsui Chemicals, Inc., was fed into a third extruder. By using a circular die for three layers each selected from three types, extrusion molding into a multilayer pipe having an external diameter of 20 mm was performed, followed by immediately thereafter, cooling to solidify through a cooling water bath which had been adjusted to 40° C. Successful molding of the multilayer pipe was enabled, and a layer configuration thereof included the gas barrier resin composition layer as the outermost layer, with the gas barrier resin composition layer/the adhesive resin layer/the high density polyethylene layer being 100 µm/100 µm/2,000 µm. From these results, it is revealed that the gas barrier resin composition described in Example 6-14 can be suitably used for intended usages such as pipes, which are presumed to be used for a long period of time.

Example 6-30

The gas barrier resin composition pellets obtained in Example 6-1 were used to form into a film under the following conditions, followed by trimming into a silage film having a width of 500 mm and an entire thickness of 25.5 µm.
  apparatus: a 7-kind 7-layer blown film extruder (manufactured by Brampton Engineering)
  layer configuration and thickness of each layer:
    outer layer 1/outer layer 2/adhesive resin layer 1/gas barrier resin composition layer/adhesive resin layer 2/outer layer 3/outer layer 4
    outer layers 1 and 4: a melt-kneaded product of 97% by mass linear low density polyethylene (TUFLIN HS-7028 NT7 manufactured by Dow Chemical Company (MFR: 1.0 g/10 min)) and 3% by mass polyisobutene (PB32 manufactured by Soltex), each 6 µm
    outer layers 2 and 3: a melt-kneaded product of 90% by mass linear low density polyethylene (TUFLIN HS-7028 NT7 manufactured by Dow Chemical Company (MFR: 1.0 g/10 min)) and 10% by mass polyisobutene (PB32 manufactured by Soltex), each 4 µm
    adhesive resin layers 1 and 2: linear low density polyethylene modified with maleic anhydride (Admer NF 498, manufactured by Mitsui Chemicals, Inc.), each 2.0 µm
    gas barrier resin composition layer: 1.5 µm
Conditions for Film Formation
Extruder
  extruder 1: 45 mmφ single screw extruder (L/D=24) . . . outer layer 1
  extruder 2: 30 mmφ single screw extruder (L/D=24) . . . outer layer 2
  extruder 3: 30 mmφ single screw extruder (L/D=24) . . . outer layer 3
  extruder 4: 45 mmφ single screw extruder (L/D=24) . . . outer layer 4
  extruder 5: 30 mmφ single screw extruder (L/D=24) . . . adhesive resin layer 1
  extruder 6: 30 mmφ single screw extruder (L/D=24) . . . adhesive resin layer 2
  extruder 7: 30 mmφ single screw extruder (L/D=20) . . . gas barrier resin composition layer
Temperature Setting and Rotational Speed:
  extruder 1, 4: C1/C2/C3/A=180° C./190° C./205° C./205° C., 27 rpm
  extruder 2, 3: C1/C2/C3/A=180° C./190° C./205° C./205° C., 69 rpm
  extruder 5, 6: C1/C2/C3/A=190° C./225° C./215° C./220° C., 26 rpm
  extruder 7: C1/C2/C3/A=180° C./210° C./215° C./220° C., 19 rpm
  die: 150 mm, temperature preset at 220° C.
  stretch ratio (Blow up rate): 3.09
Wrapping Test
  Pasture grass shaped into a size of p 120 cm×120 cm was wrapped by means of the silage film obtained and a remote control wrapper WM1600R (manufactured by Takakita Co., Ltd.). The resulting silage film was ascertained to be capable of favorably wrapping pasture grass and be suitable as a silage film.

Example 6-31

Using the gas barrier resin composition pellets obtained in Example 6-1, a film for a grain storage bag having a width of 900 mm and an entire thickness of 230 μm was produced by extruding: the resin constituting the outer layer A with the extruders 1 and 2; the resin constituting the outer layer D with the extruders 3 and 4; the resin constituting the adhesive resin layers B and C with the extruders 5 and 6; and resin constituting the gas barrier resin composition layer with the resin extruder 7, followed by trimming, under production conditions similar to those for the silage film of Example 29, except for the die: 75 mm, and the stretch proportion: 1.5. From the film thus obtained, a bag having a size of 400 mm×700 mm was produced as a grain storage bag.

Layer Configuration and Thickness of Each Layer:
    outer layer A/adhesive resin layer B/gas barrier resin composition layer/adhesive resin layer C/outer layer D
Resin Used
    outer layer A, D: LLDPE; SCLAIR FP 120-A (manufactured by NOVA Chemicals) extruders 1 and 3: each 50 μm, extruders 2 and 4: each 47 μm, each 97 μm in total
    adhesive resin layer B, C: Admer (registered trademark) NF 498A (manufactured by Mitsui Chemicals, Inc.) each 12 μm
    gas barrier resin composition layer: 12 μm Germination Ability Test
The grain storage bag thus obtained was packed with 50 kg of corn and stored outdoors for 180 days. After storage, germination ability of the corn was evaluated. The germination ability of the corn after the storage was approximately equivalent to that of the corn before the storage.

Example 6-32

Production of Delaminatable Container
Using the gas barrier resin composition pellets obtained in Example 6-17, a delaminatable container having a main body portion and a top mouth portion ((inner face side) inner face layer (LLDPE)/adhesion layer (a blend of modified polyolefin and LLDPE)/outermost layer (gas barrier resin composition layer)/outer layer (LLDPE) (external surface side)) was produced by blow molding under conditions shown below.

Container Shape
    main body portion: φ47 mm, height 110 mm
    top mouth portion: φ30 mm, height 16 mm
Layer Configuration
    outer layer: unmodified polypropylene (NOBLEN (registered trademark) FSX 16E 9, manufactured by Sumitomo Chemical Co., Ltd.)
    inner layer: having a three layer structure of: outermost layer/adhesion layer/inner face layer, in the order from the outer layer side
    outermost layer: the gas barrier resin composition obtained in Example 17
    adhesion layer: a blend of modified polyolefin (Modic (registered trademark) L 522, manufactured by Mitsubishi Chemical Corporation) and LLDPE (HARMOREX (registered trademark) F 325N, manufactured by Japan Polyethylene Corporation) in 1:1
    inner face layer: LLDPE (HARMOREX (registered trademark) F 325N, manufactured by Japan Polyethylene Corporation)

Blow Molding Conditions
The resins each molten to form the above layer configuration were coextruded to produce a laminated parison in a molten state. During production of the laminated parison, a lip width was controlled such that the top mouth portion had a greater thickness. Such a laminated parison was set in a blow molding die and molded into a desired shape of container by blow molding process. During the blow molding process, the top mouth portion was controlled to have a thickness sufficiently greater than the thickness of the body portion. The coextrusion conditions were adjusted to give: thicknesses of both the outer layer and the inner layer other than the top mouth portion ranging from 70 to 130 μm; and a thickness ratio of outer layer/inner layer ranging from 0.8 to 1.3. The blow molding conditions involved: a blowing pressure of 0.4 MPa; a die temperature of 25° C.; and a blowing time period of 15 seconds.

Measurement of Thickness of Top Mouth Portion
The top mouth portion of the delaminatable container thus obtained was cut with a microtome to prepare a section. Such a section was placed on a slide glass to measure a thickness of the top mouth portion with an optical microscope. The top mouth portion had a thickness of 0.5 mm.

Delamination Resistant Properties of Top Mouth Portion
An air inlet was formed in an outer layer of the body of the delaminatable container thus obtained and air was injected between the outer layer and the inner layer from the air inlet for preliminary delamination. The air was injected at a pressure of 0.3 MPa for 1.0 sec. After the preliminary delamination, while the air inlet was closed, the container was squeezed with a force of 30 kg to apply a pressure to the air between the outer layer and the inner layer. In this situation, whether the air leaked from an interface between the outer layer and the inner layer in the top mouth portion was checked. As a result, air leakage from the interface in the top mouth portion was not observed. It is to be noted that, due to direct lamination between the gas barrier resin composition layer and the LLDPE layer, at the interface between the gas barrier resin composition layer and the LLDPE layer, the delaminatable container obtained was a container having appropriate delamination properties at the main body portion.

Example 6-33

In a similar manner to Example 6-31 except for: producing a laminated parison without controlling the lip width; and molding without controlling the thicknesses of the top mouth portion and the body also during blow molding, a delaminatable container was produced and evaluated. The thickness of the top mouth portion was 0.3 mm, and air leakage was found in the delamination properties test of the top mouth portion.

As in Example 6-32, the container with some thickness in the top mouth portion was capable of readily inhibiting delamination of the top mouth portion. In contrast, as in Example 6-33, the container with insufficient thickness in the top mouth portion insufficiently inhibited delamination of the top mouth portion.

As shown in Tables 17 and 18, each of the gas barrier resin compositions of Examples 6-1 to 6-27 had, even though the biomass-derived raw material was partially used, superior gas barrier properties and superior flex resistance that compare favorably to a gas barrier resin composition derived from only a fossil fuel (the gas barrier resin composition of Comparative Example 6-2, etc.). In addition, each of the gas barrier resin compositions of Example 6-1 to 6-27 had sufficient long-run workability, as the evaluation results on the film formation flaw and the streak, with respect to the film produced after one hour from the start of the operation were A or B.

Moreover, from the results of the Examples and the Comparative Examples, with respect to the gas barrier resin composition in which the EVOH was used, specific properties were ascertained in which the long-run workability and the flex resistance tend to be improved as the biobased content becomes lower, whereas the gas barrier properties did not depend on the biobased content. For example, each of the gas barrier resin compositions of Examples 6-1 to 6-3, 6-5 to 6-27 having a biobased content of 65% or less had superior long-run workability, as the evaluation results on the film formation flaw, the streak, and the roll edge coloring were A or B, with respect to the films produced after one hour and after 5 hours from the start of the operation.

Furthermore, although evaluation on oxidative degradation resistance by Example 6-28 and Example 6-29, and evaluations of: the silage film by Example 6-30; the grain storage bag by Example 6-31; and the delaminatable container by Example 6-32 and Example 6-33 were conducted, respectively, all of the results indicated superior practical application characteristics.

Example 7-1

After dry blending the EVOH (A1-1) pellets and the EVOH (B1-1) pellets in a mass ratio (A1-1/B1-1) of 10/90, extrusion was conducted by using a twin-screw extruder ("2D 25W" available from Toyo Seiki Seisaku-sho, Ltd., 25 mmφ, die temperature: 220° C., screw rotation speed: 100 rpm), in a nitrogen atmosphere, followed by pelletization to give gas barrier resin composition pellets of Example 7-1.

With respect to resultant gas barrier resin composition pellets of Example 7-1, in accordance with the Evaluation Methods (1), (3) to (5), (18) to (22) described above, measurement of the ethylene unit content and the degree of saponification, quantitative determination of carboxylic acid, quantitative determination of the metal ion, the phosphate compound, and the boron compound, measurement or evaluation of the biobased content, multilayer film evaluation, shrinkability evaluation of the thermo-shrinkable film, evaluation of the multilayer thermoformed container, streak evaluation of the blow-molded container, and measurement or evaluation of the fuel permeation rate were performed. The results are shown in Table 19 and Table 20.

Examples 7-2 to 7-22, Comparative Examples 7-1 to 7-6

Each of gas barrier resin composition pellets of Examples 7-2 to 7-22 and Comparative Examples 7-1 to 7-6 was produced and evaluated in a similar manner to Example 7-1, except that each of types and mass ratios (proportions) of the EVOHs used was changed as shown in Table 19. It is to be noted that with respect to each of the each gas barrier resin composition pellets of Examples 7-21 and 7-22, evaluation of the multilayer thermoformed container, streak evaluation of the blow-molded container, and measurement or evaluation of the fuel permeation rate were not performed. The results are shown in Table 20.

Example 7-23, Comparative Examples 7-7 and 7-8

Evaluation of Coextruded Coated Paper

As a substrate, carton paper (thickness: 500 μm, grammage: 400 g/m²) was used, and coextrusion coating of five layers each selected from three types was carried out on the substrate. The coextrusion involved a configuration of: low density polyethylene/adhesion layer/gas barrier resin composition layer/adhesion layer/low density polyethylene/carton paper, which a thickness configuration being 20/5/5/5/20/500 μm. For combining and partitioning resins fed from each extruder of an extruder for low density polyethylene, an extruder for EVOH, and an extruder for the adhesive layer, a feed block and a T-die were employed. As the low density polyethylene, linear low density polyethylene ("ULTZEX (trademark) 2022L" manufactured by Prime Polymer Co., Ltd.) was used, and as the adhesion layer, polypropylene modified with maleic anhydride (manufactured by Mitsui Chemicals, Inc., "Admer (trademark) QF-500") was used. In this procedure, temperature conditions of the feed block, and the T-die were 250° C., and the drawing speed setting was 300 m/min. With respect to the coextruded coated paper produced after 3 hours from the start of the operation, the presence or absence of streak(s) on the coextruded coated face side was evaluated by visual inspection, according to the following evaluation criteria.

Evaluation Criteria of Streak
A (favorable): no streak being found;
B (somewhat favorable): streak(s) being found;
C (unfavorable): a large number of streaks being found
Results of the evaluations of coextruded coated paper performed using, as the gas barrier resin composition, each gas barrier resin composition pellets of Example 7-19, Comparative Example 7-2 and Comparative Example 7-4 are referred to as Example 7-23, Comparative Example 7-7 and 7-8, respectively. The streak evaluation results of Example 7-23 and Comparative Example 7-8 were A, whereas the streak evaluation result of Comparative Example 7-7 was C.

TABLE 19

Gas barrier resin composition pellets

| | EVOH (A) | | EVOH (B) | | ethylene unit content mol % | degree of saponification mol % | carboxylic acid ppm | metal ion ppm | phosphate compound ppm | boron compound ppm | biobased content % |
|---|---|---|---|---|---|---|---|---|---|---|---|
| | type | proportion mass % | Type | proportion mass % | | | | | | | |
| Example 7-1 | EVOH (A1-1) | 10 | EVOH (B1-1) | 90 | 32 | >99 | 220 | 200 | 10 | 700 | 10 |
| Example 7-2 | EVOH (A1-1) | 50 | EVOH (B1-1) | 50 | 32 | >99 | 220 | 200 | 10 | 700 | 50 |
| Example 7-3 | EVOH (A1-1) | 70 | EVOH (B1-1) | 30 | 32 | >99 | 220 | 200 | 10 | 700 | 70 |

TABLE 19-continued

| | Gas barrier resin composition pellets | | | | | | | | | |
|---|---|---|---|---|---|---|---|---|---|---|
| | EVOH (A) | | EVOH (B) | | ethylene unit content mol % | degree of saponification mol % | carboxylic acid ppm | metal ion ppm | phosphate compound ppm | boron compound ppm | biobased content % |
| | type | proportion mass % | Type | proportion mass % | | | | | | | |
| Example 7-4 | EVOH (A1-1) | 80 | EVOH (B1-1) | 20 | 32 | >99 | 220 | 200 | 10 | 700 | 80 |
| Example 7-5 | EVOH (A1-2) | 10 | EVOH (B1-1) | 90 | 32 | >99 | 220 | 200 | 10 | 700 | 10 |
| Example 7-6 | EVOH (A1-2) | 50 | EVOH (B1-1) | 50 | 32 | >99 | 220 | 200 | 10 | 700 | 50 |
| Example 7-7 | EVOH (A1-3) | 10 | EVOH (B1-1) | 90 | 32 | >99 | 220 | 200 | 10 | 700 | 7 |
| Example 7-8 | EVOH (A1-3) | 50 | EVOH (B1-1) | 50 | 32 | >99 | 220 | 200 | 10 | 700 | 34 |
| Example 7-9 | EVOH (A1-4) | 10 | EVOH (B1-1) | 90 | 32 | >99 | 220 | 200 | 10 | 700 | 5 |
| Example 7-10 | EVOH (A1-4) | 50 | EVOH (B1-1) | 50 | 32 | >99 | 220 | 200 | 10 | 700 | 25 |
| Example 7-11 | EVOH (A1-5) | 10 | EVOH (B1-1) | 90 | 32 | >99 | 220 | 200 | 10 | 700 | 3 |
| Example 7-12 | EVOH (A1-5) | 50 | EVOH (B1-1) | 50 | 32 | >99 | 220 | 200 | 10 | 700 | 17 |
| Example 7-13 | EVOH (A1-6) | 90 | EVOH (B1-1) | 10 | 32 | >99 | 220 | 200 | 10 | 700 | 9 |
| Example 7-14 | EVOH (A1-3) | 100 | — | — | 32 | >99 | 220 | 200 | 10 | 700 | 68 |
| Example 7-15 | EVOH (A1-4) | 100 | — | — | 32 | >99 | 220 | 200 | 10 | 700 | 50 |
| Example 7-16 | EVOH (A1-5) | 100 | — | — | 32 | >99 | 220 | 200 | 10 | 700 | 33 |
| Example 7-17 | EVOH (A1-6) | 100 | — | — | 32 | >99 | 220 | 200 | 10 | 700 | 10 |
| Example 7-18 | EVOH (A1-7) | 100 | — | — | 32 | >99 | 220 | 200 | 0 | 0 | 10 |
| Example 7-19 | EVOH (A1-8) | 100 | — | — | 32 | >99 | 220 | 200 | 10 | 0 | 10 |
| Example 7-20 | EVOH (A1-9) | 100 | — | — | 32 | >99 | 220 | 200 | 0 | 700 | 10 |
| Example 7-21 | EVOH (A1-10) | 100 | — | — | 38 | >99 | 220 | 200 | 10 | 700 | 32 |
| Example 7-22 | EVOH (A1-11) | 100 | — | — | 38 | >99 | 220 | 200 | 10 | 700 | 32 |
| Comparative Example 7-1 | EVOH (A1-1) | 100 | — | — | 32 | >99 | 220 | 200 | 10 | 700 | 100 |
| Comparative Example 7-2 | EVOH (A1-13) | 100 | — | — | 32 | >99 | 220 | 200 | 10 | 0 | 100 |
| Comparative Example 7-3 | — | — | EVOH (B1-1) | 100 | 32 | >99 | 220 | 200 | 10 | 700 | 0 |
| Comparative Example 7-4 | — | — | EVOH (B1-2) | 100 | 32 | >99 | 220 | 200 | 0 | 0 | 0 |
| Comparative Example 7-5 | — | — | EVOH (B1-3) | 100 | 32 | >99 | 220 | 200 | 10 | 0 | 0 |
| Comparative Example 7-6 | — | — | EVOH (B1-4) | 100 | 32 | >99 | 220 | 200 | 0 | 700 | 0 |

TABLE 20

| | Evaluation | | | | | | | | | |
|---|---|---|---|---|---|---|---|---|---|---|
| | Multilayer film | | | | | Thermo-shrinkable film | Thermoformed container | Blow-molded container | | |
| | roll edge streak | | oxygen coloring | | transmission rate cc/($m^2 \cdot$ day $\cdot$ atm) | appearance after shrinkage | appearance after thermoforming | streak | | fuel permeation rate g/($m^2 \cdot$ day) |
| | after 10 hours | after 50 hours | after 10 hours | after 50 hours | | | | after 10 hours | after 50 hours | after 3 hours | |
| Example 7-1 | A | A | A | A | 0.6 | C | A | A | A | 3 |
| Example 7-2 | B | B | B | B | 0.6 | C | B | B | B | 3 |

TABLE 20-continued

|  | Multilayer film | | | | Thermo-shrinkable film | Thermoformed container | | Blow-molded container | |
| --- | --- | --- | --- | --- | --- | --- | --- | --- | --- |
|  | streak | | roll edge coloring | | oxygen transmission rate cc/(m²·day·atm) | appearance after shrinkage | appearance after thermoforming | | streak | fuel permeation rate g/(m²·day) |
|  | after 10 hours | after 50 hours | after 10 hours | after 50 hours | | | after 10 hours | after 50 hours | after 3 hours | |
| Example 7-3 | B | C | B | B | 0.6 | C | B | C | B | 3 |
| Example 7-4 | B | C | C | C | 0.6 | C | B | C | B | 3 |
| Example 7-5 | A | A | A | A | 0.6 | C | A | A | A | 3 |
| Example 7-6 | B | B | B | B | 0.6 | C | B | B | B | 3 |
| Example 7-7 | A | A | A | A | 0.6 | C | A | A | A | 3 |
| Example 7-8 | A | B | A | B | 0.6 | C | A | B | A | 3 |
| Example 7-9 | A | A | A | A | 0.6 | C | A | A | A | 3 |
| Example 7-10 | A | B | A | A | 0.6 | C | A | B | A | 3 |
| Example 7-11 | A | A | A | A | 0.6 | C | A | A | A | 3 |
| Example 7-12 | A | A | A | A | 0.6 | C | A | A | A | 3 |
| Example 7-13 | A | A | A | A | 0.6 | C | A | A | A | 3 |
| Example 7-14 | B | C | B | B | 0.6 | C | B | C | B | 3 |
| Example 7-15 | B | B | B | B | 0.6 | C | B | B | B | 3 |
| Example 7-16 | A | B | A | B | 0.6 | C | A | B | A | 3 |
| Example 7-17 | A | A | A | A | 0.6 | C | A | A | A | 3 |
| Example 7-18 | A | A | B | B | 0.6 | C | A | A | A | 3 |
| Example 7-19 | A | A | A | A | 0.6 | C | A | A | A | 3 |
| Example 7-20 | A | A | B | B | 0.6 | C | A | A | A | 3 |
| Example 7-21 | A | B | A | B | 1.1 | A | — | — | — | — |
| Example 7-22 | A | B | A | B | 2.0 | A | — | — | — | — |
| Comparative Example 7-1 | C | C | C | C | 0.6 | C | C | C | C | 3 |
| Comparative Example 7-2 | C | C | C | C | 0.6 | C | C | C | C | 3 |
| Comparative Example 7-3 | A | A | A | A | 0.6 | C | A | A | A | 3 |
| Comparative Example 7-4 | A | A | B | B | 0.6 | C | A | A | A | 3 |
| Comparative Example 7-5 | A | A | A | A | 0.6 | C | A | A | A | 3 |
| Comparative Example 7-6 | A | A | B | B | 0.6 | C | A | A | A | 3 |

As shown in Tables 19 and 20, the multilayer film in which each of the gas barrier resin compositions of Examples 7-1 to 7-22 was used had, even though the biomass-derived raw material was partially used, superior gas barrier properties that compare favorably to a gas barrier resin composition derived from only a fossil fuel (the multilayer film using the gas barrier resin composition of Comparative Example 7-3). In addition, each of the gas barrier resin compositions of Examples 7-1 to 7-22 had sufficient long-run workability, as the evaluation results on the streak with respect to the multilayer film and the thermoformed container produced after 10 hours from the start of the operation were A or B, and as the evaluation results on the streak with respect to the blow-molded container produced after 3 hours from the start of the operation were A or B. In Example 7-21 and 7-22, in which the thermoshrinkable film using the EVOH having a modifying group was produced, ascertaining favorable shrinkability was enabled.

Moreover, from the results of the Examples and the Comparative Examples, with respect to the gas barrier resin composition in which the EVOH was used, specific properties were ascertained in which the long-run workability tends to be improved as the biobased content becomes lower, whereas the gas barrier properties did not depend on the biobased content. For example, each of the gas barrier resin compositions of Examples 7-1, 7-2, 7-5 to 7-13, 7-15 to 7-22 having a biobased content of 65% or less had superior long-run workability, as the evaluation results on the streak and the roll edge coloring were A or B, with respect to the multilayer films produced after 10 hours and after 50 hours from the start of the operation.

Example 8-1

After dry blending the EVOH (A1-1) pellets and the EVOH (B1-1) pellets in a mass ratio (A1-1/B1-1) of 10/90, column-shaped resin composition pellets of Example 8-1 having an average diameter of 2.8 mm and an average length of 3.2 mm were obtained by: melt-extruding into a strand shape form a strand die with a 30 mmφ twin-screw extruder ("TEX-30SS-30CRW-2V" manufactured by Japan Steel Works, Ltd.) under the following conditions: cooling strand-shaped molten resin extruded out from the strand die in a water bath; and thereafter cutting with a pelletizing machine.

Conditions of Twin-Screw Extruder
  extrusion temperature: 220° C.
  screw rotation speed: 300 rpm
  rate of resin extrusion: 25 kg/hour
  strand die: 3 mmφ, 6 wells With respect to the resin composition pellets obtained in Example 8-1, in accordance with the Evaluation Methods (1), (3) to (5), (23) described above, measurement of the ethylene unit content and the degree of saponification, quantitative determination of carboxylic acid, quantitative determination of the metal ion, the phosphate compound, and the boron compound, and measurement or evaluation of the biobased content and the long-run workability were performed. The results are shown in Table 21.

A planter having a drain hole at a height of 1 cm from the bottom (28.5 cm (upper width)×46.5 cm (upper length)×26 cm (depth); volume 28 L) was used. "Germ guard" (manufactured by Toyobo STC Co., Ltd), a water-absorbing sheet, which had been cut into a size larger than the mounting face of a shelf was laid over the shelf and an excess portion was folded over the bottom of the planter to set therein. Further, a root-proof water-permeable sheet (manufactured by Toyobo STC Co., Ltd) was laid thereon on the interior side of the planter, and then the planter was filled with the resin composition pellets of Example 8-1 to a depth of 20 cm, whereby a plant cultivation medium was obtained. With respect to the plant cultivation medium thus obtained, in accordance with the Evaluation Method (24) described above, the medium evaluation was performed. The results are shown in Table 21.

Examples 8-2 to 8-20, Comparative Examples 8-1 to 8-5

Each of resin composition pellets of Examples 8-2 to 8-20 and Comparative Examples 8-1 to 8-5 were produced and evaluated in a similar manner to Example 8-1 except that each of types and mass ratios (proportions) of the EVOHs used were changed as shown in Table 21. The results are shown in Table 21.

TABLE 21

| | Resin composition pellets | | | | | | |
|---|---|---|---|---|---|---|---|
| | EVOH (A) | | EVOH (B) | | ethylene unit content mol % | degree of saponification mol % | carboxylic acid content ppm |
| | type | proportion mass % | type | proportion mass % | | | |
| Example 8-1 | EVOH (A1-1) | 10 | EVOH (B1-1) | 90 | 32 | >99 | 220 |
| Example 8-2 | EVOH (A1-1) | 50 | EVOH (B1-1) | 50 | 32 | >99 | 220 |
| Example 8-3 | EVOH (A1-1) | 70 | EVOH (B1-1) | 30 | 32 | >99 | 220 |
| Example 8-4 | EVOH (A1-1) | 80 | EVOH (B1-1) | 20 | 32 | >99 | 220 |
| Example 8-5 | EVOH (A1-2) | 10 | EVOH (B1-1) | 90 | 32 | >99 | 220 |
| Example 8-6 | EVOH (A1-2) | 50 | EVOH (B1-1) | 50 | 32 | >99 | 220 |
| Example 8-7 | EVOH (A1-3) | 10 | EVOH (B1-1) | 90 | 32 | >99 | 220 |
| Example 8-8 | EVOH (A1-3) | 50 | EVOH (B1-1) | 50 | 32 | >99 | 220 |
| Example 8-9 | EVOH (A1-4) | 10 | EVOH (B1-1) | 90 | 32 | >99 | 220 |
| Example 8-10 | EVOH (A1-4) | 50 | EVOH (B1-1) | 50 | 32 | >99 | 220 |
| Example 8-11 | EVOH (A1-5) | 10 | EVOH (B1-1) | 90 | 32 | >99 | 220 |
| Example 8-12 | EVOH (A1-5) | 50 | EVOH (B1-1) | 50 | 32 | >99 | 220 |
| Example 8-13 | EVOH (A1-6) | 90 | EVOH (B1-1) | 10 | 32 | >99 | 220 |
| Example 8-14 | EVOH (A1-3) | 100 | — | — | 32 | >99 | 220 |
| Example 8-15 | EVOH (A1-4) | 100 | — | — | 32 | >99 | 220 |
| Example 8-16 | EVOH (A1-5) | 100 | — | — | 32 | >99 | 220 |
| Example 8-17 | EVOH (A1-6) | 100 | — | — | 32 | >99 | 220 |
| Example 8-18 | EVOH (A1-7) | 100 | — | — | 32 | >99 | 220 |
| Example 8-19 | EVOH (A1-8) | 100 | — | — | 32 | >99 | 220 |
| Example 8-20 | EVOH (A1-9) | 100 | — | — | 32 | >99 | 220 |
| Comparative Example 8-1 | EVOH (A1-1) | 100 | — | — | 32 | >99 | 220 |
| Comparative Example 8-2 | — | — | EVOH (B1-1) | 100 | 32 | >99 | 220 |
| Comparative Example 8-3 | — | — | EVOH (B1-2) | 100 | 32 | >99 | 220 |
| Comparative Example 8-4 | — | — | EVOH (B1-3) | 100 | 32 | >99 | 220 |

TABLE 21-continued

| | | | | | | |
|---|---|---|---|---|---|---|
| Comparative Example 8-5 | — | — | EVOH (B1-4) | 100 | 32 | >99 | 220 |

| | Resin composition pellets | | | | Evaluation | medium |
|---|---|---|---|---|---|---|
| | metal ion content ppm | phosphate compound content ppm | boron compound content ppm | biobased content % | amount of adhesion on die | frequency of strand breakage | number of enlarged roots |
| Example 8-1 | 200 | 10 | 700 | 10 | A | A | A |
| Example 8-2 | 200 | 10 | 700 | 50 | B | A | A |
| Example 8-3 | 200 | 10 | 700 | 70 | B | B | A |
| Example 8-4 | 200 | 10 | 700 | 80 | B | B | A |
| Example 8-5 | 200 | 10 | 700 | 10 | A | A | A |
| Example 8-6 | 200 | 10 | 700 | 50 | B | A | A |
| Example 8-7 | 200 | 10 | 700 | 7 | A | A | A |
| Example 8-8 | 200 | 10 | 700 | 34 | B | A | A |
| Example 8-9 | 200 | 10 | 700 | 5 | A | A | A |
| Example 8-10 | 200 | 10 | 700 | 25 | B | A | A |
| Example 8-11 | 200 | 10 | 700 | 3 | A | A | A |
| Example 8-12 | 200 | 10 | 700 | 17 | A | A | A |
| Example 8-13 | 200 | 10 | 700 | 9 | A | A | A |
| Example 8-14 | 200 | 10 | 700 | 68 | B | B | A |
| Example 8-15 | 200 | 10 | 700 | 50 | B | A | A |
| Example 8-16 | 200 | 10 | 700 | 33 | B | A | A |
| Example 8-17 | 200 | 10 | 700 | 10 | A | A | A |
| Example 8-18 | 200 | 0 | 0 | 10 | A | A | A |
| Example 8-19 | 200 | 10 | 0 | 10 | A | A | A |
| Example 8-20 | 200 | 0 | 700 | 10 | A | A | A |
| Comparative Example 8-1 | 200 | 10 | 700 | 100 | C | C | A |
| Comparative Example 8-2 | 200 | 10 | 700 | 0 | A | A | A |
| Comparative Example 8-3 | 200 | 0 | 0 | 0 | A | A | A |
| Comparative Example 8-4 | 200 | 10 | 0 | 0 | A | A | A |
| Comparative Example 8-5 | 200 | 0 | 700 | 0 | A | A | A |

As shown in Table 21, the plant cultivation medium using each of the resin compositions of Examples 8-1 to 8-20 had, even though the biomass-derived raw material was partially used, plant growing performance that compares favorably to a resin composition derived from only a fossil fuel (Comparative Example 8-2). Furthermore, each of the resin compositions of Examples 8-1 to 8-20 had sufficient long-run workability, as the evaluation results on long-run workability (the amount of adhesion on die, the frequency of strand breakage) in continuously producing resin composition pellets were A or B.

Moreover, from the results of the Examples and the Comparative Examples, with respect to the resin composition pellets in which the EVOH was used, specific properties were ascertained in which the long-run workability tends to be improved as the biobased content becomes lower, whereas the plant-growing capacity did not depend on the biobased content. For example, the evaluation result of each of the resin composition pellets having a biobased content of 65% or less in Examples 8-1, 8-2, 8-5 to 8-13, 8-15 to 8-22 was A on the frequency of strand breakage, suggesting superior long-run workability.

EXPLANATION OF THE REFERENCE SYMBOLS 1 cup-shaped container
2 cup main body
3 flange portion
4 opening
5 inner surface
6 outer surface
7 lid
21 continuous multilayer sheet
30 heating apparatus
31, 32 heater
40 die apparatus
50 lower mold half
51 upper mold half
52 recessed part
53 plug
101 vertical form fill seal pouch
110 film material
111 upper edge
112 lower edge
115 body portion
120 rear face
121, 122 side edge
201 plant cultivation apparatus
202 planter
203 opening
204 side wall
204a upper end of side wall
205 outlet
206 water
207 bottom wall
208 shelf
208a placement face of shelf 209 water-absorbing sheet
209a central portion of water-absorbing sheet
209b edge of water-absorbing sheet
210 root-proof water-permeable sheet
210a edge of root-proof water-permeable sheet
211 plant
212 plant cultivation medium
213 pellet (resin composition chip)

The invention claimed is:

1. A gas barrier resin composition comprising at least one type of saponified ethylene-vinyl ester copolymer, wherein
of ethylene and a vinyl ester, which are raw materials of the at least one type of saponified ethylene-vinyl ester copolymer, a part is derived from biomass, and
a remainder is derived from a fossil fuel.

2. The gas barrier resin composition according to claim 1, wherein
the at least one type of saponified ethylene-vinyl ester copolymer comprises:
a saponified ethylene-vinyl ester copolymer (A) in which of ethylene and a vinyl ester, which are raw materials thereof, at least a part is derived from biomass; and
a saponified ethylene-vinyl ester copolymer (B) which is derived from a fossil fuel.

3. The gas barrier resin composition according to claim 2, wherein a mass ratio (A/B) of the saponified ethylene-vinyl ester copolymer (A) to the saponified ethylene-vinyl ester copolymer (B) is 1/99 or more and 99/1 or less.

4. The gas barrier resin composition according to claim 1, wherein the at least one type of saponified ethylene-vinyl ester copolymer comprises an ethylene-vinyl alcohol copolymer (A') in which of ethylene and a vinyl ester, which are raw materials thereof, a part is derived from biomass, and a remainder is derived from a fossil fuel.

5. The gas barrier resin composition according to claim 1, wherein a biobased content of the at least one type of saponified ethylene-vinyl ester copolymer is 1% or more and 99% or less.

6. The gas barrier resin composition according to claim 1, having a biobased content of 1% or more and 99% or less.

7. The gas barrier resin composition according to claim 1, comprising a sulfur compound at a concentration of more than 0 ppm and 100 ppm or less in terms of sulfur atoms.

8. The gas barrier resin composition according to claim 7, wherein the sulfur compound is dimethylsulfide or dimethylsulfoxide.

9. The gas barrier resin composition according to claim 1, wherein of the raw materials, at least a part of the ethylene is derived from biomass.

10. The gas barrier resin composition according to claim 1, wherein of the raw materials, at least a part of the vinyl ester is derived from biomass.

11. The gas barrier resin composition according to claim 1, wherein the at least one type of saponified ethylene-vinyl ester copolymer comprises a modifying group represented by the following general formula (I):

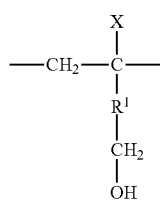

(I)

wherein, in the general formula (1), X represents a hydrogen atom, a methyl group, or a group represented by $R^2$-OH; and $R^1$ and $R^2$ each independently represent a single bond, an alkylene group having 1 to 9 carbon atoms, or an alkyleneoxy group having 1 to 9 carbon atoms, wherein the alkylene group and the alkyleneoxy group may comprise a hydroxyl group, an alkoxy group, or a halogen atom.

12. The gas barrier resin composition according to claim 1, comprising carboxylic acid at a concentration of 30 ppm or more and 1,000 ppm or less in terms of carboxylic acid radical equivalent.

13. The gas barrier resin composition according to claim 1, comprising a metal ion at a concentration of 1 ppm or more and 1,000 ppm or less.

14. The gas barrier resin composition according to claim 1, comprising a phosphate compound at a concentration of 1 ppm or more and 200 ppm or less in terms of phosphorus atoms.

15. The gas barrier resin composition according to claim 1, comprising a boron compound at a concentration of 5 ppm or more and 5,000 ppm or less in terms of boron atoms.

16. The gas barrier resin composition according to claim 1, wherein the at least one type of saponified ethylene-vinyl ester copolymer comprises:
a saponified ethylene-vinyl ester copolymer (X); and
a saponified ethylene-vinyl ester copolymer (Y) having a melting point which is lower than a melting point of the saponified ethylene-vinyl ester copolymer (X).

17. The gas barrier resin composition according to claim 1, further comprising an inorganic particle (C), wherein
a content of the inorganic particle (C) is 50 ppm or more and 5,000 ppm or less.

18. The gas barrier resin composition according to claim 1, further comprising an antioxidant (D), wherein
a content of the antioxidant (D) is 0.01% by mass or more and 5% by mass or less.

19. The gas barrier resin composition according to claim 1, further comprising:
a polyamide (E); and
at least one type of a metal atom (F) selected from the group consisting of atoms of magnesium, calcium, and zinc, wherein
a mass ratio of the polyamide (E) to the at least one type of saponified ethylene-vinyl ester copolymer is 5/95 or more and 40/60 or less, and
a content of the metal atom (F) is 1 ppm or more and 500 ppm or less.

20. The gas barrier resin composition according to claim 1, further comprising a thermoplastic elastomer (G), wherein
a mass ratio of the thermoplastic elastomer (G) to the at least one type of saponified ethylene-vinyl ester copolymer is 5/95 or more and 35/65 or less.

21. A method for producing a gas barrier resin composition, wherein
the method comprises a step of dry-blending pellets of a saponified ethylene-vinyl ester copolymer (A) with pellets of a saponified ethylene-vinyl ester copolymer (B) and carrying out melt kneading,
of ethylene and a vinyl ester, which are raw materials of the saponified ethylene-vinyl ester copolymer (A), at least a part is derived from biomass, and
the saponified ethylene-vinyl ester copolymer (B) is derived from a fossil fuel.

22. A method for producing the gas barrier resin composition according to claim 19, comprising a step of mixing:
pellets of the at least one type of saponified ethylene-vinyl ester copolymer; pellets of the polyamide (E); and a compound comprising at least one type of the metal atom (F) selected from the group consisting of atoms of magnesium, calcium, and zinc, and carrying out melt kneading.

23. A method for producing a gas barrier resin composition, wherein
the method comprises a step of dry-blending pellets of a saponified ethylene-vinyl ester copolymer (A), pellets of a saponified ethylene-vinyl ester copolymer (B), and pellets of a thermoplastic elastomer (G), and carrying out melt kneading,
of ethylene and a vinyl ester, which are raw materials of the saponified ethylene-vinyl ester copolymer (A), at least a part is derived from biomass, and
the saponified ethylene-vinyl ester copolymer (B) is derived from a fossil fuel.

24. A molded product comprising a gas barrier layer formed from the gas barrier resin composition according to claim 1.

25. A film or sheet comprising the molded product according to claim 24.

26. An industrial film or industrial sheet comprising the molded product according to claim 24.

27. A thermoformed container comprising the molded product according to claim 24.

28. A blow-molded container comprising the molded product according to claim 24.

29. A fuel container comprising the blow-molded container according to claim 28.

30. A bottle-shaped container comprising the blow-molded container according to claim 28.

31. A tube comprising the molded product according to claim 24.

32. A pipe comprising the molded product according to claim 24.

33. A paper container comprising the molded product according to claim 24.

34. A monolayer film formed from the gas barrier resin composition according claim 1.

35. A multilayer film comprising at least one layer formed from the gas barrier resin composition according to claim 1.

36. A vapor deposition film comprising:
the monolayer film according to claim 34; and
at least one inorganic vapor deposition layer, being provided on an exposed surface of the monolayer film or the layer formed from the gas barrier resin composition of the multilayer film.

37. A multilayer structure comprising:
the vapor deposition film according to claim 36; and
an other layer provided on the inorganic vapor deposition layer of the vapor deposition film.

38. A heat-sealing film comprising:
the monolayer film according to claim 34.

39. A packaging material comprising at least one layer constituted from the gas barrier resin composition according to claim 1.

40. A plant cultivation medium comprising a molded product formed from a resin composition, wherein
the resin composition is the gas barrier resin composition according to claim 1.

* * * * *